US007484004B2

(12) United States Patent
Pelavin et al.

(10) Patent No.: US 7,484,004 B2
(45) Date of Patent: *Jan. 27, 2009

(54) ANALYZING AN ACCESS CONTROL LIST FOR A ROUTER TO IDENTIFY A SUBSUMPTION RELATION BETWEEN ELEMENTS IN THE LIST

(75) Inventors: Richard N. Pelavin, San Francisco, CA (US); James G. McGuire, Daly City, CA (US); Herbert S. Madan, Sausalito, CA (US)

(73) Assignee: Cisco Technology, Inc., San Jose, CA (US)

( * ) Notice: Subject to any disclaimer, the term of this patent is extended or adjusted under 35 U.S.C. 154(b) by 785 days.

This patent is subject to a terminal disclaimer.

(21) Appl. No.: 11/006,995

(22) Filed: Dec. 7, 2004

(65) Prior Publication Data
US 2005/0102423 A1     May 12, 2005

Related U.S. Application Data

(60) Continuation of application No. 10/074,805, filed on Feb. 12, 2002, now Pat. No. 6,883,034, which is a division of application No. 09/429,767, filed on Oct. 28, 1999, now Pat. No. 6,393,486, which is a division of application No. 08/668,639, filed on Jun. 21, 1996, now abandoned, which is a continuation-in-part of application No. 08/493,984, filed on Jun. 23, 1995, now abandoned.

(51) Int. Cl.
*G06F 15/173* (2006.01)
(52) U.S. Cl. .................. 709/242; 709/238; 370/351
(58) Field of Classification Search ............. 709/238, 709/239, 240, 241, 242, 243, 244; 370/471, 370/351; 726/11
See application file for complete search history.

(56) References Cited

U.S. PATENT DOCUMENTS 5,251,205 A     10/1993   Callon et al.

(Continued)

FOREIGN PATENT DOCUMENTS

GB          2 206 713          1/1989

(Continued)

OTHER PUBLICATIONS

Tsuchida et al., "Structural Representation of Management and Control Information in Broadband Networks," published in the Proceedings of the International Conference on Communications, Chicago, IL (1992).

*Primary Examiner*—Le Luu
(74) *Attorney, Agent, or Firm*—Hickman Palermo Truong & Becker LLP

(57) ABSTRACT

Methods are described for analyzing access list subsumption in routing devices of a computer network and for identifying computer network integrity violations, by producing structured data that includes stored router names and access lists that include elements with address/mask pairs, or patterns used to filter data into and out of a routing device, respectively; determining whether access lists in the structured data include elements in which a first element in the access list has a more general or equal address/mask pair, or pattern, respectively, than a second or subsequent element, or pattern; and storing in electronic memory a report of elements or a list of patterns, respectively, in which a first element or pattern is more general than or equal to a second or subsequent element or pattern.

36 Claims, 104 Drawing Sheets

U.S. PATENT DOCUMENTS

| | | | |
|---|---|---|---|
| 5,301,303 A | 4/1994 | Abraham et al. | |
| 5,317,568 A | 5/1994 | Bixby et al. | |
| 5,351,237 A | 9/1994 | Shinohara et al. | |
| 5,414,812 A | 5/1995 | Filip et al. | |
| 5,434,863 A | 7/1995 | Onishi et al. | |
| 5,485,455 A | 1/1996 | Dobbins et al. | |
| 5,491,690 A | 2/1996 | Alfonsi et al. | |
| 5,509,123 A * | 4/1996 | Dobbins et al. | 709/243 |
| 5,513,171 A | 4/1996 | Ludwiczak et al. | |
| 5,541,911 A | 7/1996 | Nilakantan et al. | |
| 5,588,119 A | 12/1996 | Vincent et al. | |
| 5,699,513 A * | 12/1997 | Feigen et al. | 726/11 |
| 5,751,971 A * | 5/1998 | Dobbins et al. | 709/238 |
| 5,790,554 A * | 8/1998 | Pitcher et al. | 370/471 |
| 5,835,696 A | 11/1998 | Hess | |
| 5,845,091 A * | 12/1998 | Dunne et al. | 709/240 |
| 5,856,974 A | 1/1999 | Gervais et al. | |

FOREIGN PATENT DOCUMENTS

| | | |
|---|---|---|
| WO | WO 95/06989 | 3/1995 |
| WO | WO 97/49214 | 6/1996 |

* cited by examiner

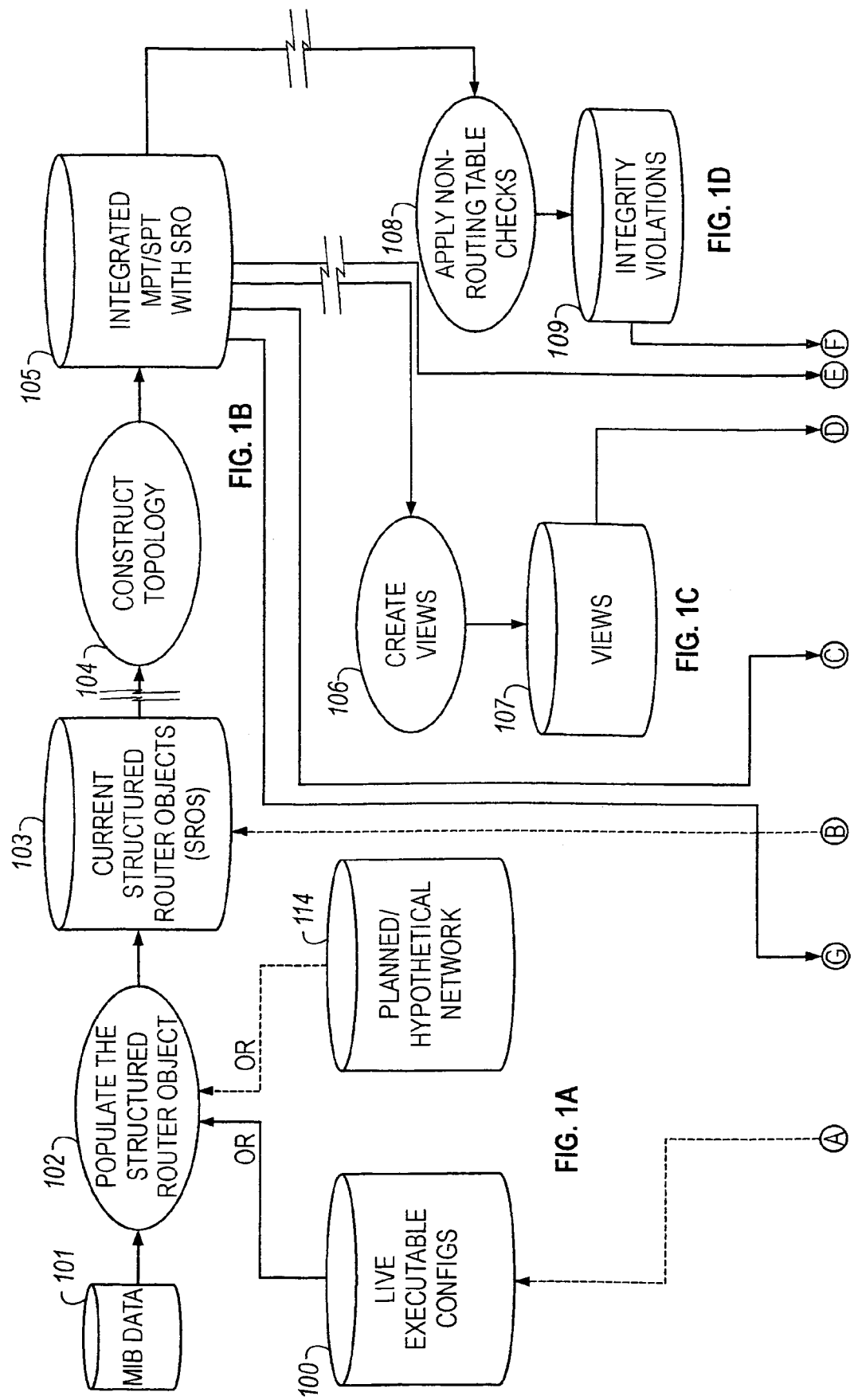

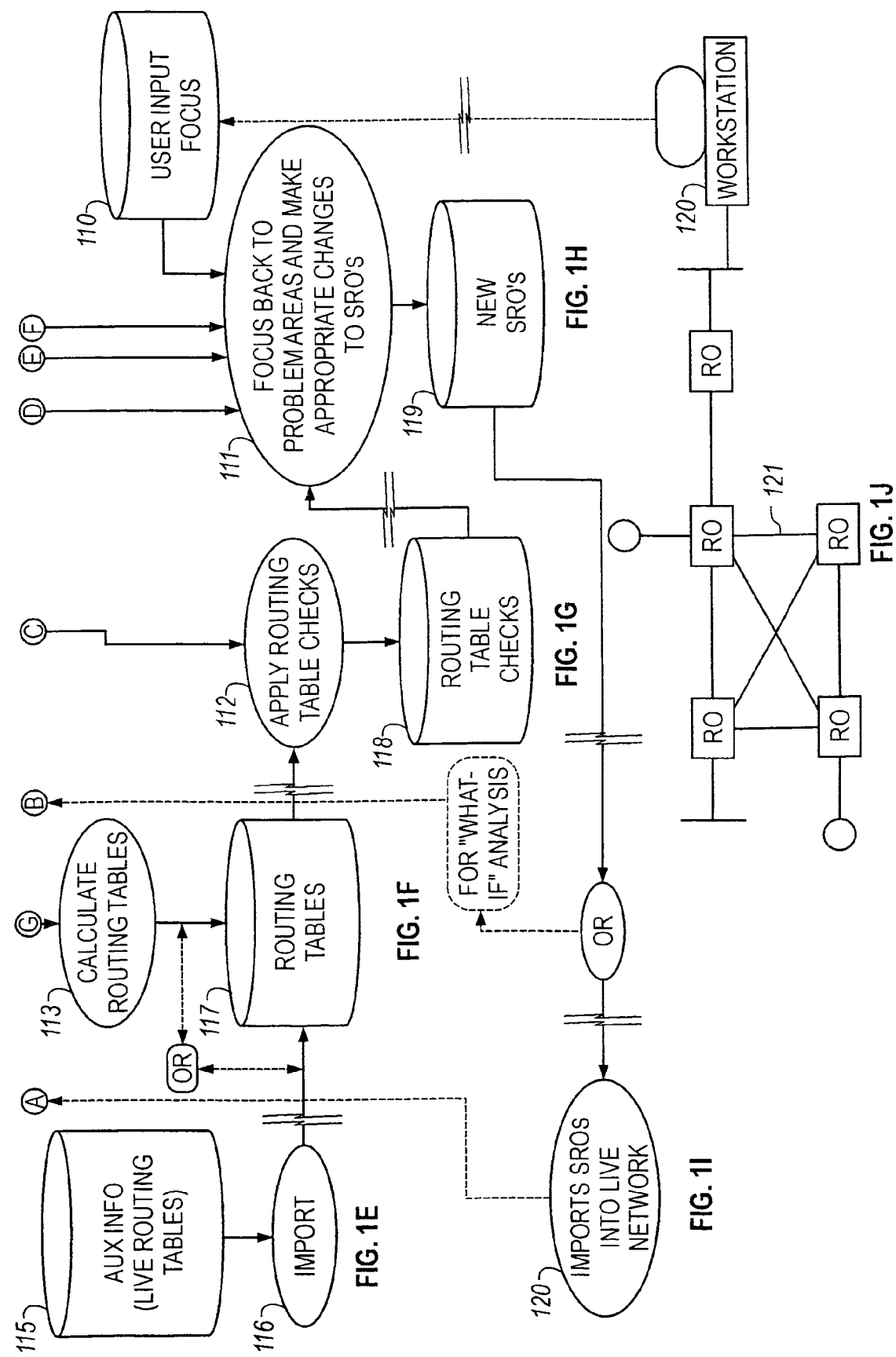

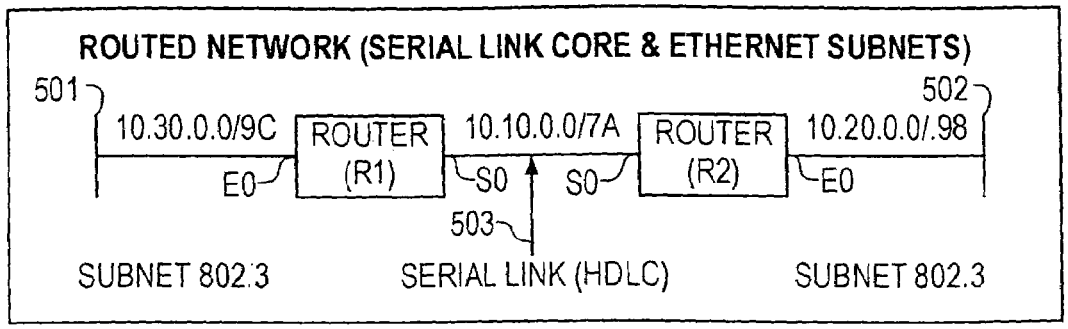

FIG. 5

ROUTER R1:

```
VERSION 10.0
!
HOSTNAME R1
!
NOVELL ROUTING 0000.0C08.94DD
!
INTERFACE ETHERNET0          /-602
IP ADDRESS 10.30.7.2 255.255.0.0
IPX NETWORK 9C
!
INTERFACE SERIAL0   /-601
IP ADDRESS 10.10.4.1 255.255.0.0
IPX NETWORK 7A
BANDWIDTH 1000
!
ROUTER IGRP 109
NETWORK 10.0.0.0
!
```

FIG. 6A

ROUTER R2:

```
VERSION 10.0
!
HOSTNAME R2
!
NOVELL ROUTING 0000.0C04.3A3E
!
INTERFACE ETHERNET0
IP ADDRESS 10.20.5.2 255.255.0.0
IPX NETWORK 98
!
INTERFACE SERIAL0
IP ADDRESS 10.10.4.2 255.255.0.0
IPX NETWORK 7A
!
ROUTER IGRP 109
NETWORK 10.0.0.0
!
! STATIC ROUTE DEFINITION
IP 70.70.3.0 255.255.0.0 199.37.28.3
```

FIG. 6B

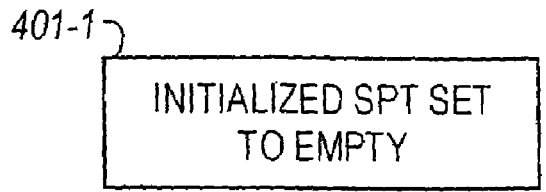
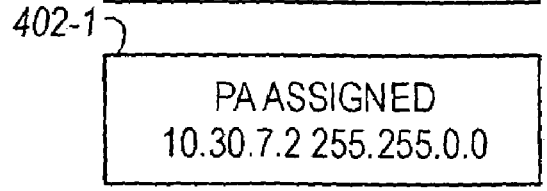
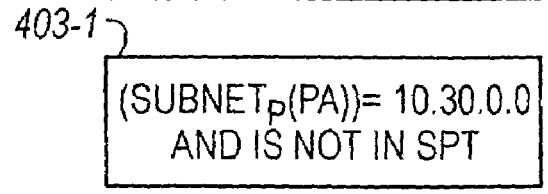
FIG. 8A
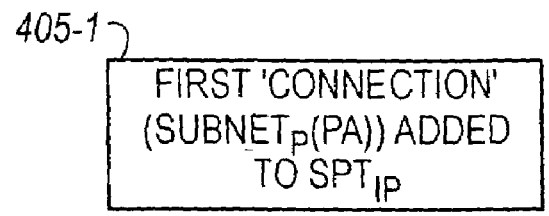
FIG. 8B
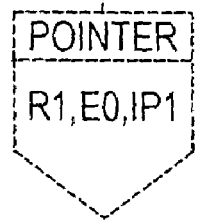
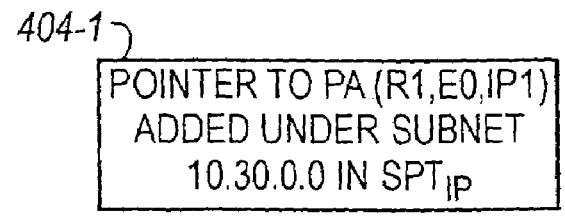
FIG. 8C

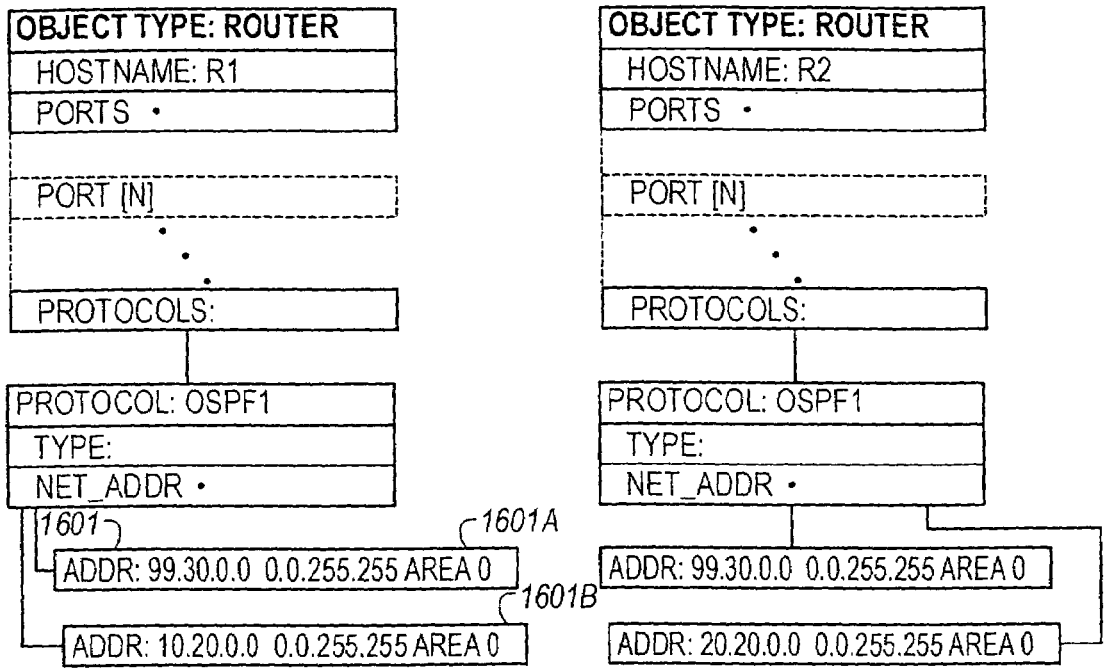
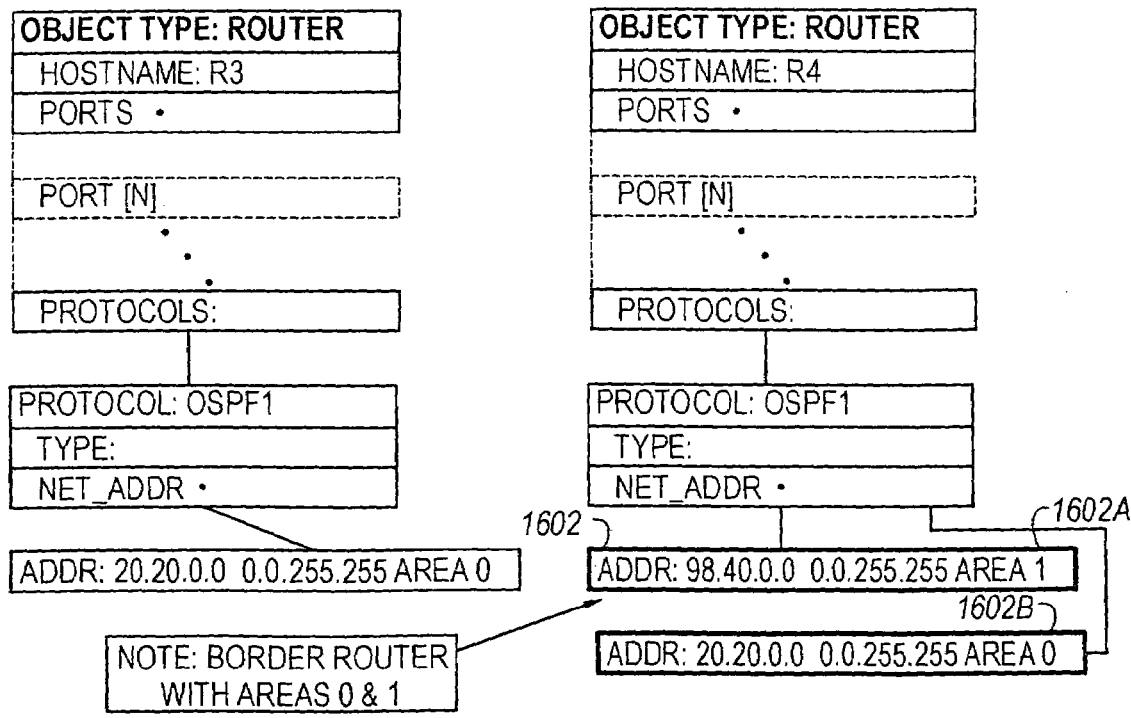
FIG. 16A

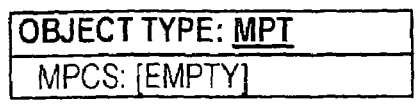
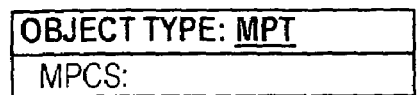
FIG. 24A
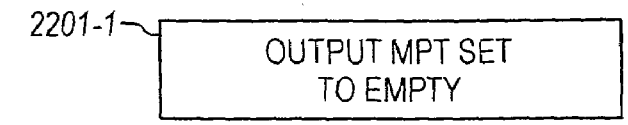
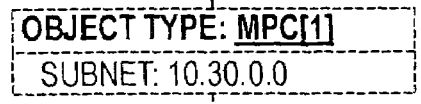
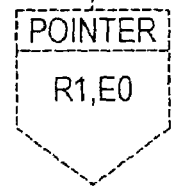
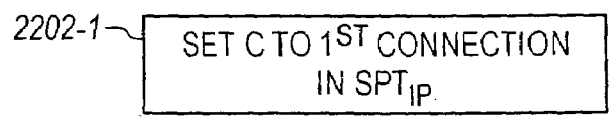
FIG. 24B
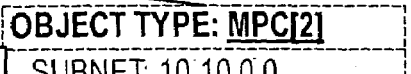
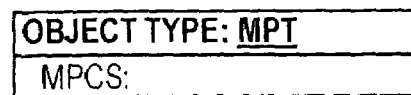
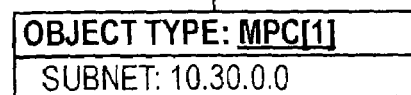
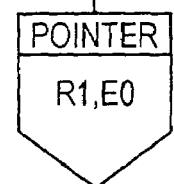
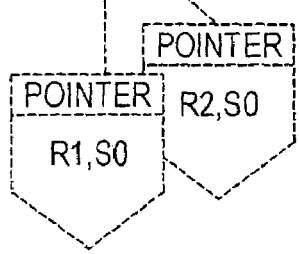
FIG. 24C

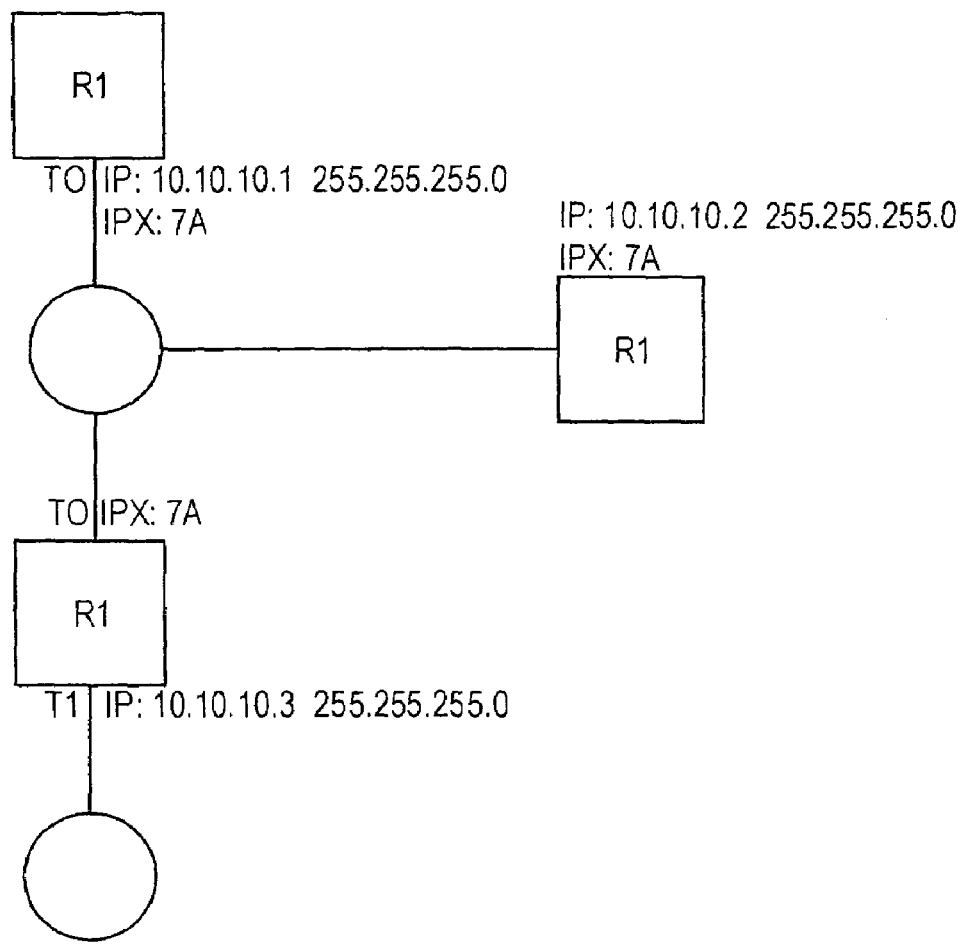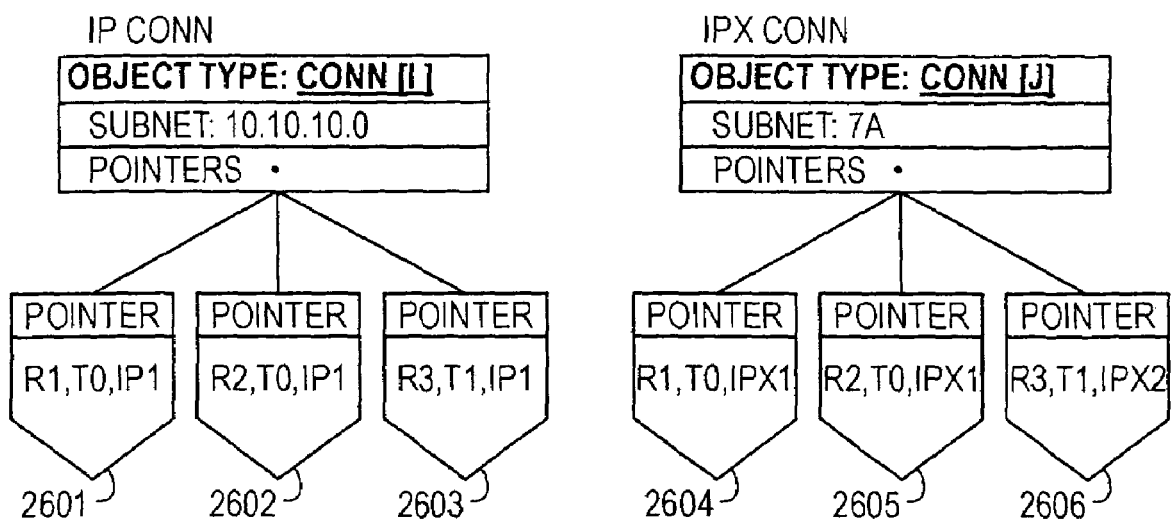
FIG. 26

ROUTER R3: 2901

```
VERSION 10.0
!
HOSTNAME R3
!
NOVELL ROUTING 0000.0C08.94DD
!
INTERFACE LOOPBACK 1
IP ADDRESS 122.33.2.1  255.255.0.0

INTERFACE SERIAL0
IP-UNNUMBERED LOOPBACK 1
IPX NETWORK 8B
!
INTERFACE FDDI 0
IP ADDRESS 20.20.1.1  255.255.0.0
END
```

FIG. 29A

ROUTER R4:

```
VERSION 10.0
!
HOSTNAME R4
!
NOVELL ROUTING 0000.0C04.3A3E
!
INTERFACE LOOPBACK 1
IP ADDRESS 127.38.7.6  255.255.0.0

INTERFACE SERIAL0
IP-UNNUMBERED LOOPBACK 1
IPX NETWORK 9C
!
INTERFACE FDDI 0
IP ADDRESS 20.20.0.0  255.255.0.0
END
```

FIG. 29B

ROUTER R5:

```
VERSION 10.0
!
HOSTNAME R5
!
NOVELL ROUTING 0000.0D09.A5EE
!
INTERFACE LOOPBACK 1
IP ADDRESS 127.38.7.6  255.255.0.0

INTERFACE SERIAL0
IP-UNNUMBERED LOOPBACK 1
IPX NETWORK 8B
!
END
```

FIG. 29C

ROUTER R6:

```
VERSION 10.0
!
HOSTNAME R6
!
NOVELL ROUTING 0000.0D05.4B4F
!
INTERFACE LOOPBACK 1
IP ADDRESS 132.43.12.11  255.255.0.0

INTERFACE SERIAL0
IP-UNNUMBERED LOOPBACK 1
IPX NETWORK 9C
!
END
```

FIG. 29D

NOTE TO FIGURE 34

THE NOTION OF A FRAME RELAY CLOUD IMPLIES FULLY MESHED CONNECTIVITY, YET IN ACTUALITY CONNECTIVITY MAY BE LIMITED AS SHOWN WITH DOTTED LINES INSIDE CLOUD

```
VERSION 10.0
!
HOSTNAME R1
!
IP SUBNET-ZERO
!
INTERFACE SERIAL0
DESCRIPTION SERIAL 0
ENCAPSULATION FRAME-RELAY
IP ADDRESS 117.33.4.1  255.255.0.0
FRAME RELAY MAP IP 117.33.4.2 100 BROADCAST
FRAME RELAY MAP IP 117.33.4.3 101 BROADCAST
FRAME RELAY MAP IP 117.33.4.4 102 BROADCAST
!
ROUTER RIP 109
NETWORK 117.33.0.0
END
```

```
VERSION 10.0
!
HOSTNAME R2
!
IP SUBNET-ZERO
!
INTERFACE SERIAL0
DESCRIPTION SERIAL 0
ENCAPSULATION FRAME-RELAY
IP ADDRESS 117.33.4.1  255.255.0.0
FRAME RELAY MAP IP 117.33.4.1 100 BROADCAST
FRAME RELAY MAP IP 117.33.4.3 101 BROADCAST
!
ROUTER RIP 109
NETWORK 117.33.0.0
END
```

```
VERSION 10.0
!
HOSTNAME R3
!
IP SUBNET-ZERO
!
INTERFACE SERIAL0
DESCRIPTION SERIAL 0
ENCAPSULATION FRAME-RELAY
IP ADDRESS 117.33.4.1  255.255.0.0
FRAME RELAY MAP IP 117.33.4.1 100 BROADCAST
FRAME RELAY MAP IP 117.33.4.2 101 BROADCAST
!
ROUTER RIP 109
NETWORK 117.33.0.0
END
```

FIG. 38C

```
VERSION 10.0
!
HOSTNAME R4
!
IP SUBNET-ZERO
!
INTERFACE SERIAL0
DESCRIPTION SERIAL 0
ENCAPSULATION FRAME-RELAY
IP ADDRESS 117.33.4.1  255.255.0.0
FRAME RELAY MAP IP 117.33.4.1 100 BROADCAST
!
ROUTER RIP 109
NETWORK 117.33.0.0
END
```

FIG. 38D

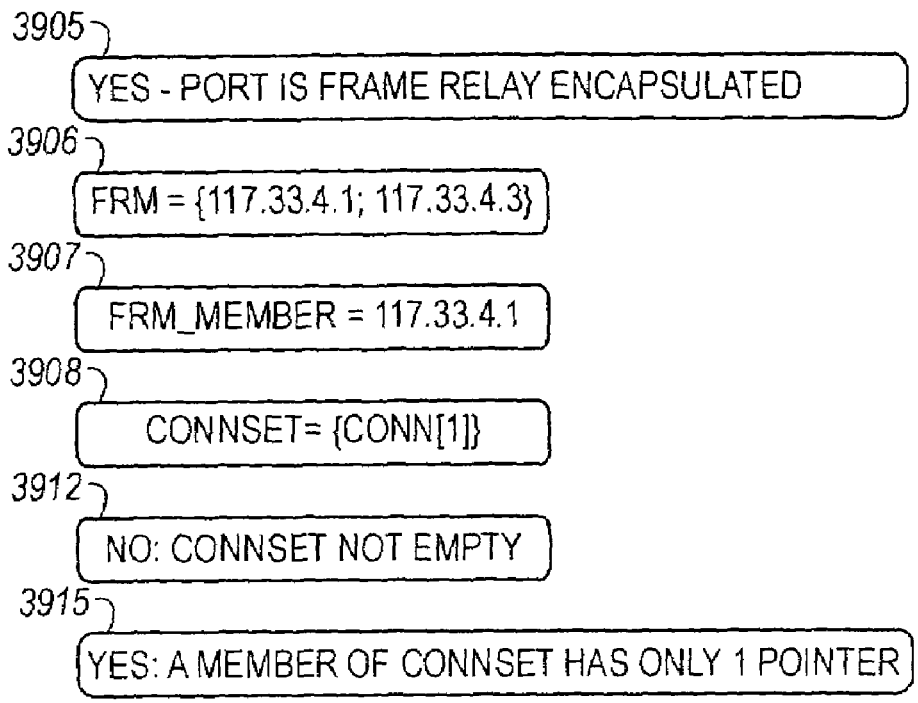
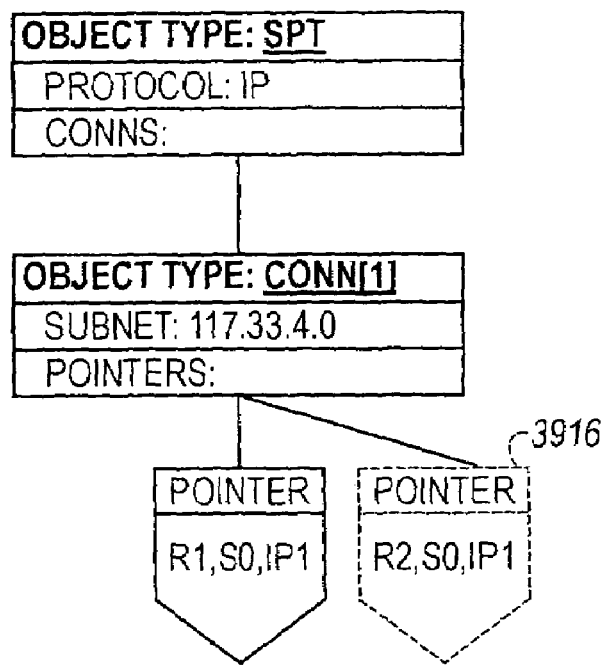
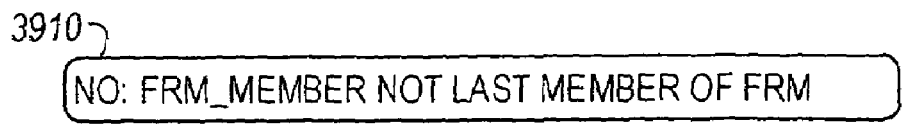
FIG. 39B

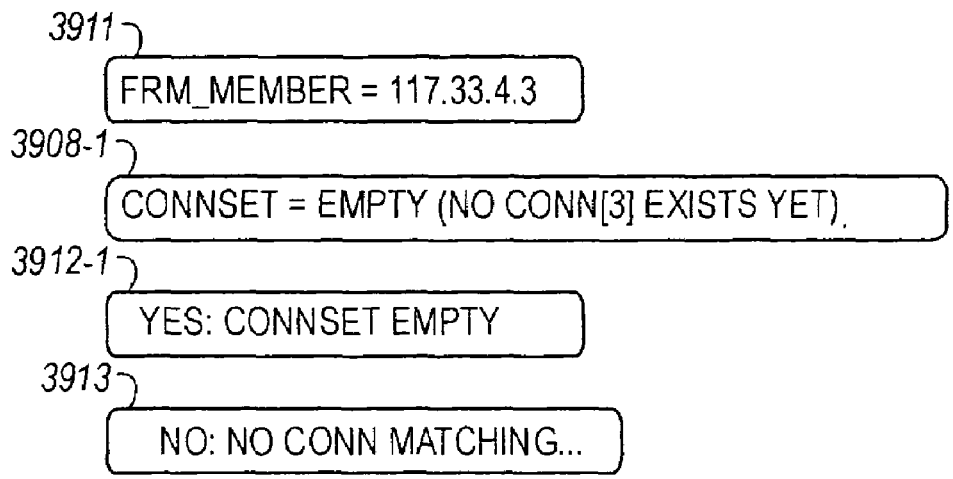
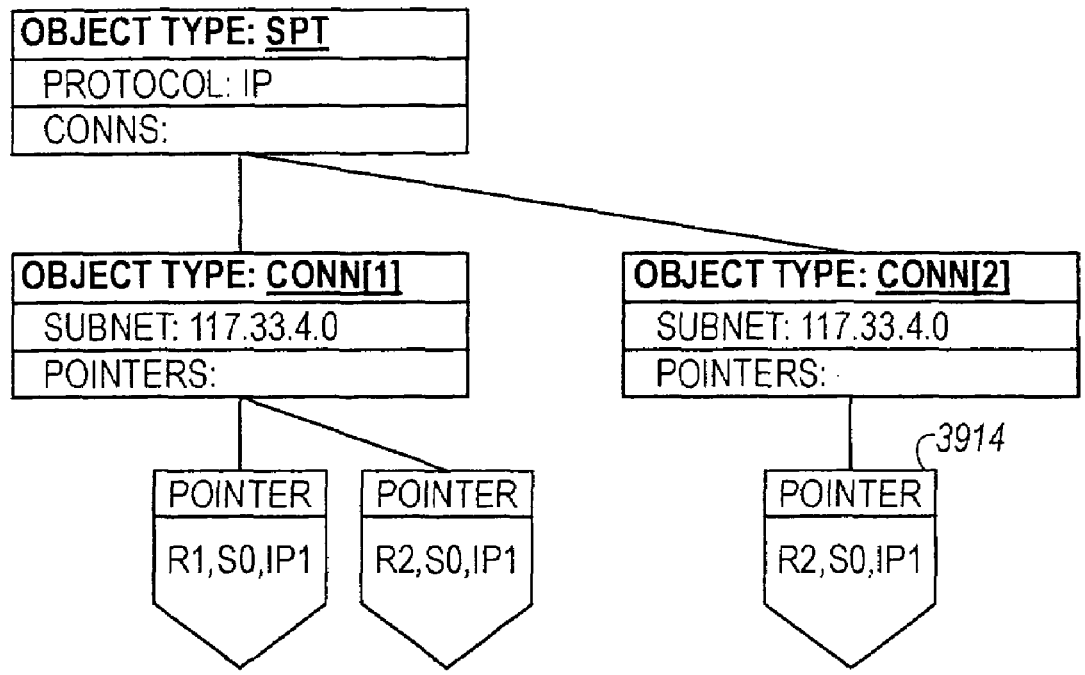
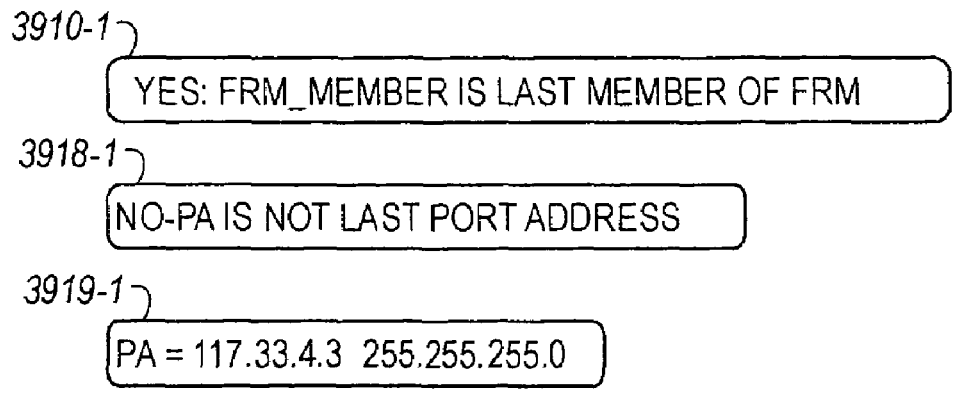
FIG. 39C

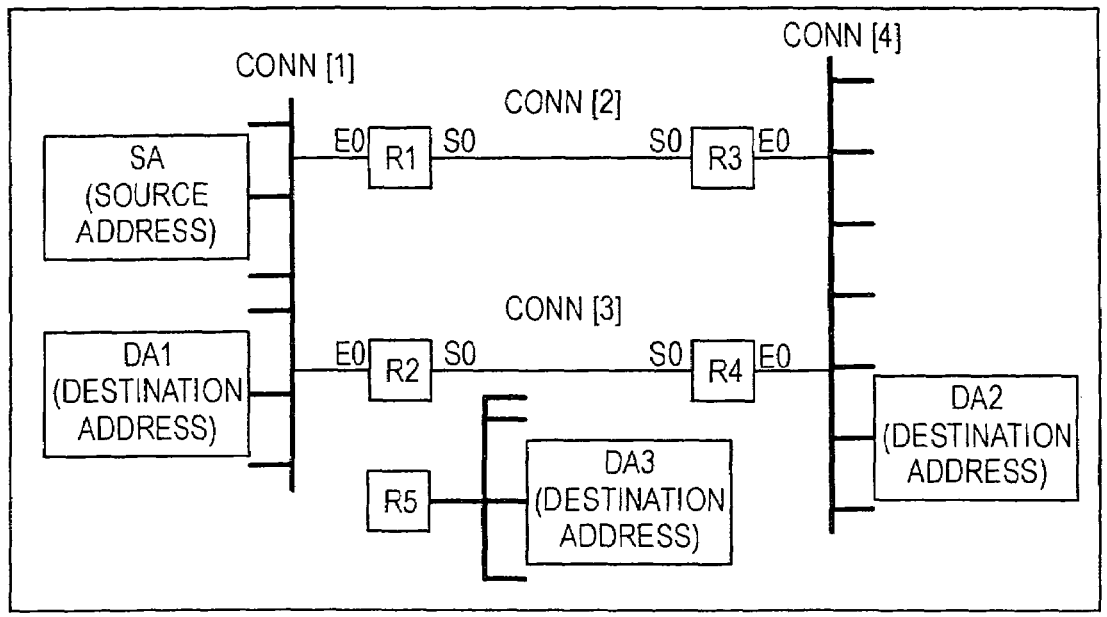

| DATA LABELS USED IN CPS DISCUSSION | |
|---|---|
| SC | SOURCE CONNECTION |
| DC | DESTINATION CONNECTION |
| SA | SOURCE ADDRESS |
| DA | DESTINATION ADDRESS |
| CPS | COMPLETED PATH SET |
| APS | ACTIVE PATH SET |
| SPT | SINGLE PROTOCOL TOPOLOGY |
| CR | CURRENT ROUTER |
| NC | NEW CONNECTION |
| EL | ROUTING TABLE ELEMENT |
| P | PROTOCOL |
| CPO | COST PATH OBJECT |

DEFINITION: COMPLETED PATH SET - CPS

THE SET HAVING: NO ELEMENTS; 1 ELEMENT; OR, MORE THAN 1 ELEMENT

NO ELEMENTS MEANS:   NO PATH FROM SA TO DA
ONE (1) ELEMENT MEANS:  ONE PATH FROM SA TO DA
MORE THAN ONE ELEMENT: MULTIPLE PATHS FROM SA TO DA

THE CPS FOR SA TO DA2 LOOKS LIKE:
   {[SA;CONN[1];R1;CONN[2];R3;CONN[4];DA2]
    [SA;CONN[1];R2;CONN[3];R4;CONN[4]DA2]}

THE CPS FOR SA TO DA1 LOOKS LIKE:
   {[SA;CONN[1];DA1]}

THE CPS FOR SA TO DA3 LOOKS LIKE:
   { }

FIG. 45

ROUTER R1:

```
VERSION 10.0
!
HOSTNAME ROUTER1
!
SOURCE-BRIDGE RING-GROUP 7
SOURCE-BRIDGE 7 TCP 30.50.2.1
!
INTERFACE LOOPBACK 1
IP ADDRESS 50.7.8.3  255.255.0.0
!
END
```

ROUTER R6:

```
VERSION 10.0
!
HOSTNAME ROUTER6
!
SOURCE-BRIDGE RING-GROUP 7
SOURCE-BRIDGE 7 TCP 50.7.8.3
!
INTERFACE LOOPBACK 0
IP ADDRESS 30.50.2.1  255.255.0.0
!
END
```

ANALYZING AN ACCESS CONTROL LIST FOR A ROUTER TO IDENTIFY A SUBSUMPTION RELATION BETWEEN ELEMENTS IN THE LIST

CROSS-REFERENCE TO RELATED APPLICATIONS

This application is a continuation of and claims the benefit of priority to U.S. patent application Ser. No. 10/074,805 filed Feb. 12, 2002 now U.S. Pat. No. 6,883,034; which is a division of U.S. patent application Ser. No. 09/429,767 filed Oct. 28, 1999, now U.S. Pat. No. 6,393,486; which is a division of U.S. patent application Ser. No. 08/668,639 filed on Jun. 21, 1996, now abandoned; which is a continuation-in-part of U.S. patent application Ser. No. 08/493,984 filed on Jun. 23, 1995, now abandoned; the contents of all of which are incorporated by this reference in their entirety for all purposes as if fully disclosed herein.

FIELD OF THE INVENTION

The invention relates in general to computer networks, and more particularly, to the design, modification and management of computer networks.

BACKGROUND OF THE INVENTION

Computer networks comprise multiple computers that are interconnected for communication with each other. A network may include only a few computers physically located close together or it may include many computers dispersed over a wide area. A network may include subnetworks or local area networks (LANs). A network also may include widely separated computers interconnected over a wide area network (WAN). Routing devices, in essence, are specialized computer networking devices that route or guide packets of digitized information throughout a network. Typically, when a host computer sends a packet out onto a network, it includes in the packet address information that specifies the source of the packet, the sending host, and the intended destination of the packet, another host computer connected to the network. The sending and receiving hosts ordinarily are interconnected through routing devices which use packet address information to route packets through the network from one routing device to the next en route from the sending host to the receiving host. Routing devices, therefore, perform a complex and critical role in network operations.

In many environments, networks are subjected to almost continual changes as host computers are added or deleted, for example. Unfortunately, networks are susceptible to failure. In today's information based economy, network failure can have severe implications to organizations that rely upon computer networks as a primary conduit for information. Network management is the process of maintaining the integrity of a network. It involves functions such as, observing the state of a network, monitoring network traffic, troubleshooting the network, making changes to the network and ensuring that the changes have the desired effect. Network management has become increasingly important as the size, diversity and importance of computer networks have grown. The rise in prominence of the Internet underscores the importance of high quality network management.

Complex technical challenges are an inherent feature of the network management function. For instance, network components may be diverse and physically dispersed. Many different communication protocols may be used simultaneously over the network. Security issues play a role in communications between hosts connected to the network. These are just a few of the numerous factors that combine to define the environment in which network management takes place. Some of the more routine objectives of a typical network manager include the swift analysis of large volumes of data, troubleshooting problems in a timely fashion, and implementing changes or upgrades without disruption of normal network operations. Numerous network management tools are available to aid in achieving network management objectives. For example, there are tools that monitor network traffic and tools that monitor management information base (MIB) data. Configuration management tools can produce audit trails that indicate the history of changes to routing device configurations. There are network management stations that can collect information from network probes and present a network manager with data representing the state of the network. Simulation tools can predict the performance and behavior of hypothetical networks. Topology rendering tools can be used to identify possible problems on particular network components as well as network-wide problems.

There are particularly difficult technical challenges in the realm of network management tools that identify possible network-wide problems and that render network topologies. For example, it can be difficult to determine the logical connections between network devices without requiring a live operational network. Additionally, the problems associated with providing a network centric view of potential problems in a network are significantly greater than the problems associated with testing an individual network component for potential problems. Moreover, diagnosing routing table problems may involve complex inquiries aimed at identifying routing loops and identifying dead end paths, for example. Furthermore, security issues involving router access lists can be difficult to diagnose without a relatively comprehensive understanding of the operation of the network containing routers with such access lists, so that, for instance, a route around a blocked host can be tracked.

Thus, there has been a need for improved network management tools that can provide network centric analysis of potential problems and that can provide diverse views of network topology in order to enhance a network manager's ability to manage a network. The present invention meets this need.

SUMMARY OF THE INVENTION

The foregoing needs, and other needs and objects that will become apparent from the following description, are achieved in the present invention, which comprises, in one aspect, a method of resolving conflicts in access control lists in routing devices of an actual or planned routed computer network based on subsumption relations.

According to one embodiment, a method of analysis of access list subsumption comprises producing structured data that includes router names and associated access lists that include elements with address/mask pairs; determining whether access lists include two or more elements in which a first element has a more general or equal address/mask pair than a second, or subsequent, element in the particular access list; and storing a report of access list elements in which a first element has a more general or equal address/mask pair than a subsequent element in the access list. In addition, each access list is related to input packets or to output packets, and is related to a level three protocol.

According to one embodiment, a method of identifying network integrity violations comprises producing structured data that includes router names and associated access lists that include patterns used to filter data into and out of a routing device; determining whether access lists include a subsumption relation in which a first pattern is more general than or equal to a second, or subsequent, pattern in the particular access list; and storing a list of subsumption relations identifying respective pairs of first and second patterns. In addition, each access list is related to input packets or to output packets, and is related to a level three protocol.

In other aspects, the invention encompasses a computer readable medium and a computer apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A-J show a flow chart of the overall data and process flow of the present invention.

FIG. 1A shows the subprocess of populating the Structured Router Objects.

FIG. 1B shows the subprocess of constructing the topology as would logically follow the process shown in FIG. 1A in the use of the invention by a user.

FIG. 1C shows the subprocess of creating the view objects, a process that would typically follow the process shown in FIG. 1B.

FIG. 1D shows the subprocess of applying non-routing table checks, which is another portion of the invention that occurs after the process in FIG. 1B is executed.

FIG. 1E shows the subprocess of importing auxiliary live information (such as routing tables), which is an alternative to constructing routing tables (FIG. 1F), which cab be selected by a user.

FIG. 1F shows the subprocess of calculating routing tables, which is an alternative process to the procedure shown in FIG. 1E.

FIG. 1G shows the subprocess of applying routing table integrity checks which is the procedure executed following either FIG. 1C or FIG. 1F.

FIG. 1H shows the subprocess of the user making changes to the SRO given rendered logical topologies from FIG. 1B, rendered abstract topologies from FIG. 1C, and integrity checks from FIGS. 1D and 1F.

FIG. 1I shows the subprocess of importing modified SROs back into the live network, which occurs logically after the user is satisfied with the network configuration as captured by the set of SROs currently in the database.

FIG. 1J shows a block diagram of a network comprising routers (Ro) and a workstation that can access the network and on which the processes in FIGS. 1A-1I can run.

FIG. 5 is an annotated topology drawing of a hypothetical network, and is referenced by subsequent figures.

FIG. 6A-B are sample router configuration files for routers in FIG. 5.

FIGS. 8A-J are a step-by-step walkthrough of a Single Protocol Topology (SPT) object data structure build routine that is shown in FIG. 4, and illustrate the values of the SPT for Protocol=IP following the execution of steps in FIG. 4 as indicated by annotations on FIG. 5.

FIG. 8A shows the SPT following Step 401, initialized to its EMPTY state.

FIG. 8B shows the population of the SPT following FIG. 4, Step 405, with the first connection (a subnet) added to the object.

FIG. 8C shows the population of the SPT following FIG. 4, Step 404, with a Pointer added to the first Port Address.

FIG. 8D shows the population of the SPT following the second pass of FIG. 4, Step 405, adding the next connection to the object data structure.

FIG. 8E shows the SPT after the second pass of FIG. 4, Step 404, adding the next pointer to the SPT object data structure.

FIG. 8F shows the looping through FIG. 4, adding the remaining pointer to the second connection.

FIG. 8G shows the third pass through FIG. 4, Step 405, adding the third and last connection to the SPT object data structure.

FIG. 8H shows the fourth pass through FIG. 4, Step 404, adding a pointer to SPT that points to the last port address of the hypothetical network configuration.

FIG. 8I shows the completed SPT object following FIG. 4, Step 407.

FIG. 8J shows the SPT that would be created by the process shown in FIG. 4 for the case where Protocol=IPX.

FIG. 11).

FIGS. 16A-B show the SRO object data structures for the routers shown in FIG. 14.

FIGS. 24A through 24I comprise a step-by-step walk-through of the Multi-Protocol Topology (MPT) object data structure build routine, referring to the topology shown in FIG. 5.

FIGS. 24A through 24I illustrate the values in the MPT object following the Step(s) in FIG. 22.

FIG. 24A shows the MPT object initialized to EMPTY.

FIG. 24B shows the addition of the first MpC for protocol=IP following FIG. 22, Step 2203.

FIG. 24C shows the effect of the loop through FIG. 22, Steps 2203-2205, adding another MpC and pointers (again for Protocol=IP) to the object.

FIG. 24D shows the effect of the same loop now finishing MpCs and pointers for Protocol=IP.

FIG. 24E shows the completed MPT for Protocol=IP as would follow FIG. 22, Step 2204.

FIG. 24F shows the addition of the first IPX element of the example following execution of FIG. 22, Step 2208.

FIG. 24G shows the addition of the second IPX element to the MPT object again looping through FIG. 22, Step 2208.

FIG. 24H shows the addition of the last IPX element to the MPT as follows the last pass through FIG. 22, Step 2208.

FIG. 24I shows the completed MPT object as would occur at the time of FIG. 22, Step 2211.

FIG. 26 shows an annotated network diagram and instantiated SPT object data structures that demonstrate a violation of the integrity check that finds mismatched protocols during the building of the MPT.

FIG. 29A through 29D show hypothetical Router Configuration Files for routers (R3 through R6) shown in FIG. 28.

FIGS. 38A through 38D show the router configuration files for each router illustrated in FIG. 34 (topology to demonstrate the Frame Relay multipoint WAN example).

FIGS. 39A through 39F show the step-by-step execution of the flowchart in FIGS. 33A-B by indicating values of variables and instantiations of the SPT as each step of the flowchart is executed. This is part of the process occurring in FIG. 1B.

FIG. 45 is a topology drawing of a hypothetical network and a definition of the Current Path Set (CPS) concept, which is used to provide background to enhance the readers understanding of the concepts explained in FIGS. 46 through 53A-G.

DETAILED DESCRIPTION

Figure 2A:
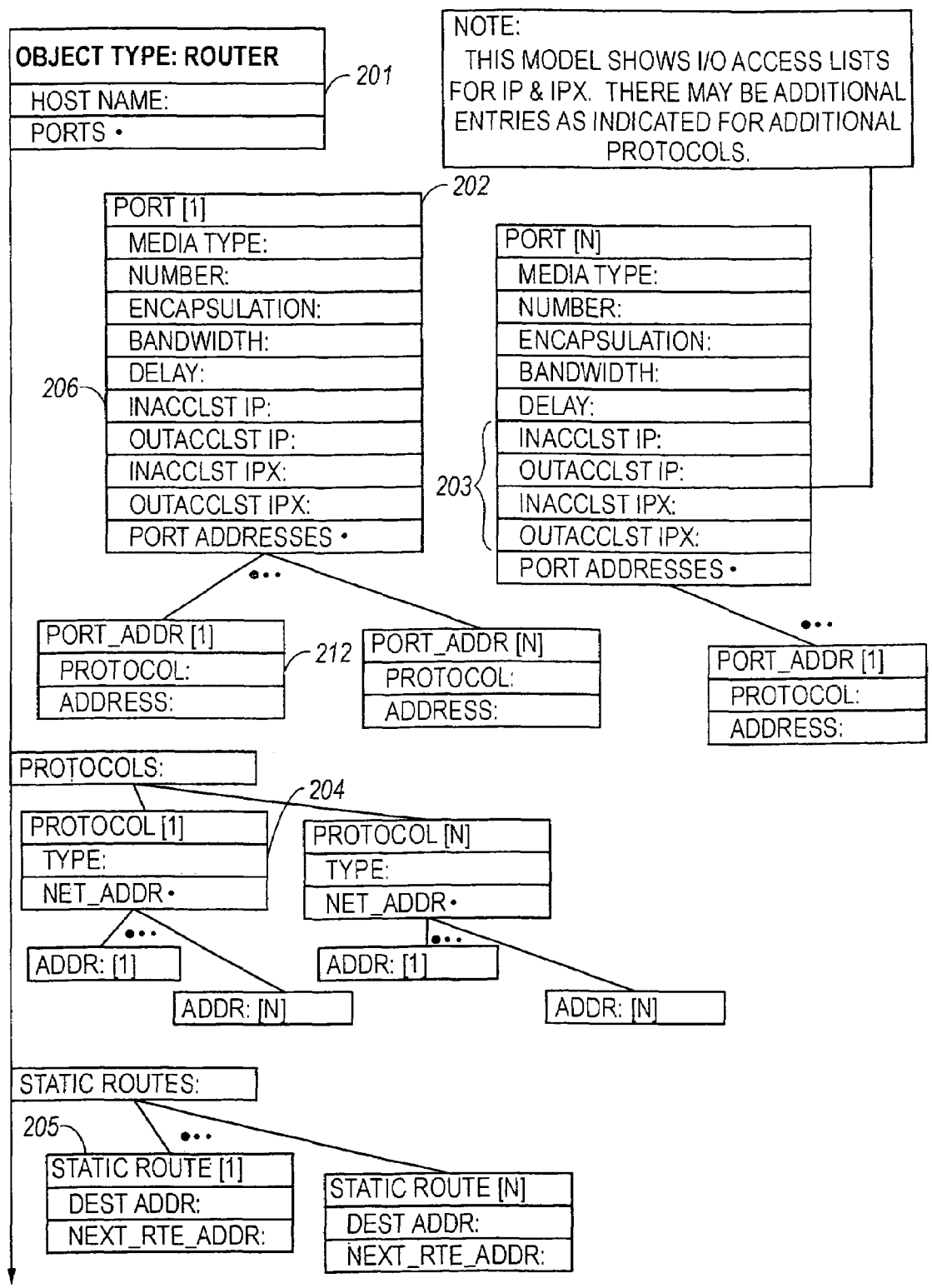
FIGS. 2A-B show the object data structure of the Structured Router Object (SRO) a principal data structure of the invention. A set of SROs serves as the primary input for all subsequent analysis.

The present invention comprises a novel method and apparatus for network management. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

The purpose of the present invention is to assist network managers, administrators and/or planners in managing routed networks for which they are responsible. "Routed Network" herein means a set of logically connected devices, each of which can operate as a switching device at level 3 in the OSI model. A presently preferred embodiment of the invention operates in connection with any of the following environments: a live network to manage; proposed network configuration information existing for a planned network to be analyzed; a live network along with configuration information for a set of planned changes; or, multiple live networks to be merged.

A high level view of FIGS. 1A-1J shows an overall process, in accordance with an embodiment of the invention, for obtaining network information from a variety of sources, putting this information into the invention's data base, rendering different views of the network, applying various integrity checks, using this information to decide if there are problems needing to be addressed, making corrections if there are problems, then either downloading these corrections to the network, or, putting these corrections back in the data base for reiterative analysis. In sum, this process assists the user in: capturing network configuration information, analyzing the information, finding problems in the network's configuration, evaluating that information, proactively validating prospective changes, and, either downloading the configuration back into the live routed network or reiterating the analysis based on the original configuration with the prospective changes applied. A key factor is that the invention enables proactive validation of a planned network or changes to an existing one. A network manager, therefore, can better design, manage and modify a routed network which is devoid of, or has fewer problems than without the invention.

Throughout the following discussion it will be presumed that line by line coding involved in implementing the processes and structures disclosed herein is well within the abilities of one skilled in the art and so is not described herein.

Each of FIGS. 1A-1I relates to a discrete portion of an overall analytical process in accordance with a current implementation of the invention.

FIG. 1A represents a process for capturing information about each of the routers in the live or planned network in a format actually used by a given router. Router devices are well known in the art. They are switching devices at level 3 in the OSI model. For Cisco Systems, Inc. products, for example, this input is an ASCII text configuration file in a proprietary language (IOS, ™). For Bay Networks Corp. products, for example, this input is the binary configuration database provided as output from a commercially available computer program such as Site Manager™ program, for example. The process represented in FIG. 1A parses the input data from a configuration file or a MIB, as described above, and fills-in default information as necessary to populate an object data structure referred to herein as the Structured Router Object (SRO).

FIG. 1B represents a process of forming a "topology" from the SROs. In the presently preferred embodiment of the invention, there are several types of constituent components of the topology. One type of component comprises a set of objects called SPTs, for "Single Protocol Topology". An SPT is produced for each protocol running on a network, such as IP, IPX and Appletalk™. Running multiple protocols in a network has become a common practice in networking. Each SPT indicates for a given protocol which routing device ports are running the given protocol and which ports are logically connected over the protocol. Another type of component comprising the topology is implemented as an object referred to herein as an MPT, which stands for "Multiple Protocol Topology". In one embodiment, there is one MPT per network. The MPT includes information that indicates how the SPTs relate to each other. For example, if a network routes both IP and IPX, both an IP SPT and an IPX SPT will be created, and they will be cross-referenced to each other to form an MPT.

The novel MPT can be used, in conjunction with novel processes in accordance with the invention, to determine whether network protocols have compatible addressing.

Processes in accordance with the invention can determine when two topologies have incompatible addressing and can identify the source of the conflict, such as the parts and protocols involved in the conflict. More particularly, during the process represented by FIG. 1B, logical topologies are produced for the different protocols that run on a live or planned network. These topologies are called SPTs and are produced from the SROs. Once SPTs have been constructed for the various protocols, they are interrelated with each other to form a structure called an MPT. The MPT can be used to identify conflicts between protocols represented in the different SPTs. The SPTs and the MPT provide valuable diagnostic information that can be useful in identifying network problems.

The processes represented by FIG. 1B produce "level 3 logic" topologies. A level 3 logic topology is defined by the OSI model. FIG. 1C represents a process which provides more abstract or "higher level" views or representations of a network. Examples of these more abstract views are OSPF and BGP views. These more abstract views can be useful to a network manager or designer who wishes to observe only certain abstractions or views of a network. Modern networks are extremely complex creations. Higher level/more abstract views enable the persons responsible for maintaining, designing or modifying networks to better visualize the network they are operating upon by removing from the view components that are not relevant to the immediate task at hand or groupings devices.

Using the object model formed in FIG. 1B (i.e., integrated SRO/SPTs/MPT), processes represented by FIG. 1D determine whether there are potential problems in the actual or proposed network represented by the object model. The conventional approach to troubleshooting a routed network typically involved a user evaluating routers one by one to determine whether there are problems with individual routers' configurations. A router configuration is a specification interpreted by a router's operating system that indicates precisely how a router is to process and respond to all types of data packets, and how it generates, receives, and processes messages that are sent between itself and other routers to construct routing tables. The abstract view produced in accordance with the processes of FIG. 1B enables a more network-centric view, which allows a user to visualize not just problems in a single router, but also problems that relate to two or more routers. An important feature of the process represented by FIG. 1D is the application of numerous novel integrity checks that can identify problems in not just individual routers, but across routers spanning the whole network. "Integrity Check" as used herein means the result from a procedure that determines whether this is a critical or potential problem in the network configuration.

The differences and relationship between the views produced according to the processes of FIG. 1C and the integrity checks represented by FIG. 1D are as follows. In the current embodiment, high level/abstract views may be used for rendering images of various protocol topologies; while integrity checks ordinarily represent information in a more textual form. A user can employ both views and integrity checks to diagnose potential problems with a network. More to the point, views set a graphic or visual context for interpreting textual reports of integrity check violations. For example, an integrity check violation may identify a network component or components such as a router or a subnet; while the view permits a user to visualize where the component or components reside in the network and its relation to other network components.

Referring now to FIG. 1G, there are multiple types of integrity checks that can be performed given routing tables as input. A routing table is a table with rows (elements) indexed by level 3 destination addresses and/or level 3 "summary addresses", which refer to ranges of addresses. If a router receives a packet that is not filtered on the incoming port, (and the packet's destination is not the router itself), it will look for a routing table element that matches the packet's destination. If no match is found, the packet is dropped. If there are a number of matches, then the element with the narrowest range (i.e., most specific address range) is used. The matching element indicates what port to send the packet out of and either a next hop router or the fact that the port is connected to the local area network (LAN) where the destination resides. The packet is sent out this output port unless there is an output port filter that blocks transmission. Routers in a network produce routing tables in order to exchange information about destinations they could reach. See, Corner, Douglas E., "Table Driven IP Routing, Internetworking with TCP/IP", pp. 113-115, Prentice Hall Inc., 1991.

In a network, different host systems may wish to exchange information with one another. In order to do so, however, there must be a route through the network between the hosts. The routing tables are used to switch the packets "hop-by-hop" through the network. If two hosts wish to communicate, but there is no path enabled between them then a "no route" situation exists, which is just one of the routing table integrity checks that can be carried out in accordance with the invention. Another example of a routing table check is that the routers for a particular destination might be involved in what may be referred to as a routing loop. In other words, Router 1 may receive packets destined for host D and transmit the packets to Router 2, which then sends these packets to Router 3, which sends these packets back to Router 1 resulting in an infinite loop. These are problems a network manager wants to avoid.

There are a number of approaches to gathering the routing table information for use in the process of FIG. 1G. One approach, represented by FIG. 1F, is to calculate the routing tables through simulation using the topology (SRO/SPTs/MPT) as input. This novel calculation process simulates behavior of actual routers in an actual network to produce the routing tables used in the process represented by FIG. 1G.

Alternatively, if the user does not want to simulate routing tables, then, in accordance with a process represented by FIG. 1E, the user can poll live routers in a network to get the routing table information and to put it into the routing table data structure 117 illustrated in generalized form in FIG. 1F.

FIG. 1H is a process largely guided by the user who has access to the views, integrity checks, and other information that are automatically computed according to other processes represented in FIGS. 1A-J. Given this information, the user can observe the problems in the network of interest and consequently may make modifications to the object model (i.e., the topology comprising SRO/SPTs/MPT). Once the user makes changes, there are a number of alternatives. One alternative, represented by FIG. 1I, is to make the changes and download those changes directly into a live router network by providing the information on the SROs to live routers in a live network. Another alternative, represented by the feedback path that includes the "what if Analysis" comment, is to modify the SROs in the object model and reiterate through the process steps described above in order to analyze and troubleshoot the proposed network changes represented in the updated SROs.

A significant advantage of the invention is that the information in the object model (SROs/SPTs/MPT) can be both used for analysis (creating views and running integrity checks, for example) and for actual download to a live network. This advantage is achieved in the preferred embodiment by storing router configuration (or MIB) information in executable form in the SROs. The term "executable" as used herein means a state of representation of a router configuration that contains sufficient detail so that it can be translated into a form that a router can execute.

Thus, FIGS. 1A-I show the overall process, in accordance with a present embodiment of the invention, of obtaining information from a network, putting it into a data base, applying different types of integrity checks, rendering different views, using this information to determine if there are problems, making corrections if there are problems, and either downloading these corrections to the network or putting these corrections back in an object model data base for further analysis. Consequently, a user can capture an existing (live or modeled) network configuration, analyze it, find problems, evaluate the problems, proactively validate changes before downloading the changes back into the network. An important factor here is that such proactive validation permits making validated changes to a routed network without impacting operation of a live network: changes can be planned and tested before downloading to a live network.

As mentioned above, an important factor distinguishing the present implementation of the invention from conventional network analysis tools is the use of an object data model which is both structured and executable, and permits the network to be automatically analyzed using the processes represented by FIG. 1D, FIG. 1C and in FIG. 1G. The executable aspect of the object model means that the model contains sufficient detail to enable information contained in SROs to be readily imported into live network routers.

The advantages of the invention can be better appreciated by considering, for example, a prior network tool called CiscoWorks whose purpose is configuration management. CiscoWorks deals with uninterpreted text files (Cisco's Configuration Files). CiscoWorks permits the user to load these files and make textual modifications, but the user still is at risk of introducing syntax errors, for instance, since changes are not validated before the user downloads them to the router. In contrast, the processes and structures employed in the current embodiment of the invention perform automated validation of changes because they use structured objects (SROs) representative of the changed configuration.

Another earlier exemplary product that performs network analysis is produced by Make System and performs network analysis. The router objects in the earlier Make Systems tool, however, are not executable. In other words, the Make Systems product cannot automatically download configurations from a database to the live routers without requiring a user to manually add configuration detail that the routers require in order to operate. Thus, output from the Make Systems product is not designed for automatic input of configuration information to live network routers. With the Make Systems tool, problems are reported and it is up to the network managers versed in the command set(s) of Bay Networks Site Manager and/or Cisco System's IOS to select the appropriate router configuration commands to correct the indicated problems, reload these changes to each affected router in the network and then run Make's "discovery" process to generate a data model for the analytical process to be run again. As used herein, "discovery" means a live process performed on an actual network that identifies elements and their connections in the actual network, which relies on the elements and their ports being operational during the process. Contrast the difficulty and potential inexactitude (room for human errors) of that process against the ability of the present embodiment of the invention to assist the user in identifying potential problems via views and integrity checks, to automatically generate executable configuration files and, before implementing those changes to a live network, to check the proposed changes, then to automatically loading the fully executable files to the live network for both Cisco Systems and Bay Networks products.

Figure 2B:
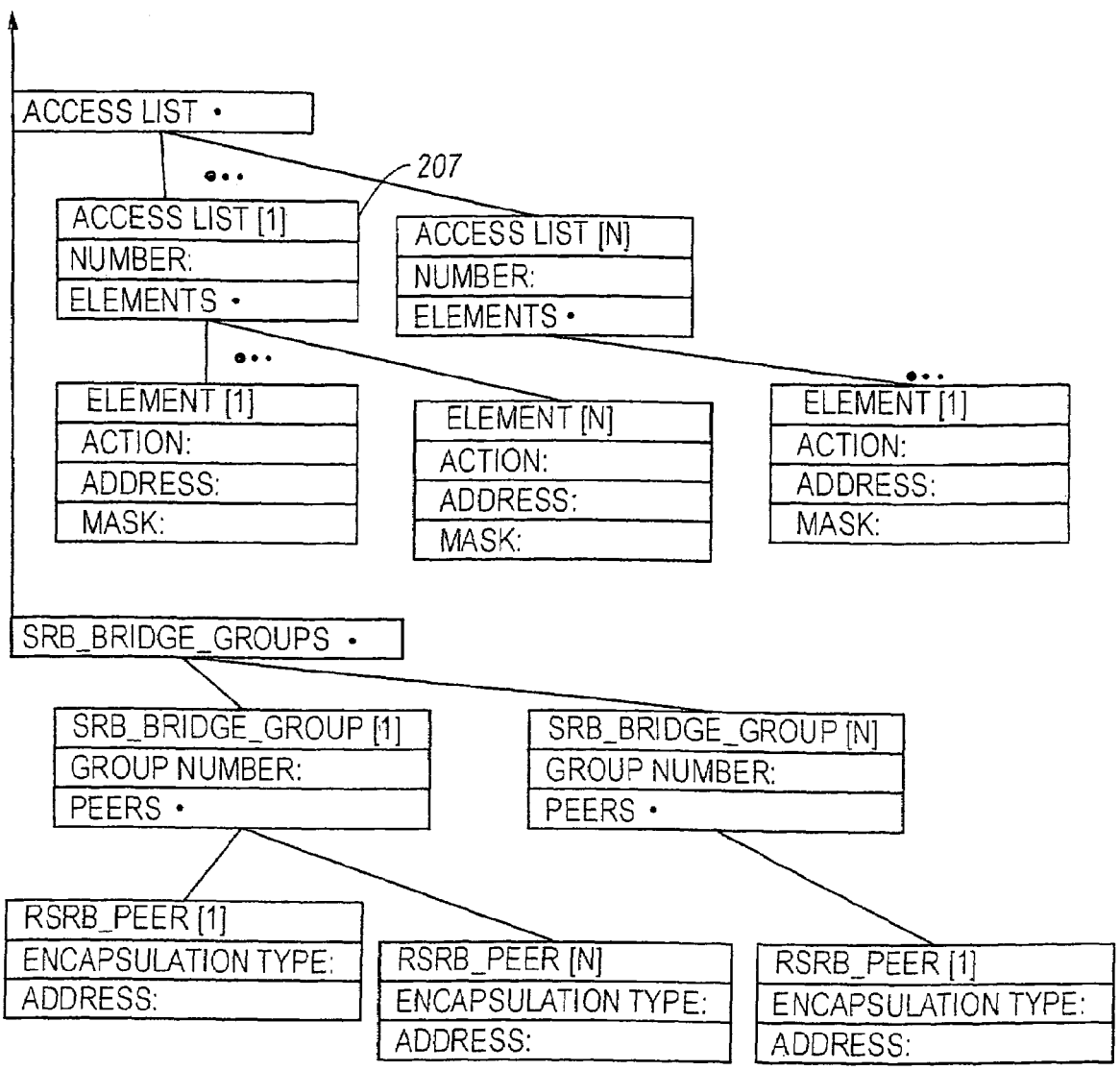

FIGS. 2A-B depict the Structured Router Object which, in accordance with a presently preferred embodiment of the invention, is referred to herein as the SRO. The SRO is a data structure encoding the contents of a single router's configuration that is relevant to a given network analysis at hand.

The data structure is referred to as "structured" to convey that it is composed of interrelated attributes and to distinguish it from such constructs as a text file containing a router's configuration, which is amorphous rather than structured.

FIGS. 2A-B illustrate a sufficient subset of the components constituting an SRO to enable one skilled in the art to practice the invention. In an actual real-life SRO, there are many more components. A SRO, as well as other structured objects referred to in this disclosure, can be described in a hierarchical fashion by starting with top level attributes and then explaining and illustrating how these attributes are further decomposed into lower level attributes. In the disclosure that follows, structured objects will be presented in two different ways: i) in attribute form which is a description of an object's interrelated attributes that omits the exact values of the attributes, and ii) in instantiated form which is a description of both the attributes and their (exemplary) exact values. FIGS. 2A-B provide an attribute form description of a SRO.

In the present implementation of the invention, objects are produced using C++ programming language techniques. However, other programming languages could be used to produce the structures. This is considered to be well within the ordinary level of skill in the art and, therefore, is not explained in detail herein.

Referring to FIGS. 2A and 2B, at reference numeral 201 there is shown an attribute, which is host name. This is a unique name for identifying the router. Looking down the structure, the next high-level attribute is Ports. The value of this attribute is a list of objects, each one having it own structure. Each of these objects, such as the one labeled 202, is called a Port Object. A router consists of a set of physical ports, each having its own configuration. Each router's port in the invention is represented by a Port Object which consists of a list of structured objects itself. Referring to FIGS. 2A and 2B, we see that there are ports 1 through N, representing N different ports on the router. The number of ports on a router depends on the type (i.e., make and model number) of the router and how it is physically configured. For an individual port (labeled as 202 in FIG. 2A), there are a number of attributes. The first is media type, whose value can be Ethernet, Token Ring, Serial, Serial Link, FDDI, etc. We also identify a number, which is used to distinguish between two ports of the same media type. The next attribute is called encapsulation, which indicates what type of encapsulation is running on the connected media. An encapsulation example is Frame Relay on a Serial media to distinguish it from a HDLC serial. Further attributes include: bandwidth—which is a scalar metric used by the IGRP routing protocol that relates to bandwidth of the connecting media. The attributes also include delay—which is a scalar metric connoting the speed of the connected media and is also used by the IGRP routing process. The next four attributes shown in FIG. 2A (collectively labeled as 203) are attributes related to access lists. Access lists are used to filter traffic coming into and out of the router. Typically, access lists are used for security purposes and routing purposes. Access lists are used to block or permit packets with either specific addresses or ranges of addresses, to be received or transmitted by a router. The first access list attribute illustrated in FIG. 2A, (InAccLstIP), stands for input access list, IP. This access list item is used to filter input IP packets. The attribute OutAccLst refers to filtering output IP traffic. Similarly, the attributes InAccLstIPX and OutAccLstIPX refer to filtering input and output IPX packets. It should be appreciated that access information for other protocols, such as AppleTalk has been omitted from FIGS. 2A-B for simplification.

The last attribute under the port object is Port addr. Each port has one or more addresses assigned to it. The Port addr object has an attribute called "protocol" which refers to a particular address' level 3 protocol, such as IP, IPX, and AppleTalk. The address attribute gives the exact address. Port Addresses serve as building blocks for forming the topology information.

The SRO structure accommodates multiple port addresses per port, as any given port on a router may be running multiple protocols. For instance, consider a port configured for both IP and IPX. Typically in such a case, one would have both an IP and IPX address for this port. Another reason for having multiple port addresses is that routers produced by Cisco Systems, for example, employ a concept called primary and secondary IP addresses where the user could address the same physical port with multiple IP addresses.

Before discussing the next high-level attribute of the SRO, Protocols, we consider the difference between this high level attribute and the subobject of the Port Object similarly named Protocol. The latter refers to the protocol(s) "running" on the particular port. These port-related protocols define the type of the packets of data that come in and out of the router's ports (i.e., IP, IPX, AppleTalk, DECnet, etc.) By contrast, the high-level attribute Protocols refers to the routing protocols such as RIP, IGRP, OSPF, EIGRP and BGP, that the routers use to exchange information and build up the routing tables.

The attribute Protocols comprises of a list of objects describing each routing protocol running on the router. The value of the "Type" attribute of a protocol object, labeled 204 in FIG. 2, represents a type of routing protocol (e.g., RIP, OSPF, IGRP, etc.), and for some of the protocols, additionally a number. This number is used because a router could run multiple copies of some protocols, such as OSPF or IGRP, on the same router. The next attribute is Net Addresses. Typically a routing protocol is running on certain interfaces (i.e., ports) on the router. Each element in the list Net_Addr is an address capturing the ports (port addresses) over which the associated protocol is running. The teachings described herein greatly simplify the Protocol object; a current implementation of the invention includes over 50 attributes associated with protocols. One skilled in the art will appreciate how to incorporate such router attributes into an SRO based upon this discussion.

The next high-level attribute of the SRO is Static-Routes. The value of the Static Routes attribute is a list of objects. Each one of these objects, labeled 205, refers to what is called a static route. There are basically two approaches to produce routes in a routing table. One approach is to run the routing protocols discussed earlier. The other approach is to directly code routes into the routing table. This latter approach involves specifying a set of static routes. A static route is identified by specifying a destination address Dest-Addr and a next router address, which tells the router where to send a packet matching Dest-Addr which is discussed below.

The next high-level attribute of the SRO is Access Lists, whose value is a list of objects, each object representing an access list. We earlier referred to access lists when we talked about port objects. For example, at the reference numeral 206 we refer to an "input" IP access list. At reference numeral 206, the SRO does not contain a whole access list, rather at this point in the structure there is a number referencing an access list. Each access list object in the list Access Lists contains a full description of the access list and a number (see reference numeral 207) used for reference elsewhere (such as at InAcclstIP). The Elements attribute in an access list refers to a list of patterns that describe what addresses to permit and deny.

Referring to FIG. 2B, we see an example of the next high-level attribute called SRB Bridge Groups. SRB stands for "Source Route Bridging," which is a mechanism for transporting traffic typically associated with Level 2 in the OSI model. There is also a variant of SRB bridging implemented in routed networks where SRB traffic can be encapsulated over an IP backbone. SRB Bridge Group and RSRB-Peer objects are specified in the SRO. Each bridge group has a group number associated with it and a list of peers. Briefly, a peer is an object with an attribute specifying encapsulation type, which indicates what encapsulation method is being used to transport SRB frames. One example is TCP encapsulated; another example, which Cisco Systems provides, is FST encapsulation. The other attribute of a Peer object may indicate the address of another router in the network where encapsulated SRB data should or potentially should be sent.

Thus, to summarize, FIGS. 2A-B, the information in the SRO captures a router's configuration. The information put into an SRO could be gleaned from a MIB or from a router configuration file, or from information regarding a planned or hypothetical network. A SRO structure, in accordance with the present embodiment of the invention, can serve as a neutral repository for configuration information from virtually any router vendor whether they use binaries or configuration files.

Figure 3:
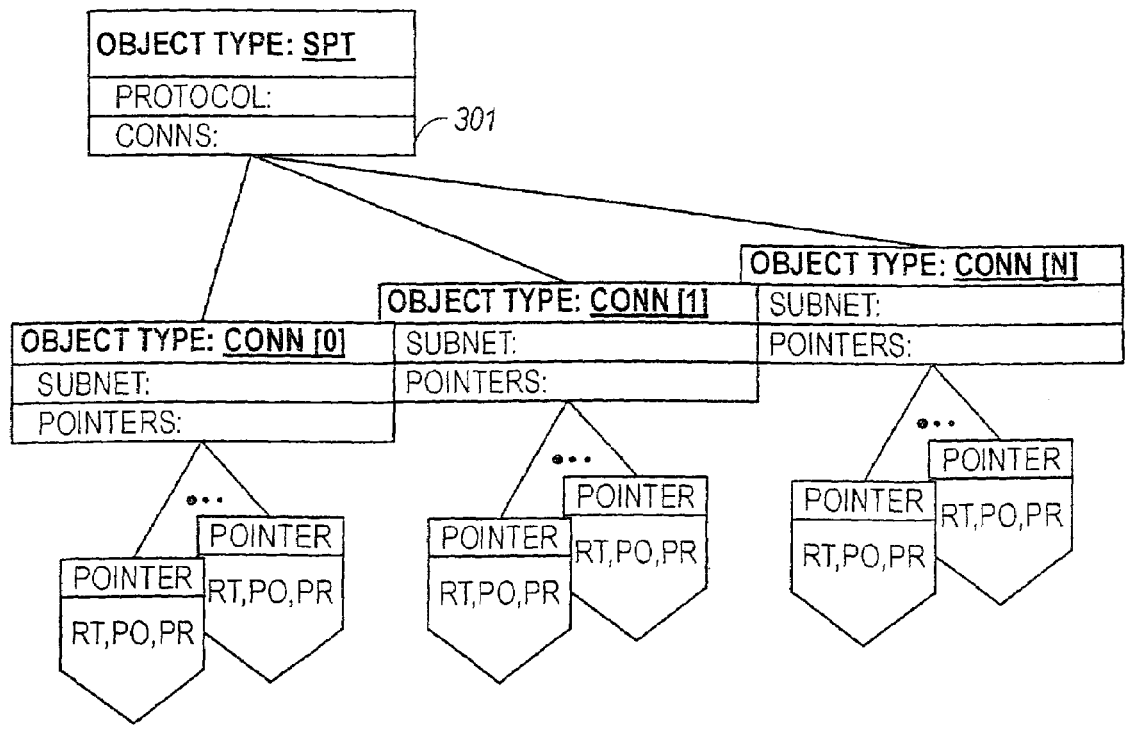
FIG. 3 shows the object data structure of the "Single Protocol Topology" object, a principle data structures of the invention that is populated in the process shown as FIG. 1B. It will serve as input to numerous processes as shown in FIGS. 1A-I.

FIG. 3 represents a Single Protocol Topology (SPT) object in attribute form, in accordance with a presently preferred embodiment of the invention. An SPT is formed for each of multiple Level 3 protocols (e.g. IP, IPX, AppleTalk). The SPT for a given protocol "P" represents a logical view of the topology from the perspective of that given protocol. The data structure in FIG. 3 indicates which router ports are configured to run protocol "P" and how each of these ports is logically interconnected with other ports that run protocol "P." A SPT for protocol P has a top-level atomic attribute, Protocol, that is set to "P," (e.g., IP, IPX, AppleTalk, etc.) and a top-level attribute Conns (labeled 301 in FIG. 3), which is a list of objects, each called a Connection. Each Connection identifies a list of router ports and their addresses, all of which are configured to receive and transmit packets of protocol type P and are directly connected from a Level 3 perspective with respect to protocol P. As an example, for an IP SPT, all the ports listed in the Connection will belong to the same subnet. We can say that all the ports in a Connection are directly connected from a Level 3 perspective to clarify that at a lower level, at Level 2, these ports might not be directly connected. For example, there may be bridges, LAN or WAN switches between these ports. If they are also directly connected from a Level 2 perspective, then one could necessarily associate a single media type with the connection such as serial links, Ethernets, token rings, FDDIs, etc.

FIG. 3 shows that each Connection object consists of a list of pointers. Each of these pointers refers to a port address in a specific router. When representing a pointer in a SPT Connection we will use the form (Rt,Po,Pr) where Rt refers to a router's host name, Po refers to a router's port, and Pr refers to a protocol annotated by an index which is described below. For example, (R1,S0,IP1) refers to the first IP address assigned to port S0 (or in long form, Serial 0) on the router with host name R1. This pointer links to a Port Address object in an SRO (see the reference numeral 212 in FIG. 2) in a network under consideration.

In giving the description of IP1, a reference is made to the "first" IP address. The reason the term "the first IP address" is used is that it is possible to assign two or more IP addresses to the same physical port. Cisco Systems, for example, refers to this configuration feature as assigning secondary IP addresses (as well the mandatory primary IP address) to a router port. Although the actual implementation of the invention makes a distinction between primary and secondary addresses, this disclosure does not make this distinction, and simply states that a port has a set of IP addresses. Thus, in general a port may have one or more addresses for any protocol. Now suppose that two ports, S1 and S2, respectively, on routers R1 and R2, are physically connected through a serial link, and both of these ports have two IP addresses assigned. Furthermore, assume that the first IP address on S1, whose pointer would be (R1,S1,IP1) belongs to the same subnet as the first IP address on S2, whose pointer would be (R2,S2,IP1) and also suppose that the second IP address on S1, (R1,S1,IP2), belongs to the same subnet as the second IP address on S2, that is (R2,S2, IP2). In this case, although there is only one physical medium connecting the two ports, that is, a single serial link, the IP SPT containing routers R1 and R2 will have two (logical) connections for this one serial link.

Thus, to summarize FIG. 3, a Single Protocol Topology SPT is a data structure that can be produced for each Level 3 protocol such as IP, IPX, and AppleTalk. A SPT for some protocol P is a logical view of the topology from the perspective of protocol P. This data structure indicates which router ports are configured to run protocol P and how each of these ports is logically interconnected with respect to the protocol. Although the network under analysis may contain Level 2 devices, such as bridges and switches, but at a Level 3 view, these devices are "invisible", meaning, for example, if there is a switch between two router ports in the Level 3 view, the ports are still viewed as being directly connected. A SPT differs from an SRO in that, while a single SRO captures the configuration of a single router, a single SPT captures the logical interconnections of a set of routers.

The following discussion describes an earlier tool by Make Systems, and explains some significant differences in the process that tool employs to create an SPT-like data structure and how that structure differs from the SPTs of the present embodiment of the invention.

The Make Systems' internetworking product can use a "discovery" process, which requires a live network. Starting at a seed router (an arbitrary starting point on the live network), the tool reads the router's routing tables for the next hop addresses to the neighbor routers. This process continues, finding the set of interconnected routers. This process also uses information, such as ARP (Address Resolution Protocol) information and configured interface speeds, in determining the valid router connections.

An important distinction is the fact that the Make Systems process is a discovery process. It is inherently a live process, which relies on live routers and their interfaces being operational. In contrast, the current embodiment of the SPT topology formation involves processes that can take place "off-line." Specifically, in the current embodiment of the invention, on-line configuration information typically is captured in one pass. After it has been captured, the formation of the SPT topology occurs off-line. In contrast, the Make System uses an on-line discovery process during topology formation. An advantage inherent in the approach to SPT formation in accordance with the invention is that it not as susceptible to errors in determining the proper configuration due to network devices and router ports being in a temporarily failed state.

Another discriminating factor with respect to formation of SPTs is the fact that earlier tools typically focused mainly on producing IP topologies because discovery is typically oriented towards IP. Some earlier tools also looked at IPX, but one of the disadvantages of discovery is that for a given protocol, one needs a certain level of instrumentation for that protocol to find the topology. Another disadvantage is that one may need to use different discovery techniques to discover an IP logical view versus IPX or versus AppleTalk. In contrast, an SPT formation process in accordance with the present invention handles all protocols using the same algorithm.

Figure 4:
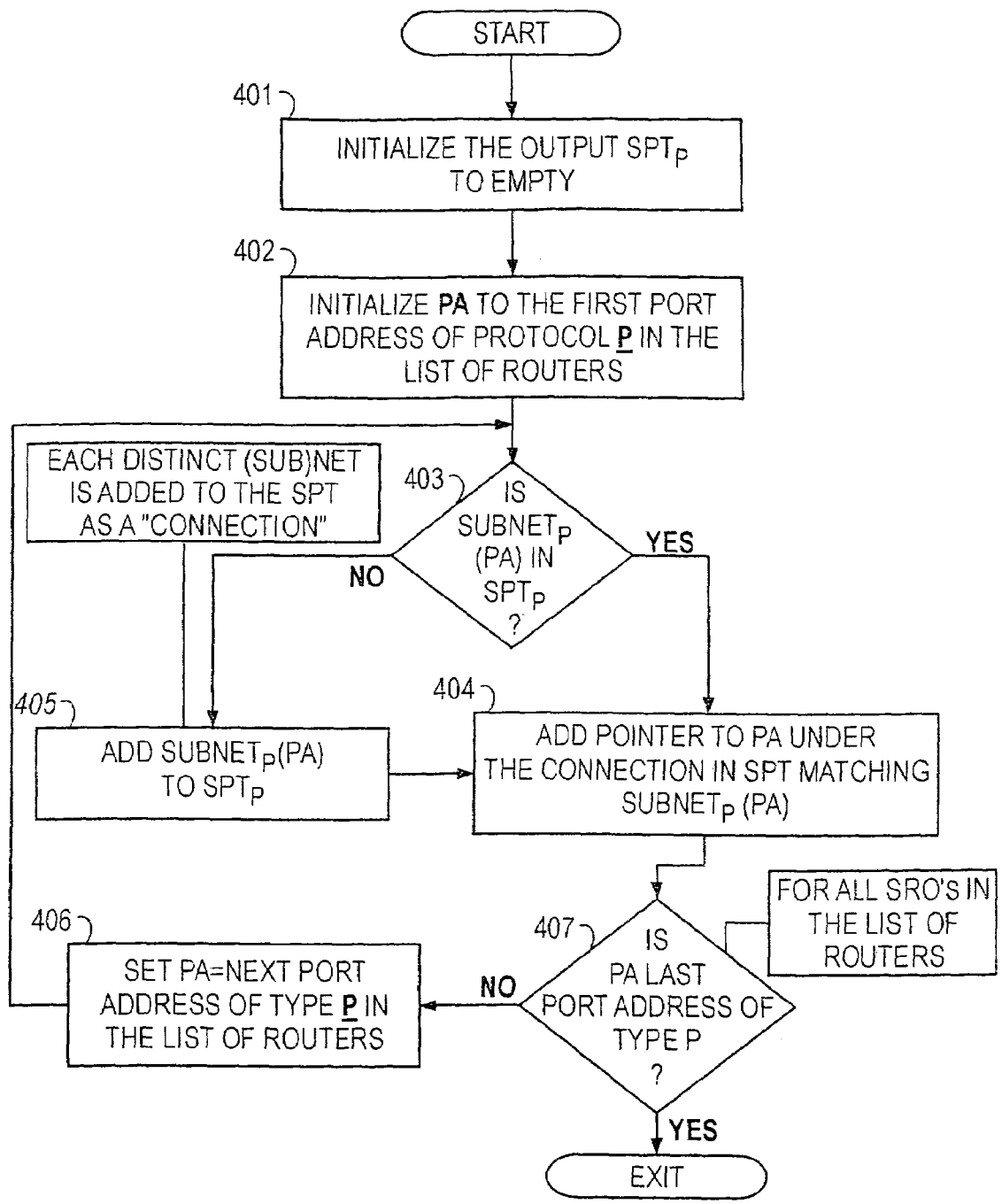
FIG. 4 is a flowchart of the process that creates a Single Protocol Topology (SPT) object data structure for a given protocol P given the set of SROs (FIG. 3) as input.

FIG. 4 is a generic procedure for forming a SPT for some protocol P from the set of SROs corresponding to the routers spanning the network. When we say "generic" we mean that this procedure, aside from a function called the SUBNET function referenced by numeral 403, is the same regardless as to whether P refers to IP, IPX, AppleTalk or DECnet, etc. FIG. 4 provides a flowchart of the SPT build process of the presently preferred embodiment of the invention. At Step 401, the Output $SPT_p$ is initialized (set to empty) to indicate that initially there are no connections in the SPT for protocol P.

Step 402 initializes a variable PA to the first port address of protocol P in the list of routers. Given the set of SROs that contain router information for the network under consideration, the invention arbitrarily orders this set in an ordered list.

Step 403 determines whether the subnet function (which will be different from protocol to protocol) associated with port address PA is already in the $SPT_p$. Initially, since $SPT_p$ is empty, the answer will be "no" and the algorithm moves to Step 405. At Step 405, a new Connection object with subnet attribute set to $SUBNET_p(PA)$ is added to the $SPT_p$. A Connection object represents a particular connection between a set of router ports. If the answer was "yes" at Step 403, (in other words, $SUBNET_p(PA)$ is already in the SPT), then the invention would skip directly to Step 404. Next, at Step 404 a pointer is added under the subnet to that port address PA. Next, after Step 404, go to Step 407 and ask if the last port address has been reached. If so, the process is finished because all the port addresses have been processed. If the answer is "no" then Step 406 is reached where PA is assigned the next port address and the process repeats itself by looping to Step 403.

The definitions for the subnet functions are given in the box on the bottom of FIG. 4. For IP, the input to the Subnet function is 32 bit address A1 and 32 bit mask M1 configured on a port; the subnet function returns an address mask pair, where the address-part is formed by applying the mask M1 using bit-wise "AND" to address A1; the mask given as output is simply M1. In the examples in this patent, we use the address-part of the subnet as shorthand for the entire subnet. For example 10.10.0.0 is used for [10.10.0.0 255.255.0.0]. In general, this shorthand cannot be used, but if the masks used are either 255.0.0.0 255.255.0.0 or 255.255.255.0, and the zero subnet is not allowed, one can infer the mask from the address-part.

The subnet functions for IPX and AppleTalk are trivial. For IPX, given the IPX network number as input, subnet returns this number as being the "subnet." Similarly, for AppleTalk, given lower and upper bound for a cable range, the subnet function simply returns this range as output.

Thus, in summary, the procedure iterates through all the port addresses in the set of routers and adds a pointer to each port address into the SPT structure, grouping it with other port addresses belonging to the same matter. This basic SPT formation process is modified in practice to handle complicating factors that may arise in networks, such as multi-point Wide Area Networks (WANs), like Frame Relay, which is described later in this disclosure.

FIG. 5 is a generalized block diagram of a simple example network that is referenced in a number of subsequent figures. In this network, there are two routers, R1 and R2. These two routers are directly connected through a serial link. In this and subsequent figures, ports are designated by an abbreviation for media type and a number such as "E0" on router R1, which means Ethernet 0. On R1's E0 port, which is in the left of the diagram, we see that it connects to a symbol, labeled 501, which refers to an Ethernet. Also associated with the Ethernet are two numeric designators—"10.30.0.0", which is the IP subnet number of this Ethernet in standard IP octet notation, and 9C, which is the IPX network number associated with the same Ethernet. In other words, there is one Ethernet designated at 501, but it has an IPX network number 9C and IP subnet number 10.30.0.0. Traversing the drawing from left to right, we see port S0 (Serial 0) on R1, which is connected to a line that designates a serial link with HDLC encapsulation. Following to the other side of the link, we see the port S0 on router R2. We can say that Router R1, through a serial link, is connected from port S0 to Router 2 through Router 2's port S0. For serial links, like Ethernets or other LANs, we can identify both an IP subnet, which in this case is 10.10.0.0, and an IPX network number, which is 7A. Router R2 includes port E0 (for Ethernet 0), which is labeled 502. This port E0 at 502 has IP subnet number 10.20.0.0 and IPX network numbered 98. In this example, we show a network where both IP and IPX are running on all interfaces. It should be appreciated that there may be networks in which different protocols run on different interfaces. For example, an interface might be running just one protocol or running none at all. Also, an interface could be running other protocols, such as AppleTalk and DecNet.

Figure 7A:
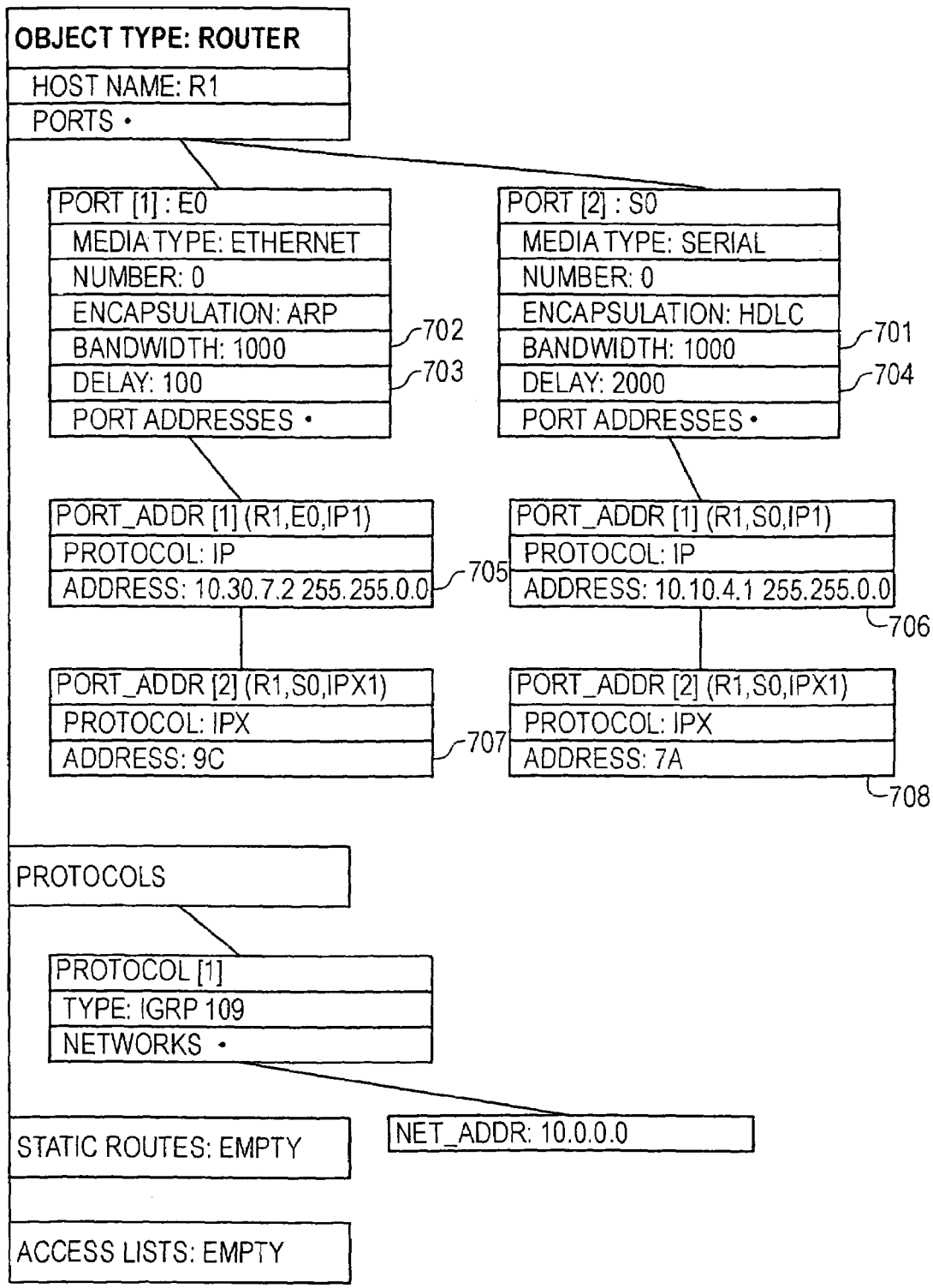
FIG. 7A shows the populated SRO associated with the router configuration file shown in FIG. 6A, Router 1 (R1) in FIG. 5.
Figure 7B:
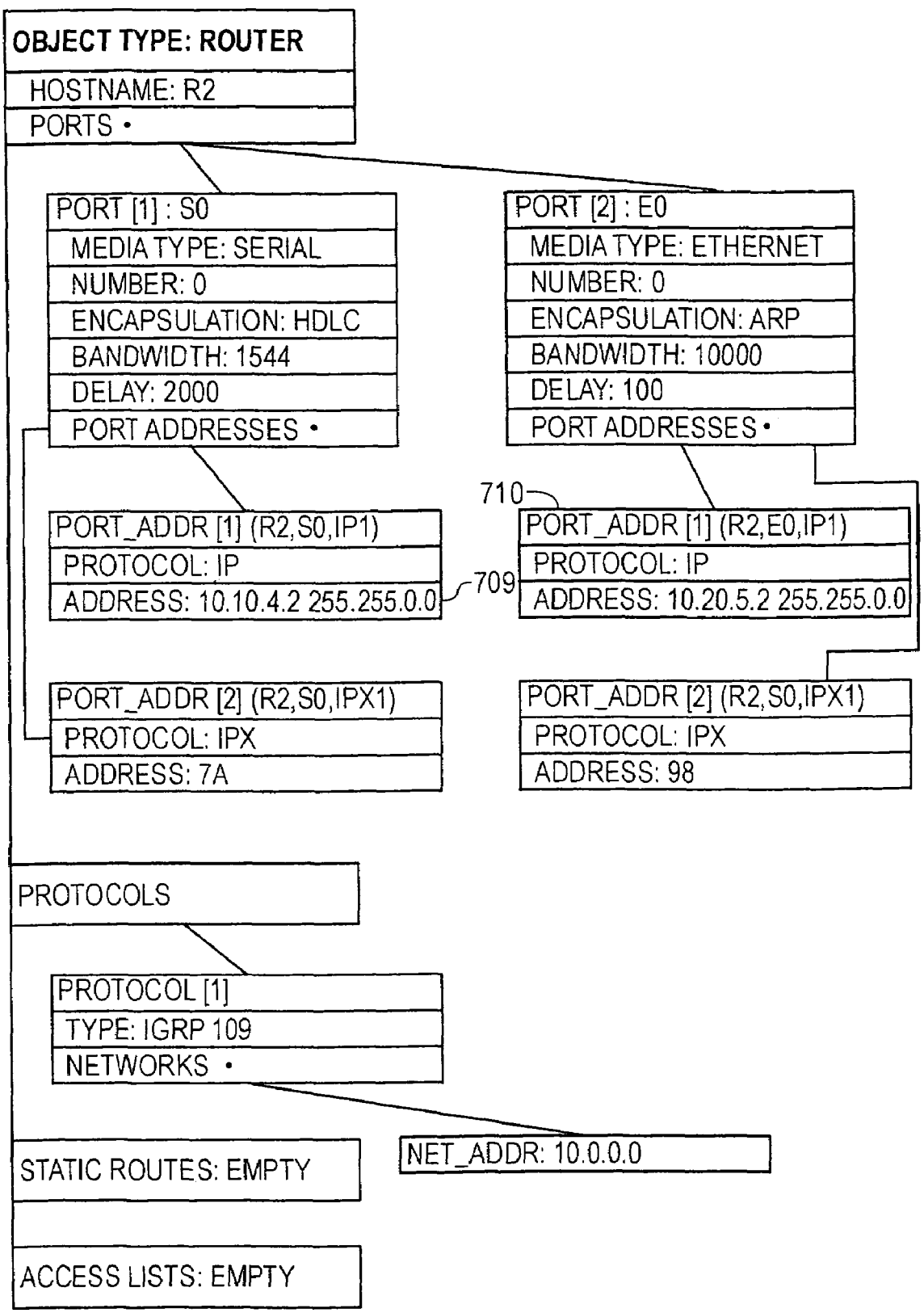
FIG. 7B shows the populated SRO associated with the router configuration file shown in FIG. 6B, Router 2 (R2) in FIG. 5.

FIG. 6A shows the text configuration file for Router R1 and FIG. 6B shows a text configuration file for Router R2. See, Cisco Systems, Inc. "Configuration File Load Commands," Router Products Command Summary, pp. 6-584, Cisco Systems, Inc., 1992-1995. FIG. 7A illustrates the SRO that corresponds to Router R1's text file, and FIG. 7B shows the SRO that corresponds the text configuration file shown in FIG. 6B.

Briefly stated, a text configuration file is put into SRO form using standard parsing techniques. In addition, certain default values also are entered into the SRO. There is default information that is implicit in the configuration file. By omission, attributes still have values. As an example, refer to FIG. 6A and note where we designate 601, a bandwidth statement for Serial 0 Router R1. Refer now to FIG. 7A at the point that is marked 701, is an associated bandwidth value of "1000". This bandwidth statement was explicitly coded in FIG. 6A, and consequently was parsed and was explicitly put into the SRO of FIG. 7A. In contrast, note in FIG. 6A the version labeled 602, which is interface E0 for R1. In this case, there is no bandwidth statement. Referring to FIG. 7A at the point marked 702, note in the SRO the bandwidth is assigned the value 1000. The fact that the bandwidth at 702 and the one labeled 701 are both 1000 is just an artifact. By default, each of the different media, such as Ethernet, has bandwidth settings which are the default values. These are values, for example, that a vendor such as Cisco Systems makes public in documentation. Another example of default values is apparent in FIG. 6A. No delay specification for either of the interfaces is coded in FIG. 6A, but referring to FIG. 7A at the regions labeled 703 and 704, delay parameters are specified. These were inferred knowing that Port[1] is an Ethernet, which has a default delay of 100, and that Port[2] is a serial interface, which has a default delay equal to 2000.

FIGS. 8A through 8I show a walkthrough of the flowchart in FIG. 4 (a depiction of the process for constructing the SPT for a given protocol). For this walkthrough, the inputs are the two SROs given in FIGS. 7A and 7B. In this case, we will be producing a SPT for protocol IP. In the walkthrough, we will be referring to the steps that are numbered in FIG. 4 and discussing what happens at each step. Reference numerals depicting the steps of FIG. 4 for the walkthrough of FIGS. 8A-8I are appended with dash numbers to distinguish iterations of steps. The result will show the incremental build of the output, an IP SPT for the SROs of FIGS. 7A and 7B.

In Step 401-1 the SPT is initialized. FIG. 8A shows the SPT at this point; protocol is set to IP and there are no connections.

In Step 402-1 the variable PA, which refers to a port address, is assigned the first port address (referring to FIG. 7A, the port address marked 705 in the diagram). Note that the port address assigned has two parts 10.30.7.2—which is the address—and 255.255.0.0, which is the mask.

Step 403-1 asks the question whether the subnet associated with PA is in the SPT. The subnet for this PA is 10.30.0.0. The conventional approach to applying the subnet function for the IP protocol follows a simple rule: for each of the four octets in the address apply the corresponding mask octet using the bit-wise AND operation. For the special case when the mask octets are 0s and 255s, the following rule can be used: if there is a 255, it means use the corresponding octet, if there is a 0, that means ignore it (i.e., "zero out") the corresponding octet. Thus, given PA set to 10.30.7.2 255.255.0.0, we use the first two octets and ignore the last two, yielding 10.30.0.0. See, Corner, Douglas E., "Implementation of Subnets with Masks," Internetworking with TCP/IP, pp. 273-274, Prentice Hall Inc., 1991.

Since the STP at this point is empty, the subnet, 10.30.0.0 is not in this SPT. Thus, the answer to the question in FIG. 4, Step 403 is "no", and the process moves to Step 405-1 where the process adds a connection Conn[1] with subnet 10.30.0.0 to the SPT. FIG. 8B shows the state of the SPT after this operation (Step 405-1).

Step 404-1 adds a pointer to the current port address (referred to as R1,E0,IP1) under the connection that is labeled 10.30.0.0. FIG. 8C shows the result after this step.

Step 407-1 determines whether the last port address has been reached. In this case, it has not because there are three more to process. Thus, the process proceeds to Step 406.

At Step 406-1 the variable PA is set to the next IP port address, which is the port address labeled 706 in FIG. 7A. After Step 406-1, processing moves back to Step 403-2.

At Step 403-2 the process computes the subnet for this new port address. In this case, the subnet is 10.10.0.0, which is not in the SPT. Thus, the answer to Step 403-2 is "no".

Figure 8D:
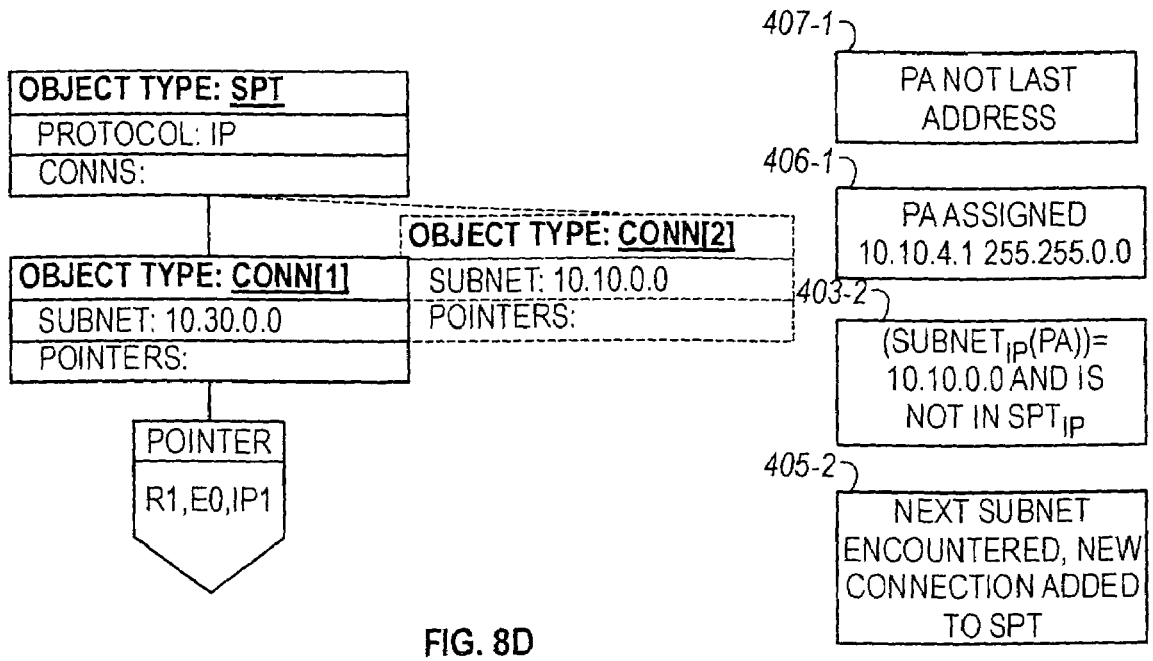

The process proceeds to Step 405-2 and adds a new connection, whose subnet is 10.10.0.0, to the SPT that it is building. FIG. 8D shows the state of the SPT after Step 405-2.

Figure 8E:
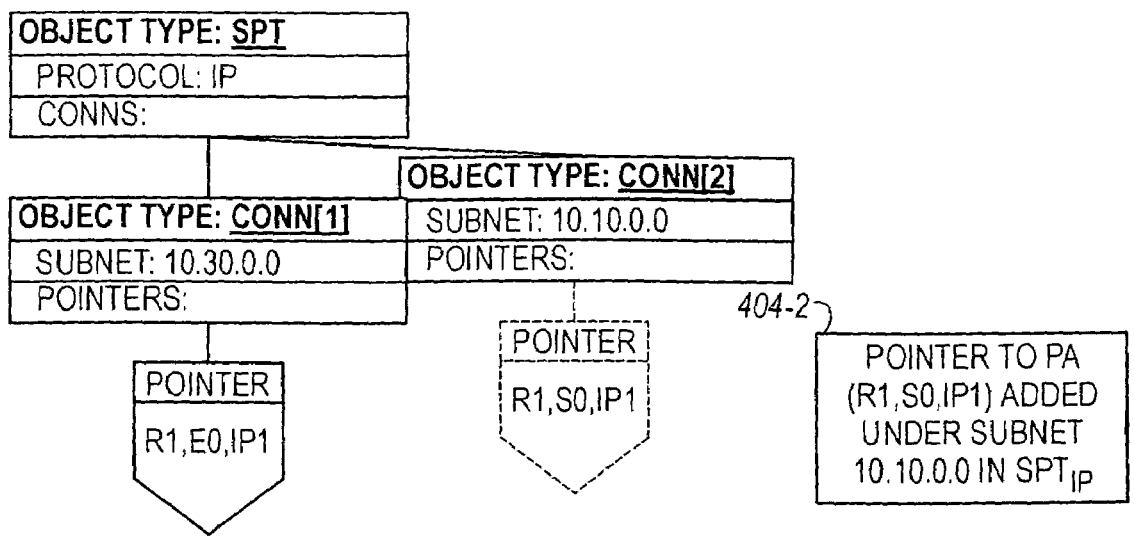

Next, processing proceeds to Step 404-2 where a pointer is added to PA under the subnet 10.10.0.0, the pointer being R1,S0,IP1, resulting in the structure in FIG. 8E.

Next, at Step 407-2, since we are not at the last port address the answer is "no"; thus processing moves to Step 406-2 and the port address is set to the next address which is shown in FIG. 1B at the port address labeled 401. In other words, the port address is assigned 10.10.4.2 with mask 255.255.0.0.

Processing moves back to Step 403-3, and computes the subnet for the port address, which is 10.10.0.0, and the answer to Step 403-3 in this case is "yes" because 10.10.0.0 matches Conn[2].

Figure 8F:
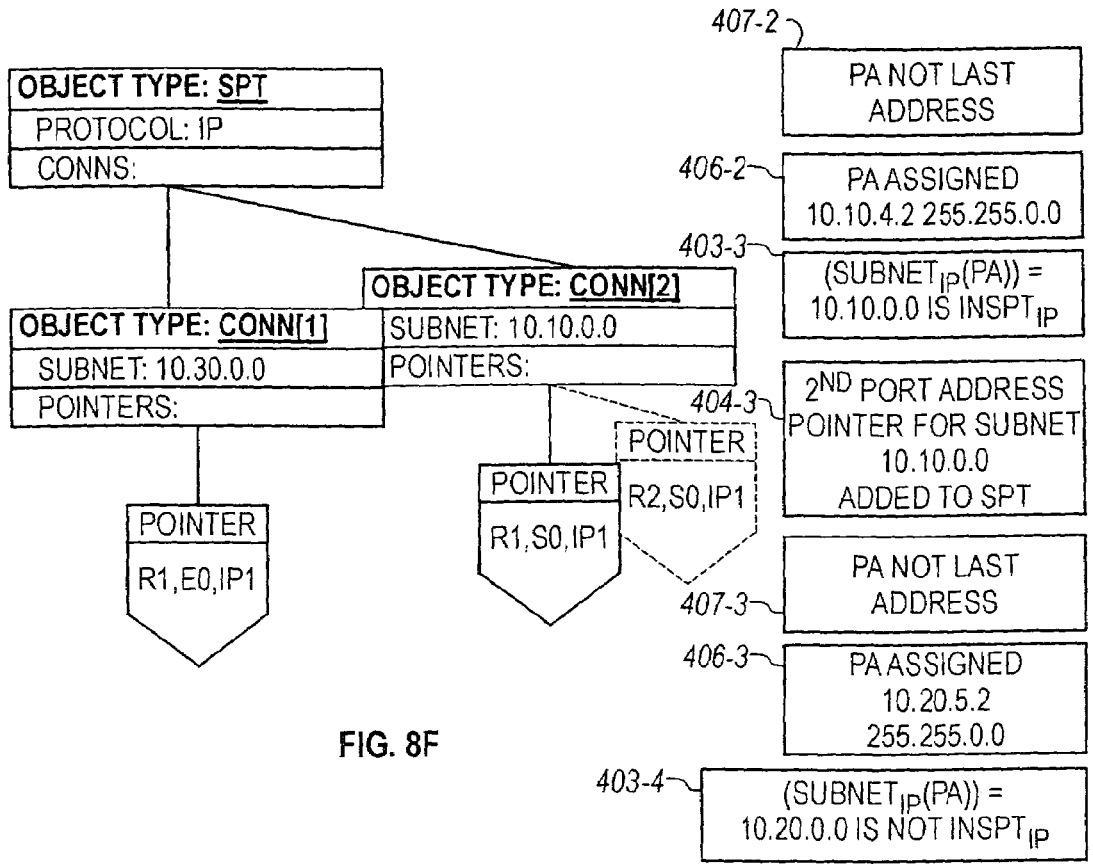
Figure 8G:
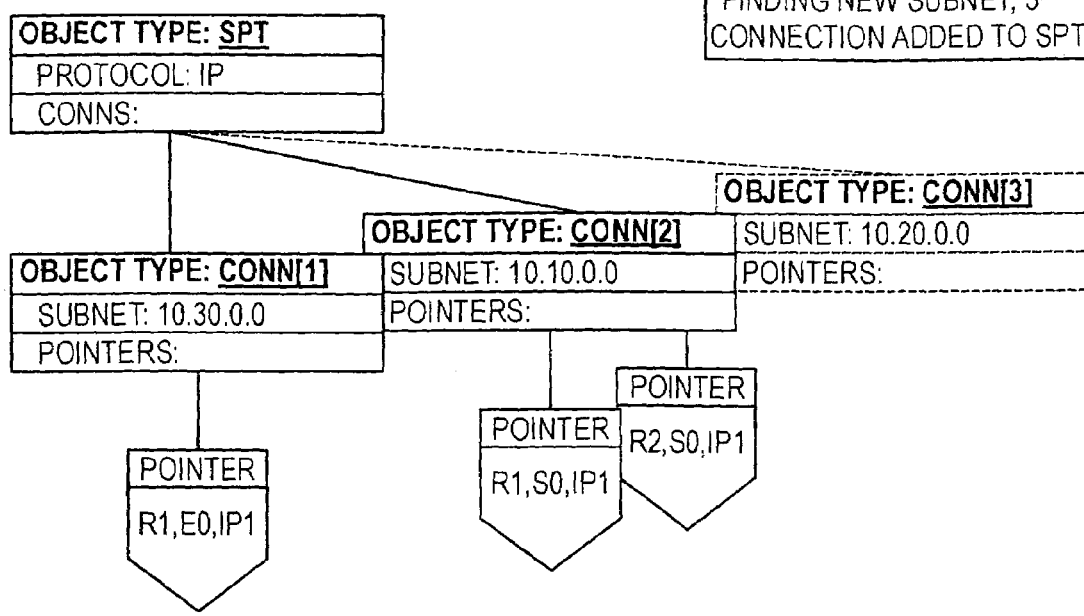

Processing moves directly to Step 404-3, rather than going through Step 405, and simply adds a pointer to the port address under the matching connection (Conn[2]) (i.e., the connection associated with subnet 10.10.0.0.). FIG. 8F shows the status at this point in the process.

The process proceeds to Step 407-3. PA is not the last address, so processing then goes to Step 406-3 where PA is assigned the address which is shown in FIG. 7B at the port address labeled 702.

Processing moves back to Step 403-4 and computes the subnet associated with PA, which in this case is 10.20.0.0. Step 403-4 determines the subnet is not in SPT, and thus processing moves to Step 405-3 and adds the subnet to the SPT, resulting in the structure illustrated in FIG. 8G.

Figure 8H:
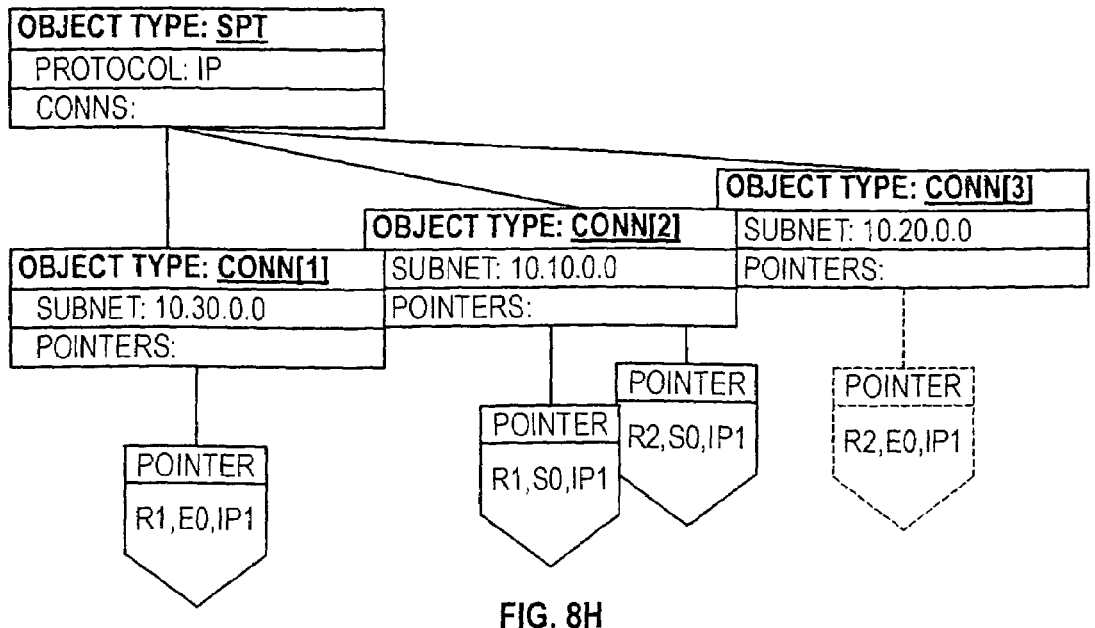

Processing then moves to Step 404-4 where a pointer is added under Conn[3] (i.e., the connection associated with 10.20.0.0) to the port address R2,E0,IP1, as shown in FIG. 8H.

Figure 8I:
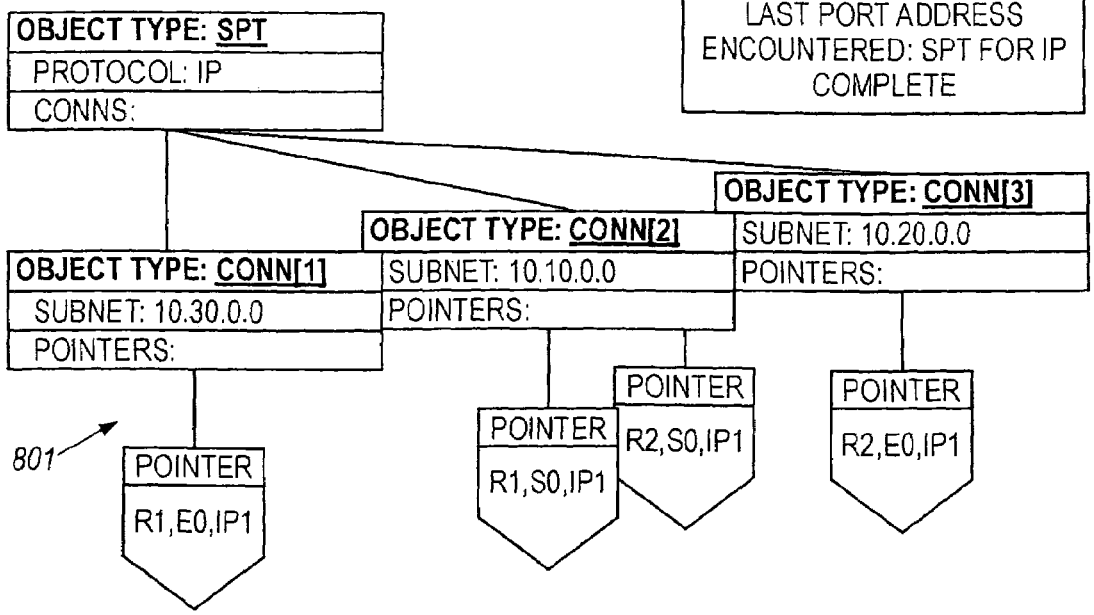

Processing moves to Step 407-4 and since processing has reached the last port address the answer is "yes" and the process is terminated. FIG. 8I shows the resulting SPT after all the processing is complete.

FIG. 8I is the SPT for protocol IP. The data structure of FIG. 8I represents the IP connections shown in FIG. 5. It will be helpful to see how 81 corresponds to FIG. 5. Referring to the SPT in FIG. 8I, note that there is one subnet (10.30.0.0) that connects to just one pointer. A pointer is a link into the SRO substructure corresponding to a port address. The single pointer under Conn[1] (in FIG. 8I) links to Router R1's port E0's only IP address. Conn[1] can be interpreted as capturing that subnet 10.30.0.0 which has one router point attached to it, namely router R1's E0. Since "E" refers to an Ethernet, this connection can be associated with an Ethernet. Next, refer to Conn[2] in FIG. 8I, and note that this is associated with subnet 10.10.0.0, which is labeled 503 in FIG. 5, the Serial Link. This serial link connects two ports, represented in the data structure by the two pointers associated with Conn[2]. Lastly, Conn[3] corresponds to subnet 10.20.0.0, which is an Ethernet with a single router port attached, Router R2's E0.

Figure 8J:
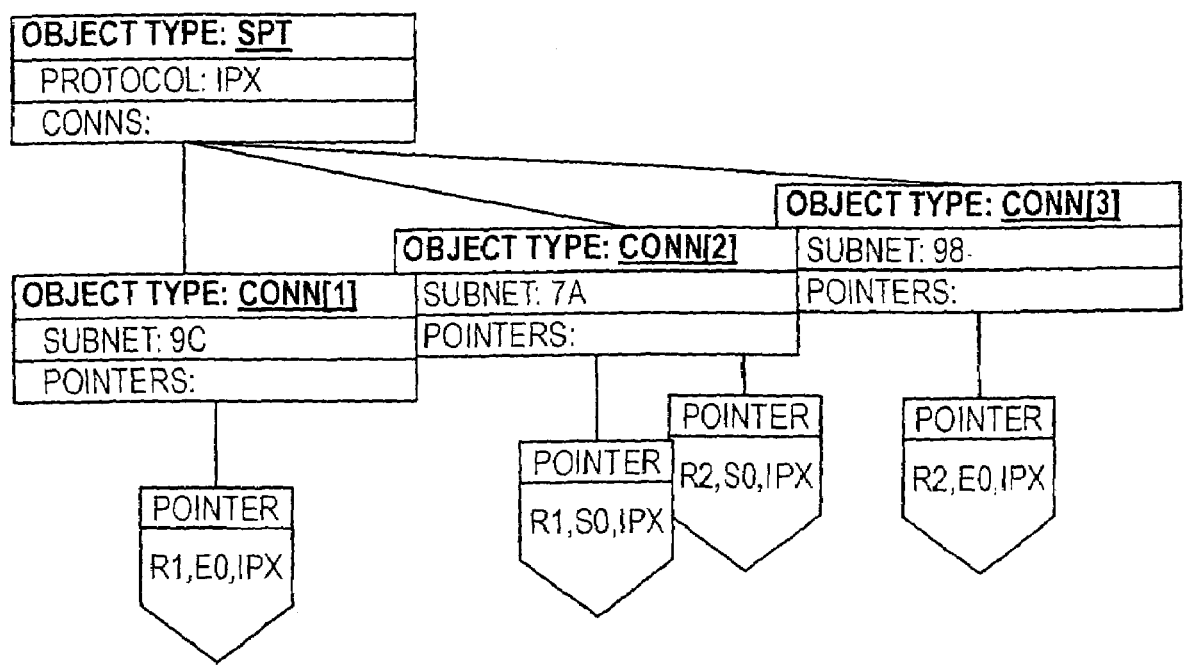

FIG. 8J shows the SPT that would be produced if the procedure in FIG. 4 were applied to SROs in FIGS. 7A and 7B for protocol IPX. A difference between the IPX and IP walk-through are that, for IPX, PA will be assigned IPX port addresses. Another difference is that for IPX, a SUBNET$_{IPX}$, rather than SUBNET$_{IP}$ would be used in Step 403 of FIG. 4.

It will be apparent from the foregoing discussion that there exist only minor distinctions in the process of building the SPT among certain different protocols. If the process of FIG. 4 were building an AppleTalk SPT, it would step through AppleTalk port addresses. Another difference is the function "subnet" which is specified in FIG. 4 at Step 403. For the different protocols there are different subnet functions. We described earlier that for IP, the port addresses are given by an address and mask—(the invention applies the mask using "bit-wise AND"), and then the comparison is performed to get the subnet from the mask/address combination. For IPX, the condition is much easier. The invention simply uses the address specified in the port address, which is the IPX Network Address. Referring to the region labeled 707 in FIG. 7A, note that the address is 9C. Next, referring to FIG. 8J shows that the subnet is simply the network number 9C.

Thus, a significant advantage of the processes and structures of the present invention over earlier network management tools is that with the present invention, one need go to the live network only once for each router to populate the SROs. When the SROs are populated, the formation of topology is strictly an off-line process that can proceed even if the network at that time has regions that are not operational. This is in contrast to other mechanisms that use (on-line) discovery for topology production.

Another advantage of the invention is in creating topologies for two networks that are separate, but are to be merged. Using the methodology of the present invention, one can obtain the router configurations for one of the networks; go to the second network and get the router configurations, even though they are not connected at this moment; merge them; load the configurations into SROs; make modifications to the configurations to be sure the networks interoperate properly; and perform analysis of the newly merged networks. Generally, earlier network management tools cannot be used to form a topology unless the two networks are merged.

Figure 9A:
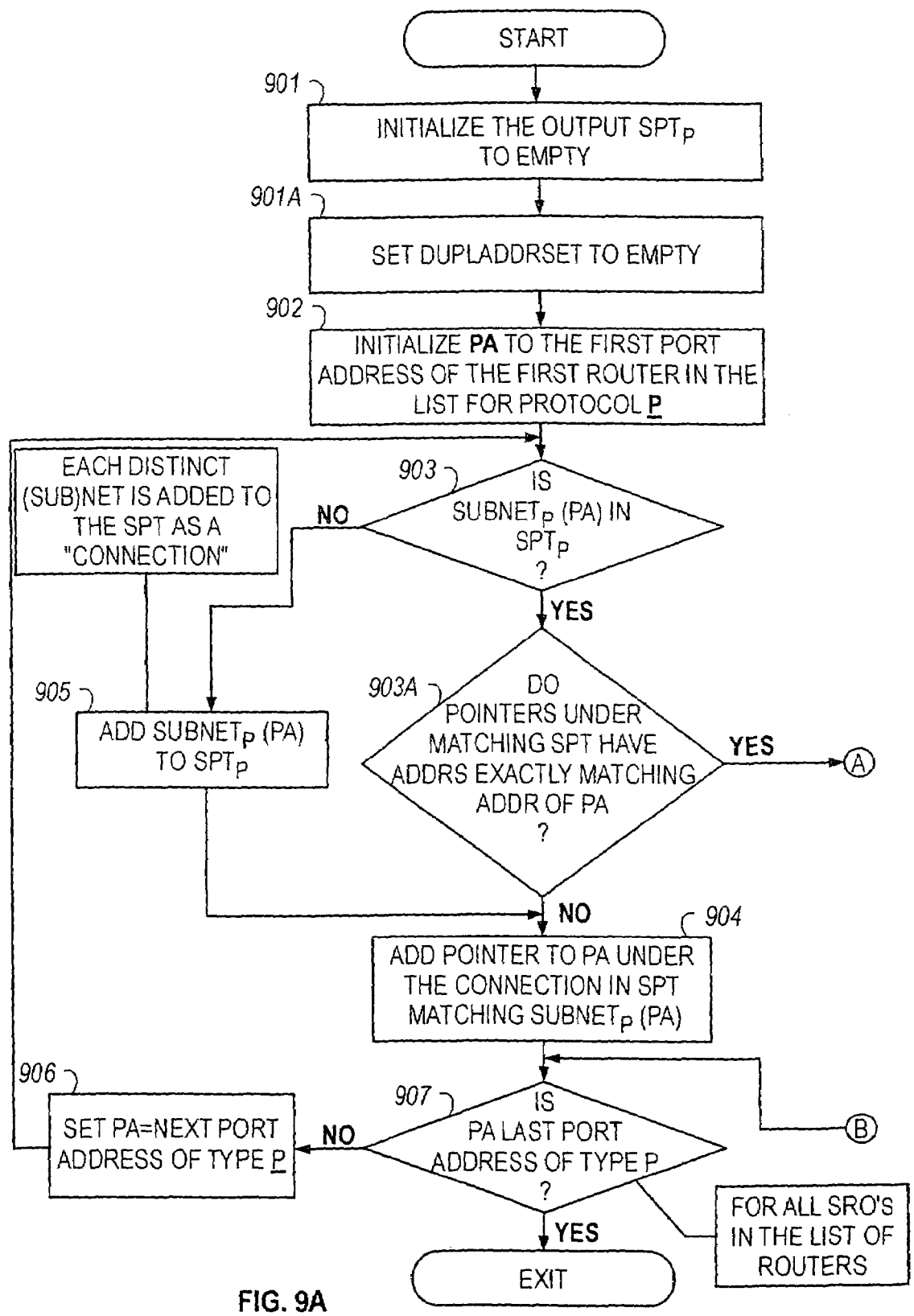
FIGS. 9A-B show an extension of the flowchart in FIG. 4, which constructs the SPTs, to check for the integrity violation of duplicate addresses.
Figure 9B:
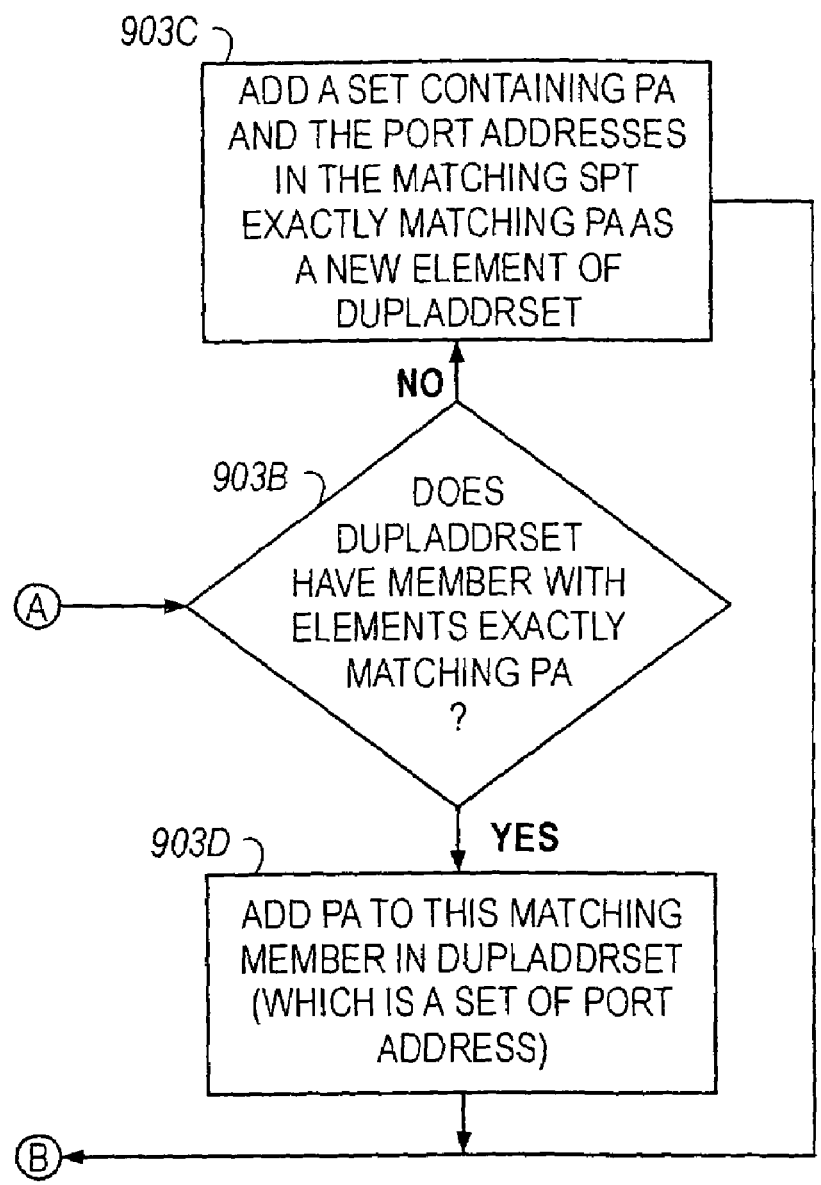

FIGS. 9A-B show an extension of the SPT Build process shown in FIG. 4. The process in FIGS. 9A-B handles a complication in which it is possible, due to misconfiguration, that ports on two different routers are given the same address. This is a high severity integrity check, a problem that the network manager wants to correct on the network without delay. The problem is somewhat analogous to a situation where you are mailing a letter and two people have the exact same address. It is not clear where the letter would be sent. During the process of forming the topology, a search is made for duplicate addressees. FIG. 9A shows the steps from FIG. 4 and inserts the additional steps that look for duplicate addresses.

Focusing now only on the additional steps added in FIG. 9A, Step 901A, is inserted between Step 901 and Step 902. Step 901A sets the duplicate address set to empty. The process in FIGS. 9A-B will produce not only the SPT, but also an integrity check output set that conveys which port addresses refer to the same address. The comments at the top of FIG. 9B provide an example of what this set might connote. For example, consider the DuplAddrSet (which is a set of sets) with elements {PA1, PA3, PA4}, which means that the port address pointed to by PA1, PA3, and PA4 all refer to the exact same address. Similarly, the presence of the second set, {PA9, PA7} means that PA9 and PA7 refer to the same address. As conflicts are identified, the set DuplAddrSet will grow.

In Step 903A, if the process finds that the subset of the port address being processed is already in the SPT, then it is necessary to determine if, in that SPT, there are any duplicate addresses. (If the subnet is not in the SPT, it is not necessary to do the check since an address equal to PA cannot be in the SPT.) If there are not any duplicate addresses detected in Step 903A, the answer will be "no" and the process goes to Step 404 as it appeared in FIG. 4.

Returning to Step 903A, if the test in this step detects an address conflict, then processing goes to Step 903B of FIG. 9B. Step 903B is a test that checks to see if, in DuplAddrSet, there already exists a member (i.e., a set of port address pointers) having the same address as PA, the current port address). If the answer is "yes," then the matching element is extended to include a pointer to PA. If it doesn't, a new member is added to DuplAddrSet containing a pointer to PA and a pointer to the port address in SPT exactly matching PA. Thus, Steps labeled 901A, 903A, 903C, 903B and 903D are added in FIGS. 9A-B to look for duplicate addresses and put them in this duplicate address set, DuplAddrSet.

Referring to FIGS. 1A-1J, note that the invention forms topology information and then determines whether there are any integrity violations (FIGS. 1D and 1G). The address set is the result of one of the integrity checks referred in FIG. 1D. This is important information that the user can apply in FIG. 1H to find if there are problems and remove them.

Figure 10:
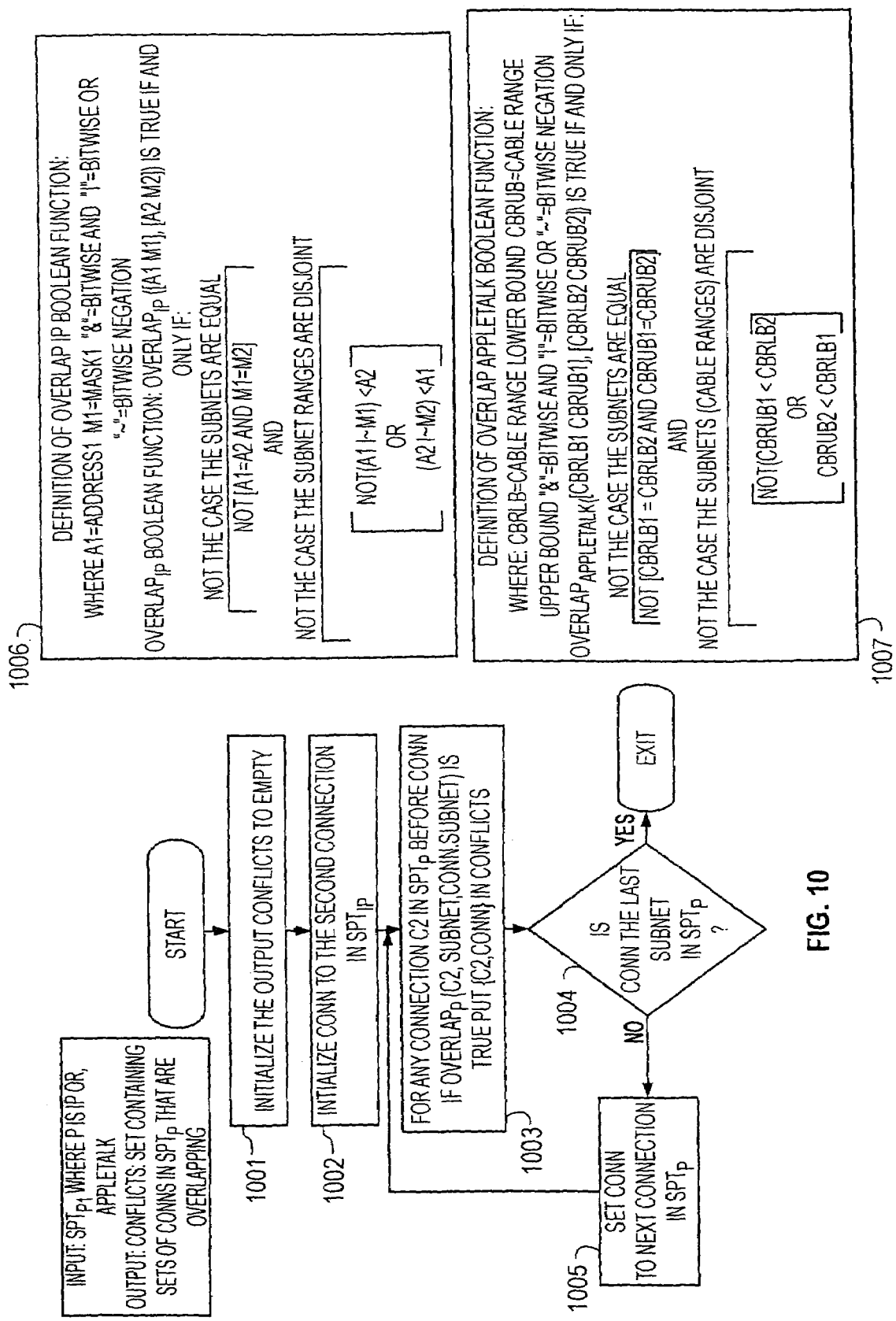
FIG. 10 is a flowchart to check for the integrity violation of overlapping subnet masks given an SPT as input.

FIG. 10 shows a procedure for calculating another integrity check, which is applicable to IP using an SPT. In IP, not only do you want to ensure that two addresses do not exactly match, but also you want to ensure that address/mask pairs, which intuitively refer to address ranges, either refer to the exact same ranges or do not overlap at all. The case where they overlap is undesirable.

FIG. 10 illustrates a general procedure for computing the "Overlapping Address Range" integrity constraint, which is applicable for protocols, such as IP and IPX, that allow interfaces to be configured with address ranges. (Note: an IP subnet can be thought of as corresponding to an IP address range.)

The input to the "Overlapping Address Range" flowchart is the SPT for the protocol being analyzed, which, according to some embodiments, can be IP or AppleTalk and its output. The output set Conflicts includes elements that are the pairs of connections in the SPT being analyzed, which refer to overlapping address ranges. In Step 1001 of the flowchart (FIG. 10), the output variable Conflicts is initialized to the empty set. In Step 1002, the variable Conn is set to the second connection in the SPT. (Note: if there is only one connection in the SPT then there cannot be any conflicts and we assume this procedure would not be applied.) In Step 1003 the process looks for any connections in the SPT listed before Conn that overlap with it. If any overlap is found, a set containing the two overlapping connections are put in as a member of Conflicts. At the bottom of FIG. 10, the definitions of the Overlap functions are shown, which are the only part of the algorithm that differs from protocol to protocol. In Step 1004 the algorithm determines whether the last connection has been reached, and if so, processing terminates. If the last connection has not been reached, then processing goes to Step 1005, where Conn is set to the next connection and processing repeats for this new connection starting at Step 1003.

The overlap function for IP (shown in 1006 in FIG. 10) takes as arguments two IP subnets, each which is given by a 32-bit address and 32-bit mask. The subnet given by [A1|~M1] defines the range of addresses from A1 to "(A1|~M1)", where "|" refers to bitwise OR and "~" to bitwise negation. The expression "(A1|~M1)" can be thought of as producing a 32-bit number formed by flipping the bits in A1 that were masked out (which are the ones where M1 has 1s), from 0s to 1s. The definition for OverlapIP ([A1 M1], [A2 M2]) can be interpreted as saying that subnets [A1 M1] And [A2 M2] overlap if, and only if, they are not equal and not disjoint. Two addresses are disjoint if the lower bound of one of the ranges is greater than the upper bound of the other.

The overlap function for AppleTalk (shown in 1007 in FIG. 10) takes as arguments two AppleTalk "subnets," each which is given by a lower and upper bound giving a cable range. The definition for OverlapAppleTalk [cbrlb1 cbrub1], [cbrlb2 cbrub2] can be interpreted as saying that the cable ranges [cbrlb1 cbrub1] and [cbrlb2 cbrub2] overlap if, and only if, it is the case that they are not equal and not disjoint.

Remember that this description is sequentially moving through the overall processes described in FIGS. 1A-1I. We have already talked about the process of taking text configuration files or MIB data and producing SROs (FIG. 1A). Given the SROs, for each of the protocols that are running on the network, individual SPTs are formed (part of what is done in FIG. 1B). Given each of the individual SPTs, there are a number of integrity checks applied (some of what is done in FIG. 1D). For each SPT, duplicate addresses are identified in the associated protocol. Additionally, for IP, overlapping subnet masks are identified.

Figure 11:
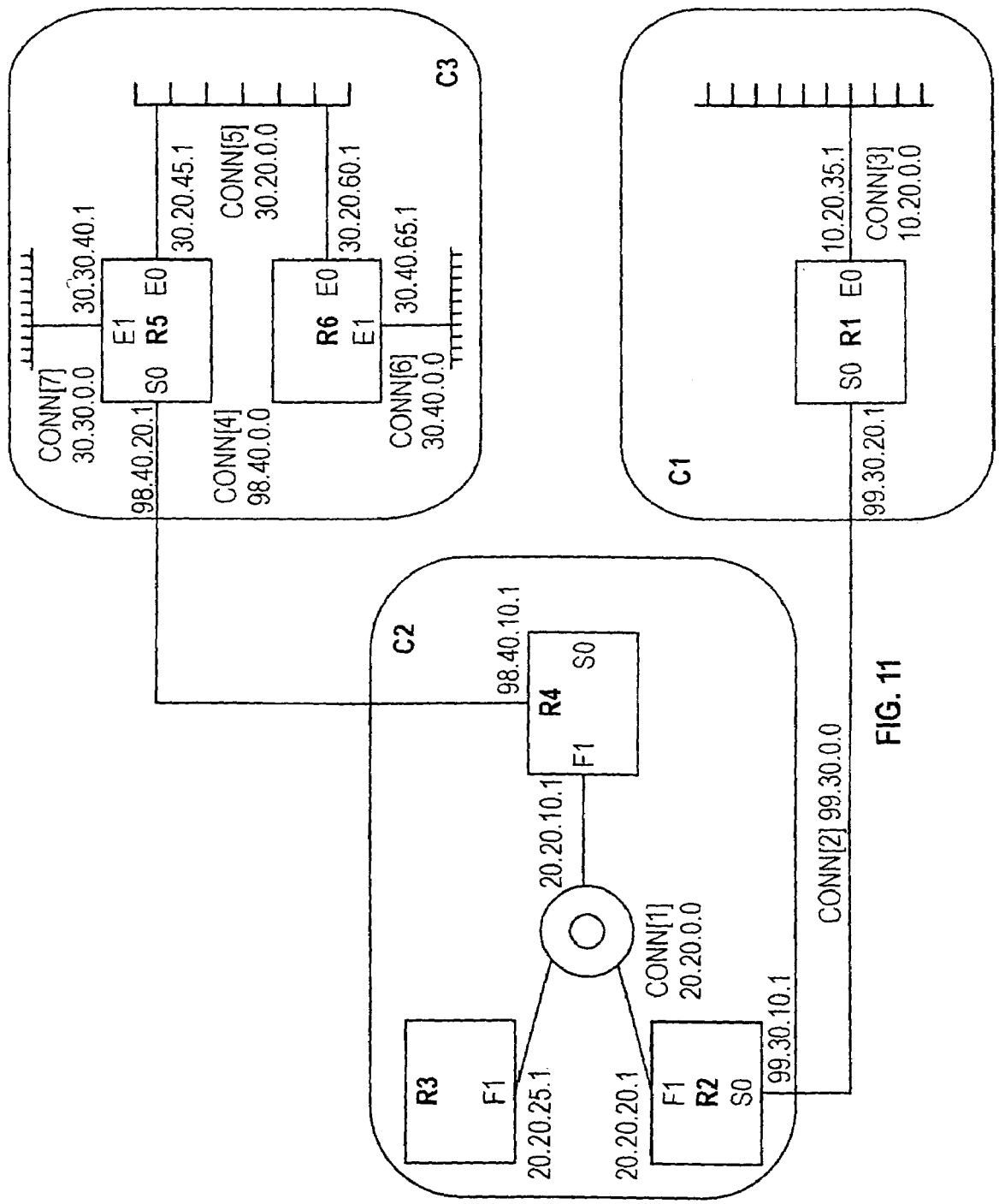
FIG. 11 is a topology drawing of a hypothetical network shown with a Campus View. It supports discussion of the "Create Views" process shown as FIG. 1C.
Figure 12:
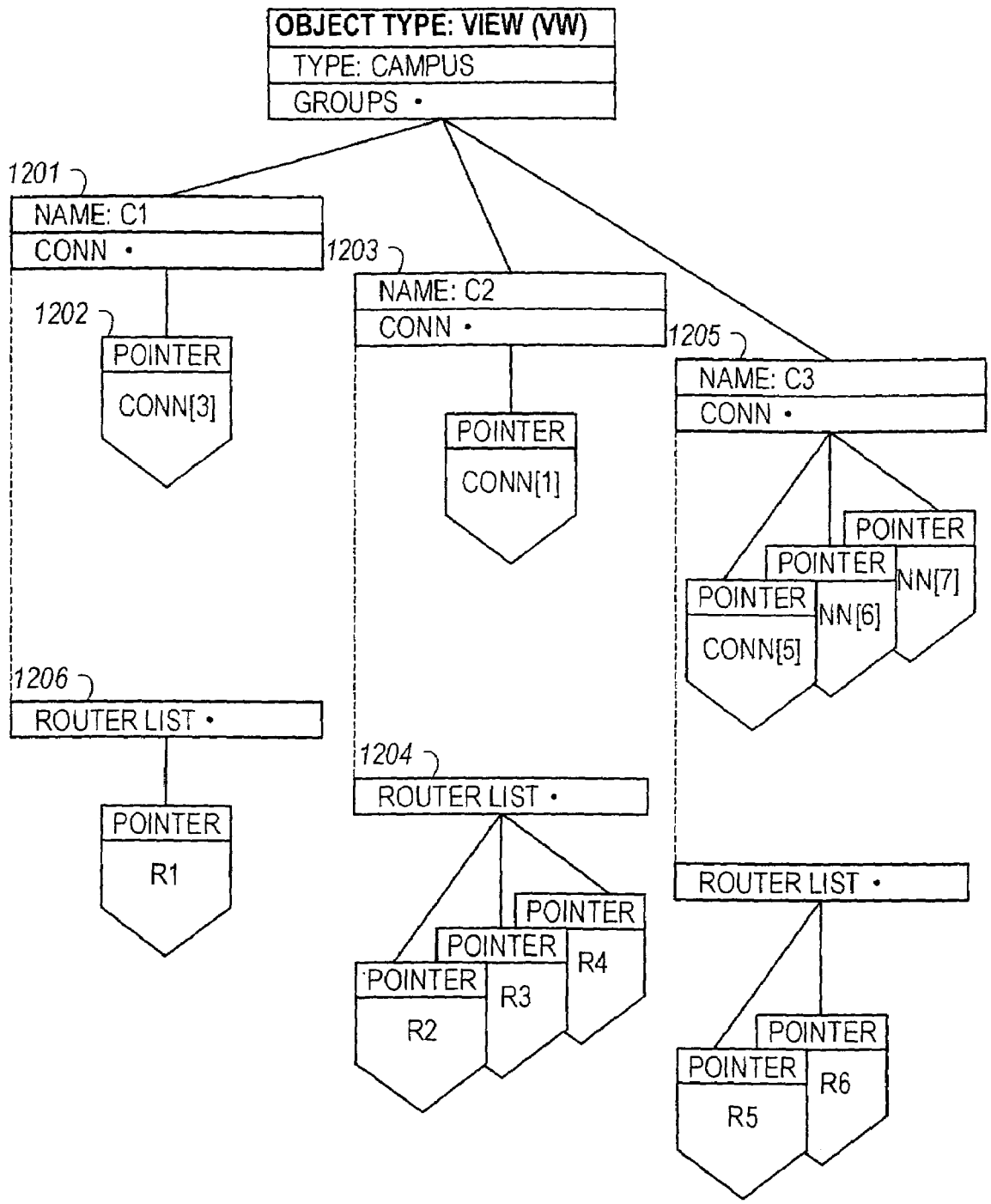
FIG. 12 shows the object data structure of a Campus View Object corresponding to the topology shown in FIG. 11.

Next, we provide examples of the production of views in accordance with the process represented in FIG. 1C. The first example is illustrated in FIG. 11. The term "view" as used herein means an abstract representation of a level 3 topology that omits irrelevant elements and logically groups elements. FIG. 11 provides a view which groups routers together to show which routers and LANs share the same campuses. In FIG. 11, we show campuses labeled C2, C1 and C3, each containing routers and LANs. Referring to C2 first, we see that routers R3, R4 and R2 are grouped together appearing in Campus C2. Referring to Campus C3 next, we see that router R5 and R6 are grouped together. Referring to Campus C1, we see that there is one router in this campus, R1. To understand how this information is captured in data structures, in accordance with the invention, refer to FIG. 12, which provides an example of a "View" data structure in instantiated form. The same basic type of data structure framework is used for the different type of views. The first element in this View data structure is the atomic attribute "Type" set to "Campus" to distinguish it from different views, such as the OSPF view. The next attribute, "Group", is a list of objects. Each of the objects being what is referred to as a "Group", which shows how the routers, links and LANs (or in our terminology, "Connections") tie together. Going back to FIG. 12, reference numeral 1201 refers to an object with name C1. The next attribute, Conn, refers to a list of pointers to connections in the SPT being abstracted. These connections are the links and LANs that belong to the group. In FIG. 12, in the group with name C1, we see that the Conn[3], which corresponds to the Ethernet 10.20.0.0, is a member. In FIG. 11, this Ethernet is within the C1 campus group. Groupings have two parts, the connections and the routers. In C1 of FIG. 1, note that router R1 is in this grouping. Refer to the Router List attribute at region 1206, FIG. 12, where there is a pointer to just a single router, R1.

In FIG. 12 reference numeral 1202 indicates a pointer into SPT. Many of the data structures of the present embodiment of the invention are intertwined data structures that connect the topological information to the SRO information.

Referring to reference numeral 1203 in FIG. 12, a group corresponding to campus C2 is shown. The connection that belongs to it is Conn[1] and the routers that belong to it are R2, R3 and R4 (shown at Point 1204). The last group (reference number 1205), corresponds to campus C3 which has three connections associated with it, Conn[5], [6], and [7], and two routers, R5 and R6. Note that a view might not contain all routers or all connections that are contained in an SPT. It merely describes the elements that are relevant to the abstraction. In a campus view, some of the connections may be omitted. Connections belong to a campus view only if they are LANs. So, for example, Conn[1] in FIG. 11 is an Ethernet and is in C2. We see that Conn[3] is an Ethernet, and is in C1. Also connections Conn[7], Conn[6] and Conn[5], which are all Ethernets, are in C3. There are two connections, serial links (Conn[2] and Conn[4]) in FIG. 11, that do not appear in FIG. 12 because serial links do not belong to a particular campus; rather, they span campuses.

Figure 13:
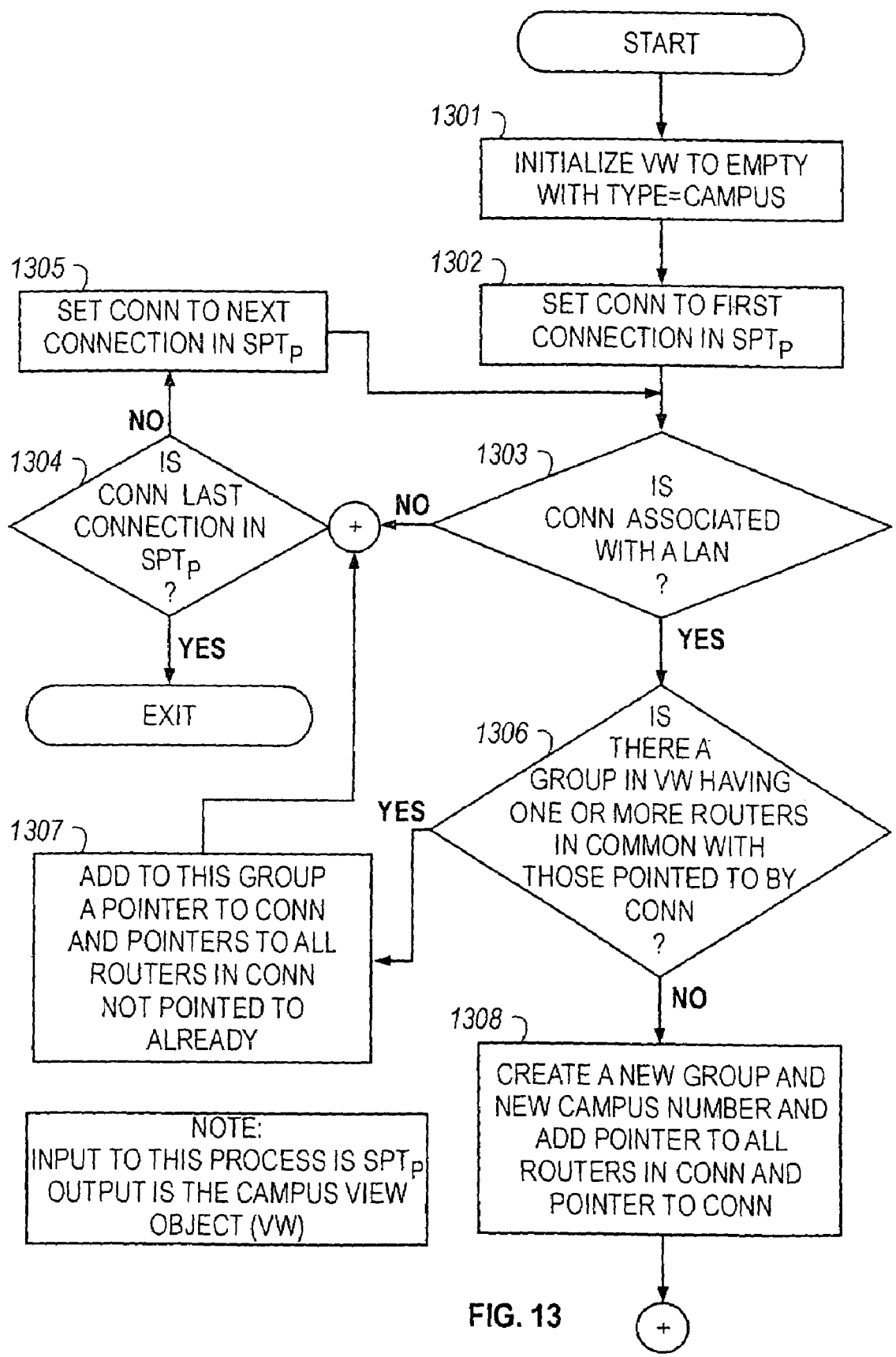
FIG. 13 is a flowchart of the process that forms a Campus View Object, given an SPT and SROs as input.

FIG. 13 is a flowchart that illustrates a process for constructing a campus View object, given as input an SPT and the SROs that are pointed to by the SPT. In FIG. 13, we refer to $SPT_p$, where "P" can stand for any protocol since basically the same is used for multiple protocols, e.g., IP, IPX, AppleTalk, etc.

Referring to FIG. 13, we first initialize the view object (VW) to "empty" and set Type to "campus". Next, at Step 1302, the variable Conn is set to the first connection in SPT (really $SPT_p$). In the following discussion, realize that the view object formation process iterates through all the connections in the SPT under consideration.

In Step 1303, it is determined whether the Conn variable is associated with a LAN. If the answer is "no" (in other words, Conn is associated with a serial link or any other wide area link), then the connection is ignored and processing goes to Step 1304, which determines whether the last connection in SPT been reached. If it has, the procedure terminates. If it has not, then Conn is set to the next connection in the SPT, and processing goes back to Step 1303.

On the other hand, at Step 1303, if the Conn is a LAN connection, we go to Step 1306, which determines whether there is a group in a view already having one or more routers in common with those pointed to by Conn. (Remember that Conn is a connection in a SPT, which has pointers to port addressees, and each port address belongs to a router). If the answer is "yes", then we go to Step 1307 and add to this existing group in the view a pointer to Conn under the Conn attribute and pointers to all routers associated with Conn under the Router list attribute. If the answer to Step 1306 is "no", then processing goes to Step 1308 where we create a new group. We give each group a unique name, (Campus C1, Campus C2, etc.). We add a pointer to Conn connection and to all routers pointed to by this connection. After this step, we go back to Step 1304 and find out if we reached the last connection. If not, iterate to the next connection. Similarly, after Step 1307, we go back to Step 1304 to determine whether the last connection has been reached. If not, processing of connections is continued until all have been processed. The result, upon answering "yes" in Step 1304, is that the process terminates and the object VW (the view object) will be fully instantiated. For example, for the network view in FIG. 11, we have a view object like that in FIG. 12.

Next, an example involving the formation of an OSPF view is described. OSPF is a particular routing protocol. See, Spohn, Darren L., "Router Protocols", Data Network Design, pp. 192-213, McGraw-Hill Inc., 1993. Also, see the following Requests for Comment issued by the Internet Engineering Task Force (IETF): RFC 1771—A Border Gateway Protocol 4 (BGP-4) specification; RFC 1131—OSPF specification; and RFC 1058—Routing Information Protocol (RIP). Basically, routers run routing protocols in which they exchange and generate information to produce routing tables. For OSPF, a network is grouped into areas with sonic routers called area border routers, responsible for exchanging information between areas.

Figure 14:
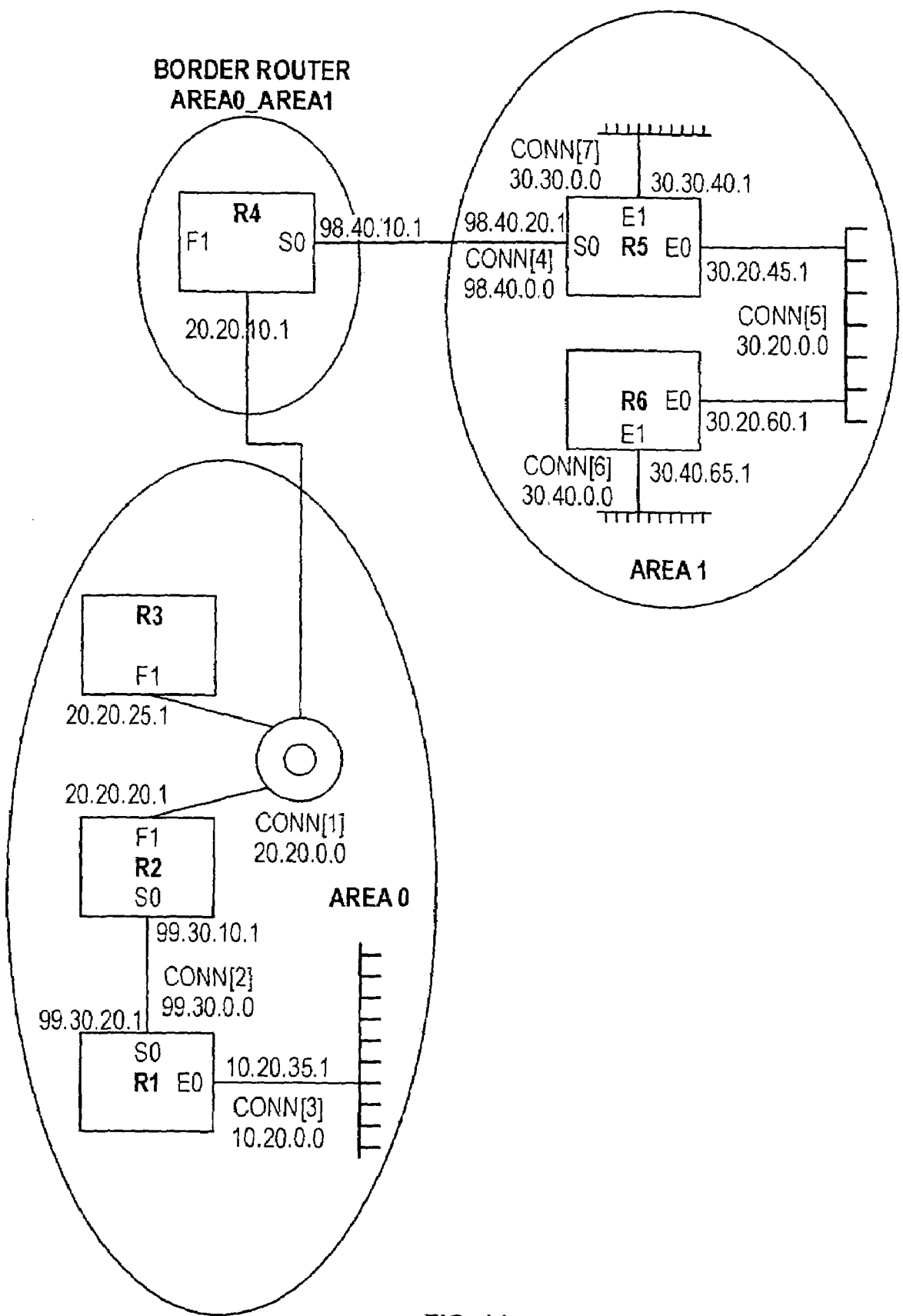
FIG. 14 is a topology drawing of the same network shown in FIG. 11 representing an OSPF view of the same configuration shown in a Campus View (ref.
Figure 15:
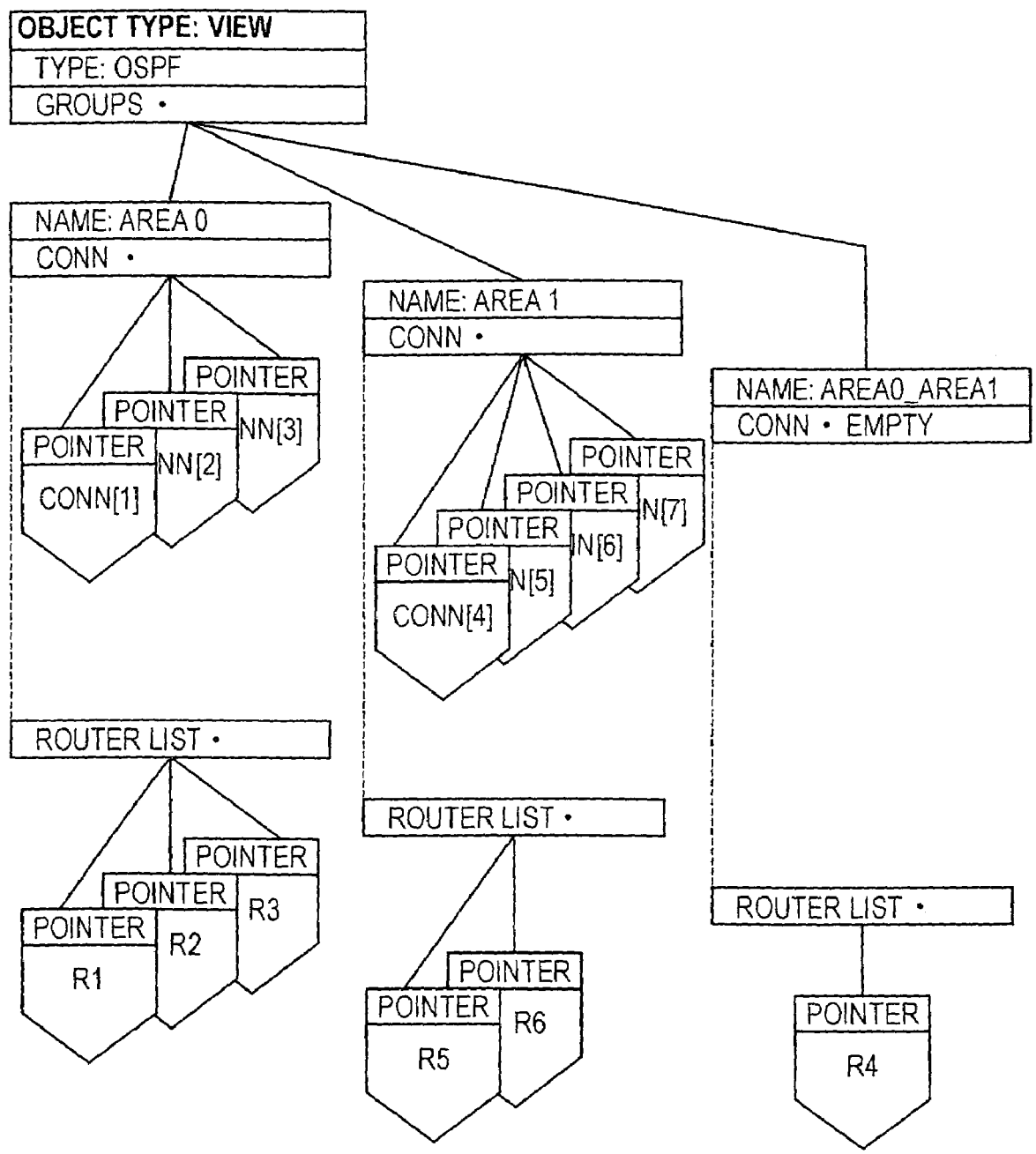
FIG. 15 is the OSPF View Object data structure corresponding to the topology shown in FIG. 14.
Figure 16B:
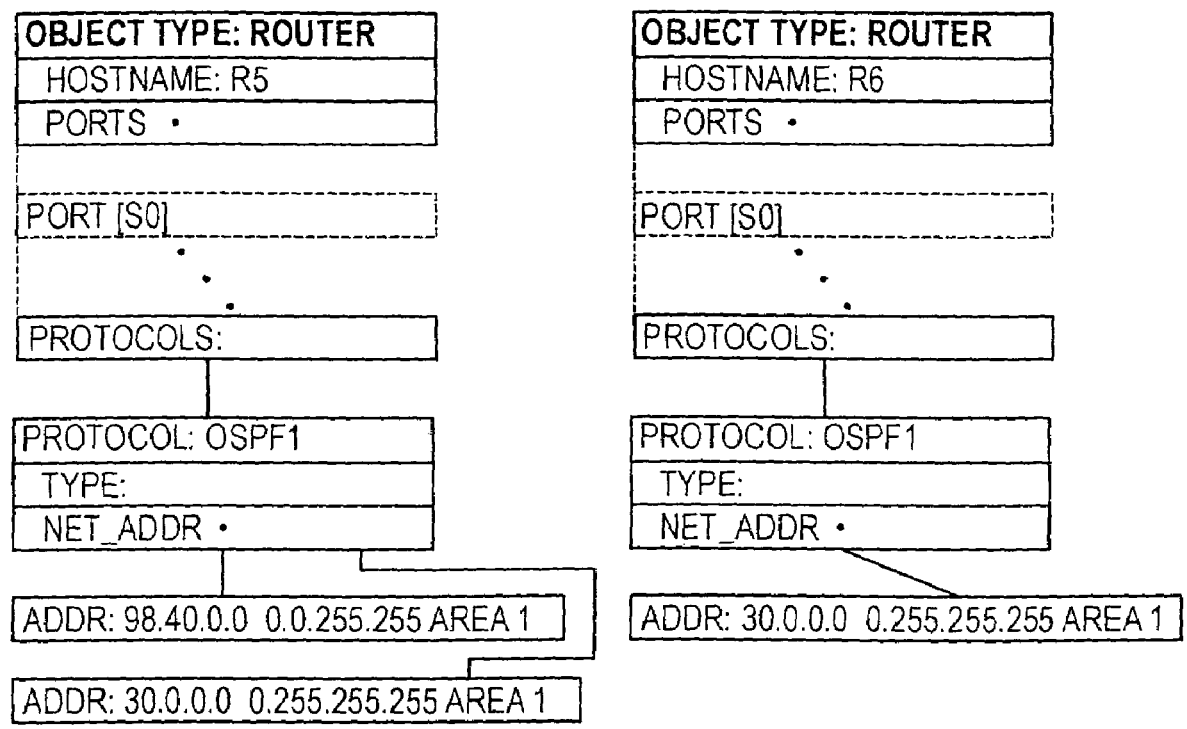
Figure 17A:
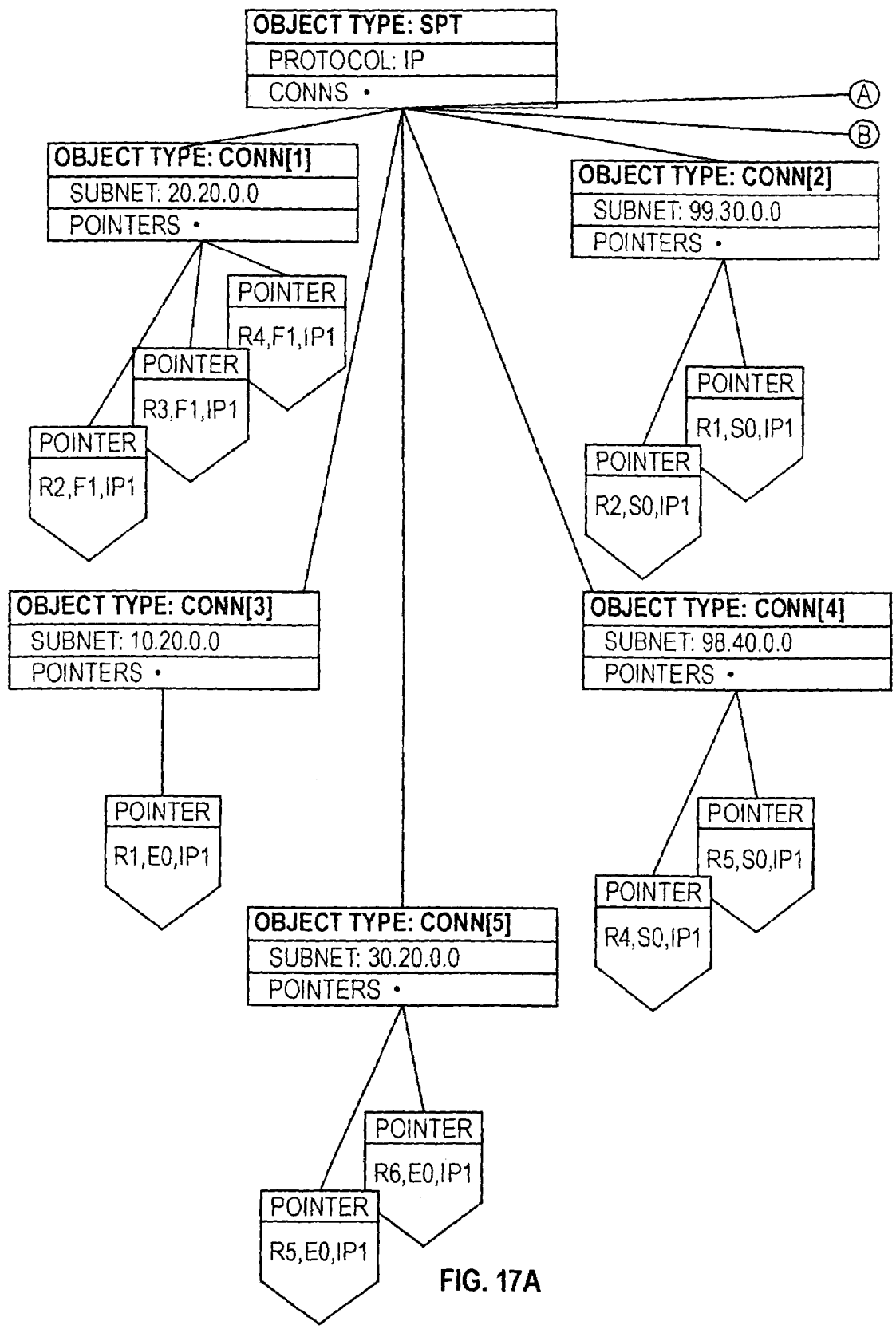
FIGS. 17A-B show the SPT object data structure for the network shown in FIG. 14.

FIGS. 14 through 17A-B deal with creating an exemplary OSPF View. FIG. 14 gives an intuitive picture of an exemplary OSPF view. FIG. 15 shows an example of a data structure that captures the OSPF view of FIG. 14. FIGS. 16A and 16B are portions of the SROs for the routers shown in FIG. 14 that are relevant for the analysis. Finally, FIGS. 17A-B show an IP SPT that was formed for the routers in FIG. 14.

Referring to 14, there are two Areas, Area 0 (encompassing routers R1, R2 and R3), Area 1 (encompassing routers R6 and R5), and a group with a single router, R4, which is the area border router between Area 0 and Area 1. Specifically, R4 is running both Area 0 and Area 1.

Referring to FIG. 15, there is shown a View data structure that captures the grouping of FIG. 14. The View object Type is OSPF. The View object's TYPE attribute distinguishes it from other View objects, such as the campus view TYPE. Next, note the group's attributes. The group attribute comprises a list of group objects. The first group refers to Area 0, the connections in that group are, Conn[1], [2], and [3], and the routers in the group are, R1, R2 and R3. The next group refers to Area 1, which includes Conns [4] thru [7] and routers R5 and R6. Finally, there is a group for the area border router R4.

FIGS. 16A and 16B illustrate how router configurations as captured by the SROs contain the information that is used to indicate to which areas the different routers correspond. In FIG. 16A, we see that the SRO for router R1 is running an OSPF process, OSPF 1. Note that a router can be running many different OSPF processes. For simplicity here, we only consider cases where a router runs just one process. At reference numeral 1601, we see that the OSPF process on router R1 has an attribute called Net Address, which refers to a list of statements indicating to what areas the different router interfaces belong. To find out if an interface belongs to a particular area, you sequentially go down the list of network statements looking for a match. Referring to FIG. 16A, the process for finding a router interfaces area involves first starting at network statement object labeled 1601A and seeking a match. If there is no match, then the process proceeds to the network statement object labeled 1601B. If no match is found in any of the Net-addrs, this interface does not belong to any Area and is not considered in an OSPF view.

The actual matching process is as follows. Consider the item 1601A that has 99.30.0.0 and 0.0.255.255 as its matching pattern. Referring to FIG. 14, we see router R1, port S0 has an address of 99.30.20.1, which matches 99.30.0.0 and 0.0.255.255. The second part, 0.0.255.255, is called an access list mask, to distinguish it from the masks found on IP port addresses. For "port address" mask, the octet "255" means "consider" the corresponding address octet during the matching process, and "0" means ignore the corresponding address octet. For access lists, the meaning of the matching octets is reversed. "255" means ignore the matching address octet, and "0" means consider it. For example, the pattern at the network statement 1601A means look for addresses that start with 99.30 because there is a corresponding 0.0 matching octet, but ignore the rest of the address because the mask ends with 255.255. Thus, R1,S0 has address 99.30.20.1, which matches item 1601A in FIG. 16A. Consequently, R1,S0 belongs to Area 0. Referring to FIG. 14, R1,E0 has address 10.20.35.1. This does not match item 1601A but does match item 1601B, so this interface (E0 on R1) is in the specified area, that is, Area 0. In summary, reference to FIG. 16 shows that both interfaces, S0 and E0, for router R1 (shown in FIG. 14) match Area 0.

As another example of interface matching in OSPF areas, refer to reference numeral 1602 in FIG. 16. Now refer to FIG. 14 at Router R4. Router R4 has two interfaces, F1 whose address is 20.20.10.1 and S0 whose address is 98.40.10.1. Referring back to FIG. 16A, reference numeral 1602 shows the network statements for router R4. The first network statement reference numeral 1602 shows the pattern 98.40 (ignore the rest of the bits). This matches Serial 0's address (98.40.10.1), and thus this interface is in Area 1. However, F1's address (20.20.10) does not match the first network statement (the statement at 1602 in FIG. 16A), but matches the second network statement, i.e., 1602B. Thus, F1 (from router R4) is in the area specified by network statement 1602B, i.e., Area 0.

For the routers running OSPF, determining what areas their interfaces match is an important step in the algorithm for producing the OSPF view. Very briefly, if there is a router that has one or more interfaces, all of them belonging to the same area, then this router will be put in the group for this area. For example, you see that routers R1, R2 and R3 in FIG. 14 have all of their interfaces match a statement associated with Area 0. On the other hand, router R4 has interfaces that match two different areas, so it is in its own border area group. Similarly, routers R5 and R6 have all of their interfaces match Area 1. Thus, R5 and R6 are in Area 1.

An advantage of multiple views is that if you have a particular task at hand, then a specific view might be particularly suitable. The OSPF view, for example, is a view that would be useful for configuring OSPF. In configuring OSPF, a central concept is specifying to which areas each router running OSPF belongs. So being able in a very succinct way to observe the area groupings is an enormous benefit in gaining a more comprehensive understanding of how the OSPF processes are running.

Placing a router in the wrong area is a very easy mistake to make. For example, in typing in a configuration, a user that mistypes 1 instead of 0 in a single area statement changes what areas a router's interface is in. Thus, it is very helpful to have a view based upon OSPF areas to permit easier diagnosis of errors, for example.

Figure 17B:
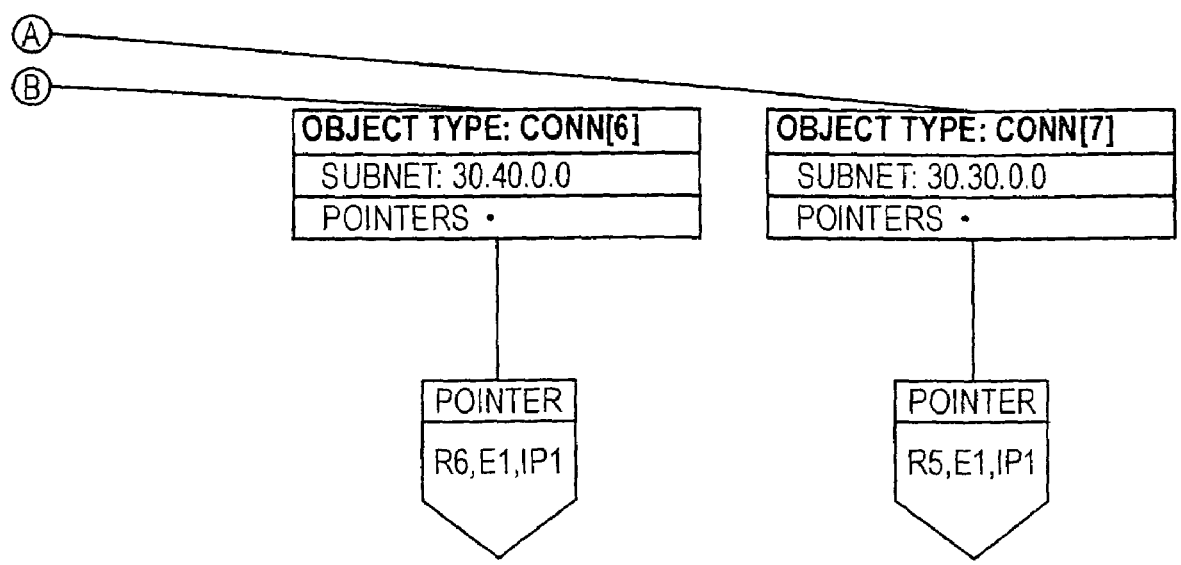

As we mentioned, FIGS. 17A-B are the IP SPT, which will be produced by running the algorithm we described in FIG. 4 on the SROs corresponding to routers R1 to R6.

Figure 18A:
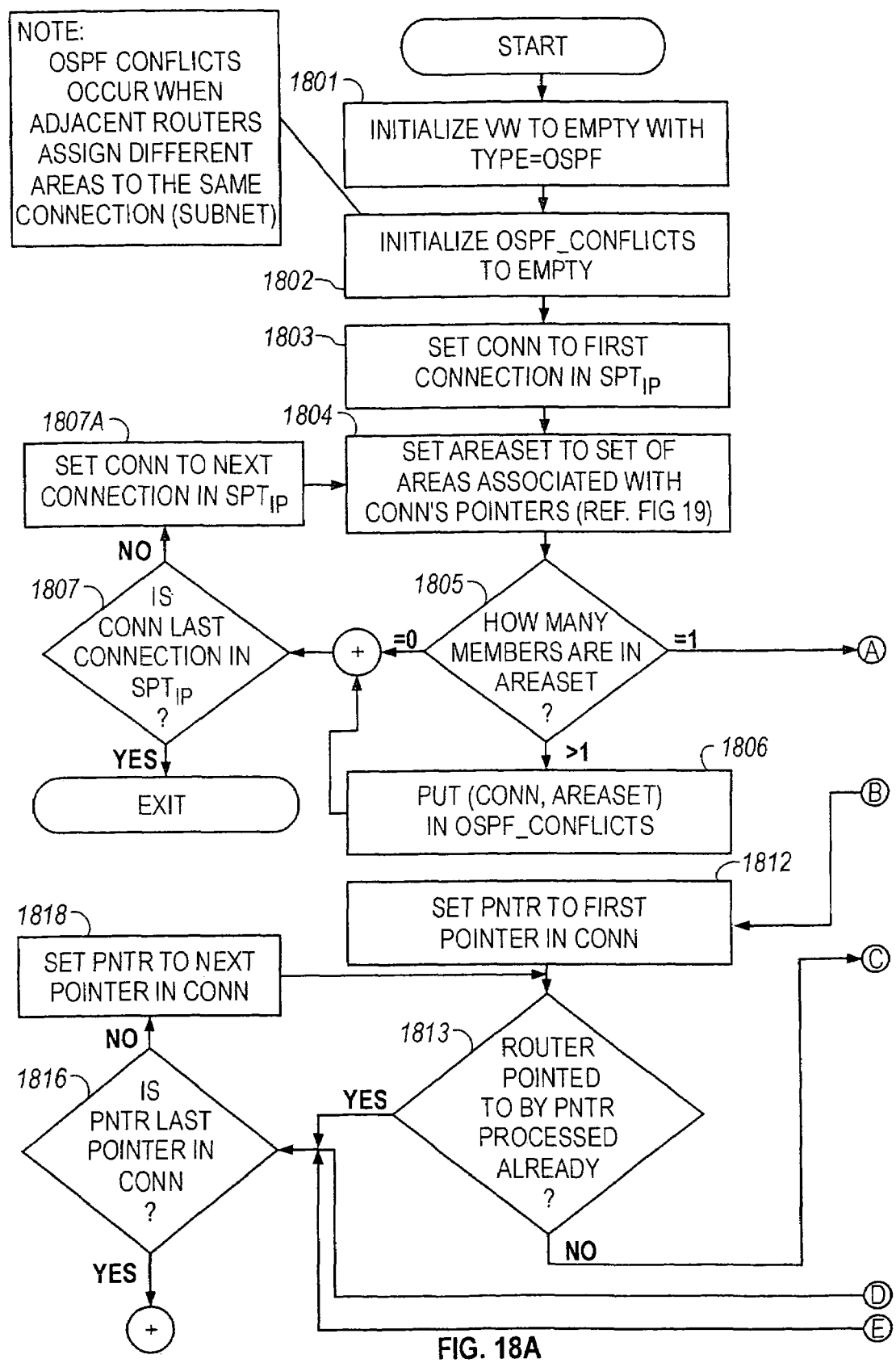
FIGS. 18A-B are a flowchart of the process that forms an OSPF View object data structure given an SPT and set of SROs as input.
Figure 18B:
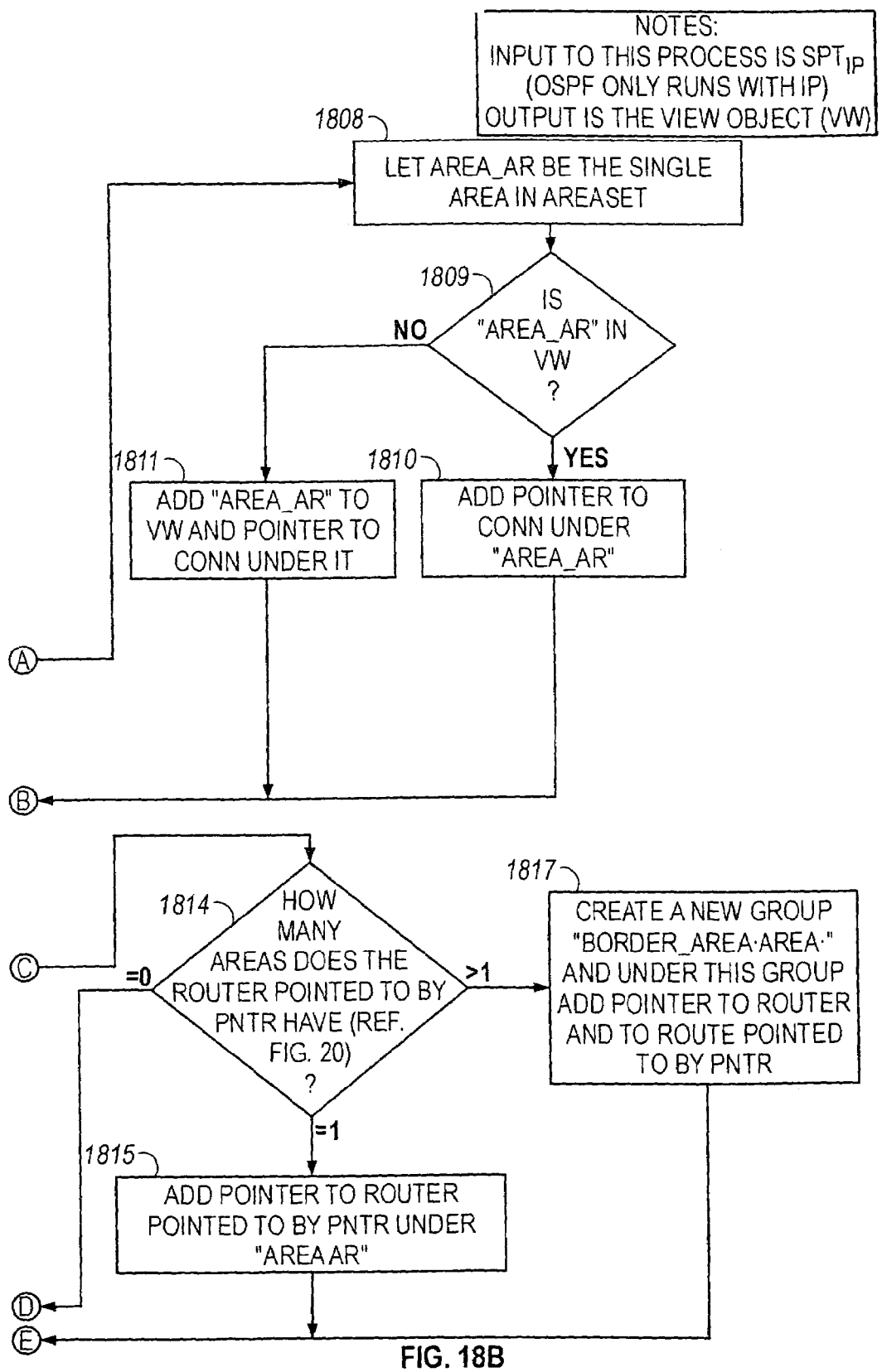

FIGS. 18A-B are a flow chart that shows how the OSPF view is produced with the inputs being the IP SPT from its related SROs. In the course of producing the OPSF view, an integrity check is performed which determines whether there are two adjacent routers running OSPF that have their connected ports assigned to different areas. This condition is a misconfiguration that should be pointed out to a user so the error can be corrected. In Step 1801 of FIG. 18A, the main object being built, the VW object, is set to empty with Type set to OSPF. In Step 1802, the OSPF Conflict set is initialized to empty. In this algorithm, we will be iterating through the connections in the IP SPT. So in Step 1803 variable Conn is set to the first connection in the IP SPT. Next, in Step 1804, the AreaSet is assigned the set of areas associated with Conn's pointers. We will go into detail about this process in FIG. 19. If connection Conn has one or more ports that are running OSPF, then Conn will be processed. On the other hand, if no ports are running OSPF, it is ignored. If it is the case that there is a conflict as, for example, when one port attached to Conn has Area 1 associated with it and another port attached to the same Conn has Area 0 associated with it, then AreaSet will have more than one element.

In Step 1805 it is determined how many members are in AreaSet. If the answer is "0" that means that there are no routers touching this connection with ports that run OSPF, and we go to Step 1807 meaning that we go on to the next connection, if it exists. At Step 1807 the process checks whether the last connection has been reached. If it has, processing terminates. Otherwise processing goes to Step 1807A where Conn is set to the next connection and the process iterates through the loop again, going back through 1804 to 1805, etc. On the other hand, if there is a conflict in which there are two or more areas associated with a single connection, then Conn processing from Step 1805 goes to Step 1806, where the connection Conn is put in OSPF_conflicts.

Another case arises when the connection is only associated with one area, in which case the process continues to Step 1808. In Step 1808, for convenience, "Area_Ar" refers to the case where there is a single element in AreaSet.

After Step 1808, processing proceeds to Step 1809, which determines whether the area associated with connection Conn is already in the view. If it is in the View, then this connection is added under this area, which is accomplished at Step 1810. On the other hand, if the area associated with Conn is not in the view, processing goes to Step 1811 where a new group labeled "Area_Ar" is created and under which there is added a pointer to Conn. From both Steps 1811 and 1810, processing goes to Step 1812.

Steps 1812 through 1817 are responsible for putting routers pointed to by Conn under the appropriate area if they have not already been placed. Recall that a connection points to a set of port addresses, and each one of them corresponds to a router. We set variable PNTR to the first pointer in Conn, at Step 1812. We then go on to Step 1813, which determines whether a router associated with this pointer is already in the View. If the answer is affirmative, then this router is not processed and the process continues onto Step 1816, which determines whether PNTR is the last pointer in Conn. In other words, it determines whether we have finished processing the routers in Conn. If that is the case, then we go onto Step 1807 to process the next connection. If not, we go on to 1818 to process the next pointer (more particularly to the router pointed to by this next port address pointer) and go back to Step 1813.

Figure 20:
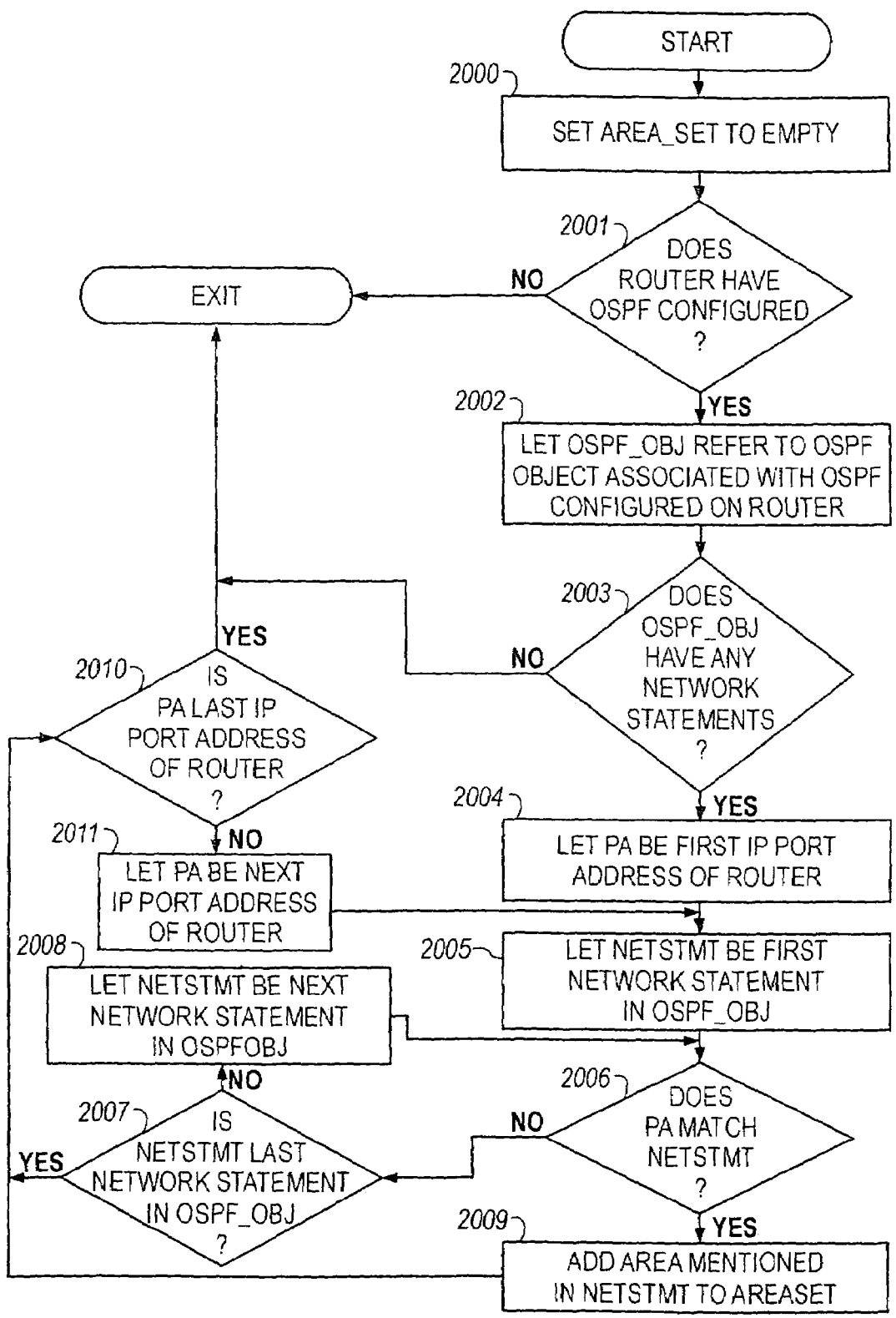
FIG. 20 is a flowchart expanding on the "How Many Areas Does Router Have" question from FIGS. 18A-B.

In Step 1813, if the router associated with PNTR has not already been processed, at Step 1814 the number of areas the router pointed to, by PNTR, is determined. FIG. 20 shows detail of how the answer to this is computed. If the answer is zero, in other words, this is a router which is not running OSPF, then move to Step 1816. If the area answer is 1, then we know that this router is running one area, Area_Ar. Thus, it is put under group Area_Ar under the Router Lists attribute. On the other hand, if the router is running in more than one area, then we know that it is a border area router, and a special group for that router is constructed. In Step 1817, a new group called "Border Area" and a pointer to the single router in this group are created. In the View of FIG. 14, router R4 is one of these border routers, and hence belongs to its own group.

Figure 19:
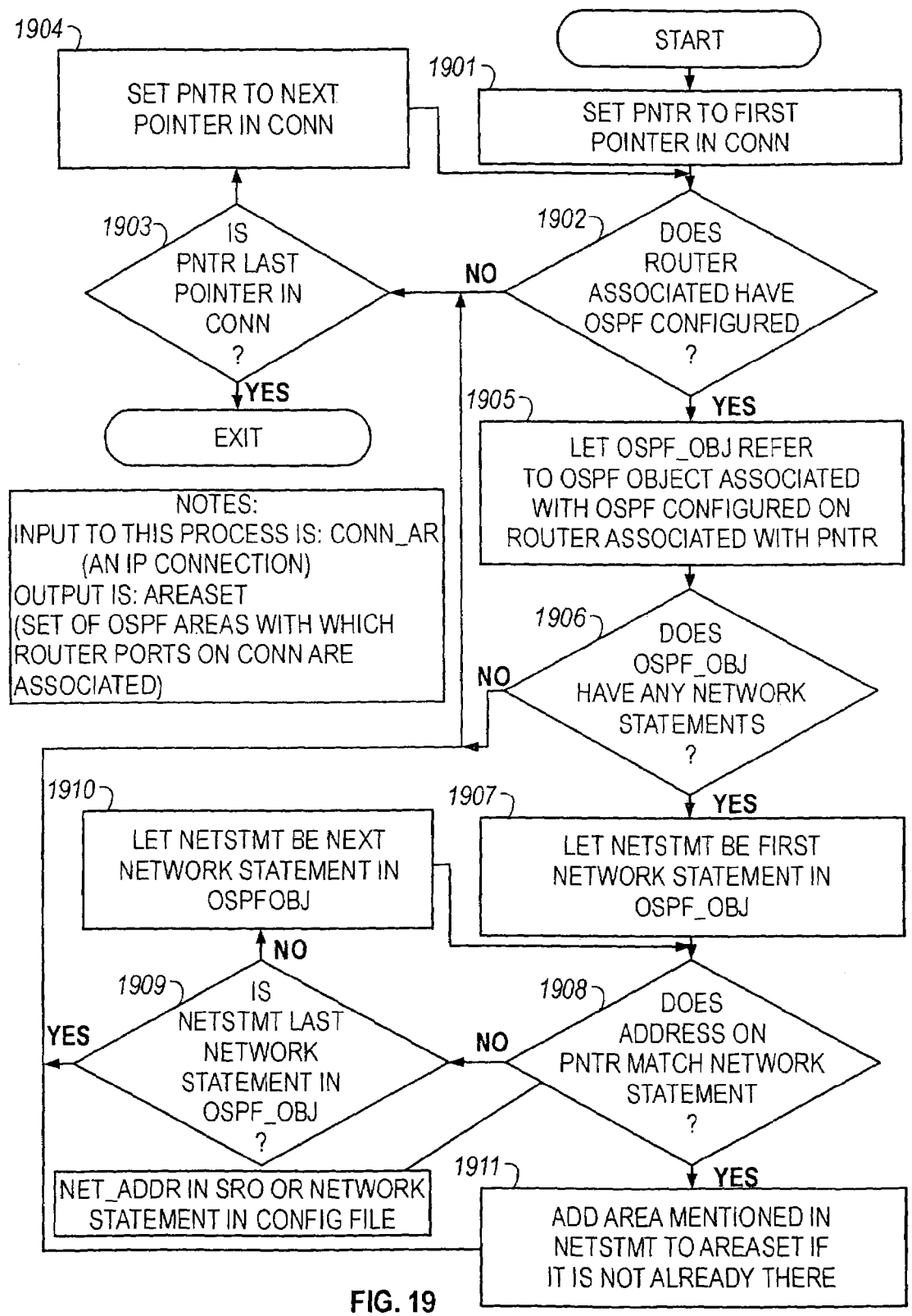
FIG. 19 is a flowchart expanding on the "AreaSet" concept introduced in FIGS. 18A-B.

FIG. 19 is a flow chart that explains details of Step 1804 in FIG. 18A. This is a procedure, which given as input a particular Connection in a IP SPT, indicates all the areas associated with the router ports which are attached to this connection. As an overview of the following discussion of FIG. 19, the process for associating areas and router ports involves iterating through the pointers contained in the input connection, or in other words, iterating over all the routers that are connected to the input connection Conn.

At Step 1901, PNTR is set to the first pointer in Conn. Step 1902 asks if a given router pointed to by PNTR has the routing process OSPF configured thereon. If the answer is "no", then the procedure does not have to process this given router. At Step 1903 a determination is made as to whether PNTR is the last pointer in Conn. If it is, then processing is finished. If not, the process moves to Step 1904, in which PNTR is set to the next pointer in Conn. The process then returns to Step 1902. On the other hand, if the given router has OSPF configured, Step 1905 is reached.

Note that for simplicity we assume that a router only has one OSPF process, if it has any. The actual implementation of the preferred embodiment, however, can handle multiple OSPF protocols on a single router, and this process described herein naturally extends to cover that situation.

At Step 1905, for convenience, we let OSPF_obj refer to the OSPF object associated with the router pointed to by PNTR. The process then proceeds on to Step 1906, which determines whether the OSPF_obj has any network statements. If the answer is "no", then the process goes back to Step 1903 and iterates through and processes the next router. If the answer is "yes", then "Netstmt" becomes the first "network statement" in OSPF_obj.

In Steps 1907 through 1911, the process goes sequentially through the list of network statements associated with the OSPF process to determine whether the address associated with PNTR matches one of those statements. If so, then the process uses the area number associated with that network statement. At Step 1907, the process makes Netstmt the first network statement. Step 1908 determines whether an address associated with PNTR matches the network statement. The details of this matching process are described earlier in this specification. If there is a match, then the process proceeds to Step 1911, which adds the area mentioned in the network statement to the output AreaSet if it is not there already. Processing then goes back to Step 1903 to process another router, if any are left. On the other hand, if at Step 1908, the address does not match the network statement, then the next OSPF network statement is processed, looking for a match, if it exists.

FIG. 20 depicts a flow chart that describes in detail Step 1814 in FIG. 18B; it determines with how many areas a particular "router" is associated. We contrast this with the process in FIG. 19, which determines with how many areas a "connection" is associated.

The first step in FIG. 20, labeled 2000, sets the output AreaSet to empty. The process next goes to Step 2001, and determines whether a router has OSPF configured. If the answer is "no", then the process is finished, and the output area set is empty. If the answer is "yes", the process proceeds to Step 2002. For convenience the variable OSPF_obj is set to refer to the OSPF object associated with the input router. The process then goes to Step 2003, which determines whether this OSPF object has any network statements. If it does not, then the process exits with the answer being that the area set is empty. If it does, the process goes to Step 2004 and iterates over the port addresses on this router. Step 2004 lets the variable PA be the first IP port address of the input router. The process then goes to Step 2005.

Step 2005 lets Netstmt be the first network statement in the OSPF object. Next, Step 2006 determines whether PA (the Port Address that is currently being processed) matches the network statement, Netstmt. This notion of matching is the same as that described at Step 1908 of FIG. 19. If there is no match, go to Step 2007 and determines whether the last network statement has been reached. If the last network statement has been reached, go to Step 2010 to process the next port address on the router.

In Step 2007, on the other hand, if the last network statement has not yet been reached, then go to Step 2008, which sets the variable Netstmt to this next network statement, and iterate through the loop to determine whether there is a match. Referring again to Step 2006, if a match is found, then the area mentioned in the Netstmt is added to the AreaSet, and the procedure goes to 2010 to process a new port address.

Figure 34:
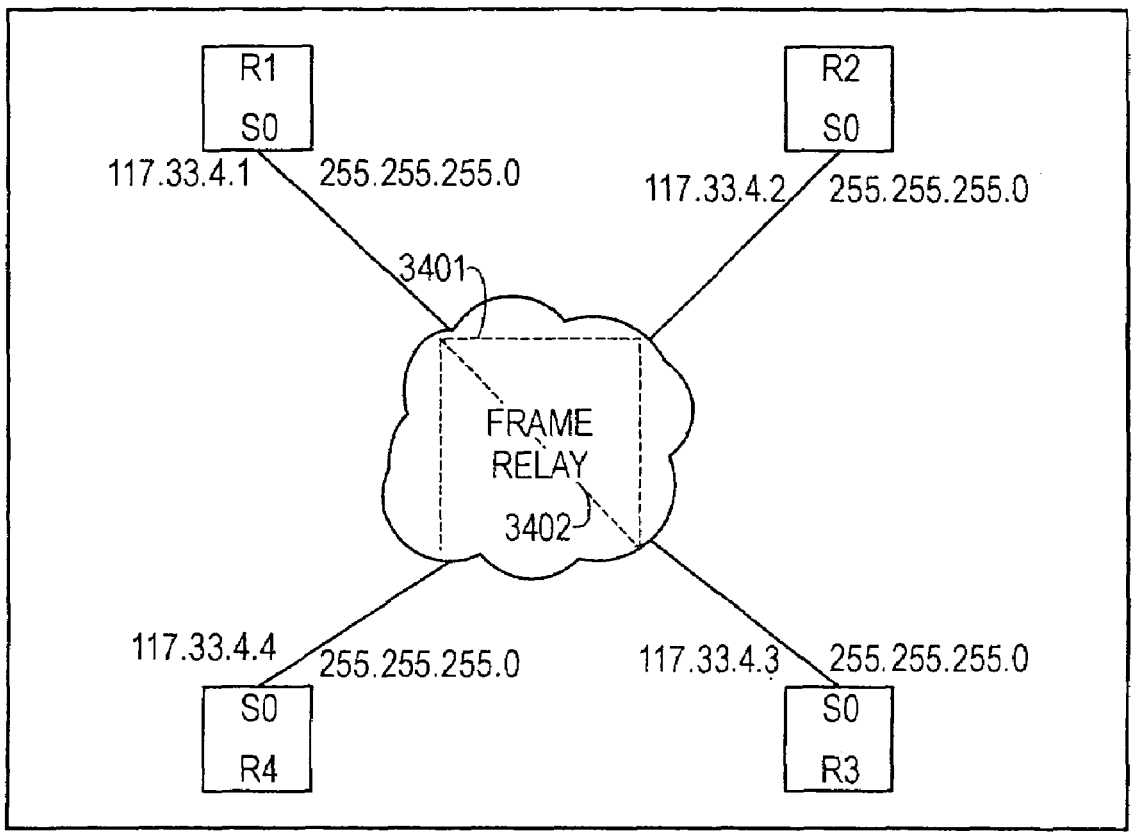
FIG. 34 is a topology drawing of a hypothetical network. It is referenced by subsequent figures in support of the illustrations related to the Multipoint WAN complication discussion.
Figure 35:
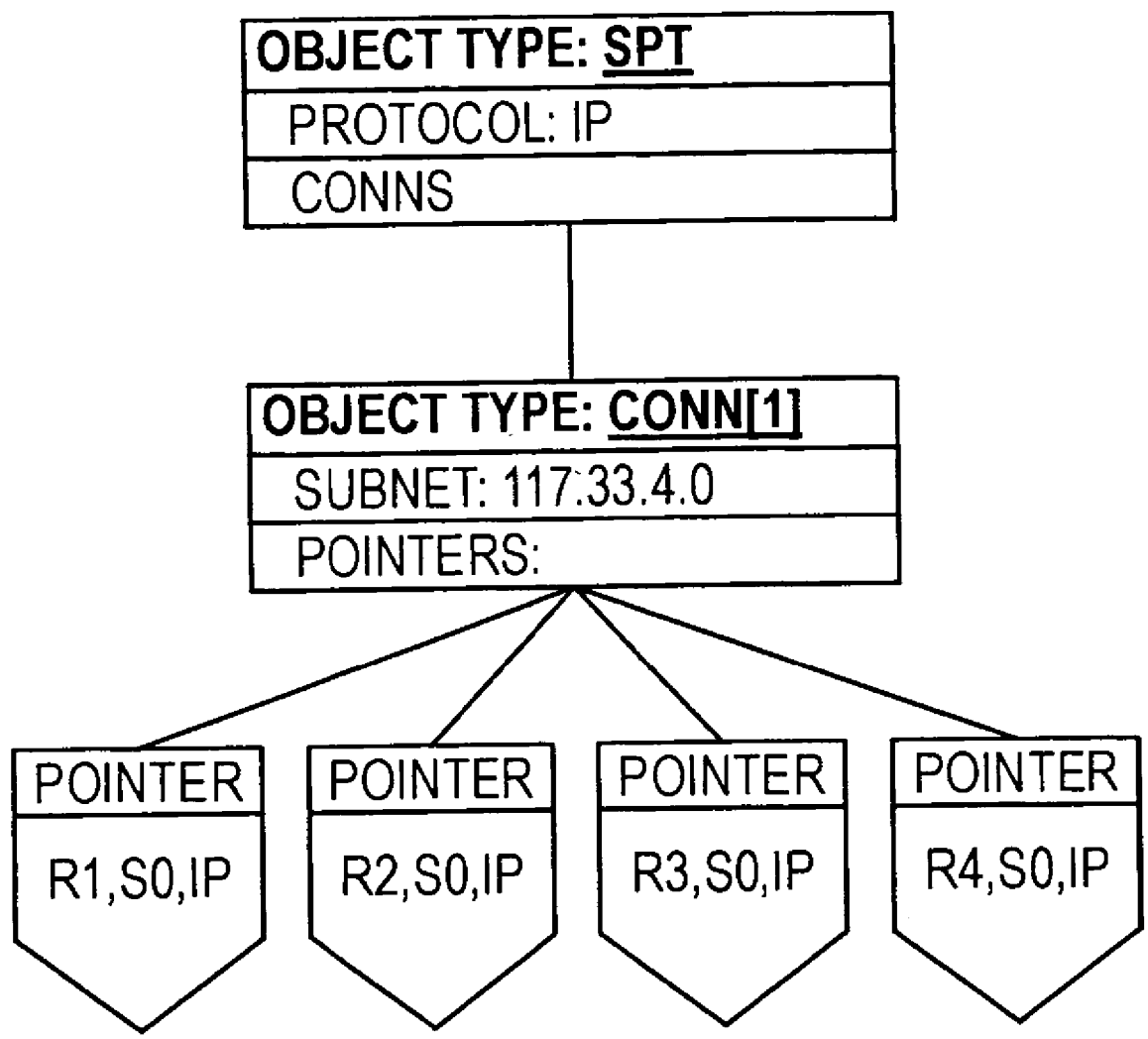
FIG. 35 shows a SPT object as would be prepared by a naïve algorithm incorrectly creating pointers for a Frame Relay WAN (FIG. 4) without the enhancements shown as FIGS. 32A-B.

The following discussion addresses some of the issues that come up with a multi-point WAN, such as Frame Relay. An intuitive description is presented first and then how the flow chart in FIG. 4 is modified to account for the complications that the multipoint WAN introduces is shown. Refer to an intuitive view of an exemplary network depicted in FIG. 34, which shows four routers R1, R2, R3, R4, that are connected through a Frame Relay cloud. Each of these routers attaches to the Frame Relay cloud through its S0 port. As far as the Level 3 view is concerned, all the routers that hook into the frame relay, such as R1 and R2, are one hop away. Another consideration to note is that all the S0 port addresses each of the four routers belong to the same subnet, 117.33.4.0. If we took the algorithm described in FIG. 4 (or even with the extensions shown in FIGS. 9A-B) and just simply applied it to the description of this network as given by its SROs, the SPT depicted in FIG. 35 would be produced. The SPT in FIG. 35 shows that R1's, R2's, R3's and R4's S0 port all are attached to subnet 117.33.4.0. The implicit assumption of these four ports in the same grouping is that they all could directly reach each other, or in network terms, that they are "fully meshed." For a LAN this is the case; all the connected ports can directly communicate.

A potential problem, however, is that in a multipoint WAN, such as Frame Relay for example, the connected routers may not be fully meshed. For example, in FIG. 34 we show that there is only a partial meshing. The dotted lines, in the Frame Relay cloud in FIG. 34, are there to convey that the pairs of routers that can directly "talk" are: R1 and R2; R1 and R3; R1 and R4; and R2 and R3. This is not a full meshing, for example, because R4 cannot directly talk to R3.

Figure 36:
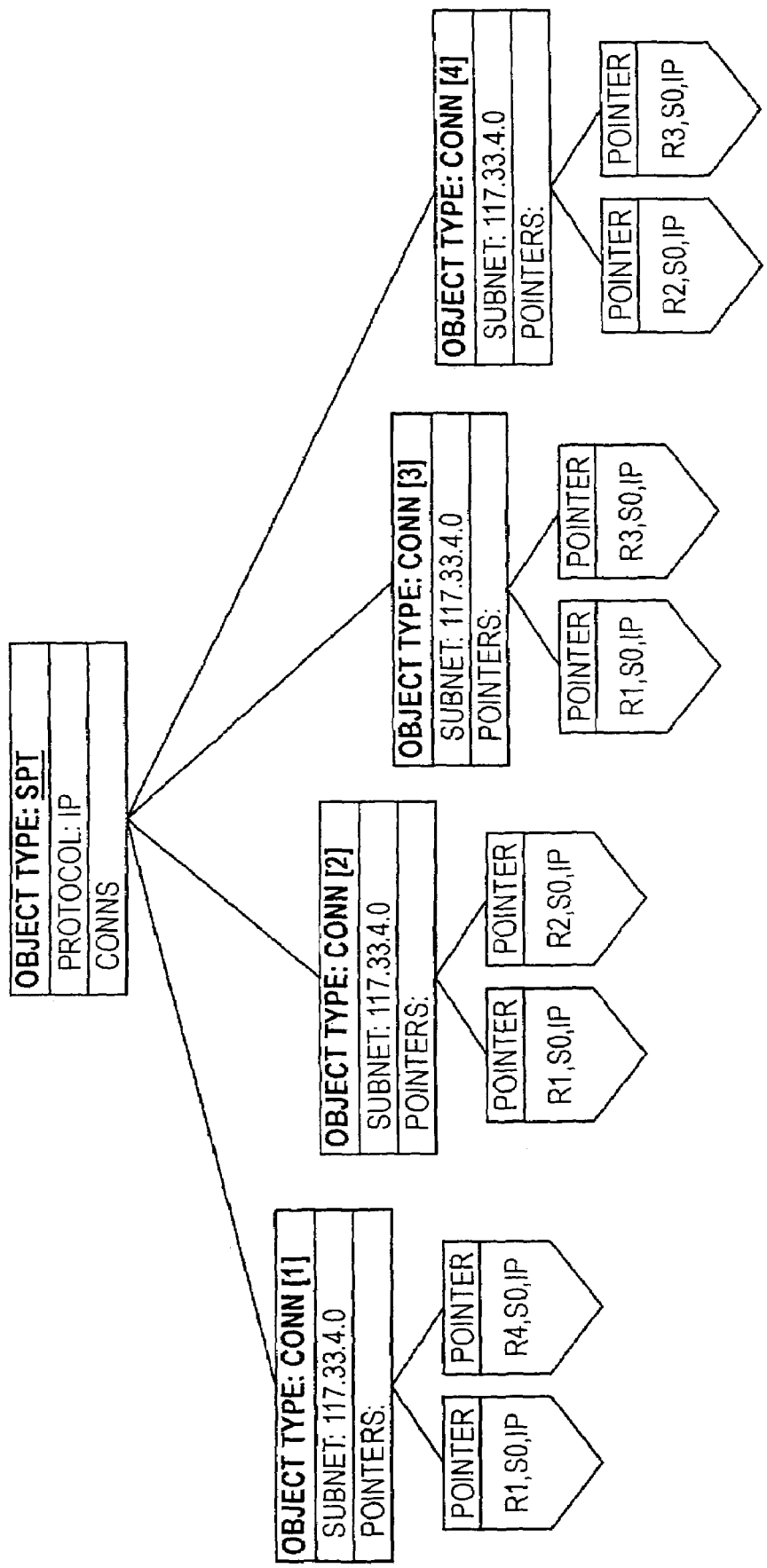
FIG. 36 shows an accurate SPT object for FIG. 4 as computed by the SPT build algorithm that takes into account Multipoint WAN complication as shown in FIGS. 33A-B.

An important aspect of capturing a Level 3 view is capturing the fact that R4 and R3 are not directly connected. If we use the SPT in FIG. 35, we are not capturing that distinction. Instead, we can use the SPT in FIG. 36 to represent this incomplete meshing. FIG. 36 shows four Connections, all with the same subnet 117.33.4.0. These four Connections show the directly connected routers in the Frame Relay Cloud.

There are a number of sources of information about meshing in a multi-point WAN such as Frame Relay. One mechanism to determine the meshing is by the inclusion in the router configuration text of explicit Frame map commands. Looking at reference numeral 3801 of FIG. 38A, there is a command, "Frame Relay Map IP", the address 117.33.4.2, and the number 100 (and the term "broadcast" which is not relevant to the disclosure). This command, which is associated with router R1's S0 port, is saying that S0 is meshed with the address 117.33.4.2, an address of R2. So, reference numeral 3801 in FIG. 38A corresponds to the dotted line marked 3401 in FIG. 34. Similarly, referring to the second line under the Frame Relay Command, in FIG. 38A, address 117.33.4.3 corresponds to the dotted line that connects R1 to R3 in FIG. 34. Referring next to FIG. 38B, at reference numeral 3803 we see the mapping from R1 to R2 in the other direction: from R2 to R1. In summary, the presence of the map commands in router configuration files is one source of information to determine the meshing in a Frame Relay cloud, for example. This information often can be obtained from text files, such as those shown in exemplary FIGS. 38A through 38D.

Figure 37:
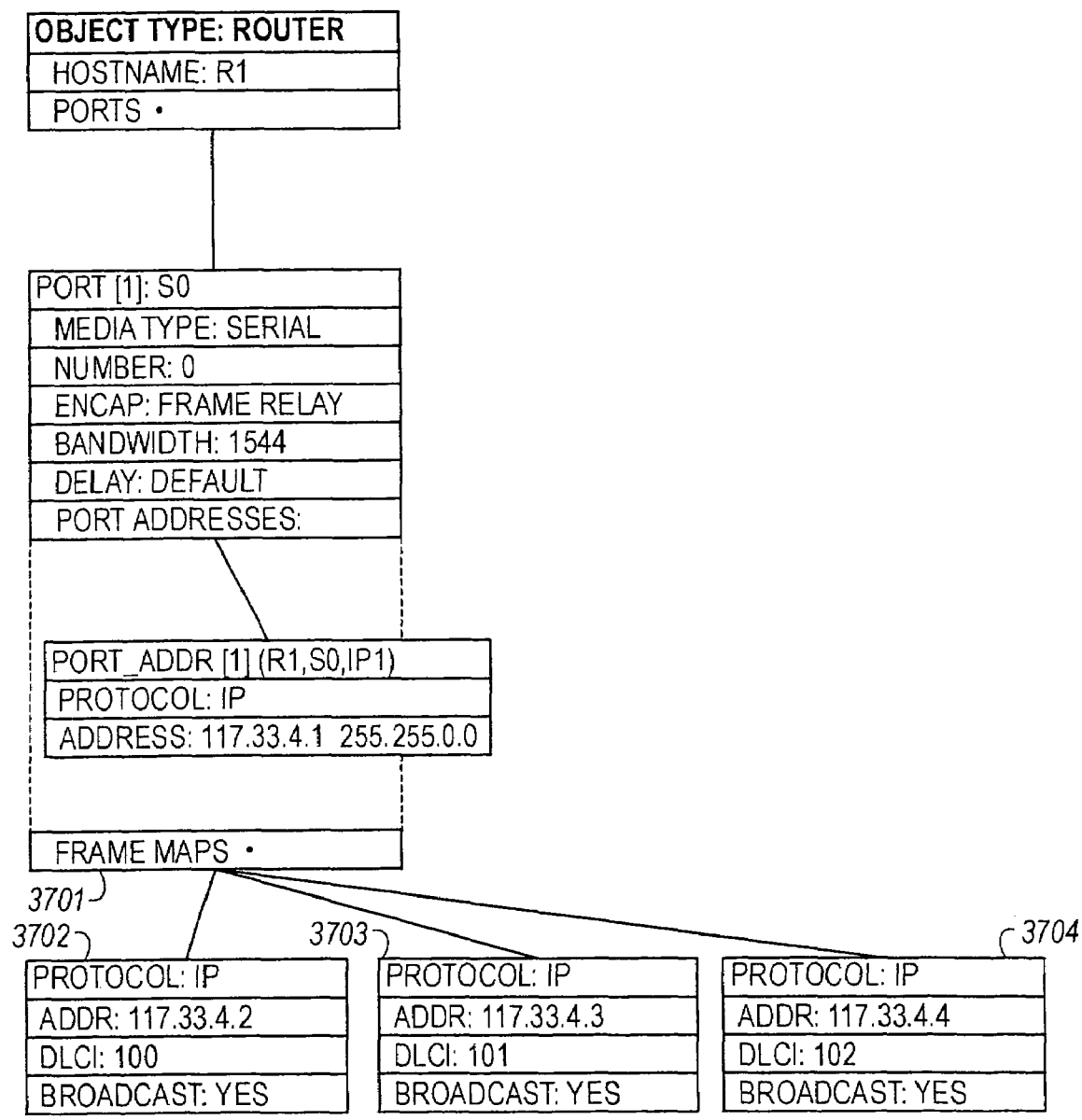
FIG. 37 shows the SRO object for router R1 in FIG. 34 focusing on the Frame Map objects.

In FIG. 37 there is shown a fragment of the SRO for router R1 that focuses on how the Frame Relay maps in FIG. 38A translate into the SRO. Referring to reference numeral 3701, note that there is an attribute for port S0, which is a list of Frame Relay map objects. In FIG. 37, each one of these items under Frame Maps labeled 3701 (which items are labeled 3702, 3703 and 3704), correspond to the three Frame Relay Map commands that are present under interface S0 in FIG. 38A. It is a straightforward translation. Another process for determining the meshing in a multi-point WAN is referring to the live router and executing a "Show Frame Map" command, parsing the response, and bringing it into the SRO.

To handle the complications due to a multi-point WAN, the SPT algorithm that we described in FIG. 4 is modified. To show how this algorithm is modified, we repeat FIG. 4, which is given in FIG. 31. We show the additional processing steps that modify it (FIGS. 32A-B) and then the modifications are applied and the resulting flowchart (FIGS. 33A-B) shown.

Figure 31:
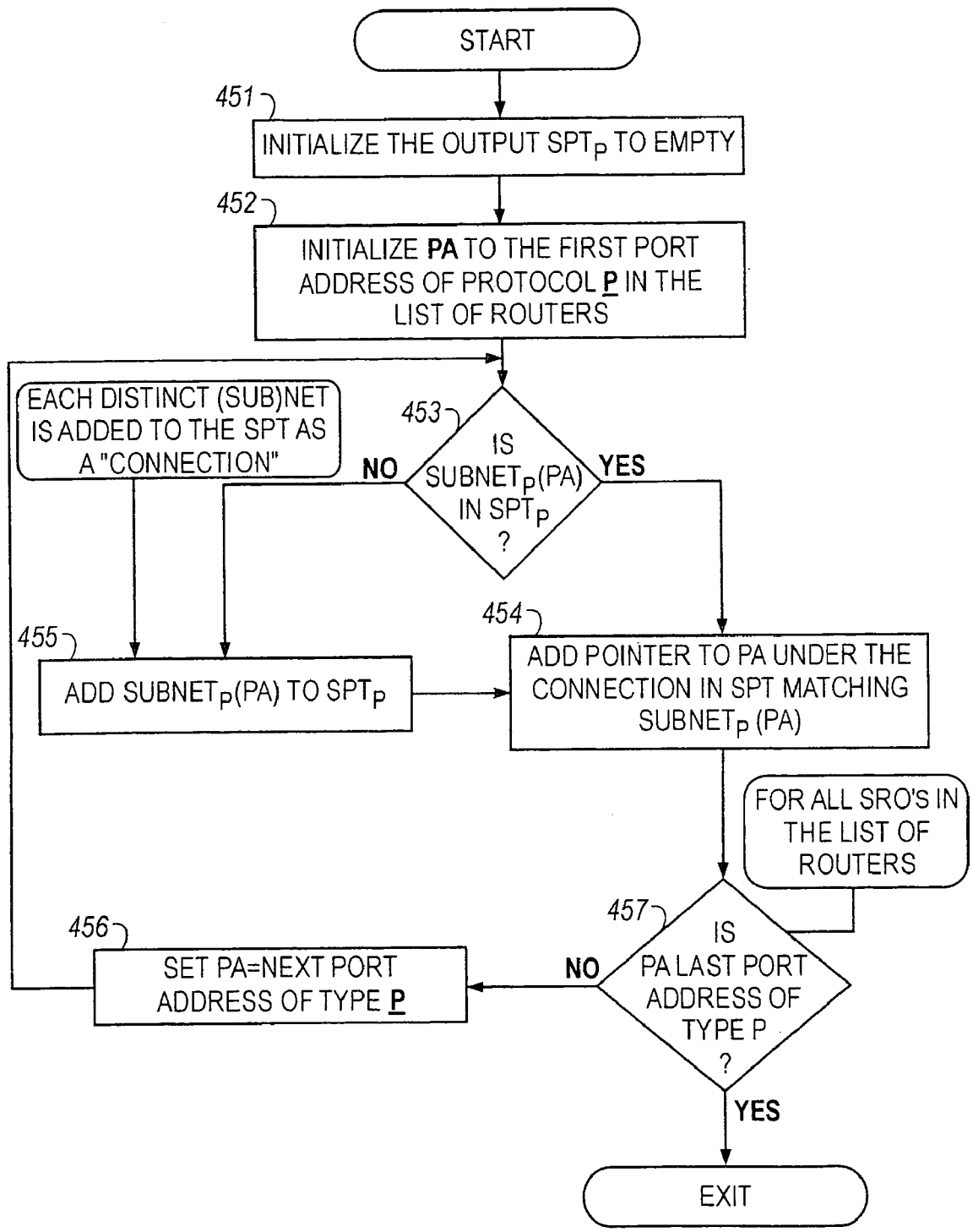
FIG. 31 is a repetition of FIG. 4 (a flowchart of the process that populates the SPT object data structure) annotated for integration with a flowchart for handling the Frame Relay WAN complication to the SPT build process.
Figure 32A:
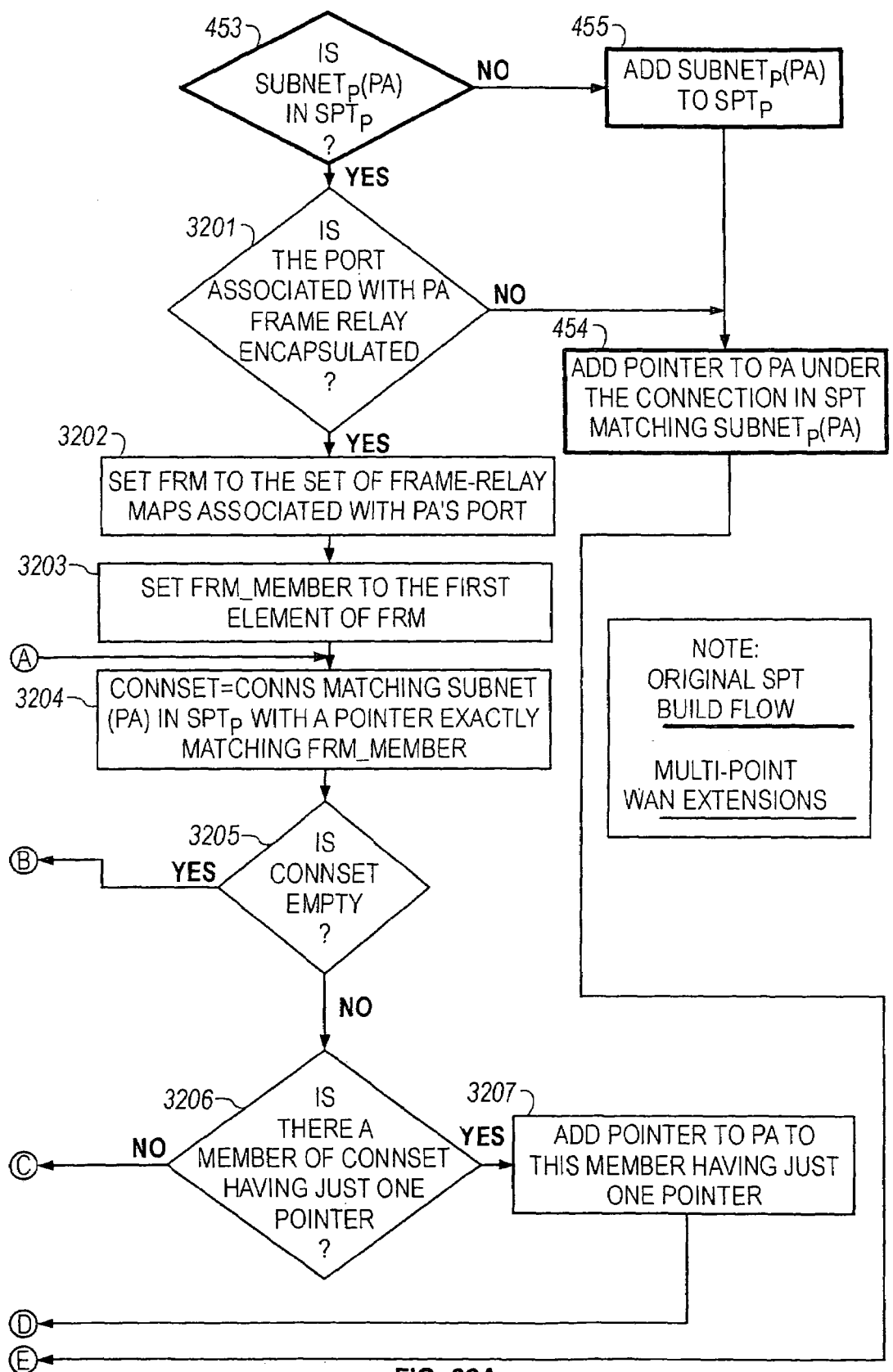
FIGS. 32A-B comprise a flowchart that shows the set of extensions to FIG. 31 required to handle the Frame Relay WAN complication to the SPT build process (FIG. 4).
Figure 32B:
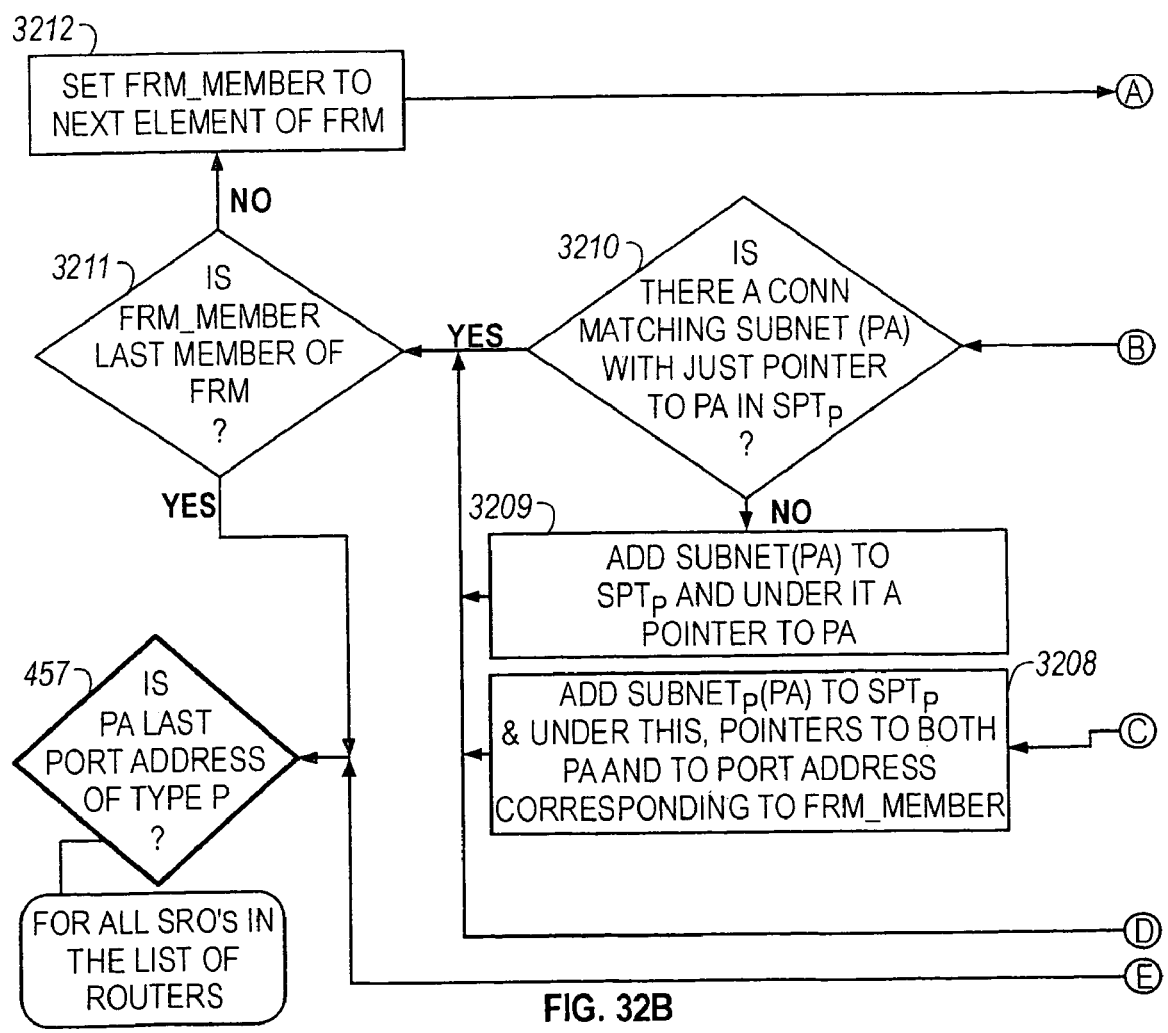

Referring to the Step labeled 453 in FIG. 32A, which is the same as Step 453 in FIG. 31, Step 453 is a test to see if the subnet for the port address being processed (PA) is in the SPT. If the case is "no" then we go to 455, which is normal processing, and reiterate the process with the next port address. On the other hand, if the Subnet (PA) is in the SPT, processing goes to Step 3201, which determines whether the port associated with the PA is Frame Relay encapsulated. This is determined by looking in the encapsulation attribute of the port associated with PA in the SRO. If this is not the case, then normal processing takes place and the procedure goes to 454 (as depicted in FIGS. 31 and 32). If "yes," go to the special Frame Relay multi-WAN processing, in other words we go to Step 3202. In Step 3202 the variable FRM is set to the set of Frame Relay maps associated with PA's port. The process iterates through this set by first setting FRM member to the first element of FRM (Step 3203). In Step 3204, for convenience the variable ConnSet is assigned to the set of connections in SPT that i) match subnet (PA) and ii) have the property that it has a pointer exactly matching the address in the variable FRM_member. Now it is possible this set could be empty. Step 3205 determines whether the Conn Set is empty. If the answer is yes, then go to Step 3210 (FIG. 32B), which determines whether there is a connection of SPT matching Subnet (PA) with just a single pointer to PA. If the answer is "no" go to Step 3209 (FIG. 32B) and add a new connection with subnet Subnet (PA) and with a single pointer to PA. Then go to Step 3211 to determine if the last frame member has been reached. If not, continue in the loop, going to Step 3212 (FIG. 32B) to set Frm_member to the next element, and continue processing. On the other hand, if the answer is "yes" at Step 3211, then processing of PA is finished. Then go to Step 457, which is in the original FIG. 31, to process the next port address. Now, on the other hand if the answer is "yes" at Step 3210, i.e., there a connection in SPT matching subnet (PA) with just pointer to PA, then go to Step 3211 and continue in the loop over Frame members.

Now referring again to Step 3205 (FIG. 32A), if ConnSet is not empty then we go to Step 3206, which determines whether there is a member of ConnSet having just one pointer. If the answer is "yes", add a pointer to PA to this member, Step 3207, and then continue to Step 3211 (FIG. 32B) to process the remaining elements of FRM. If the answer is "no" then go to Step 3208 (FIG. 32B), and create a new connection whose label is subnet (PA), and under this we add two pointers: one to PA and the other to the port address corresponding to the address in FRM_member.

To give a better feel for the flowchart obtained after grafting in the additional steps to handle multi-point WANs (FIGS. 33A-B), we'll walk through a specific example which is intuitively depicted in FIG. 34, and whose configurations appear in FIGS. 38A through 38D and having an SRO as shown in FIG. 37. FIG. 37 shows only one of the SROs (for Router R1). The SROs for Router R2 through R4 are not included because the process of going from a configuration file to a SRO representation for these routers should be evident.

Figure 33A:
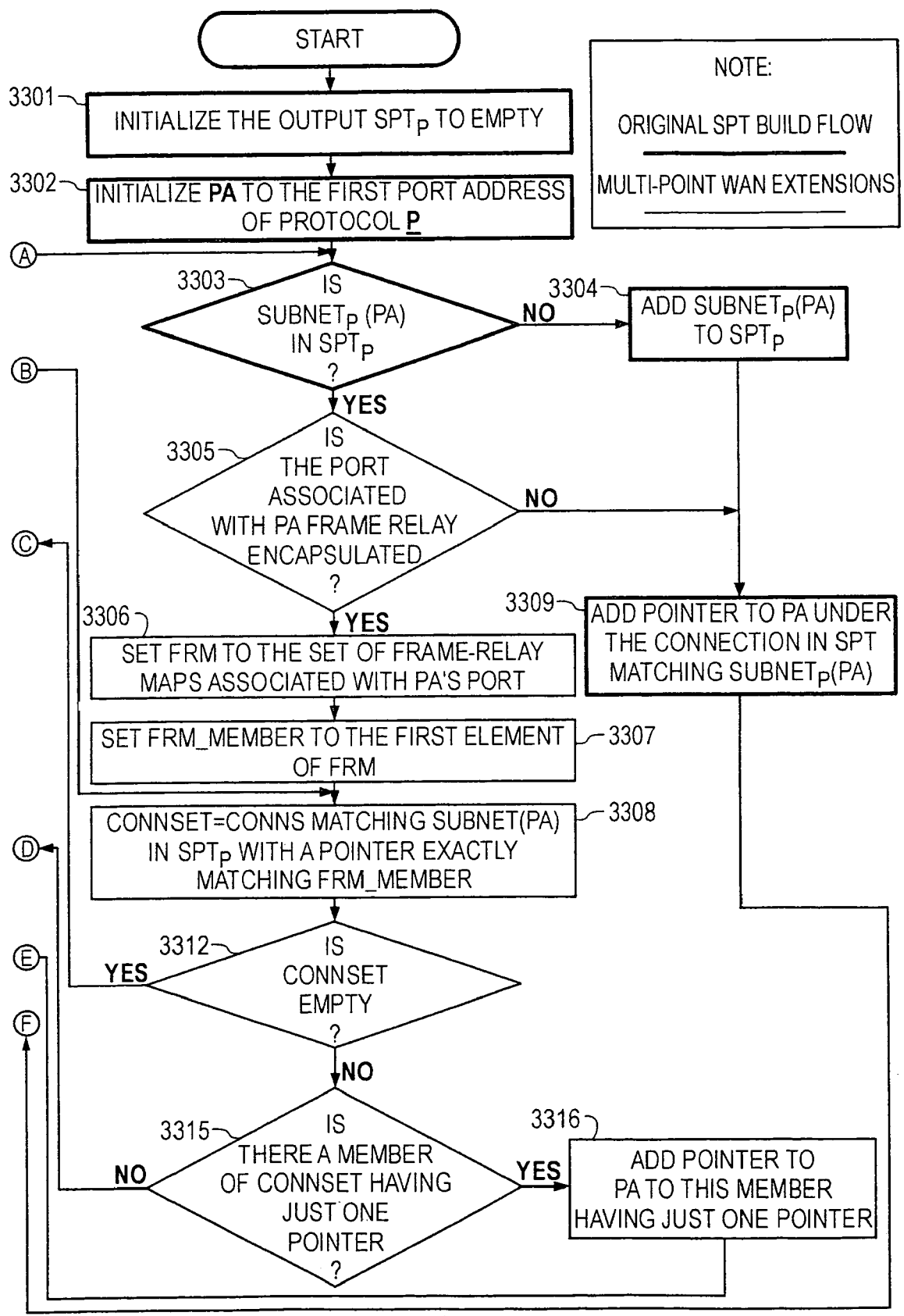
FIGS. 33A-B are the merged result of FIGS. 31 and 32A-B and show the complete set of logic applied by the invention to accurately populate the SPT despite the complications introduced when the process encounters the presence of Frame Relay multi-point WAN.
Figure 33B:
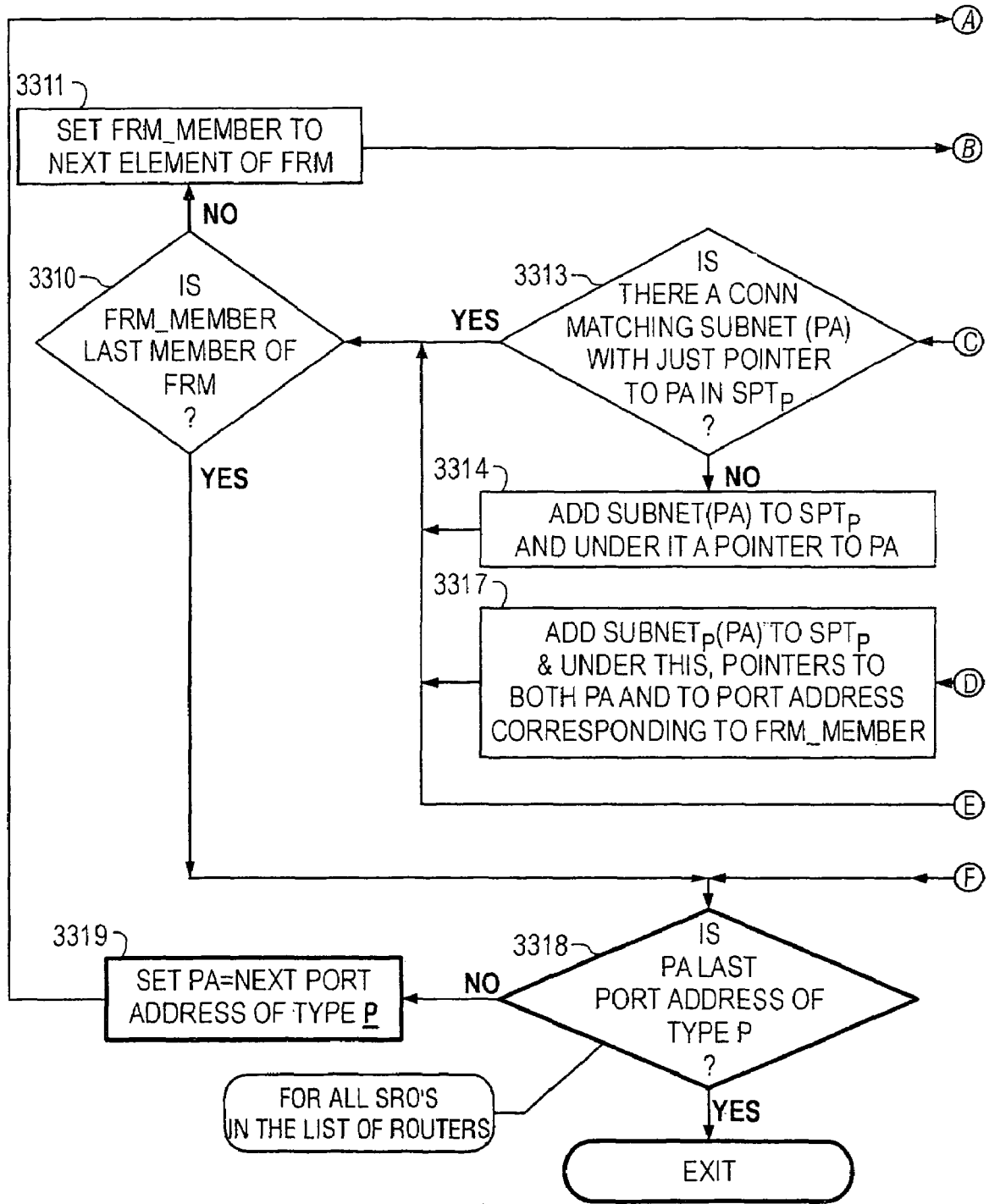
Figure 39A:
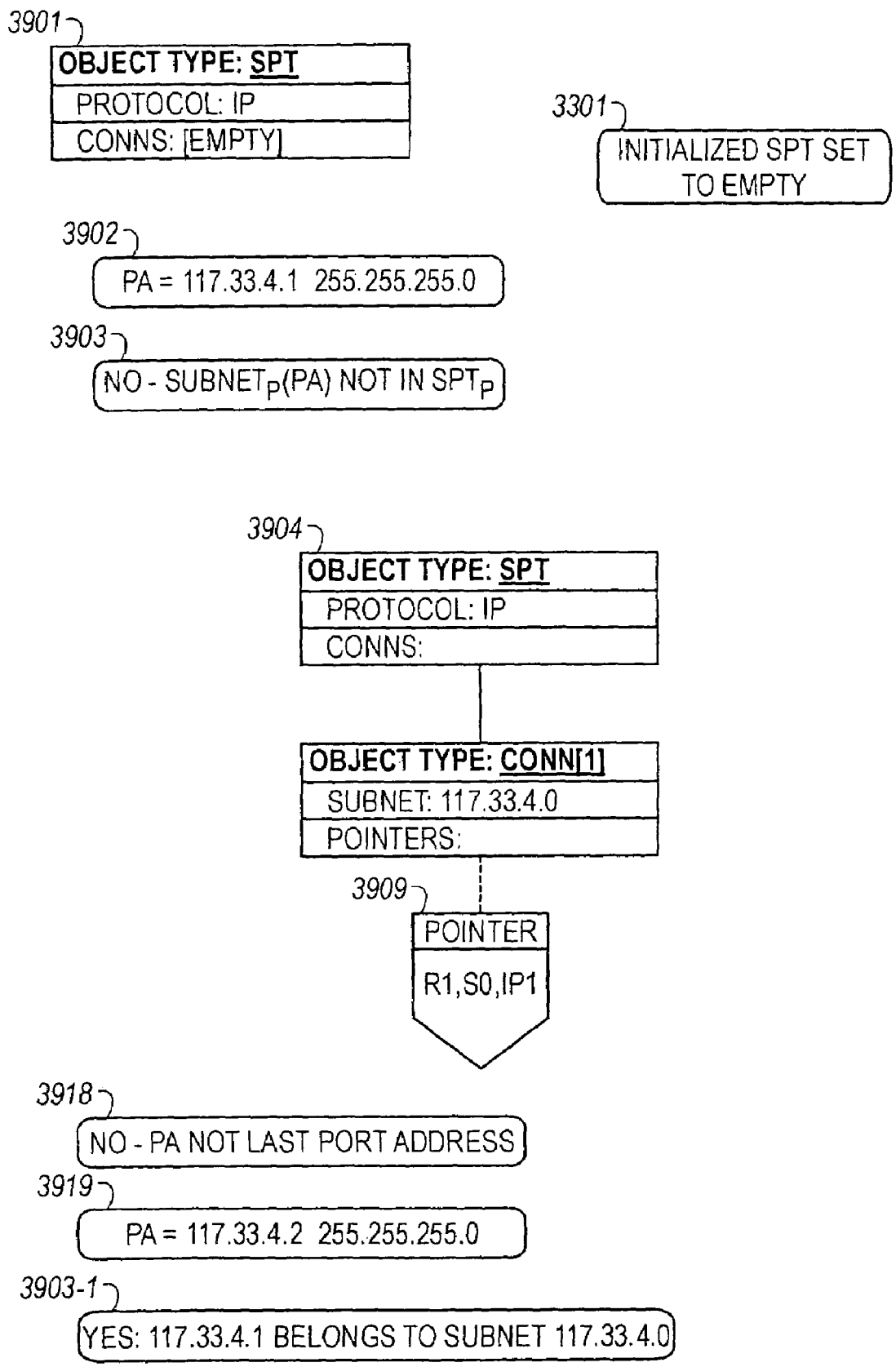

FIGS. 39A through 39F provide a detailed example used as a walkthrough of the flow chart depicted in FIGS. 33A-B. Reference numerals depicting the steps of FIGS. 33A-B for the walkthrough of FIGS. 39A-F are appended with dash numbers to distinguish iterations of steps. Starting at FIG. 39A we see reference to Step 3301 of the flowchart of FIG. 33A where the output, the SPT, is initialized as shown in 3901. This is an IP SPT, so the protocol is set to IP. In Step 3902, PA is set to the first port address, 117.33.41.1 255.255.255.0. At Step 3903 the question is whether subnet (PA), which is 117.33.4.0, is in the SPT. In this case it is not because the SPT is empty. Thus, go on to Step 3304, which adds a new Connection, whose subnet is 117.33.4.0, to the SPT, shown at 3904. Then go to Step 3309, which adds a pointer under this subnet to R1,S0,IP1 (the current port address), shown at 3909. Referring to Step 3909 in FIG. 39A, there is shown the structure formed by Step 3309. After Step 3309, go to Step 3318, which determines whether PA is the last port address. The answer here is "no", shown as 3918. Processing goes to Step 3319 where PA is set to the next port address, 117.33.4.2 255 and 255.255.0, shown as 3919. After Step 3319, go to Step 3303, which determines whether subnet (PA), (117.33.4.0) is in the SPT. The answer here is "yes", shown as 3903-1. In FIG. 39B, there is a continuation of the walkthrough continuing from Step 3303, which answered "yes" as shown as 3903. Thus the current step is Step 3305, which determines whether PA is Frame Relay encapsulated. The answer is "yes", shown as 3905. Thus go to Step 3306 and set the variable FRM to the set of Frame Relay map addresses associated with PA's port, shown as 3906. In this case there are two of them, 117.33.4.1 and 117.33.4.3. Then go to Step 3307 and set FRM_member to the first address, 117.33.4.1, shown as 3907. Then go to Step 3308 and set the variable ConnSet to the connections in the SPT matching subnet 117.33.4.0 with a pointer exactly matching the Frame member, shown as 3908. In this case, ConnSet contains Conn[1] because this has the subnet 117.33.4.0 and also has a pointer to R1,S0,IP1 whose address is 117.33.4.1.

Next, go to Step 3312, which determines whether the Conn_Set is empty. Here it has one element and so the answer is no, shown as 3912. Step 3315 determines whether there is a member of ConnSet having just one pointer. The answer here is "yes" because Conn[1] only has one pointer, shown as 3915. Thus go to Step 3316 and add a pointer to PA under this connection forming the structure shown at 3916 in FIG. 39B. Then go from Step 3316 to Step 3310, which determines whether the process has reached the last member of FRM. In this case "no" because there is one more element to process. So, the answer at 3910 is "no."

Refer now to FIG. 39C. Since the answer to 3310 was "no", the current step is Step 3311, and FRM_member is set to the next element of FRM, 117.33.4.3, shown as 3911. Then go to Step 3308 and set ConnSet to the connections matching 117.33.4.0 and also with the pointer exactly matching frame member that is 117.33.4.3. In this case there are no connections meeting the second criteria, shown as 3908-1. So Step 3313 determines whether there is a connection matching subnet (PA) with a pointer to PA in SPT. The answer here is "no", shown as 3913. Go to Step 3314 and add a new connection with subnet 117.33.4.0 to SPT under it, a pointer to PA. The resulting structural addition to the SPT is shown in the diagram at reference numeral 3914 in FIG. 39C. Then go to Step 3310, which determines if the last member of the frame set has been processed. The answer here is "yes", shown as 3910-1 and thus we go onto Step 3318, which determines whether the last port address has been reached. The answer here is "no", shown as 3918-1, because there are more port addresses to process. Go to Step 3319-1, which sets the next port address to 117.33.4.3 and 255.255.0.0, shown as 3919.

Figure 39D:
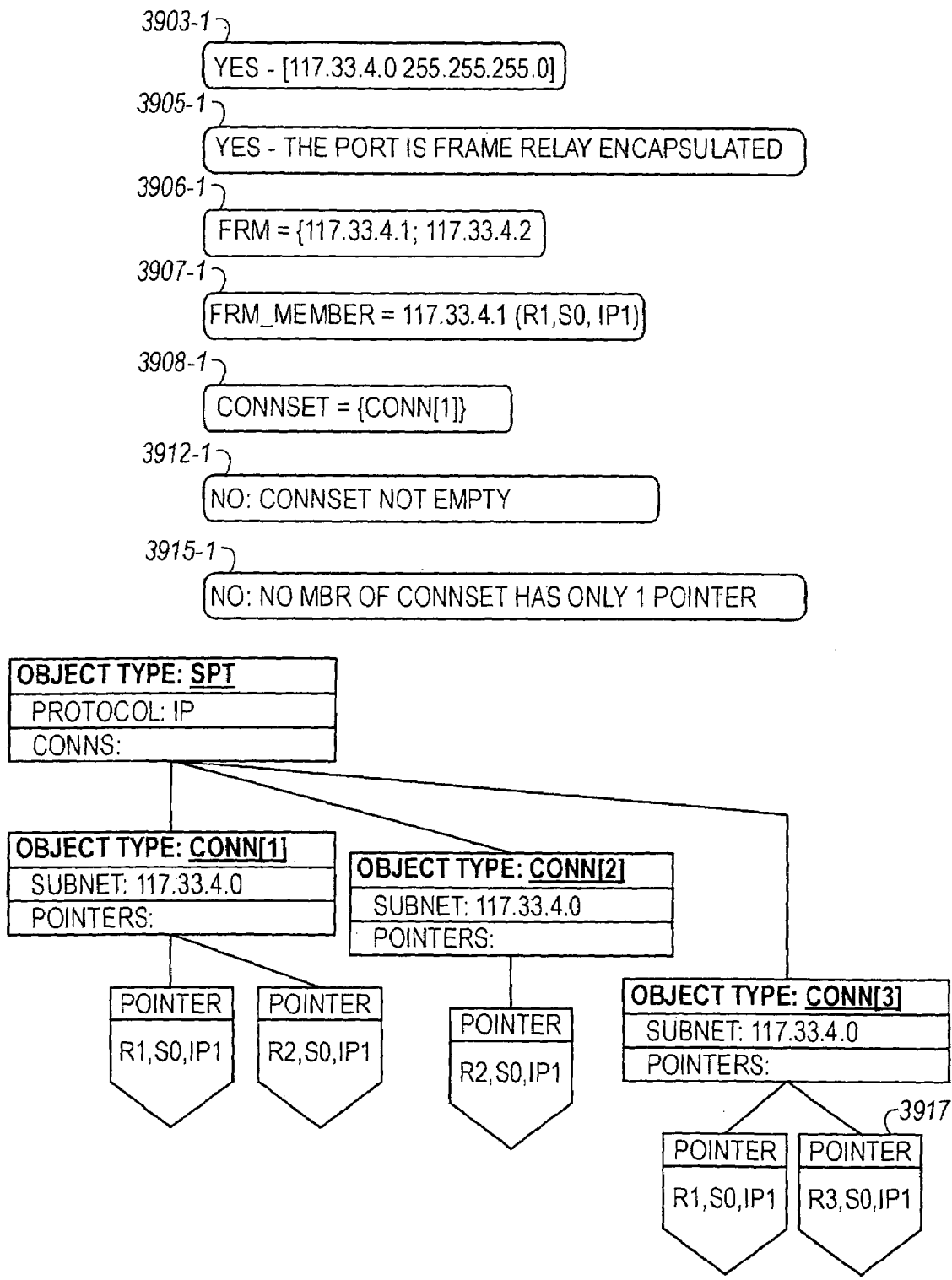

Move now to FIG. 39D, which is a continuation of the walkthrough example. After setting the new port address in Step 3319 as shown as 3919-1, go to Step 3303, which determines whether the subnet is associated with the new port address (which in this case is 117.33.4.0) in the SPT. The answer here is "yes", shown as 3903-1. Thus, go to Step 3305, which determines whether this Frame Relay encapsulated. The answer is "yes," shown as 3905-1, and thus processing goes to Step 3306, which sets the variable FRM to the set of frame maps associated with this PA port. In this case, PA refers to Router R3's S0 port, which has two Frame Relay addresses, 117.33.4.1 and 117.33.4.2, shown as 3906-1. Go to Step 3307 and set FRM_member to the first element of the frame set, 117.33.4.1, shown as 3907-1. Next in Step 3308, compute the ConnSet by looking for connections that match subnet (PA), 117.33.4.0, and ones that also have a pointer exactly matching the frame member. In this case one element is found, Conn[1], because its first pointer R1,S0,IP1 has the address 117.33.4.1. So the ConnSet has a single element, shown at 3908-1. Go to Step 3312 and ask whether ConnSet is empty. The answer here is "no", shown as 3912-1. Go to Step 3315, which determines whether there is a member of ConnSet having just one pointer. The answer here is no", shown at 3915-1, because Conn[1] has two pointers under it. Go onto Step 3317 and add a new connection with subnet 117.33.4.0, and under it add a pointer to both PA which is R3,S0,IP1 and to the port address corresponding to the FRM_member, which is R1,S0,IP1. Looking in FIG. 39D, reference numeral 3917 indicates structure add to the SPT upon completing Step 3317.

Figure 39E:
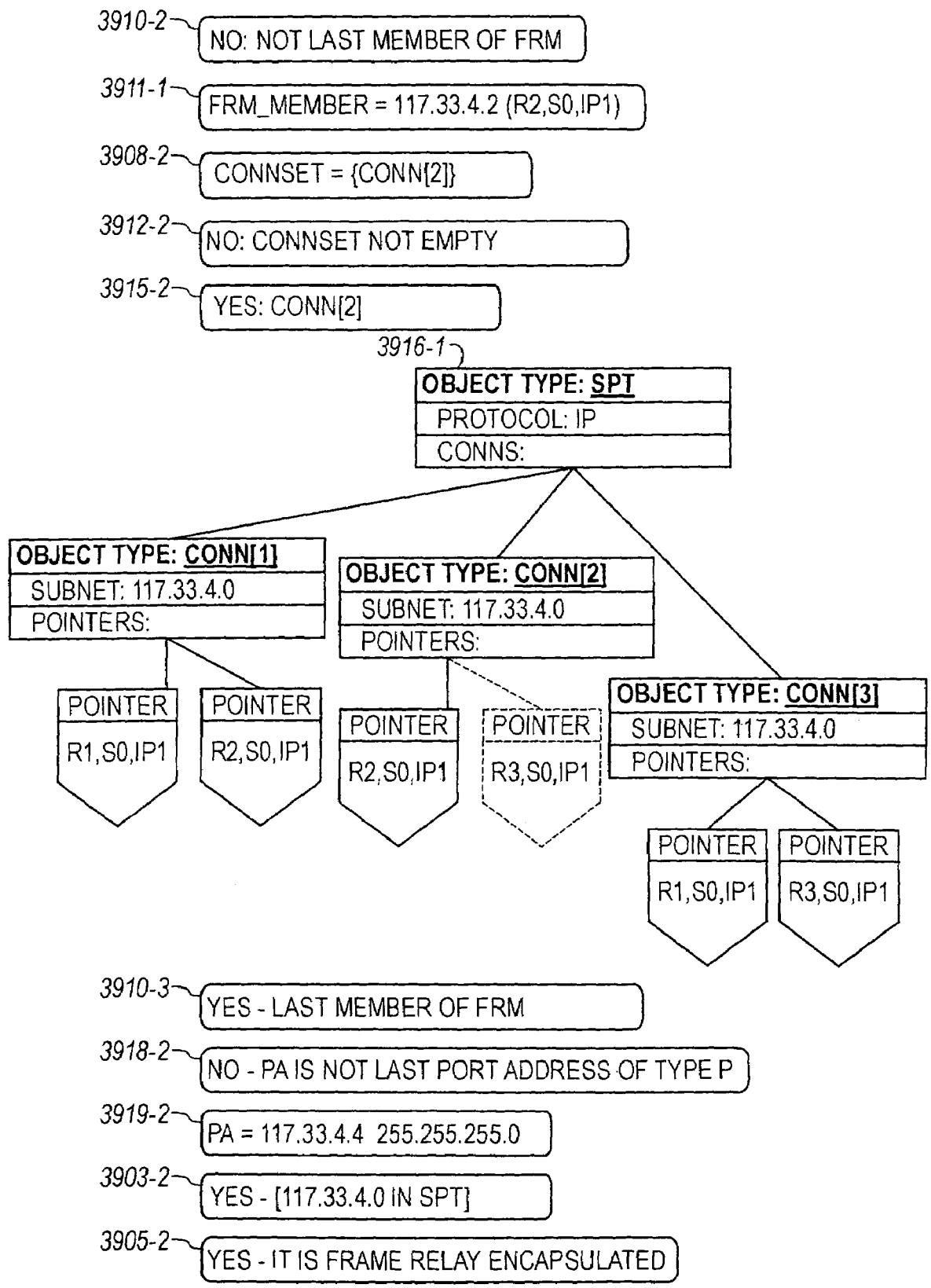

Refer now to FIG. 39E, which is a continuation of the walkthrough. Step 3310 determines whether the last member in FRM has been processed. The answer here is "no", shown at 3910-2, because there is one member left to process, and thus processing goes to Step 3311, where FRM_member is set to this next element, 117.33.4.2, to the first IP address on R2,S0, shown at 3911-1. Next at Step 3308, Connections matching 117.33.4.0 with a pointer at exactly matching the FRM_member 117.33.4.2. In this case the ConnSet will have one element which is Conn[2], shown at 3908-2. Thus, the answer at Step 3312 is "no", shown at 3912-2, and processing goes to Step 3315 which answers "yes", shown at 3915-2, since ConnSet has a single member. Consequently, processing goes to Step 3316, which adds a pointer to PA under this member Conn[2] leading to the structure in FIG. 39E adjacent to reference numeral 3916-1. After Step 3316, processing goes to Step 3310, which asks if the last FRM_member in FPM has been processed. The answer here is "yes", shown at 3910-3. Hence go to Step 3318, which asks if the last port address has been processed. The answer here is "no", shown at 3918-2. There is still one more port address to process. Step 3319 sets variable PA to the next port address, which is 117.33.4.4 and 255.255.0, shown at 3919-2. Next, at Step 3303, the answer is "yes", shown at 3903-2, since subnet (PA) which equals 117.33.4.0, is in the SPT. We then go to Step 3305, which answers "yes" since PA is frame relay encapsulated, shown at 3905-2.

Figure 39F:
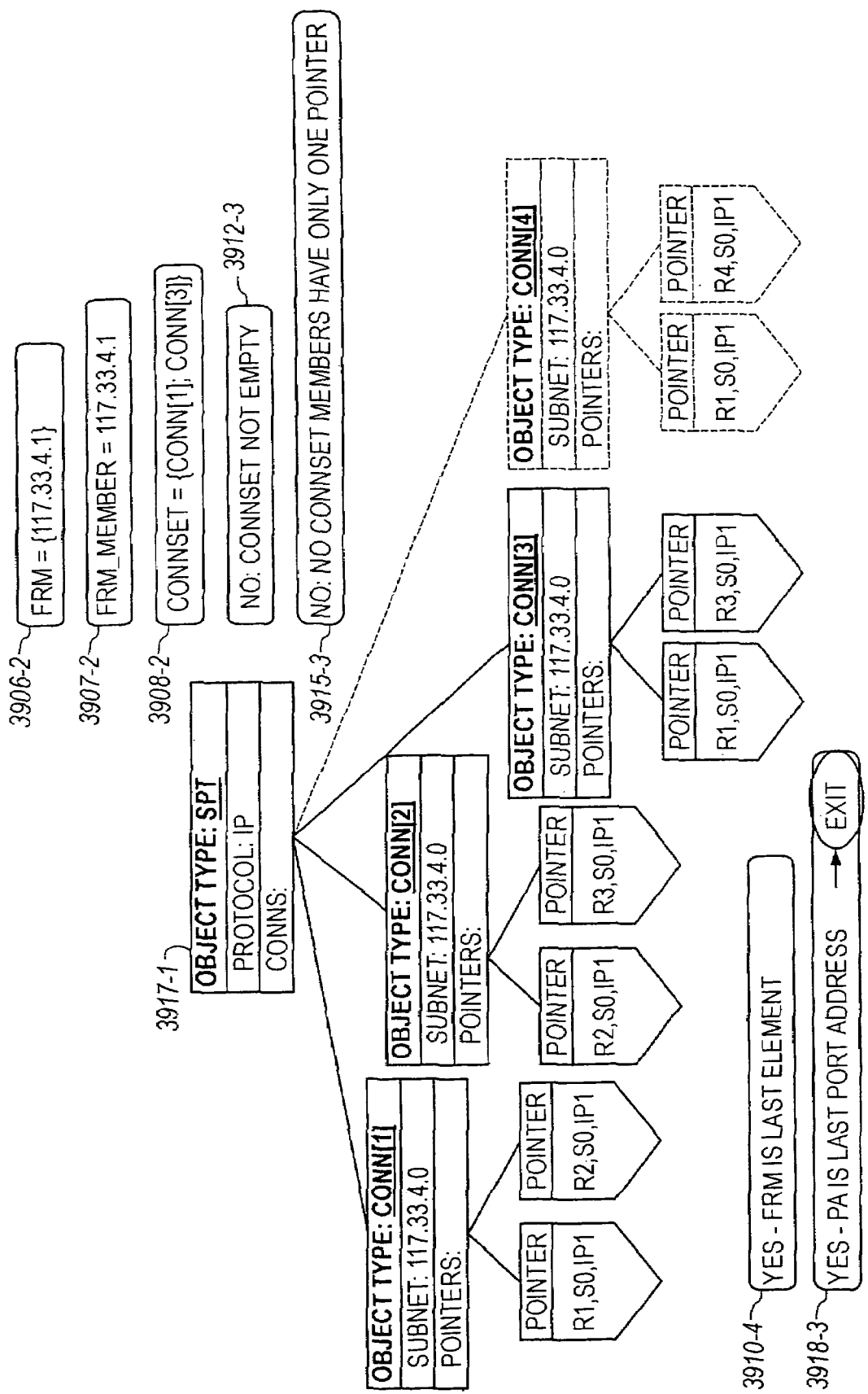

The walkthrough example now continues with FIG. 39F. Step 3306 sets FRM equal to the Frame relay maps. In this case it is a set having one element, 117.33.4.1, shown at 3906-2. Go to Step 3307 where the FRM_member is set to the first element, which is the only element, 117.33.4.1, shown at 3907-2. In Step 3308, look for the connections matching subnet 117.33 4.0 with a pointer exactly matching FRM_member. In this case two matching elements are found. Conn[1] and Conn[3], shown at 3908-2. Step 3312 determines whether the set is empty. The answer here is "no" because it has two elements, shown at 3912-3. Go to Step 3315, which determines whether there is a member of ConnSet having just one pointer. The answer here is "no", shown at 3915-3. The two elements both have two pointers. Go to Step 3317, which adds a new connection with subnet 117.33.4.0 and a pointer to PA, which is R4,S0,IP1, and also to the port address corresponding to FRM_member, which is R1,S0,IP1 resulting in the SPT structure shown adjacent to reference numeral 3917-1 in FIG. 39F. Go to Step 3310, which asks if the last member of FRM has been reached. The answer here is "yes", shown as 3910-4. Go to Step 3318, which then leads to termination of the procedure since the last port address has been processed, shown at 3918-3.

Next, the construction of the MPT, which stands for the Multiple Protocol Topology is described. Referring to FIG. 1B, the MPT is constructed in Step 104. The MPT is constructed from the set of SPTs. The MPT is a data source that captures the interrelationships between the different Level 3 topologies, each of which is encoded as an SPT. A single router's physical port can have multiple Level 3 addresses configured on it with different protocols. When there are multiple addresses from different protocols assigned to a router's ports in the network, there is potential for logical topologies with incompatible addresses. As used herein, "incompatible addresses" means two Level 3 protocols, such as IP and IPX, have assignments to port addresses that are inconsistent.

Figure 23:
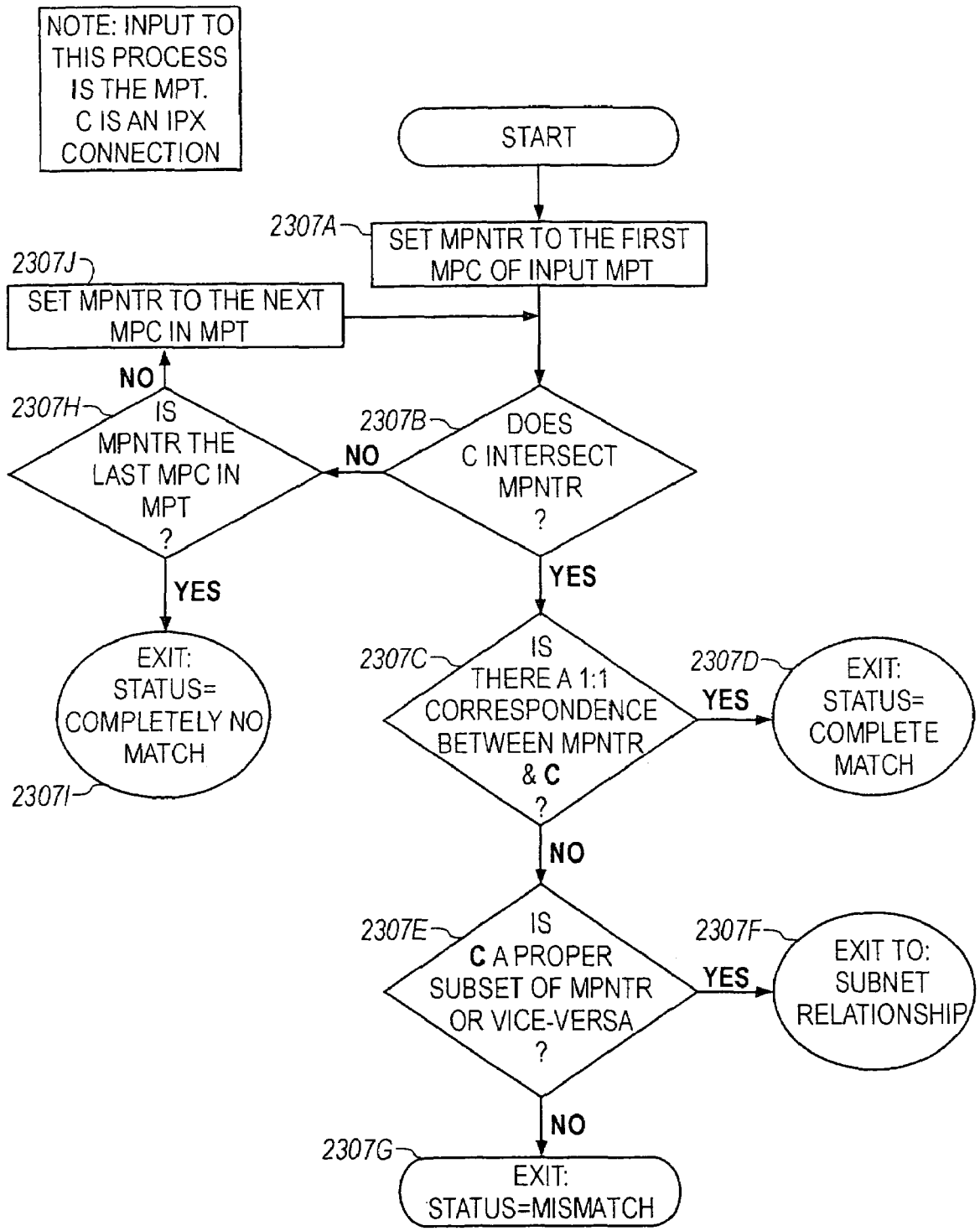
FIG. 23 is a flowchart expanding on the process of Step 2207 in FIG. 22, matching connections with Multiprotocol Connection (MpC) objects.

An example of a network with incompatible addresses is shown in FIG. 26, which shows a network with mismatched IP and IPX addresses and two IP and IPX connections that would be flagged as being a Mismatch by the process shown in FIG. 23. The reason that these two connections are in conflict is because they overlap by virtue of having the pointer labeled 2601 (in FIG. 26) refer to the same port as the pointer labeled 2604 and also having pointers 2602 and 2605 match. On the other hand, pointer 2603 does not match pointer 2606 and thus IP and IPX connections are in conflict. Looking at the network in FIG. 26, we see that this conflict is important to identify because it is caused by mis-addressing Router R1's T1 port with an IP address belonging to subnet 10.10.10.0. The problem could be corrected by instead putting this address on R1's T0 port.

In the process of building a MPT from a set of SPTs, (one for each Level 3 protocol running on the network), certain existing conflicts between the SPTs can be identified through certain integrity checks. Although networks may be able to run when their logical topologies have incompatible addresses (it is a common practice) and because it is common practice to have logical topologies with incompatible addresses, finding the conflicts between logical topologies can be an extremely valuable diagnostic aid that can identify addressing errors. As mentioned earlier, it can be important to identify addressing errors because they can have substantial impact on network operations. An important benefit of computing how logical topologies relate is that information regarding one logical topology can be used to fill in missing information about another logical topology once they are synchronized. An example of how information that would be missed by just looking at the IP topology alone, because of a Cisco configuration command called IP-unnumbered, could be filled in by using logical topologies from the other protocols such as IPX and AppleTalk is described below. The production of the MPT is a unique aspect of the invention. The MPT serves to coordinate topologies from different protocols.

Figure 21:
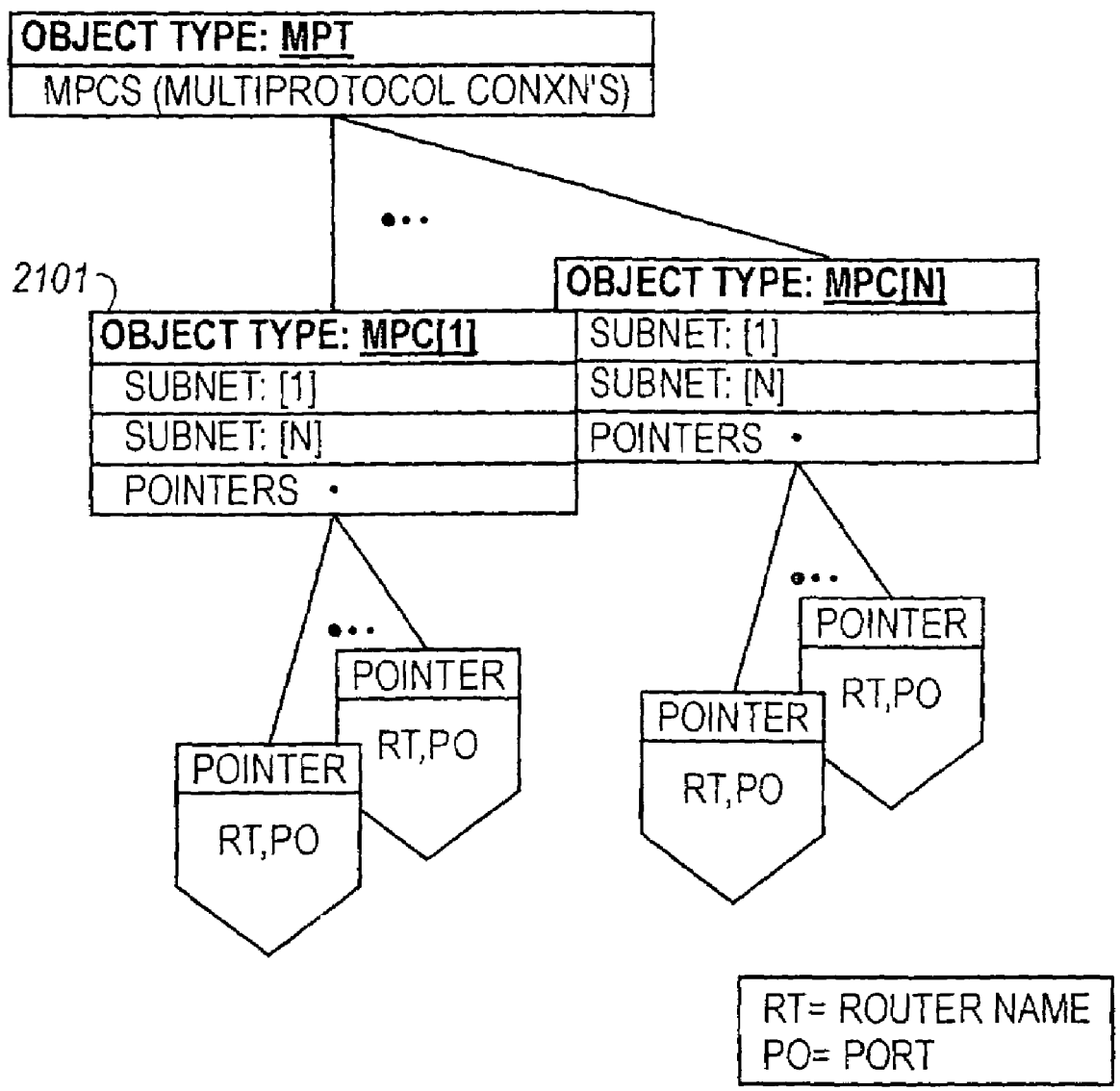
FIG. 21 shows the object data structure of the Multiple Protocol Topology (MPT) object, a principle data structure of the invention that is populated during execution of the process shown in FIG. 1B.

FIG. 21 provides an illustration of a MPT data structure, in attribute form. A MPT structurally looks very similar to an SPT. A MPT consists of a list of objects that are called Multiple Protocol Connections. In FIG. 21, reference numeral 2101 indicates a first multiple protocol connection labeled MpC[1]. This object contains a list of subnets to which it refers. Each subnet is from a different protocol. Note also that for IPX, for example, a network number would be included in the list. Thus, MpC[1] could have an IP subnet and an IPX network number. A multiple protocol connection object also contains a list of pointers, not to the port address on a router, but to the port itself. Therefore, a pointer for an MpC is identified simply by a router and a port. It does not have the additional attribute that a SPT has which identifies a particular address within a port. So one could think of a MPT as tying together router ports and grouping them together in the different protocol subnets that correspond to each other.

Figure 22:
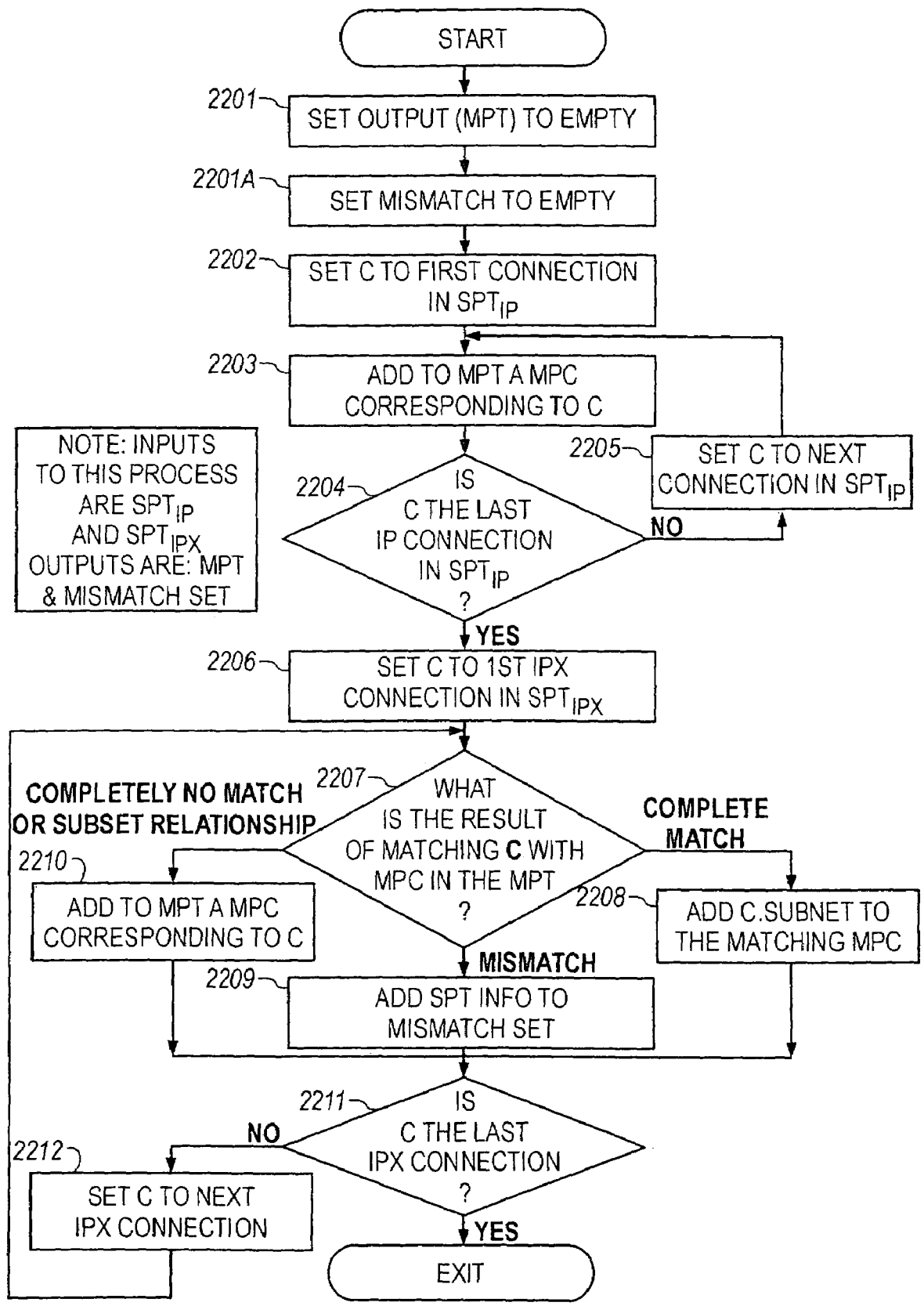
FIG. 22 is a flowchart of the process that populates the MPT object data structure taking a set of SPTs (for the different protocols) as input.

FIG. 22 is a flowchart that computes a process which produces a MPT from a set of SPTs denoting the different logical topologies. In addition, during formation of the MPT the process will also find mismatches between the topologies, which are put in a mismatch set, which is another output for this process. Identifying such mismatches is a particular integrity check in accordance with the invention.

Note that although FIG. 22 only handles processing of IP and IPX, the process is easily generalized to handle other protocols. For example, the same basic process can be used to process IP, IPX and AppleTalk.

In Steps 2201 and 2201A, the two outputs of the process, the MPT and Mismatch set are initialized to empty. The first part of the process, which is denoted by Steps 2202 through 2205, handles the IP part, and then the rest of the process handles the IPX part. For the IP part, a relatively simple process is used which essentially just copies the IP structure into the MPT. Step 2202 sets "C" to the first connection in the IP SPT. Step 2203 adds into MPT an MpC corresponding to this connection. Step 2204 determines whether "C" is the last IP connection in $SPT_{IP}$. If "C" is the last IP connection, then go to Step 2206. If "C" is not the last IP Connection, go to Step 2205 and set "C" to the next IP connection and repeat the process. When Step 2206 is reached the IP SPT has been "copied" into the MPT.

Next, the process represented by Steps 2206 through 2212 integrates the IPX SPT into the MPT, and also look for conflicts. In these Steps, variable "C" is used to iterate over the IPX connections. Step 2206 sets "C" to the first IPX Connection in the IPX SPT. Step 2207 determines whether the result of matching Connection C with the MpCs in the MPT (which at this point in the process merely reflects the IP SPT structure.)

The result of the match process is one of four states. One state is a complete match, another one is a mismatch, connoting a problem, another state is no match at all, and a last state is a subset relationship. If there is a mismatch, go to Step 2209 and add to the mismatch set the conflict between "C" and the conflicting member in MPT. Go to Step 2211 to determine if "C" is the last IPX connection. If it is, the process terminates. If not, set "C" to the next IPX connection and go back to Step 2207. If there is a complete match in Step 2207 then there is an IP connection and an IPX connection that correspond to the exact same router ports. In that case, go to Step 2208, which adds a new IPX subnet to the matching MpC. Then go to Step 2211, etc., iterating through the loop. On the other hand, if there is no match or if there is a subset relationship in Step 2207, then go to Step 2210 where a new MpC is created by "copying over" the IPX connection "C". Next go to Step 2211. If C is the last IPX Connection, then the process terminates. If not, go to Step 2212, and iterate through the rest of the IPX connections.

FIG. 23 is a flowchart that provides additional details about Step 2207 in FIG. 22. The input for this flowchart is "C" which refers to an IPX connection, and the MPT. The process starts at Step 2307A where MPNTR is set to the first connection in MPT. Step 2307B determines whether the IPX connection intersects the MPNTR. As used herein, the term "intersect" means "refers to one or more of the same ports." If the answer is "no", then Step 2307H determines whether MPNTR is the last MpC in the MPT. If the answer is "yes", then all the connections in MPT have been processed, and no matches or intersections have been found. The process exits with status: completely no match, shown at 2307I. If there are more MPCs to process, then set the variable MPNTR to the next connection in MPT, at 2307J, and go back to Step 2307B.

If at Step 2307B, an intersection is found between "C" and MPNTR, then go to Step 2307C, which asks what type of intersection relationship is present. Specifically, the question is whether there is a one to one correspondence between MPNTR and "C". That is, do they point to the exact same router ports? If the answer is "yes", then the process exits with status: a complete match. If there is not a one-to-one correspondence, then Step 2307E determines whether the ports in "C" refer to a proper subset of the ports referred to by MPNTR, or visa versa. In other words, is there a subset relationship? If the answer is "yes", then the procedure exits with status: subset relationship. If not, the process exits with a mismatch status.

FIGS. 24A through 24I illustrate a walkthrough example of the flowcharts of FIGS. 22 and 23. The walkthrough example shown in FIGS. 24A through 24I uses as input the IP SPT in FIG. 8I and the IPX SPT in FIG. 8J. Recall that these SPTs were produced from the SROs in FIGS. 7A and 7B. The SROs, in turn represent the router configuration files shown in FIGS. 6A and 6B. Recall that FIG. 5 is intended to be an intuitive illustration of the routers in the network. Reference numerals depicting the steps of FIGS. 22 and 23 for the walkthrough of FIGS. 24A-I are appended with dash numbers to distinguish iterations of steps.

Referring to FIG. 24A, the diagram shows the state of the output MPT after Step 2201 in FIG. 22 (or Step 2401 of FIG. 24) is executed. Reference numeral 2401A in FIG. 24 indicates that at Step 2201A in FIG. 22, MisMatch is initialized to empty. Step 2202 (or Step 2402 of FIG. 24) sets "C" to the first IP connection in SPT IP, Conn[1] in FIG. 8I whose subnet is 10.30.0.0. Step 2203 (or Step 2403 of FIG. 24) adds a connection corresponding to "C" to the MPT. FIG. 24B shows the resulting MPT state after applying Step 2203 (or Step 2403). Note the similarity between the structure in FIG. 24B and the structure marked as 801 in FIG. 8I. The difference is that the pointer in the MPT is R1, E0, rather than R2,E0,IP1. In other words rather than pointing to a specific address on a port, a connection in a MPT just points to the port itself.

FIGS. 24A and 24B show the main operation in processing the IP SPT: the pointers in the IP SPT are copied into the MPT, omitting their address references yielding pointers just mentioning a router and a port thereby pointing to a higher level in the SRO structure and being independent of protocol.

FIG. 24C shows the results after processing the next connection, which is Conn[2] (See FIG. 8I). The diagram in FIG. 24C shows the state of the MPT after Step 2203 (or Step 2403) is executed the second time. Once again, note the similarity between the structure in FIG. 24C and the first two connections in the structure of FIG. 8I.

Figure 24D:
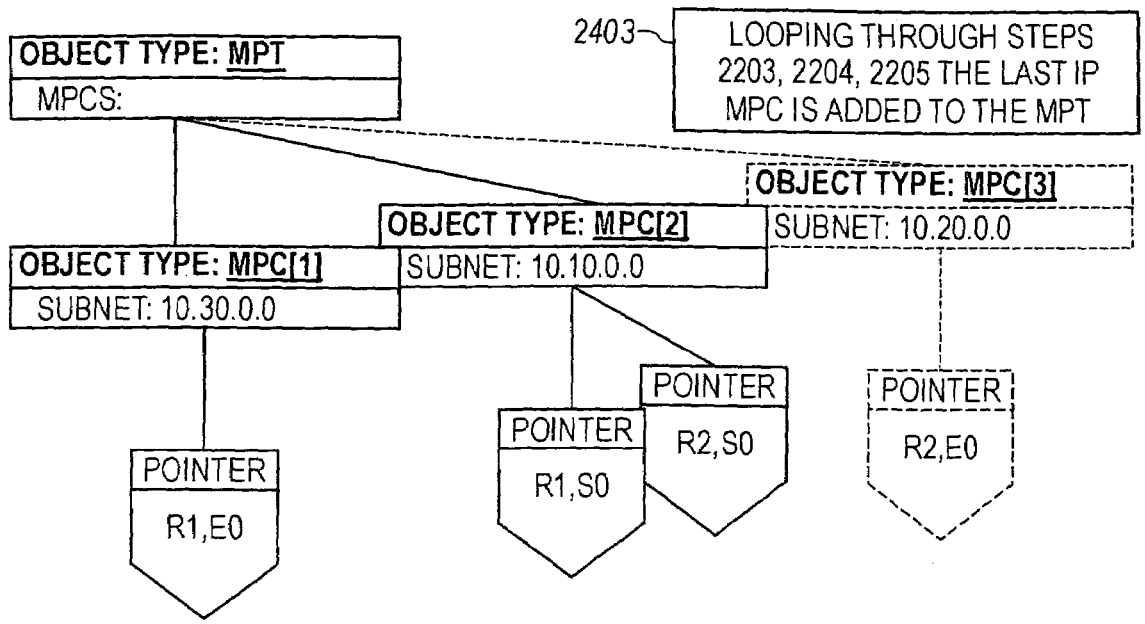

FIG. 24D illustrates the state of the MPT after Conn[3] is processed in Step (3).

Figure 24E:
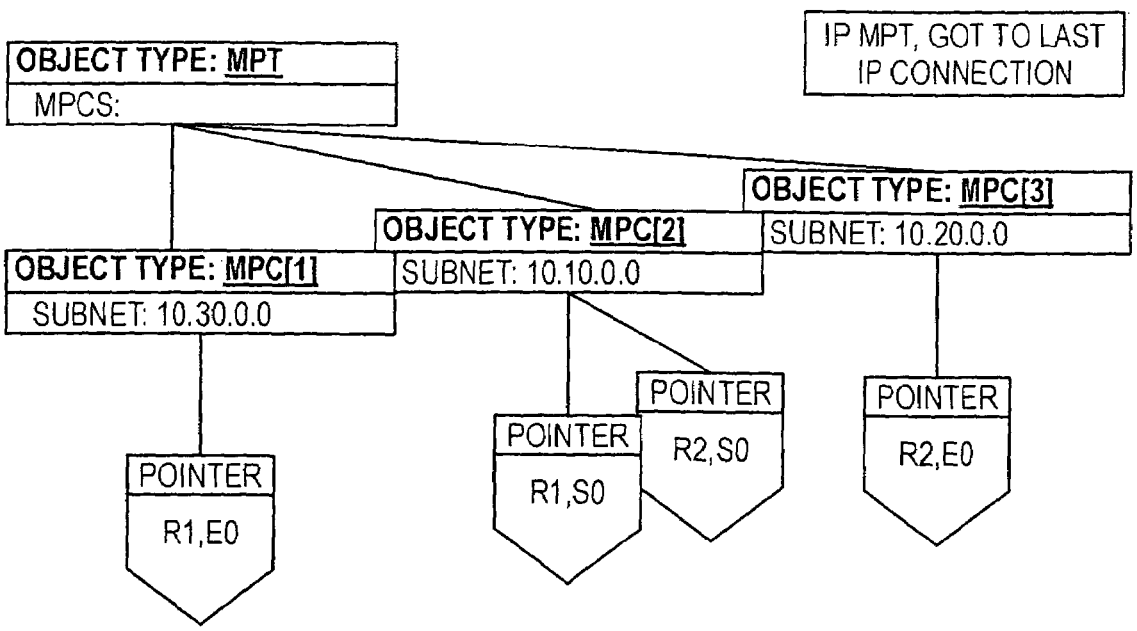

FIG. 24E shows the state of the MPT after the last IP SPT has been processed.

Figure 24F:
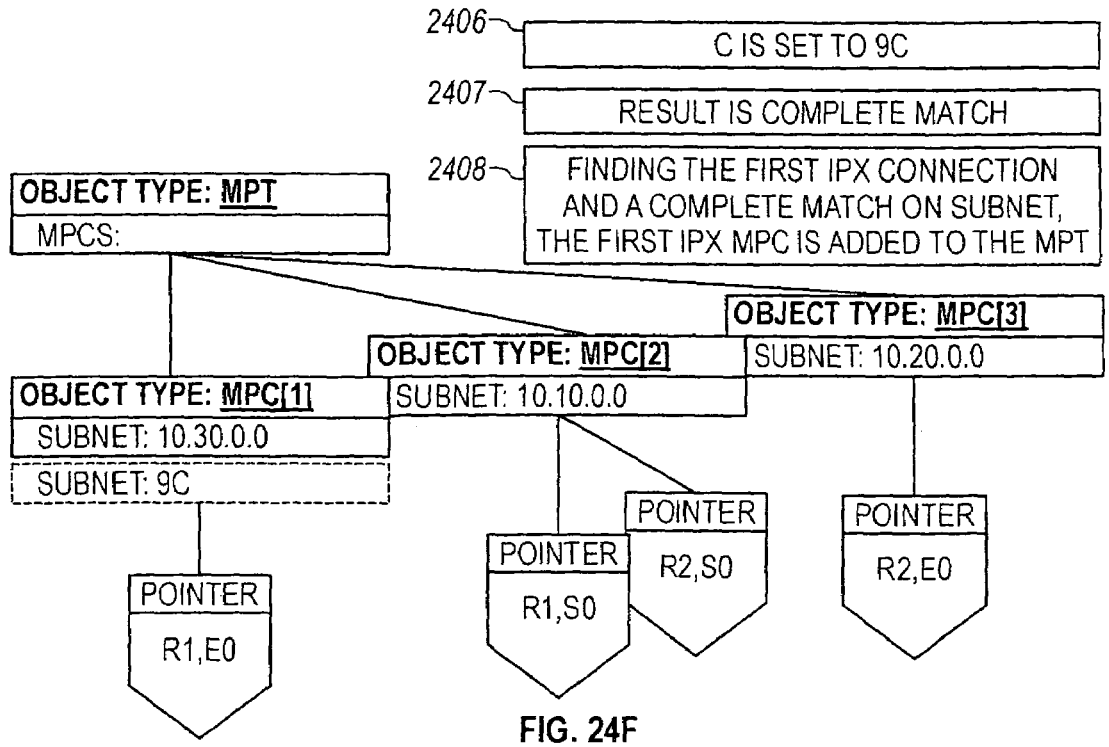

We have now discussed the first part of the process in FIG. 22, where the IP SPT is copied over to the MPT. Next, the process iterates through the IPX SPT where an additional step is performed that looks for matches and mismatches. FIG. 24F continues the walkthrough example at Step 2206. In this part of the flowchart, the variable "C" is set to the connections in the SPT IPX. In Step 2206, "C" is set to Conn[1], shown at 2406, in FIG. 8J, which has subnet 9C. Step 2207 determines the type of matching relationship between "C" and the MPT in FIG. 24E. In this case, the result is a complete match, shown at 2407. The reason that there is a complete match between the connection in FIG. 8J (with subnet 9C) and the first connection in the MPT is that they both corresponded to only one router port, R1, E0. As a result, since the answer to Step 2207 is a complete match, shown at 2407, go to Step 2208, which "adds C's subnet to the matching MpC", shown at 2408 The subnet corresponding to "C" is 9C. Reference to FIG. 24F shows there is subnet 9C which has been added under MpC[1].

Figure 24G:
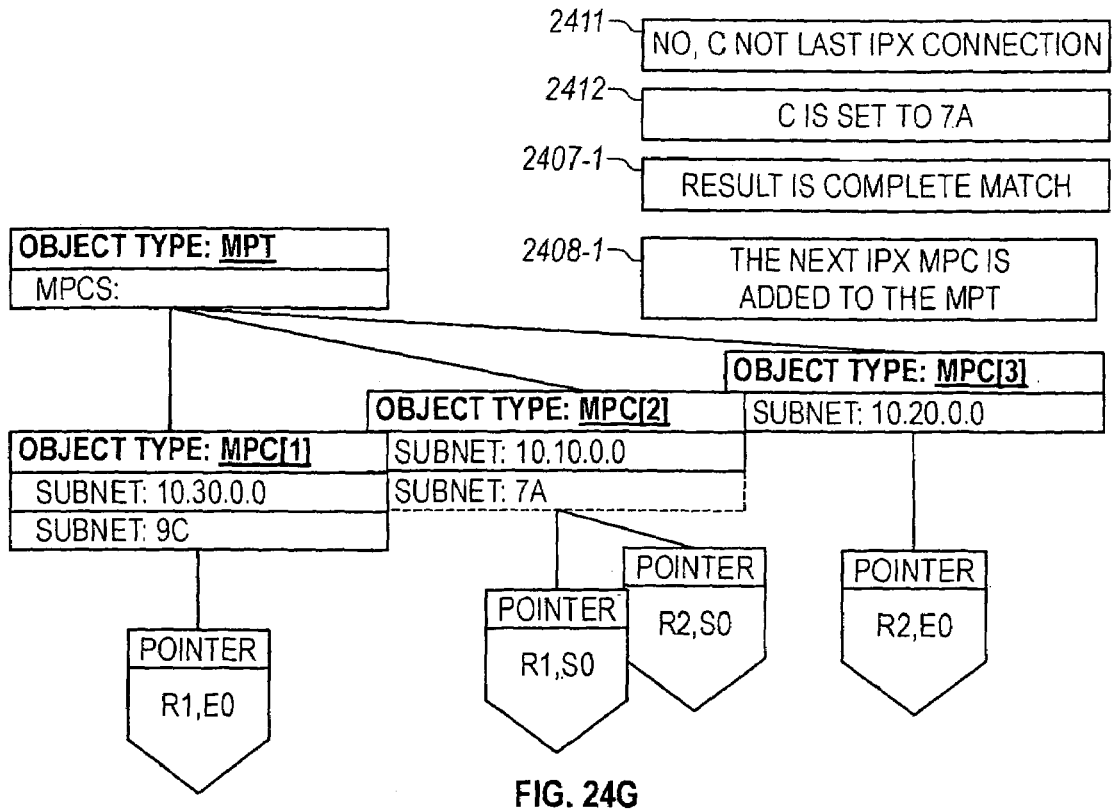
Figure 24H:
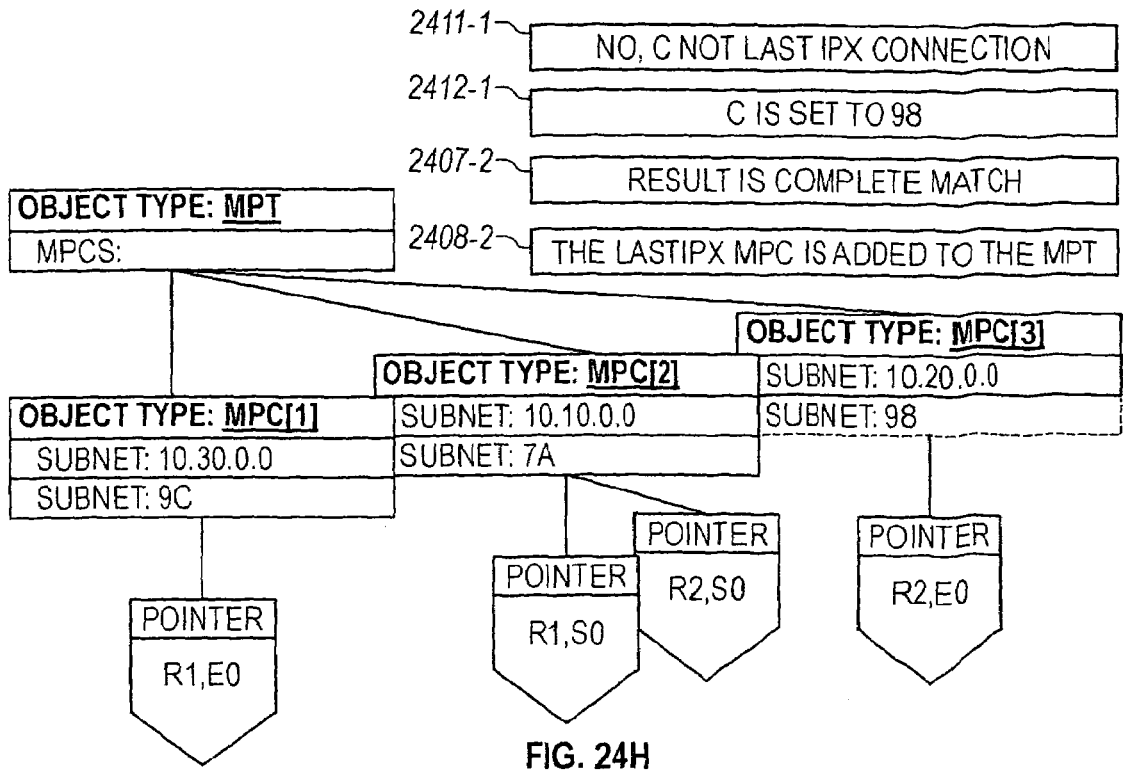
Figure 24I:
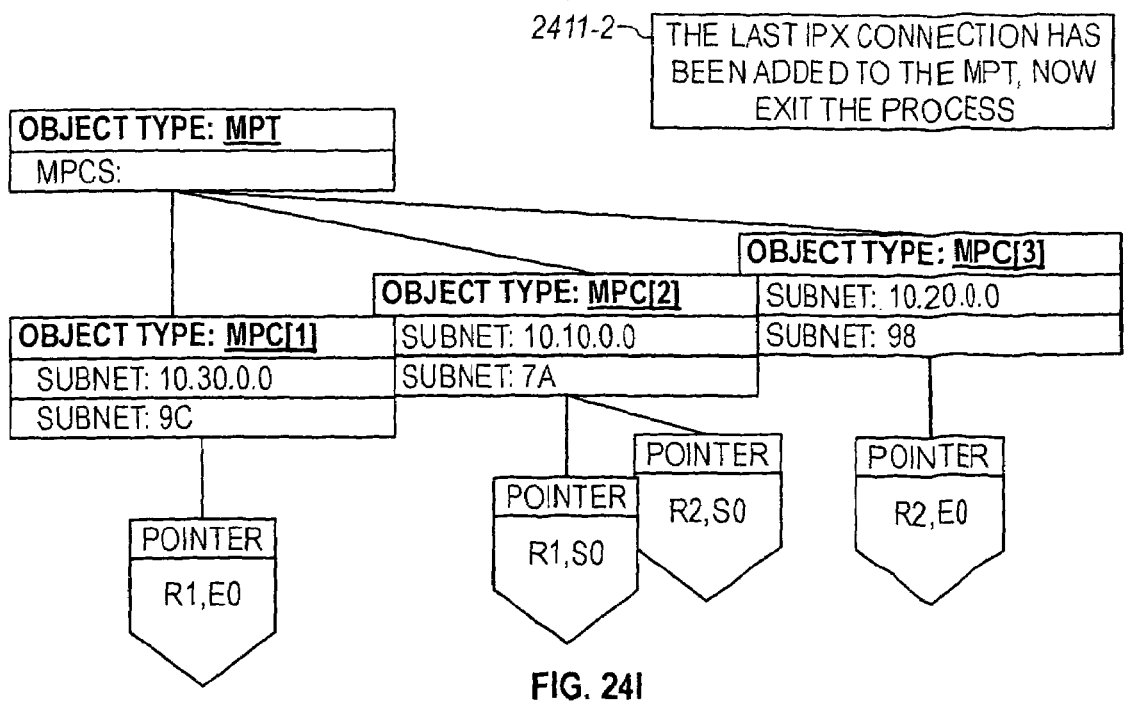

Referring to FIG. 24G, Step 2211 asks, whether "C" is the last IPX connection. The answer is "no", shown at 2411, because there are two more IPX connections to process. Step 2212 sets C to the next IPX connection, Conn[2] as shown in FIG. 8J, which has subnet 7A, shown at 2412. Step 2407 then asks what is the result of matching this IPX connection with the MPT. In this case, it is found to be an exact match with MpC[2], shown at 2407-1. Now, refer back to FIG. 24F, which is the state of the MPT at the time the matching takes place. The reason that it is an exact match is that MpC[2] it refers to two router ports, R1 S0 and R1 S0 and so does Conn[2] in FIG. 8J. Because there is an exact match, go to Step 2208 and add "C's" subnet (7A) under MpC[2], shown at 2408-1, yielding the structure in FIG. 24G.

Then go to Step 2211, which determines whether "C" is the last IPX connection. The answer is "no", shown at 2411-1, because there is one more IPX Connection to process. Step 2212, "C" is to the next IPX connection, which in FIG. 8J is Conn[3], which has subnet 98, shown at 2412-1. Then go to Step 2207, which once again finds an exact match, shown at 2407-2. Note that in FIG. 8J Conn[3] has a pointer to one router port R2 E0 as does MpC[3], as shown in FIG. 24E. Because there is an exact match, go to Step 2208, which adds "C's" (Sub) net 98 under MpC[3], shown at 2408-2, yielding the structure shown in FIG. 24H. Finally, Step 2211 determines that the last IPX connection has been reached, and the process exists, shown at 2411-2. The resulting competed MPT is the structure shown in FIG. 24I.

Figure 25A:
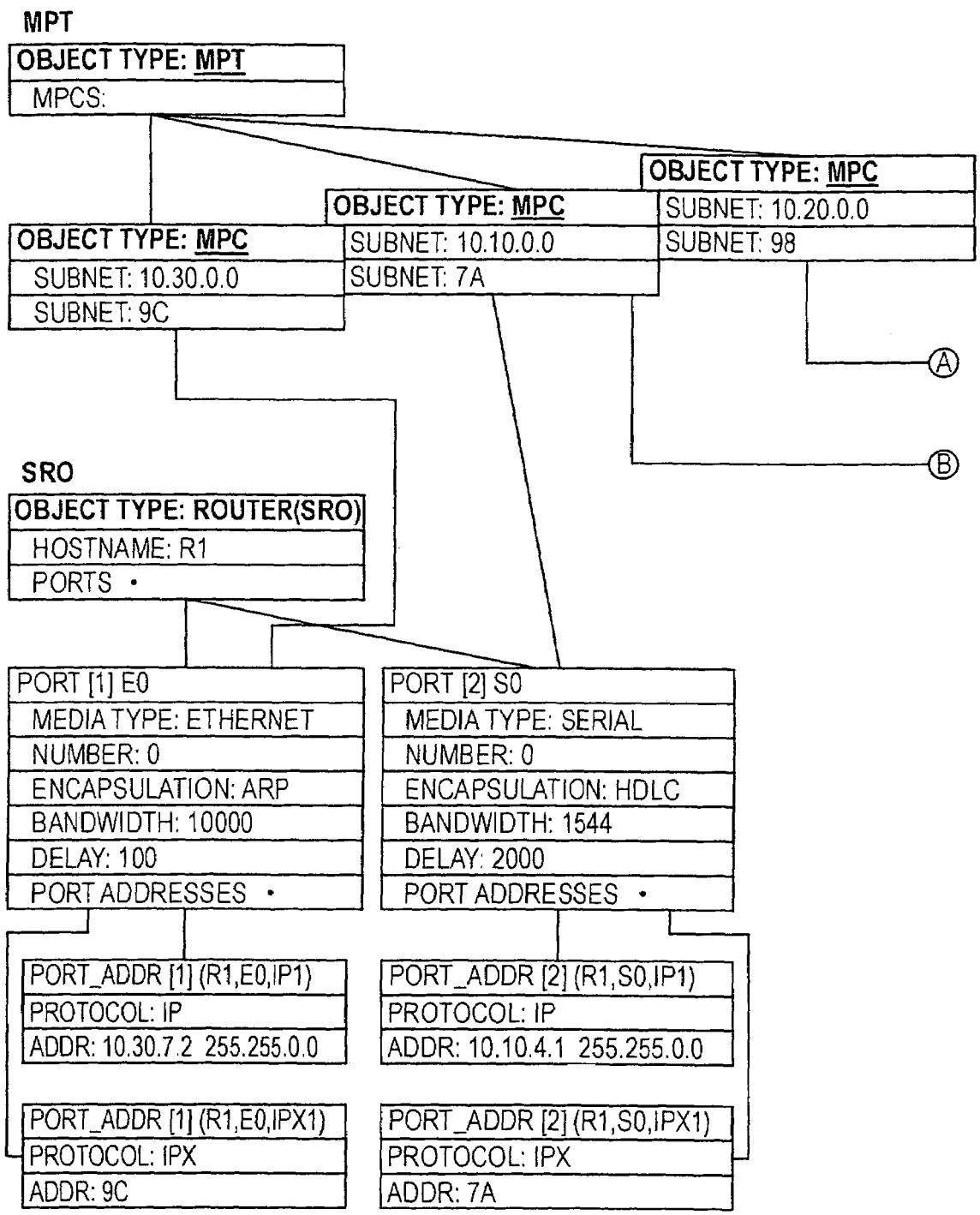
FIGS. 25A-B show the Object data structures of the SRO & MPT to demonstrate the linkages that inter-relate them as they would occur following execution of the process shown in FIG. 1B.
Figure 25B:
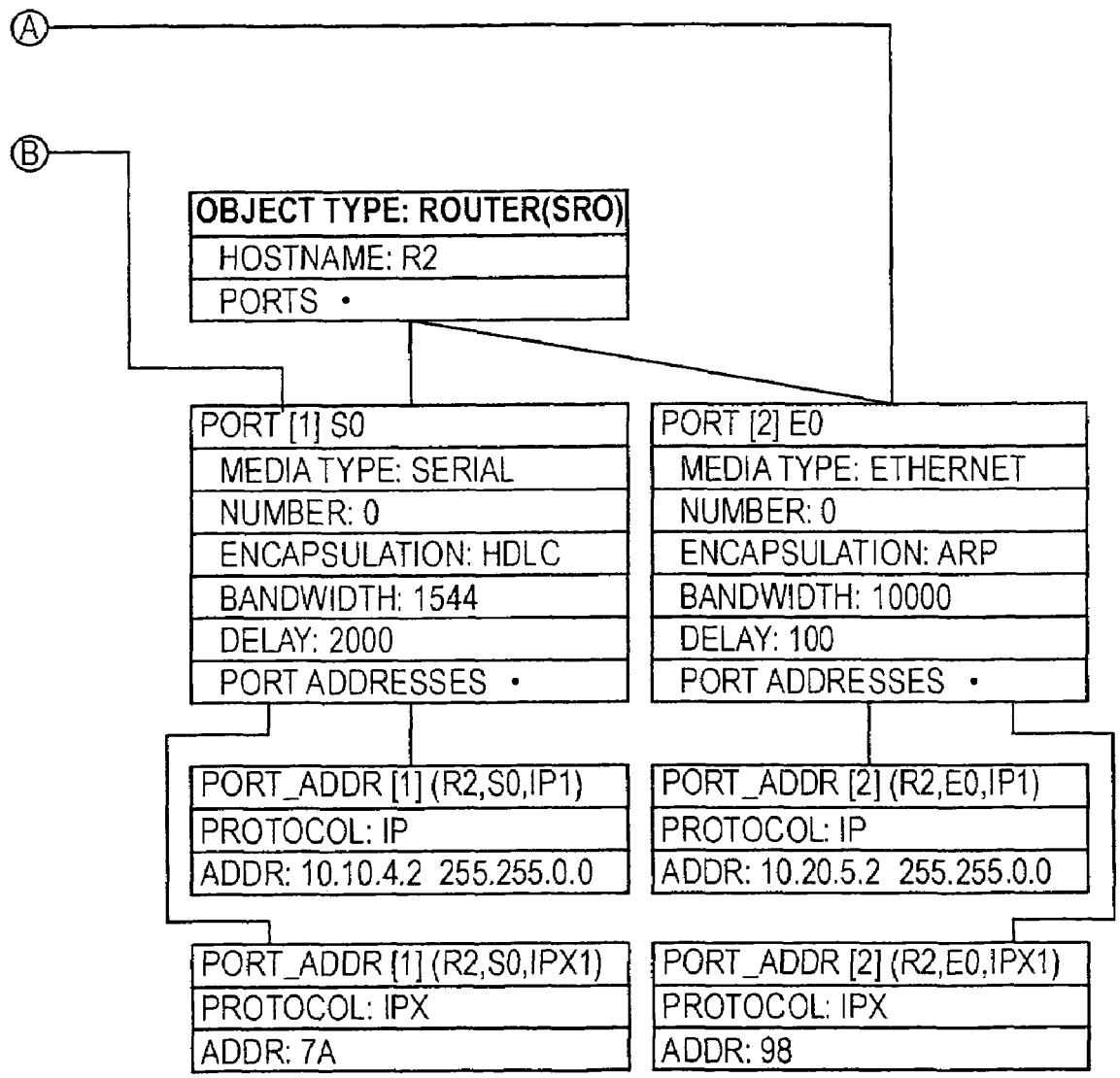

FIGS. 25A-B show the integration of the example MPT with the example SROs. When the MPTs were previously described, there were just pointers. Here pointers are replaced with the actual SROs to better illustrate the integrated structure. This is a novel aspect of the invention, the fact that the object model does not merely manage isolated routers, but rather maintain the interrelationships among routers. Specifically, the MPTs and the SPTs interrelate the SROs.

Note that in FIGS. 25A-B there are two types of links connoting two different relationships. The single links represent a component relationship (for example, the object type MPT has MPC components). The double lines represent pointers. A pointer differs from a component-link in that it links to a separate object.

As mentioned above, one of the advantages of forming a MPT is that information from one logical protocol can be used to fill in missing information from another logical protocol. The following figures show how information that is omitted from the IP SPT could be filled in from another protocol, such as IPX. Cisco Systems, for example, has a configuration option called IP-unnumbered, where on a particular router port, rather than explicitly giving it an IP address, the IP-unnumbered command could be used. One advantage of this configuration option is that it helps to conserve the address space. However, a problematic ramification of using the IP-unnumbered command is that since a port configured with IP-unnumbered does not have its own address, it cannot be readily matched up to the other router ports. Remember that in FIG. 4, which shows how to produce the SPTs, a critical aspect of the SPT formation process is knowing the port addresses and matching them up. So, if a port lacks a port address, the process, in a sense, is blocked. The example network of FIG. 28 shall be used to illustrate a procedure that accommodates IP-unnumbered. The example network has four routers, R3, R4, R5 and R6. Router R3 and Router R4 are connected through their FDDI 1 interfaces to a FDDI ring whose subnet is 20.20.0.0. Router R3 and Router R5 are connected through their Serial 0 interfaces to a serial link, which is explicitly assigned an IPX network number, but no IP address (because IP-unnumbered is being used). Routers R4 and R6 are connected through their serial 0 interfaces with a serial link that is given an IPX network number (9C) but no IP address. Now look at the configuration files for these four routers and their SROs structures.

In FIGS. 29A through 29D the four router configuration files are shown. Refer to FIG. 29A reference numeral (1). Under interface Serial 0, rather than explicitly having an IP address with an address and mask, we see the IP-unnumbered command. (Note: The interface mentioned in the command, loopback 1, will not be further discussed because it is not relevant to the present discussion. However, to give a little more background on what a loopback is: while a router has a number of physical interfaces (such as serial, FDDI and Ethernet interfaces), the user can manually configure as many loopback interfaces as desired. These serve, in a sense, as a way of addressing a router. If a host wants to reach a router, it needs to mention an address on the router's ports. A common technique is to supply loopbacks to serve as addresses into a router. An advantage of a loopback address over the address of a physical port is that a loopback cannot fail.

Figure 30A:
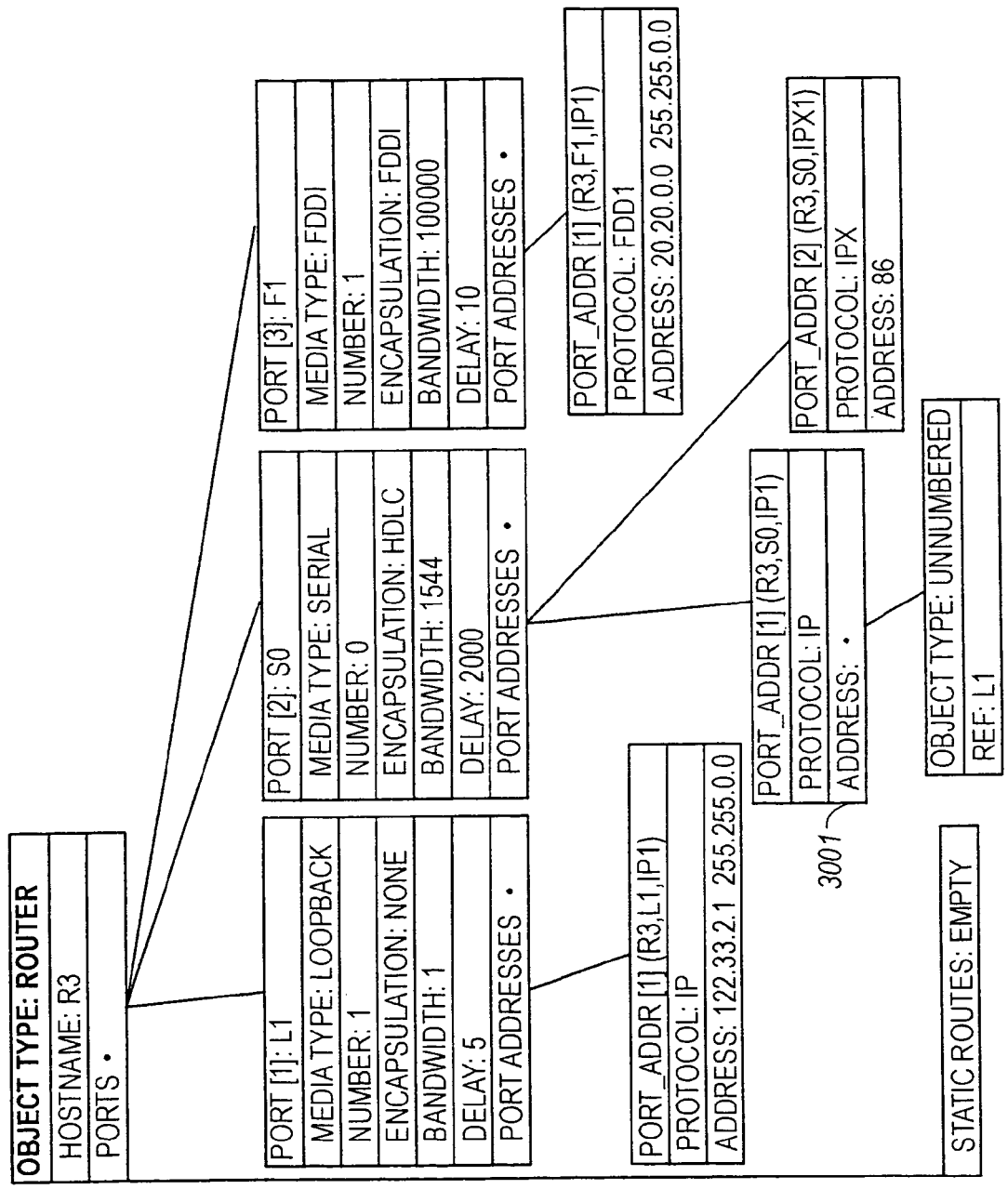
FIG. 30A shows the SRO object for R3 in FIG. 28.
Figure 30B:
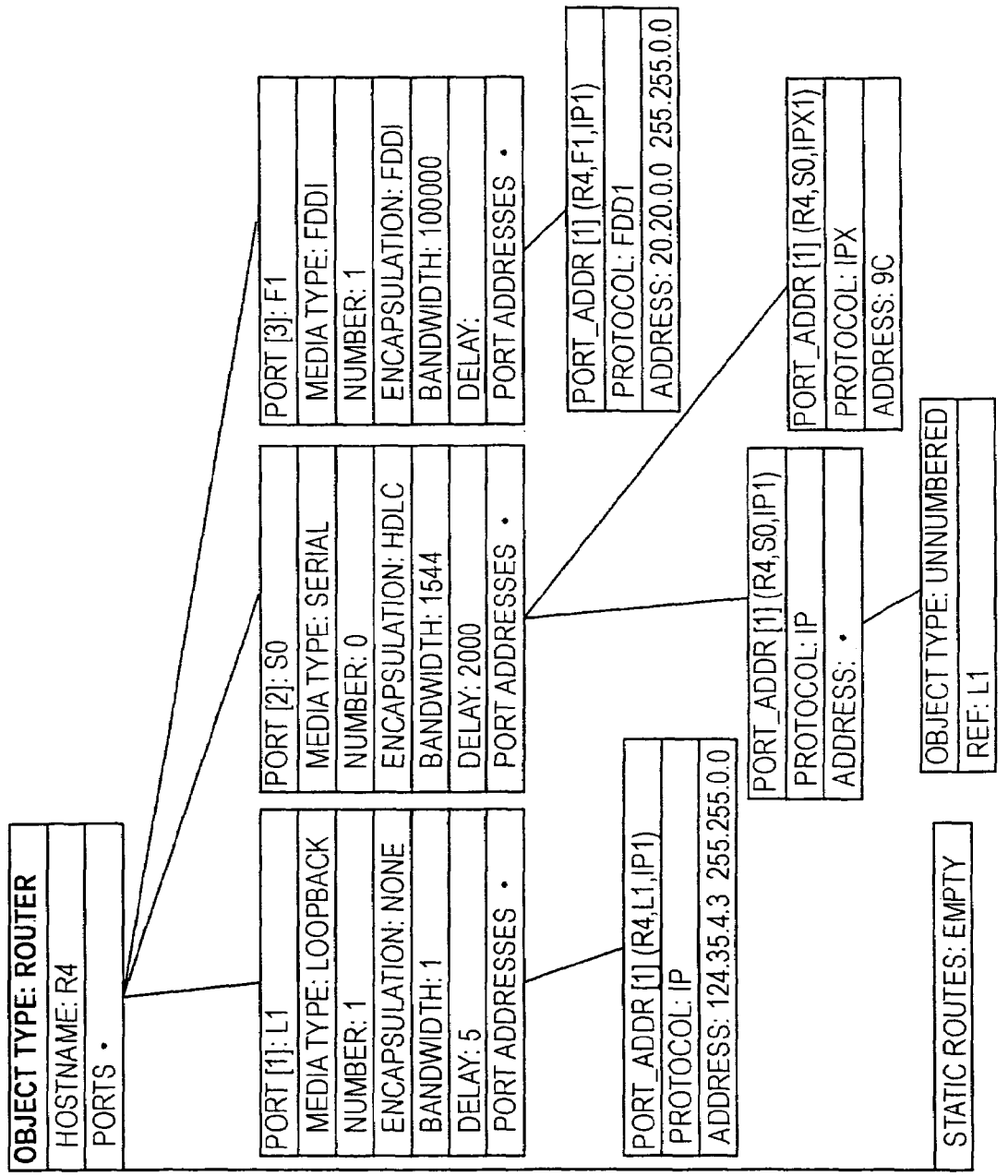
FIG. 30B shows the SRO object for R4 in FIG. 28.
Figure 30C:
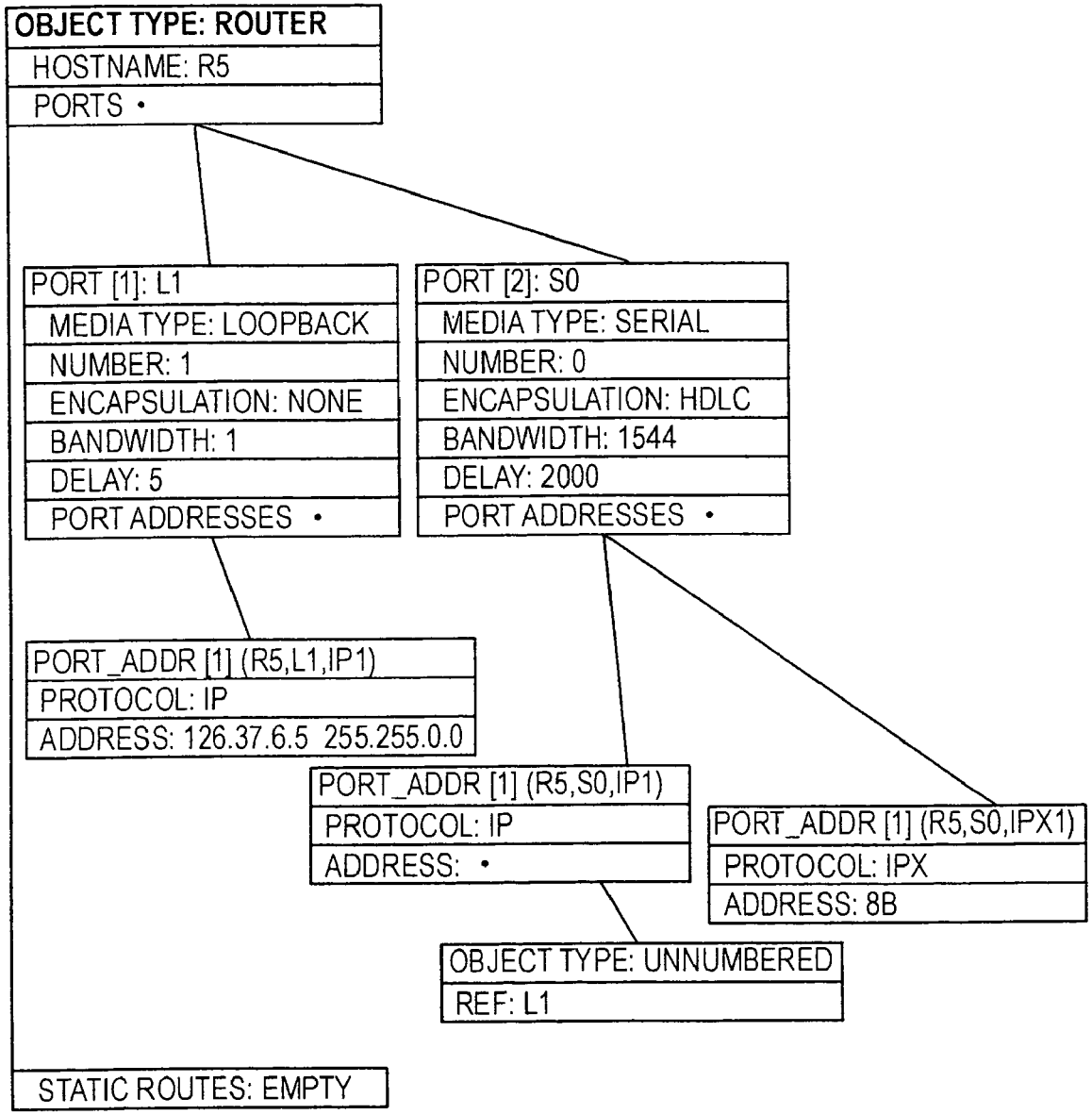
FIG. 30C shows the SRO object for R5 in FIG. 28.
Figure 30D:
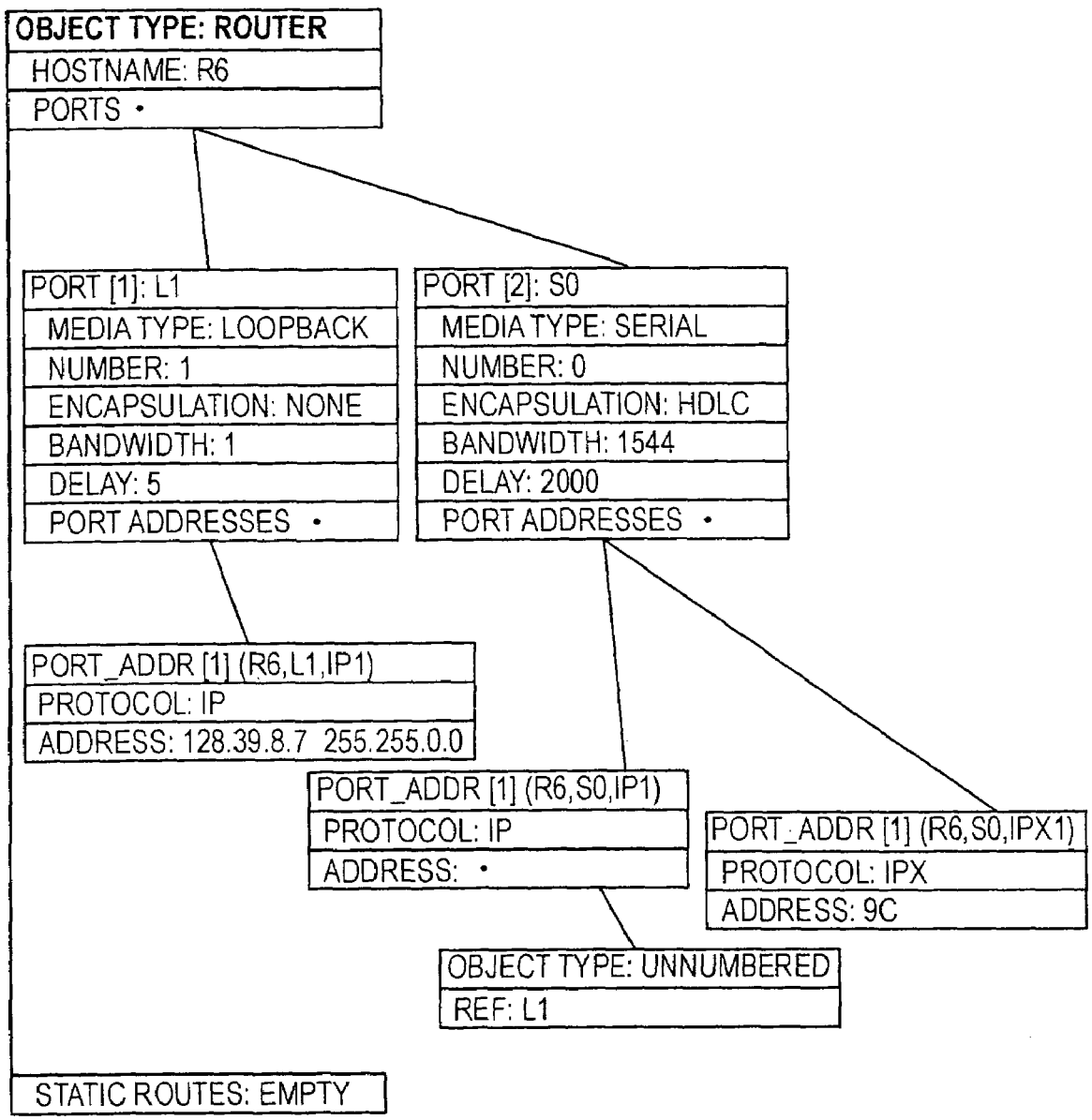
FIG. 30D shows the SRO object for R6 in FIG. 28.

FIGS. 29B through 29D each have IP-unnumbered configurations on their respective Serial 0 interfaces. FIGS. 30A through 30D show the SROs that are produced by parsing and filling in the defaults of the configuration files that are shown in FIGS. 29A through 29D. FIG. 30A shows the SRO corresponding to FIG. 29A. It is a straightforward translation. The only thing to highlight here is the protocol address indicated by numeral 3001. Rather than including an address, an object type "Unnumbered" is provided. The structure in FIG. 30A indicates that the router is an IP-unnumbered and points to the loopback LI. Similarly, FIG. 30B corresponds to FIG. 29B, FIG. 30C corresponds to FIG. 29C, and FIG. 30D corresponds to FIG. 29D.

Figure 27:
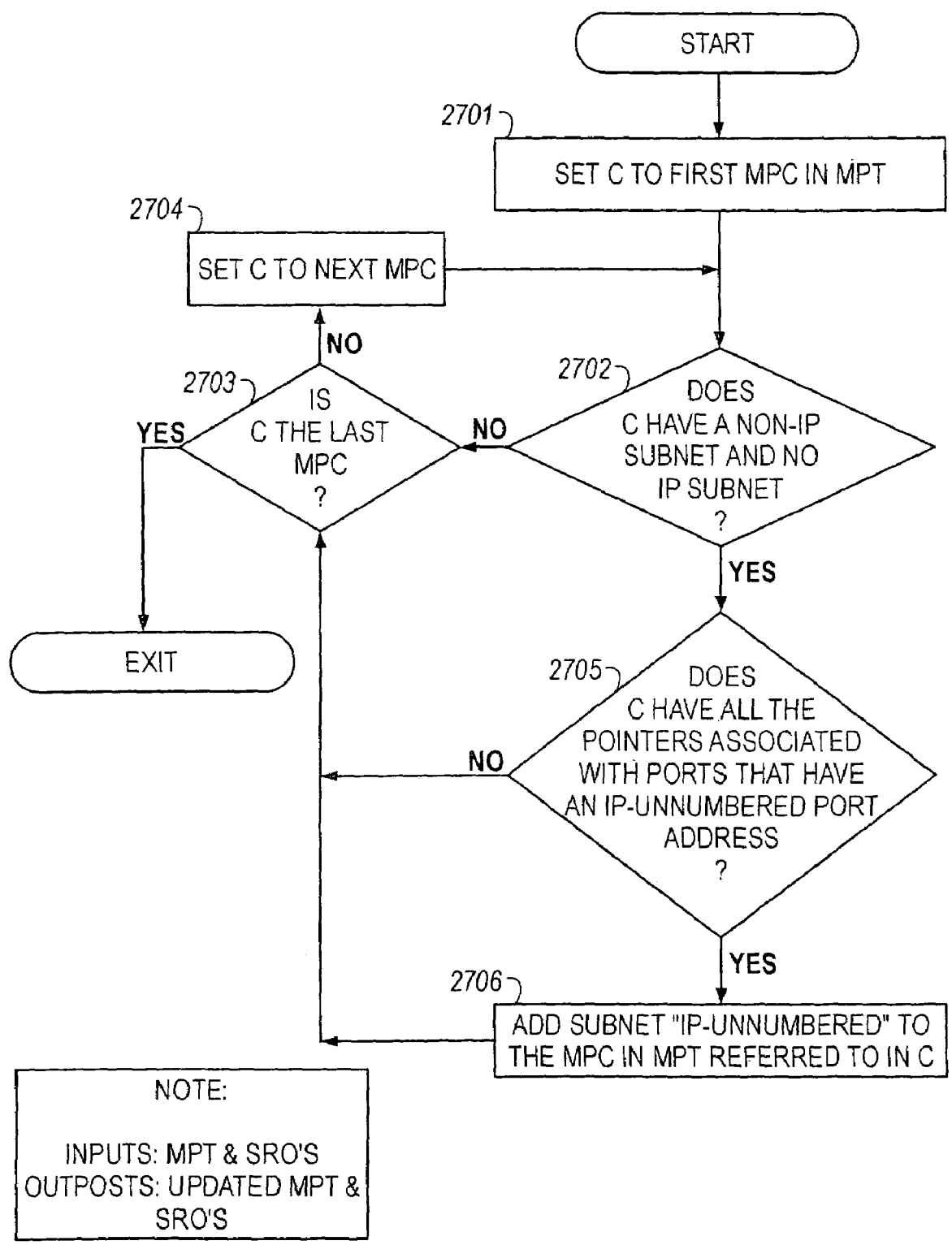
FIG. 27 shows a flowchart for the process for resolving IP-unnumbered connections using connections of another protocol, this process occurs during the topology construction phase (FIG. 1B).

FIG. 27 shows a flow chart that takes as input the MPT and the SROs to which it points. Processing will add more items to the MPT to fill in the missing information that is missing in the IP SPT due to the use of IP-unnumbered.

Figure 28:
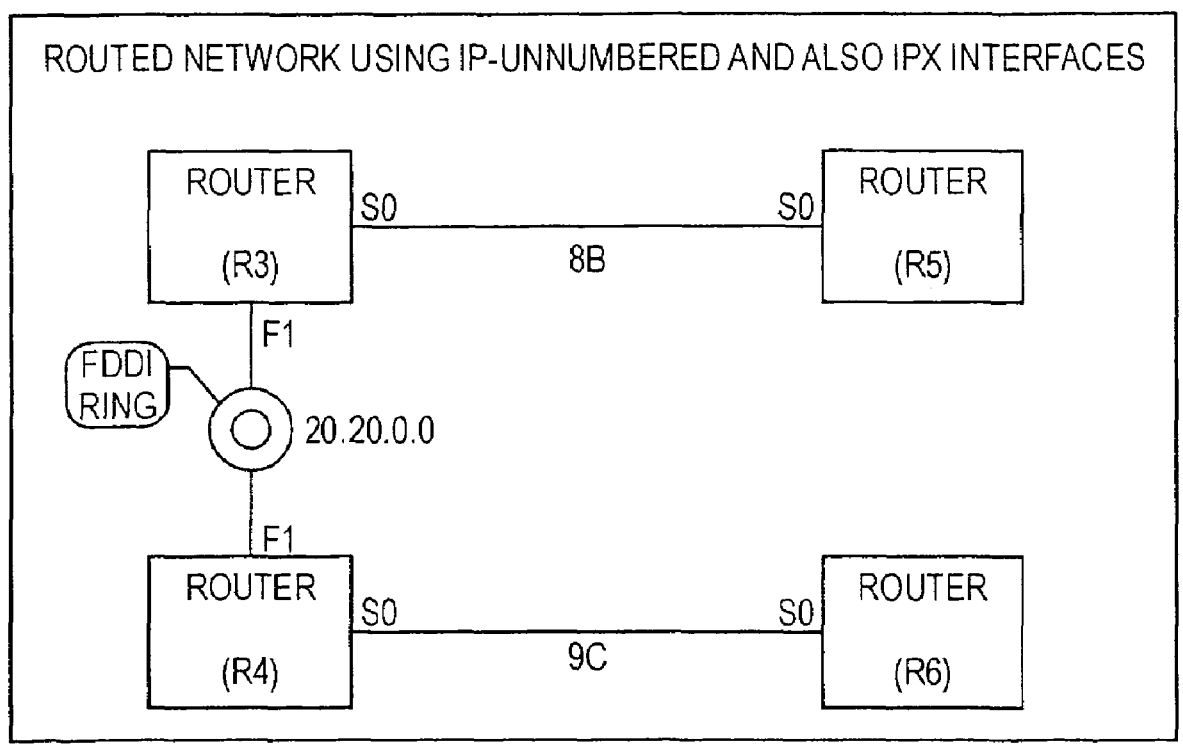
FIG. 28 is a topology drawing of a hypothetical network that will be referenced along with subsequent figures to show how information missing from the IP SPT because of the use of IP-unnumbered is filled-in using the IPX SPT.
Figure 30E:
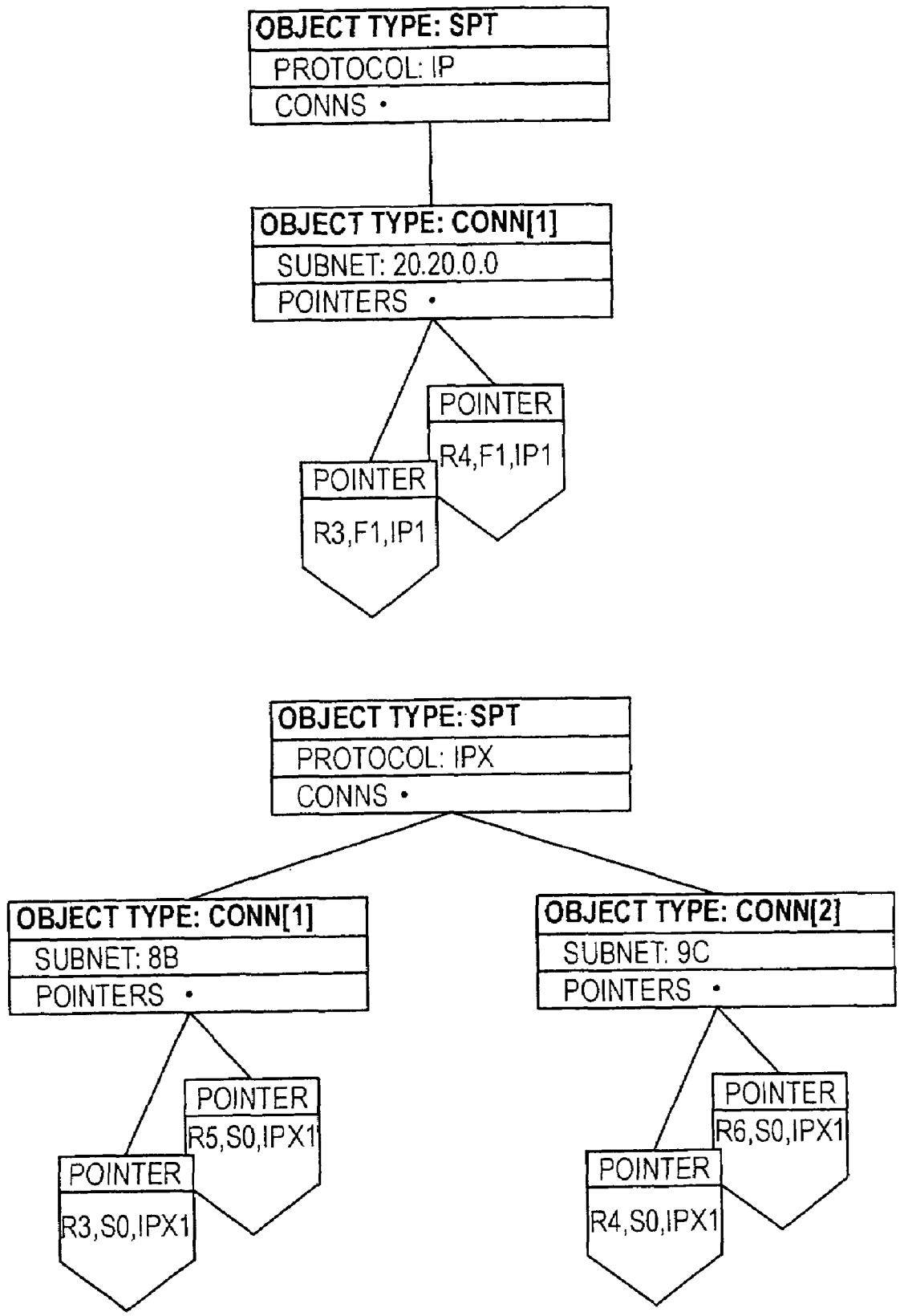
FIG. 30E shows examples of the IP and IPX SPT object data structures as they would be populated following the execution of the SPT build process in FIG. 4 for IP and IPX.

FIG. 30E shows the IP and IPX SPTs that would be produced for the network intuitively shown in FIG. 28, and with routers having the configuration files shown in FIGS. 29A through 29D. Notice that the IP SPT only has a connection for the FDDI because only at the FDDI ports are there explicit IP port addresses. At all the serial ports, IP-unnumbered is used. The IPX SPT, on the other hand, has connections associated with the two serial links.

In FIG. 27, Step 2701 sets "C" to the first connection in MPT. Step 2702 determines whether this connection has a non-ID subnet. If the answer is "no", then this Connection does not need to be processed, and the process goes to Step 2703 to process the next connection in the MPT. If at Step 2702, the answer is "yes", then go to Step 2705 and determine whether C has all the pointers associated with ports that have IP-unnumbered address. If the answer is "no", then continue at Step 2703 and process the next connection in the MPT. If the answer is "yes", then add to connection IP a new subnet labeled "IP-unnumbered."

Figure 30F:
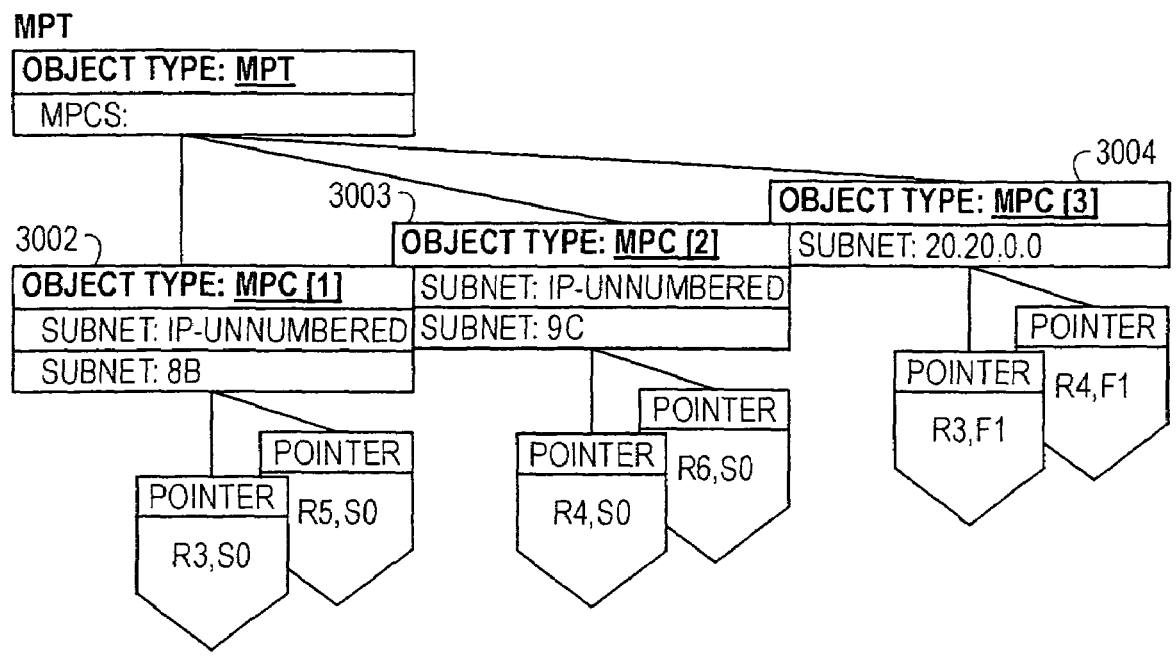
FIG. 30F shows an example of the MPT object data structure as it would be populated following the execution of the process in FIG. 22 taking the SPTs in FIG. 30E as input, and refined with the additional process shown as FIG. 27 that fills-in information missing due to the use of IP-unnumbered.

FIG. 30F shows the MPT that would be produced after performing the MPT construction algorithm, shown in FIG. 22, and then applying the algorithm for handling missing information due to IP-unnumbered, shown in FIG. 27. Before the IP-unnumbered processing takes place, the MPT would look like FIG. 30F with the exception that connection MPC[1] would only have a single subnet 9C, and not "IP-unnumbered" in the subnet list. Similarly MPC[2] would only have a single subnet 8B, and not "IP-unnumbered" in the subnet list. The IP-unnumbered subnets shown at points 3002 and 3003 in FIG. 30F are added during execution of the IP-unnumbered processing algorithm (FIG. 27). The reason that "subnet: IP-unnumbered" is added under MPC[1] is the presence of the IPX connection between ports R3,S0 and R5,S0 and the fact that both of these ports are configured for IP-unnumbered. Similarly, the reason that "subnet: IP-unnumbered" is added under MPC[2] is the presence of the IPX connection between ports R4,S0 and R6,S0 and the fact that both of these ports are configured for IP-unnumbered.

Figure 40:
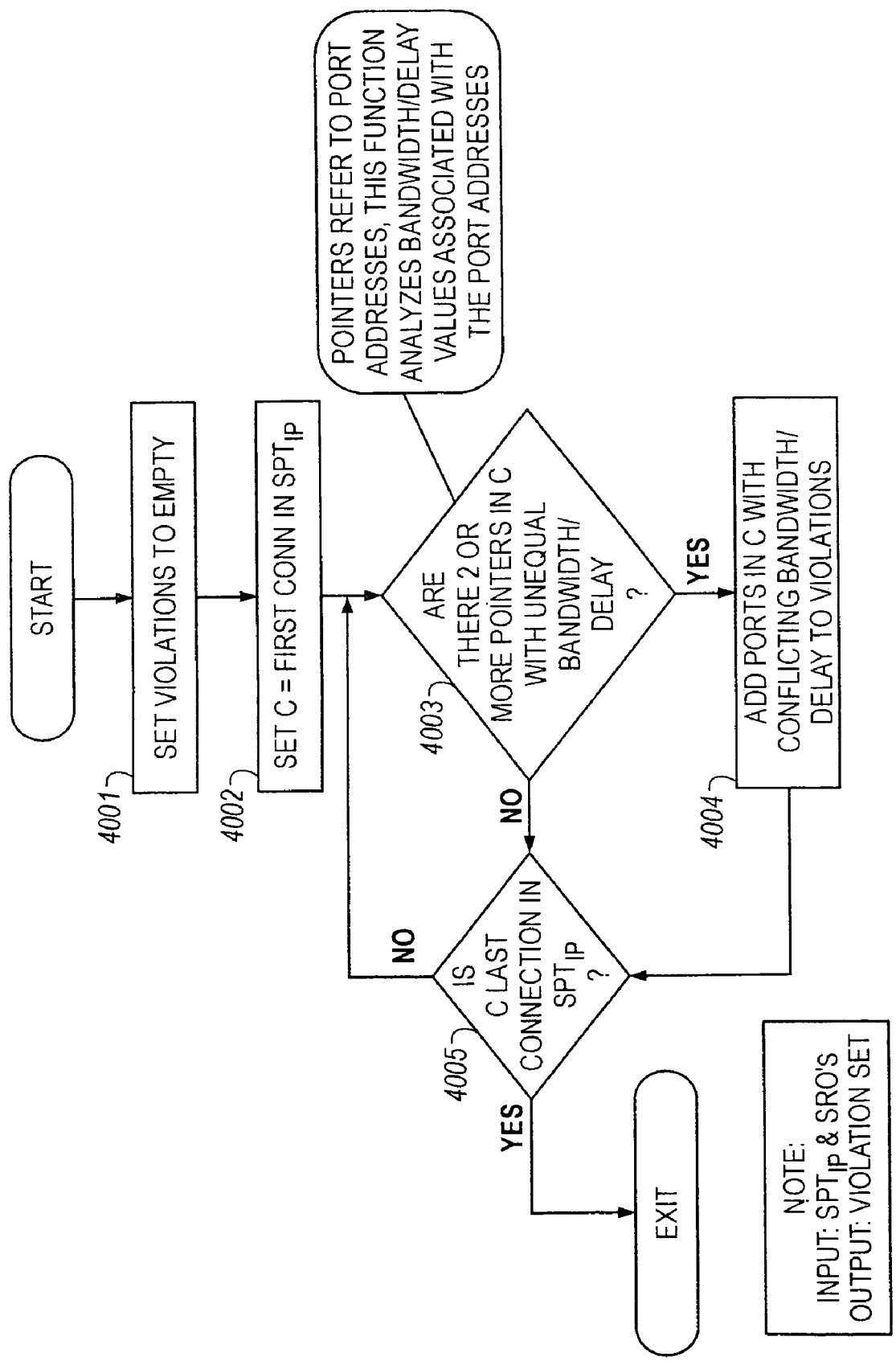
FIG. 40 is a flowchart showing the process for determining bandwidth and delay mismatches between adjacent routers, which is an integrity check that occurs during the phase indicated as FIG. 1D.

FIG. 40 is a flow chart that describes the process for finding mismatched bandwidth statements and mismatched delay statements. (Note: this is a non-routing integrity check; see FIG. 1D). On each port in a router, a bandwidth and delay statement is either explicitly or implicitly configured. These are used by both the IGRP and EIGRP routing protocols to compute the "cost" of a routing path. The process illustrated by the flowchart in FIG. 40 looks for conflicts where two adjacent router ports are configured with different bandwidth and/or delay metrics, which may or may not be a problem. Because mismatching may be inadvertent and detrimental to the network operation, it is valuable integrity check information to present to the user.

The input of this procedure is the SPTP and the SROs to which it points. The output is a violation set which is initialized to empty in Step 4001. In Step 4002, the variable "C" is set to the first connection in the SPTP. The process iterates through all the connections in the SPTP. Step 4003 determines whether there are two or more pointers in "C" (recall these are pointers to port addresses) associated with ports having bandwidth or delay that are unequal. If the answer is "yes", go to Step 4004 and add the ports in "C" with a conflicting bandwidth or delay to the violation set. Then go to Step 4005, which determines whether "C" is the last connection. If it is, the procedure terminates. If not, go back to Step 4003. If in Step 4003 the answer is "no conflict", go to Step 4005 and process the next connection in the $SPT_{IP}$.

Figure 41:
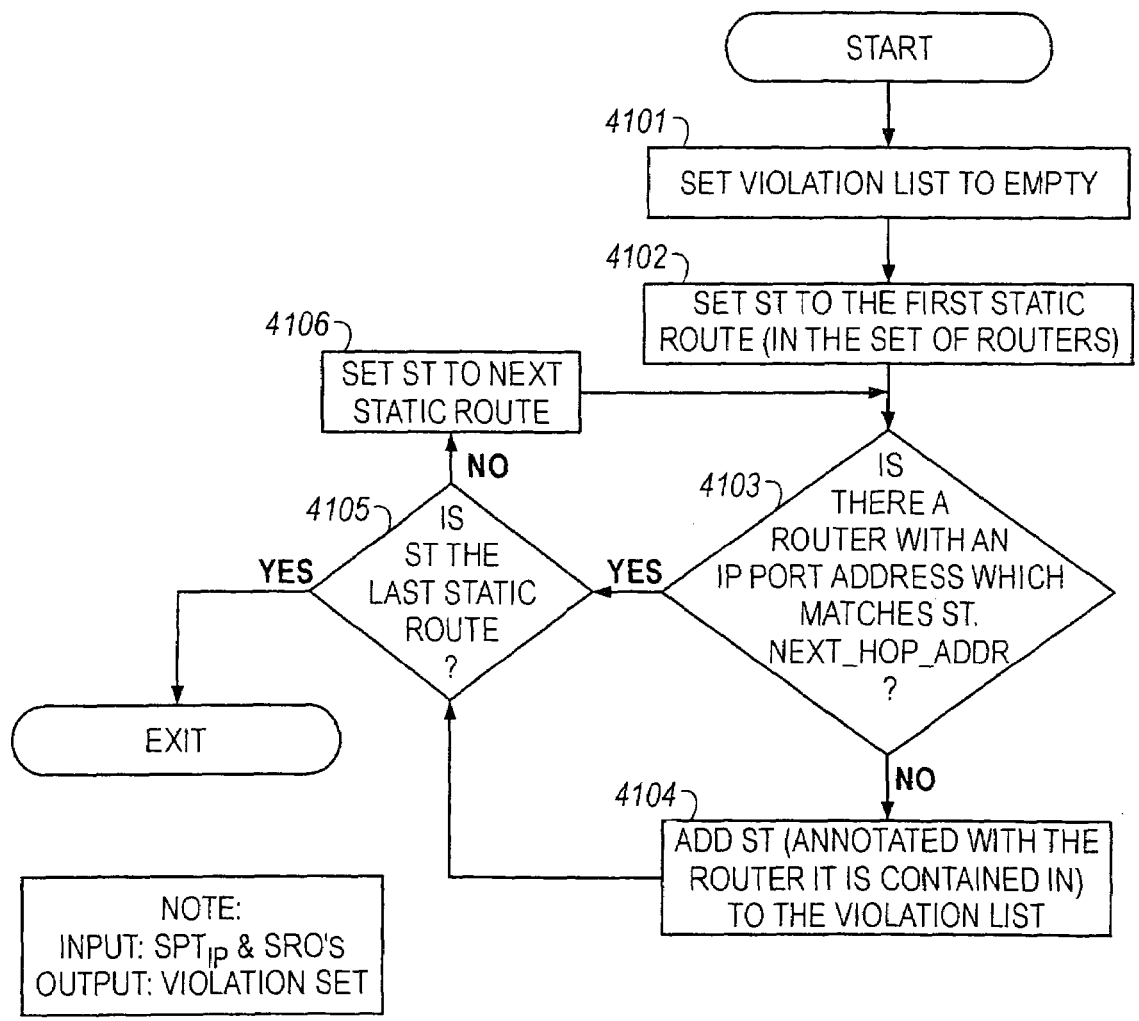
FIG. 41 is a flowchart showing the process for determining the existence of unresolved static routes as coded in router configurations, which is an integrity check that occurs during the execution of the phase shown as FIG. 1D.

FIG. 41 provides a flow chart depicting a process for performing another type of non-routing integrity check (FIG. 2) which looks for static routes configured on the router that point to routers that do not exist in the network being analyzed. This may or may not be a problem. It is a problem in the case in which the static route's next hop address is incorrectly specified, in which case it will not match an existing router. On the other hand, it might point to a router outside the domain being analyzed, in which case the user could discount the integrity check. The input to this flow chart is the set of SROs spanning the network. The output is a violation list which in Step 4101 is initialized to empty. The process steps through all the routers and all the static routes configured. Step 4102 sets ST to the first static route in the list of routers. Step 4103 determines whether there is a router with an IP port address that matches the static route's next hop address. To determine this, the procedure searches through all the SROs. If no match is found, then add to the violation list a pointer to this static route object, meaning that this static route refers to a next-hop router that is not in the domain of analysis. Step 4105 determines whether ST is the last static route in the list of routers. If the answer is "yes", the process terminates. If the answer is "no", ST is set to the next static route and the process repeats. If the answer to Step 4103 is "yes", then the address in the static route is within the set of routers, and the procedure goes to Step 4105 to process the next static route, if it exists.

Figure 42:
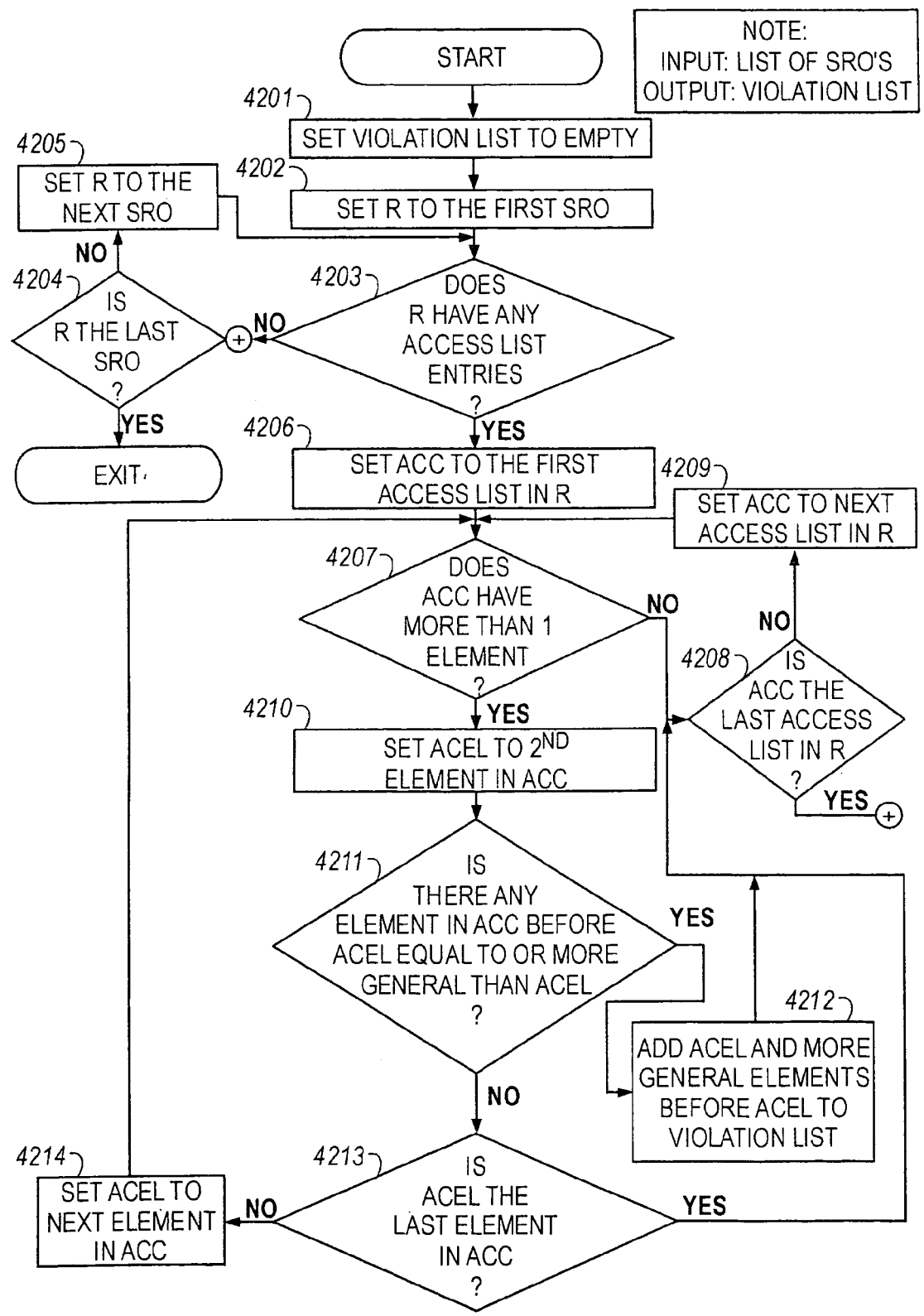
FIG. 42 is a flowchart of the process for determining access list subsumption problems, which is an integrity check applied during the phase shown as FIG. 1D.

FIG. 42 describes another non-routing table integrity check (See FIG. 1D.) This integrity check is responsible for looking at all the routers' access lists to find problems within an access list. An access list is a set of patterns used to filter traffic going into and coming out of a router. Given a destination to filter, an access list will be processed starting at its first element. If the destination matches this first element, then the router looks at the action associated with the element. If the action is a "permit", the destination gets through. If the action is a "deny", the destination is filtered. If the first element does not match, the router goes on to the next element and looks for a match. If processing reaches the end of the access list (and thus there is no match), the destination is filtered. The checks that are depicted in FIG. 42 look at an access list to see if there are two or more elements in the access list where the earlier one is more general than the later one. If that is the case, the latter one will never be reached. This relation is called a "subsumption relation". A high severity error occurs when the two access elements in the subsumption relation have different actions: one says "permit" and the other says "deny". A less severe integrity error occurs when the access list elements in the subsumption relation refer to the same action. The latter case is an issue of efficiency, whereas in the former case, it is probably a problem in which the user did not realize that processing would not reach this more specific entry later in the list.

FIG. 42 illustrates how the process finds subsumption problems in the access lists of the routers. The input to this flow chart is the list of SROs and the output is a violation list, which has the access list element pairs that are in violation. Step 4201 of FIG. 42 sets the violation list to "empty". Step 4202 sets R to the first SRO, that is, to the first router in the list of routers. Step 4203 determines whether R has one or more access lists. If the answer is "no", then there is no need to process this router and the process moves to Step 4204, which determines whether the last router has been reached. If so, the process terminates. If not, Step 4205 is reached, which sets R to the next SRO and then continues at Step 4203. If in Step 4203, router (R) has an access list, then set a variable Acc to the first access list in R, Step 4206.

A router can have one or many access lists. Step 4207 determines whether the access list has more than one element. If it has only one element, then there is no processing because the algorithm is looking for conflicts between two elements. If the answer is "no", move to Step 4208, which determines whether Acc is the last access list in R. If the answer is "yes", then go to Step 4204 and process the next router. If the answer is "no", then set the variable Acc to the next access list in router (R) and then process this access list. If the answer to Step 4207 is "yes", that is, the access list pointed to by Acc has more than one element, then in Step 4210 set AcEL, which will be a pointer to an access element, to the second element in Acc. Step 4211 determines whether there is any element in the access list Acc before AcEL, which is equal to or more general than AcEL. If this is the case, then conflicts have been located. Go to Step 4212 where these conflicts are placed in the violation list. If this is not the case then at Step 4213, determine whether the last element in Acc has been reached. If the last element in Acc has been reached, then move onto Step 4208, which processes the next access list in Router R (if it exists). If the answer is "no" at Step 4213, then Step 4214 sets AcEL to the next element in the access list, and the process continues processing this access-list element.

Each router typically has a routing table for each Level 3 protocol. A routing table is responsible for determining the "next hop" a packet of data must take along the path from its source to its destination. The "next hop" refers to the next adjacent router along the path through the network that the packet(s) will take en route to its ultimate destination. A routing table consists of a set of elements, each having a destination to match against and a "next hop" specification. When a packet enters a router, the router looks in its routing table to find a matching element. If a match is found, then this element indicates the next hop (Note: there could be more than one next hop, meaning that there are multiple choices). It is possible that, for a particular destination, no route is in the routing table. If that is the case, the router looks for what is called a gateway of last resort, which might or might not be set. If it is not set, then the router drops the packet being matched. If a gateway of last resort is set, it will be handled like any other routing table element, which the router will use as a defined "next hop".

Figure 44:
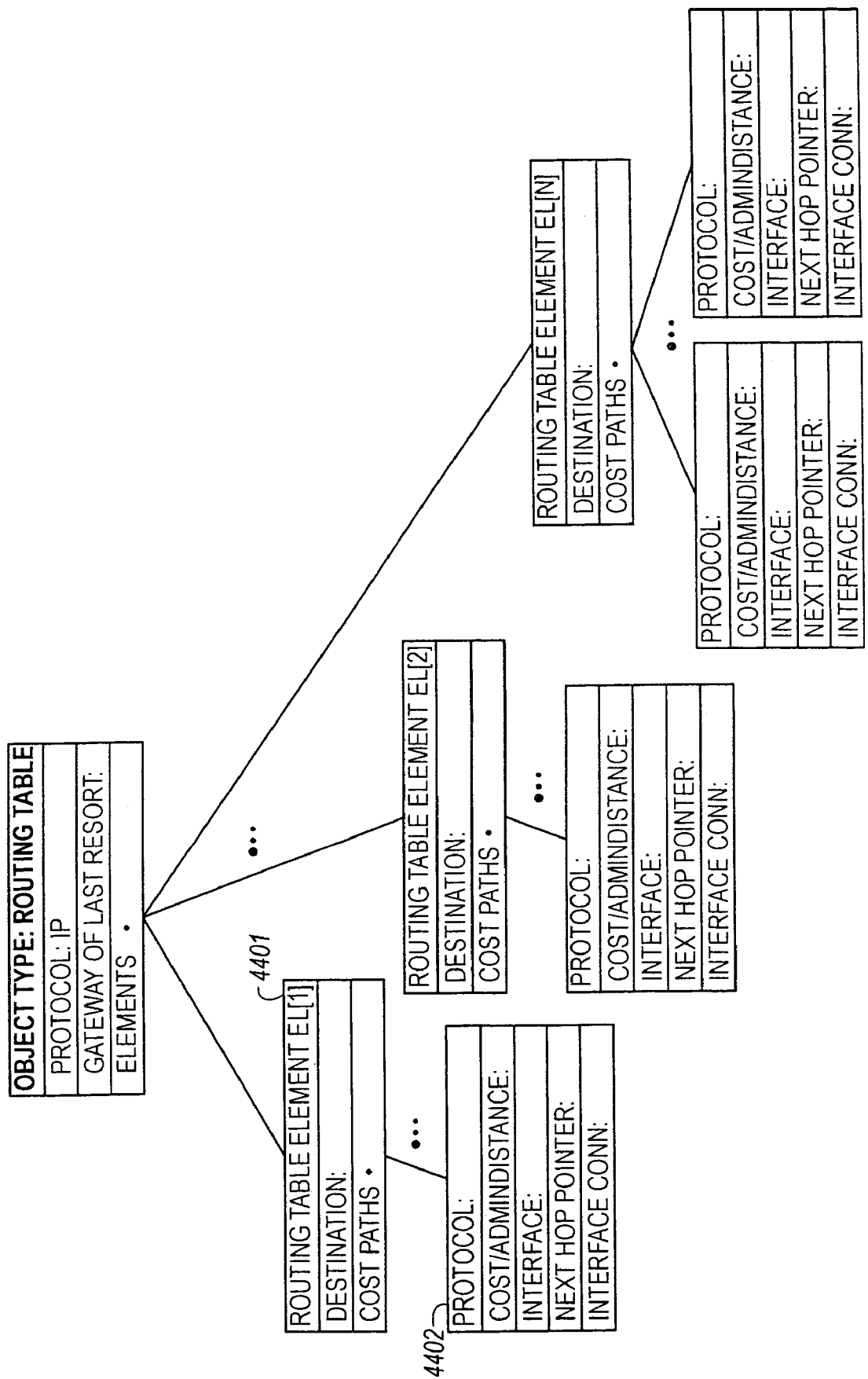
FIG. 44 shows the object data structure of the Routing Table object, which is populated during either of the processes shown as FIG. 1E or F, and becomes input to the process shown in FIG. 1G, which evaluates integrity checks that use routing tables as input.

FIG. 44 shows, in attribute form, a Routing Table Object. For each Level 3 protocol, each router will have a Routing Table Object. In the first field of the Routing Table Object is the Protocol attribute, which is set to IP, IPX, APPLETALK, etc. In the second field is a pointer that is either empty or references a gateway of last resort (which is a Routing Table Element object described below). The last high-level attribute, which contains the bulk of this object, is a set of routing table elements. Each one of these elements mentions a destination and if this destination matches, where to go next.

In FIG. 44, reference numeral 4401 refers to routing table element EL[1], which includes a destination. The different protocols have different ways of describing the destination. For IP, a destination is given by an address and a mask. For example, consider a destination with an address being 10.10.0.0 and a mask being 255.255.0.0. In this context 255 in the mask means pay attention to the corresponding octet, 0 means ignore the corresponding octet. So for example, 10.10.0.0 255.255.0.0 would match anything that starts with 10.10 and any other setting of the last two octets. In general, mask octets can be any number from 0 to 255 and "matching" is decided by applying the mask using bit-wise AND.

The second part of a routing table is an attribute "Cost Paths", which can have one or more elements. Each Cost Path element (see reference numeral 4402 in FIG. 44) contains five attributes. The first is Protocol, indicating the routing protocol that caused the element to be put in the routing table. This attribute can have a number of settings. A routing table element could be present because it is a directly connected interface; or it could be present because there was a static route; or it could be present because it was learned by a dynamic routing protocol such as RIP, IGRP or OSPF, etc. The second field, Cost/Administrative distance, is an attribute that is used in the case of two or more routes being available. When there are two routes, the router tries to determine the best route. The Cost/Admin distance value is a metric that is used for comparison to find the best route. The third field, Interface, tells which port/interface to send a matching packet out of. The Next Hop pointer will be non-empty if the protocol was learned either from a static route or a dynamic protocol and this tells to which next router to send the packet. Lastly, the field, Interface Conn, refers to a connection in the SPT of the corresponding protocol that is attached to the interface identified in the third field.

Recall that cost-paths may have one or more elements. It is possible to have a number of equal cost-paths in which case cost-paths will have two or more elements showing the different ways the router can route the packet.

The routing table data structures can be obtained in two basic ways; these structures can be obtained by reading the routing tables from the live routers in the network (the process shown in FIG. 1E) or by computing them, through simulation, using the integrated SPT/SRO object model as input (the process shown in FIG. 1F). If IP routing tables are being computed then the IP SPT is used; if IPX routing tables are being computed then the IPX SPT is used, etc.

An important benefit of computing routing tables, rather than observing them, is that a simulation using computed routing tables can indicate what happens to the routers under hypothetical failure scenarios enabling a pro-active failure analysis.

The routing tables being used and computed by the invention refer to "steady-state' routing tables. The steady-state routing tables are the routing tables that are produced once the routing process settles. In a live network, the routing tables can converge to a new state when network devices or router ports change in status (i.e., whether they are operational or failed). Routing tables can also converge to a new state when the configuration of the routers or other network devices are changed, new devices are added, or existing ones removed. By saying that the invention is computing steady-state routing tables, we mean to imply that the invention is not computing information about the convergence process, such as the settling time or the number of messages exchanged during convergence.

Focusing on steady state, rather than also the transient states, allows novel efficient techniques to be applied in this invention because the invention can "cut to the chase"; this is in contrast to the live routers running, for example, the periodic distance vector protocols, such as RIP and IGRP, which must do a lot more cycling before obtaining a steady state.

The invention's routing table simulation technique draws on the published specification of the standardized routing algorithms, such as RIP and OSPF, and draws on the vendors' public specification of their own proprietary routing protocols, such as Cisco's IGRP and EIGRP routing protocols, as well as the vendors embellishments and slight modifications to the standardized routing protocols.

The part of the invention that models the published algorithms are separated from the rest of the structure, which constitutes the invention's novel contribution, by defining the functions below, which capture the published algorithm's behavior. These functions below are used for all of the routing protocols being treated.

SEND(RT_EL,RP,<Ro,Po>) is a function computable from Ro's SRO that returns either null if router Ro cannot generate from routing table element RT_EL an update using routing protocol BP and send it out interface Po. Otherwise, this function returns the routing table element that router Ro would send when advertising route RT_EL out interface Po using protocol RP. If SEND(RT_EL,RP,<Ro,Po>) is non-null, then its destination is either the same as RT_EL's destination or more general than RT_EL's destination (in which case we say that it refers to a summarized route). Also, if the value of SEND(RT_EL,RP,<Ro,Po>) is non-null, then the protocol attribute associated with this value will be RP. If the element RT_EL has its protocol attribute set to RP or to Direct Connect (meaning that it refers to a directly connected interface), then we say that SEND(RT_EL,RP,<Ro,Po>) refers to natively sending RT_EL. Otherwise, we say that SEND(RT_EL,RP,<Ro,Po>) refers to redistribution of RT_EL into protocol RP.

The function SEND(RT_EL,RP,<Ro,Po>) embodies the routing update "sending" behavior enabled by the configuration of protocol RP for router Ro, which is captured by the (routing) protocol object in Ro's SRO with Protocol attribute set to RP (see FIG. 2 for the placement of this object in the SRO and a partial view of a routing protocol object). There are many routing protocol configuration commands that impact what routes can be sent out. For example, route filters can be configured for a routing protocol, which consists of references to access-lists that indicate which destinations a routing protocol can send out. Another example is passive interfaces. If protocol RP has a passive interface on interface (i.e., port) Po, then this protocol will not send any updates out of port Po.

RECEIVE(RT_EL,RP,<Ro,Po>) is a function computable from Ro's SRO that returns null if either router Ro is not running protocol RP or Ro will filter or otherwise block element RT_EL in an update from routing protocol RP coming in interface Po. Otherwise, the function returns the routing table element that router Ro will consider putting in its routing table when receiving an update from RP containing element RT_EL.

Suppose that RECEIVE(RT_EL,RP,<Ro,Po>) is non-null and returns RT_EL2. In this case, RT_EL and RT_EL2 can differ in the following ways: i) RT_EL2's and RT_EL's costInfo object's cost/admin distance attributes typically will differ (with RT_EL2's cost/admin. dist typically being larger), ii) RT_EL's Interface attribute will be set to the name associated with Po, iii) RT_EL's Interface_Conn attribute will be set to the SPT connection attached to Po, and iv) Next_hop_pointer will be set to the pointer on the SPT connection associated with the router sending the update (so being more formal would require RECEIVE to take as another argument the sending router).

The function RECEIVE(RT_EL,RP,<Ro,Po>) embodies the routing update "receiving" behavior enabled by the configuration of protocol RP on router Ro (if RP happens to be enabled on Ro). For example, a configuration option that can block the reception of incoming updates is the setting of an input route filter.

COMPARE(CostInfo1,CostInfo2,RP,Ro) is a function computable from Ro's SRO that returns one of the three states: Greater_than, Equal_to, or Less_than. If cost/admin distance of CostInfo1 is less than that of CostInfo2, Less_than is returned; if the cost/admin distance of CostInfo1 is greater than that of CostInfo2, Greater_than is returned; otherwise the two cost/admin distances are equal and Equal is returned.

(Note: For simplicity here we are not presenting the more general form of SEND and RECEIVE used in the invention that is applicable in cases where the router sending the update and the one directly receiving it are not directly connected, such as can be the case for BGP (which can use remote neighbors). The invention generalizes SEND and RECEIVE so that, rather than just taking a port as an input, it can also take an argument that designates the router that is receiving or sending the update).

FIGS. 43A-D depict the process the invention uses to compute the steady-state routing tables for protocol P (e.g., IP, IPX, AppleTalk) given a SPT for protocol P, the SROs it points to, and the operational status of each router, each of its ports, and each of the connections in the SPT. A routing table is computed for each router in the set of SROs given as input. The output routing tables are the steady state routing tables that would be produced by running all the routing protocols that are specified in each routers SRO. The invention's algorithm is applicable when there are multiple routing protocols running on one or more routers. It also handles redistribution between routing protocols; that is, for example, router R1 might learn about a destination through RIP and if it is configured to do so can re-advertise this route if redistribution from RIP into IGRP is enabled. Lastly, the algorithm handles summarization as embodied by the SEND function, which has the property that it returns an output routing table element that can have a more generalized routing table element destination than the input element (to capture summarization cases).

A novel aspect of the invention is that all routing protocols are simulated using a distance vector message passing scheme based on incremental updates, similar as to what is used by EIGRP. This scheme produces the steady-state routing tables that are produced by routing algorithms that use difference methods during their convergence process, such as periodic distance vector (RIP and IGRP), link state (OSPF, IS-IS, and NLSP), and BGP. Also, for IP destinations for all the protocols take both a 32-bit address and 32 bit mask, rather than just a 32-bit destination used by RIP and IGRP. This treatment provides, although, more general than needed for RIP and IGRP are for uniformity in implementation across routing protocols. The advantage of treating all these type of routing algorithms with one type of scheme is that it facilitates a general mechanism for explanation and it makes incorporating a new routing algorithm into the invention much easier to handle.

Figure 43A:
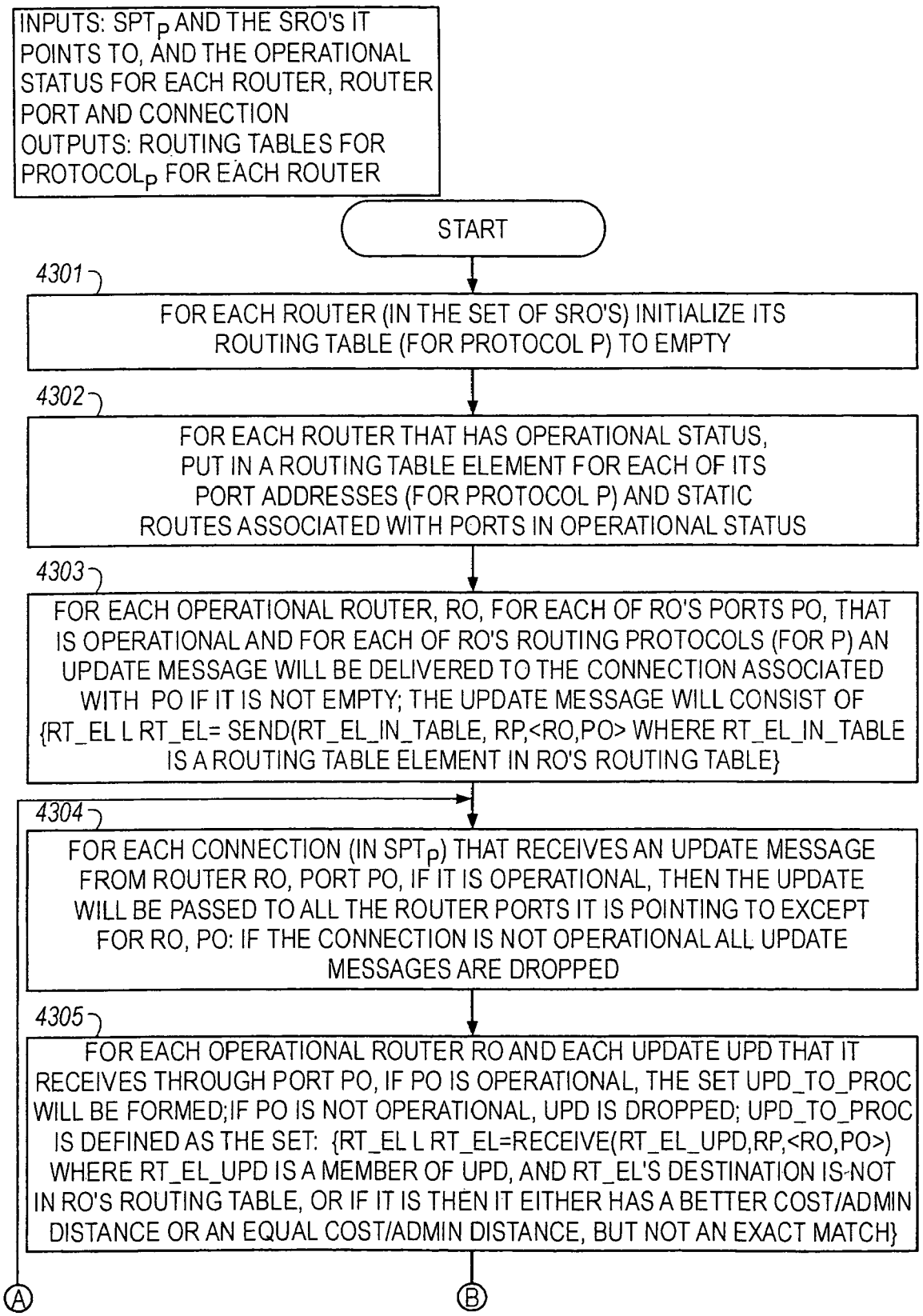
FIGS. 43A-B comprise a flowchart showing the process for calculating routing table elements taking a SPT and SROs as input, which occurs during execution of the phase shown as FIG. 1F. It is an alternative method to capturing live routing tables from the network as shown in FIG. 1E.

In Step 4301 (FIG. 43A) of the "routing table simulation algorithm" shown in FIG. 43A, each routing table (for protocol P) for each router is initialized to empty. In Step 4302, for each operational router Ro, routes (i.e., Routing Table Element objects) corresponding to Ro's port addresses (for protocol P) on ports that have operational status are put into Ro's routing table with Protocol set to Direct Connect (see FIG. 44, point 4402); also each static route configured on Ro (see point 205 on FIG. 2) that is not associated with a failed port, is put in Ro's routing table with Protocol set to Static_to_next hop (note: there are two types of static routes; static routes which mention a next hop address and static routes that mention a router interface; although the invention treats both types, for simplicity, only the static routes to a next hop address are discussed).

In Step 4303, the static and directly connected routes are advertised. For each operational router Ro, each of its routing protocols RP will try to advertise update messages out its operational ports for the static and directly connected routes put in its routing table in Step 4302. The function SEND is used in this step to determine which routes are permitted to be advertised out of what ports (as dictated by each router's configuration as captured by its SRO (from which SEND is computable)).

An update message sent from Router Ro out port Po in Step 4303 is directed (in the simulation) to the SPT connection that is attached to (i.e., points to) router Ros port Po. In Step 4304, each failed connection drops any message it receives, while each operational connection passes the message to each of the other Router/ports attached to the connection.

Step 4305 refers to the process where for each update that an operational router receives, it determines for each routing table element in the update whether it should be processed or discarded. A failed router that receives an update or a router that receives an update through a failed port simply drops the update. The RECEIVE function is used in Step 4305 to determine if a router is configured to receive each routing table element in an update message. In Step 4305, the router is also computing the new cost/admin distance to be used for a received element, which is typically higher than the one it received (this "new cost" computation is embodied in the RECEIVE function); in Step 4305 the router also discards any element where its new cost/admin distance is greater than an routing table element already in the routing table with matching destination. The function COMPARE is used in this step to make this cost/admin distance comparison. The output of Step 4305 is a set of UPD_TO_PROC sets for each router, capturing the update elements that need further processing.

In Step 4306 (FIG. 43B), for each router Ro with one or more UPD_TO_PROC sets, it will add each member from each one of these sets and put it in its routing table, replacing any route previously in its routing table having higher cost/admin distance. If the new route being added matches a route already in the table with equal cost/admin distance, then the resulting table will have multiple (equal cost routes). Another condition mentioned in Step 4305 (FIG. 43A) is not an "exact match"; by this we mean that two routes have exact same destinations, cost/admin distances and in addition match on the other attributes, such as Interface (see FIG. 44 point 4401) (Note that for simplicity here we just present an algorithm that allows multiple routes that have equal cost/admin distance; this is easily generalized to handle multiple routes where the costs may differ, a possibility for example, when using Cisco's IGRP variance command).

In Step 4307, each UPD_TO_PROC set is examined to look for and remove any routing table element that when put in is an "equal cost/admin distance" route, that is a route that matched an existing destination and has equal cost/admin distance. The reason for removing these elements is because in the next step these "incremental changes" will be sent out and it is not necessary to send out an incremental change corresponding to a new, but equal cost/admin distance route.

In Step 4308, the "incremental updates", which are in the UP_TO_PROC sets will be advertised both through the native protocol associated with each element in a UPD_TO_PROC set and by redistribution. The SEND function is used in this step to determine which advertisements and redistributions are permitted by the configuration. Consider an element EL in a UPD_TO_PROC set for router Ro. For the protocol RP associated with EL, SEND(EL,RP,Ro,Po) will be non-null only if the router Ro is configured to natively send EL (using protocol RP) out Po. For a routing protocol RP_X different from El's protocol, SEND(EL,RP_X,Ro,Po) will be non-null only if the router Ro is configured to redistribute from EL's protocol to RP_X and send it out port Po. Like Step 4303 (FIG. 43A), Step 4308 will only send updates out operational ports.

Step 4309 checks whether any updates are sent in Step 4308; if not then the process terminates; otherwise the algorithm loops back to Step 4304 where the new updates are processed.

Figure 43B:
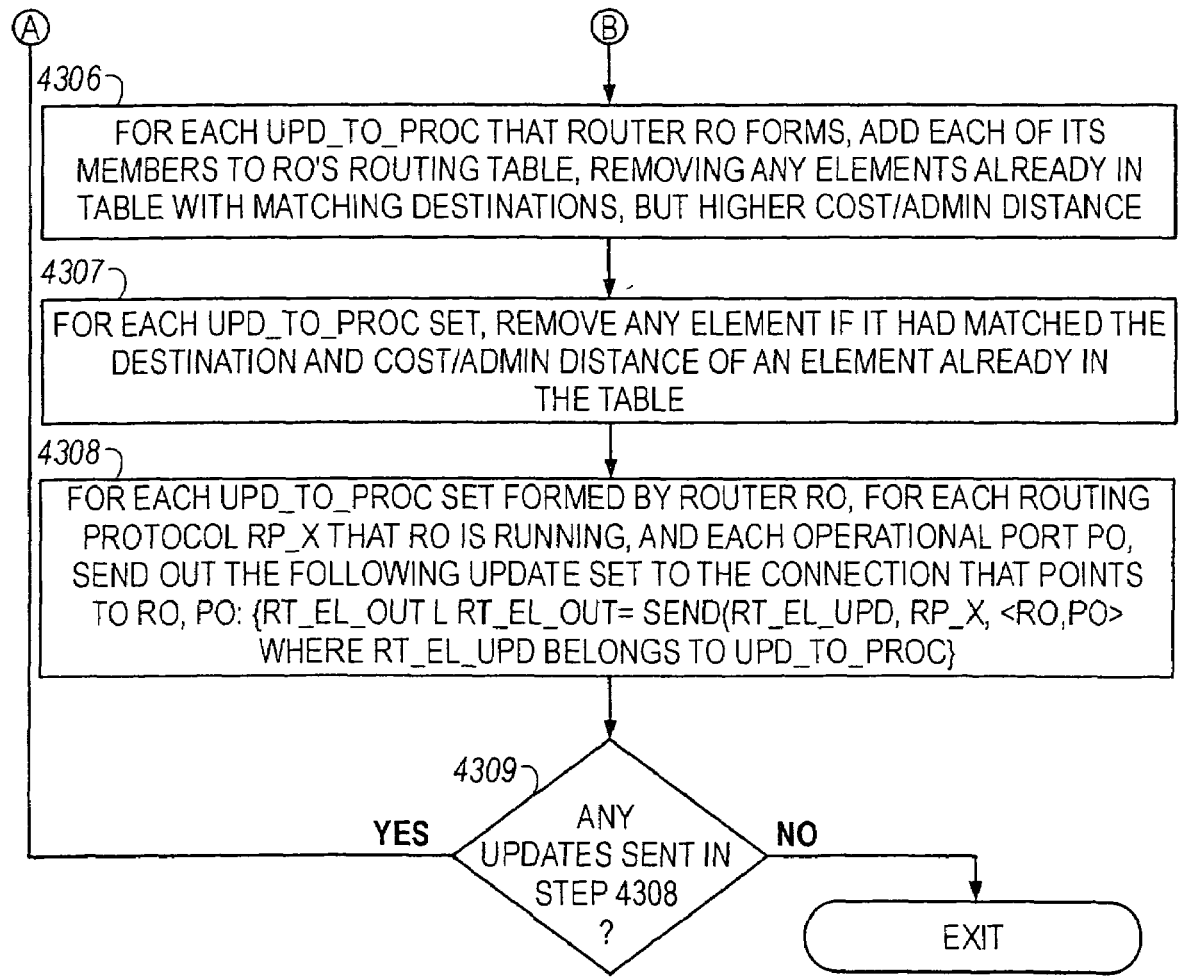
Figure 43C:
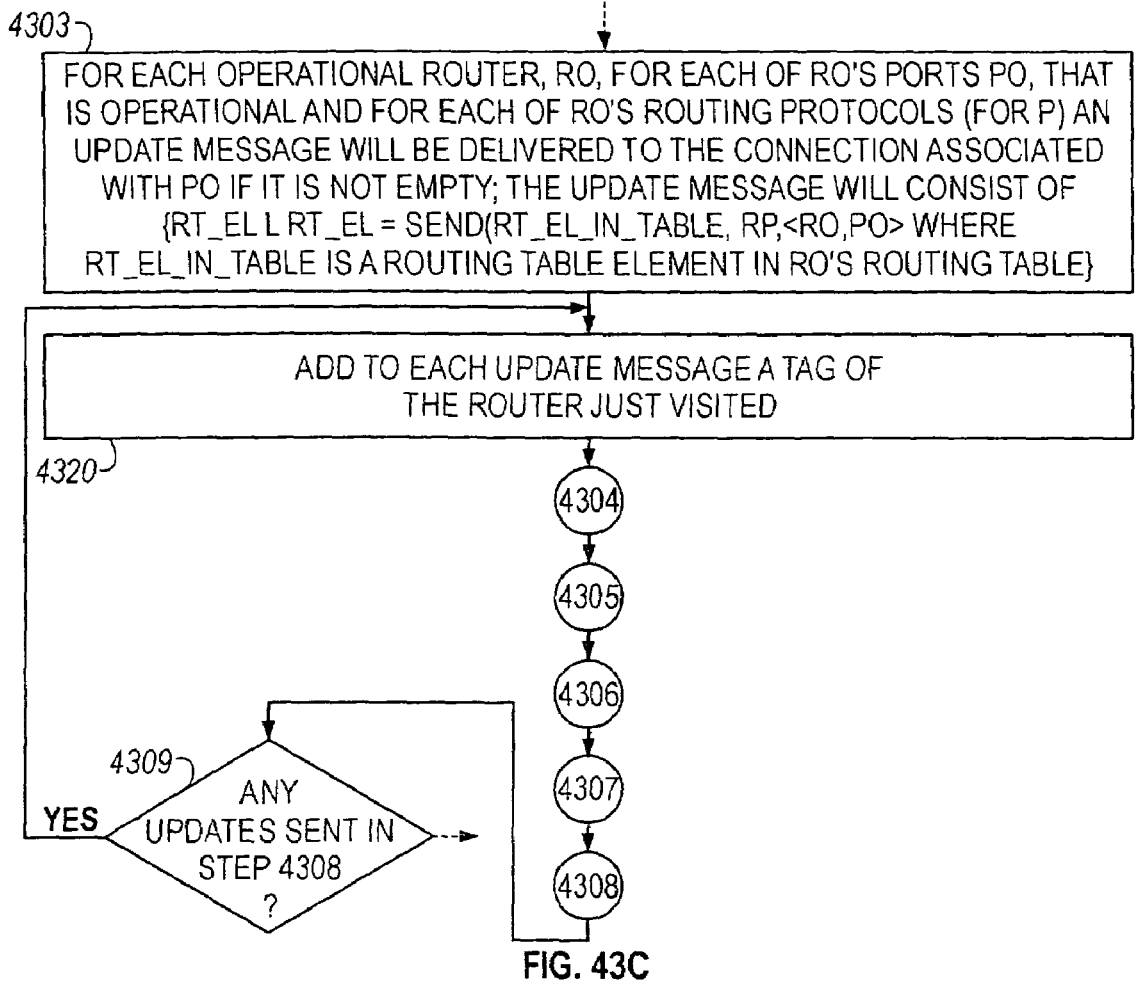
FIG. 43C shows the first modification made to the process shown in FIGS. 43A-B to efficiently handle loops encountered while creating routing tables.
Figure 43D:
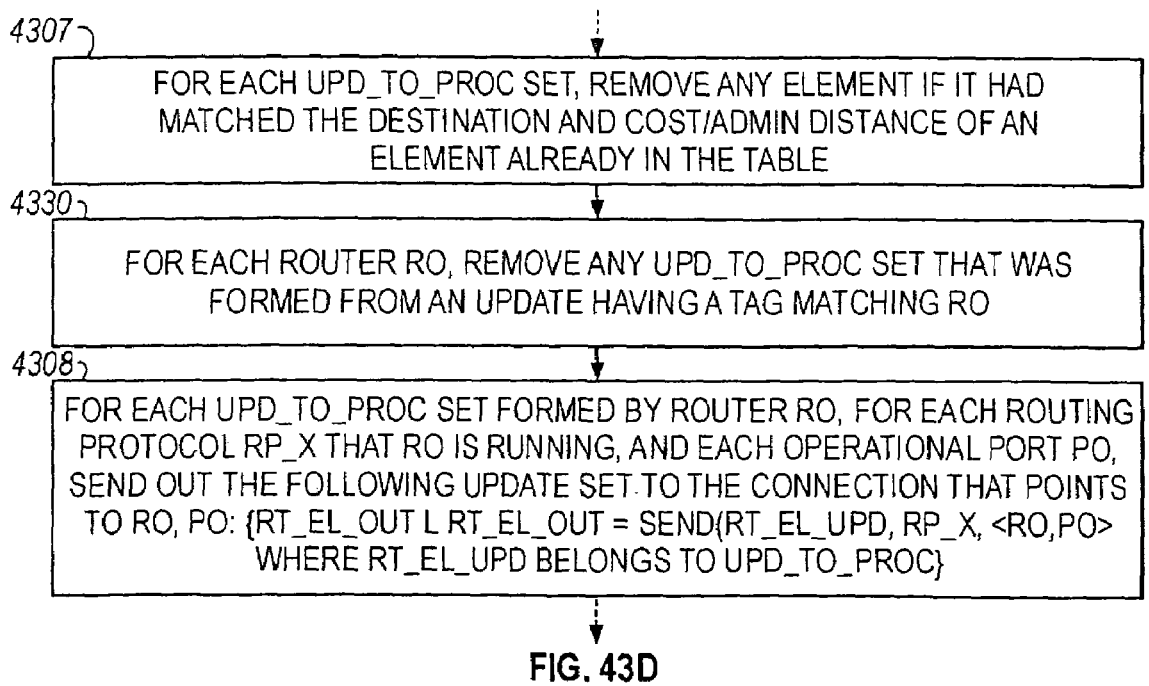
FIG. 43D shows a companion modification to that shown in FIG. 43C that efficiently handles loops encountered while creating routing tables.

FIGS. 43C and 43D show grafts onto the algorithm in FIG. 43A-B for additional processing that efficiently handles loop conditions; as an update is passed from router to router, the update is tagged to produce the list of routers that the update has visited. The tagging is done in Step 4320 shown in FIG. 43C, which is inserted between Steps 4303 and 4304 of FIG. 43A. Before a router sends out an incremental update, it checks if the update is in a loop; if it is, then it is dropped. FIG. 43D shows this process as Step 4330, which is inserted between Steps 4307 and 4308 of FIG. 43B. The reason for "cutting off loops" at this point, rather than earlier, before Step 4305 when an update first reaches the router, is we want to leave the routing tables in a "loop state" so that it can be picked up by the "Routing Loop" Integrity Check, shown in FIG. 66.

A novel aspect of the invention's steady-state routing table computation is that it contains a number of kinds of routing loops. It is possible to configure the live routers so that they produce persistent, periodic, or transient routing loops for different destinations. Routing loops that result after the procedure in FIGS. 43A-D terminates can be of any of these three types. By having an integrity checkpoint out all these type of loops, the user can then look at the live routers to judge the severity of the problem. Clearly, persistent routing loops are the most severe and the transient loops are least severe. The severity of periodic routing loops depends on the frequency that the routing table destination is in "loop state" versus a non-loop state and whether the non-loop state results in correct routing or a no route condition. Many times, for periodic routes, the user may not be aware because he or she may poll the table while in a good state. Thus, knowing about loops, which can be periodic, is valuable diagnostic information (note: to be formally strict here, in the real routers there may not be a "steady-state" condition for some routing destinations, such as those involved in a periodic routing loop; for this particular case, our algorithm presents one of the cases, in the steady-state routing tables.)

Another novel aspect of the invention stems form the fact that in some cases, the simulation "fleshes out the non-determinism" found in the live routers. For example, the actual routers can be configured to keep only up to two equal cost paths for each destination. If there happens to be more than two equal routes, two of them will be arbitrarily chosen. In contrast the invention can find all the equal cost paths to a destination D and show them all, reporting "two out of the following X paths will be chosen to destination D."

Another contrast between the invention and live routers is that the invention exploits the fact that in its simulation model all the routers' models are in the same memory space, as opposed to a live network, where each router has its own memory space. For example, Step 4309 in FIG. 43B is a question that could be asked only if the routers where in the same memory space. It is a question that looks at global convergence.

Recall that the processes in accordance with the invention have the ability to either import routing tables from the live routers or to calculate the routing tables based on information in the SROs and SPTs. In either case, once the routing table objects are populated, there are a number of integrity checks that can be applied. To see where in the overall process of the invention these routing table integrity checks are applied, refer to FIG. 1G.

Before describing how the particular integrity checks operate, there are some preliminary concepts that need to be discussed. The routing tables are used by the routers when they receive a packet. When a host wants to forward a packet to another destination it will send it to its neighboring routers and that router, if it has a routing table element, will send to a next hop router en route to a final destination. In this process, the routers will send packets of data from hop to hop until they reach the destination. In a sense, given a set of routing tables, they implicitly define paths through the network going from a source to a destination. A concept that we'll define here is the notion as to whether given a source address and a destination address there is a path that exists throughout the network, and if there is, what path will be taken. In a case where multiple paths can be taken, what are these multiple paths.

FIG. 45 shows an example network that shall be used for explanation. In this example, there are five routers, R1 through R5. R1 and R2 are connected through an Ethernet (Conn[1]). R1 is connected to R3 through a serial link (Conn [2]). Router R2 is connected to Router R4 through a serial link Conn[3]. R3 and R4 are connected through an Ethernet (Conn [4]). R5 is isolated. It is just connected to an Ethernet (Conn [5]). Source Addresses and Destination Addresses, SA and DA1 are respectively source and destination addresses on Conn[1], DA2 is a destination address on Conn[4] and DA3 is a destination address on Conn[5]. (Note: When we say source and destination address that is an arbitrary distinction. We say source address because it is used as a source in our example and destination address because it is used as a destination in our example.)

Continuing in FIG. 45, the output for the analysis, which given a source address and destination address shall be called herein a "Completed Path Set." A Completed Path Set (CPS) will be empty if there is no path from SA to DA (where SA refers to the source address and DA refers to the destination address). If CPS has one element that means that there is one path from SA to DA and if it has more than one element there are multiple paths between the source and destination. For the example network, suppose we are considering a CPS (a Completed Path Set,) for a path from source address SA to DA2. In this case, there will be two paths, one of them that starts at SA and goes to Conn[1], R1, Conn[2], R3, Conn[4] and then gets to the destination DA2. The second path starts at SA, goes to Conn[1], R2, Conn[3], R4, Conn[4] and then to DA2. If on the other hand, we are interested in a CPS where the source destination is SA and the destination address is DA1, (this is a case where the source and destination are on the same subnet), there would be one path; from SA to Conn[1] to DA1. An example where there is no path is if a packet is to go from SA to DA3. In this case, CPS would be represented as an empty set.

Figure 46A:
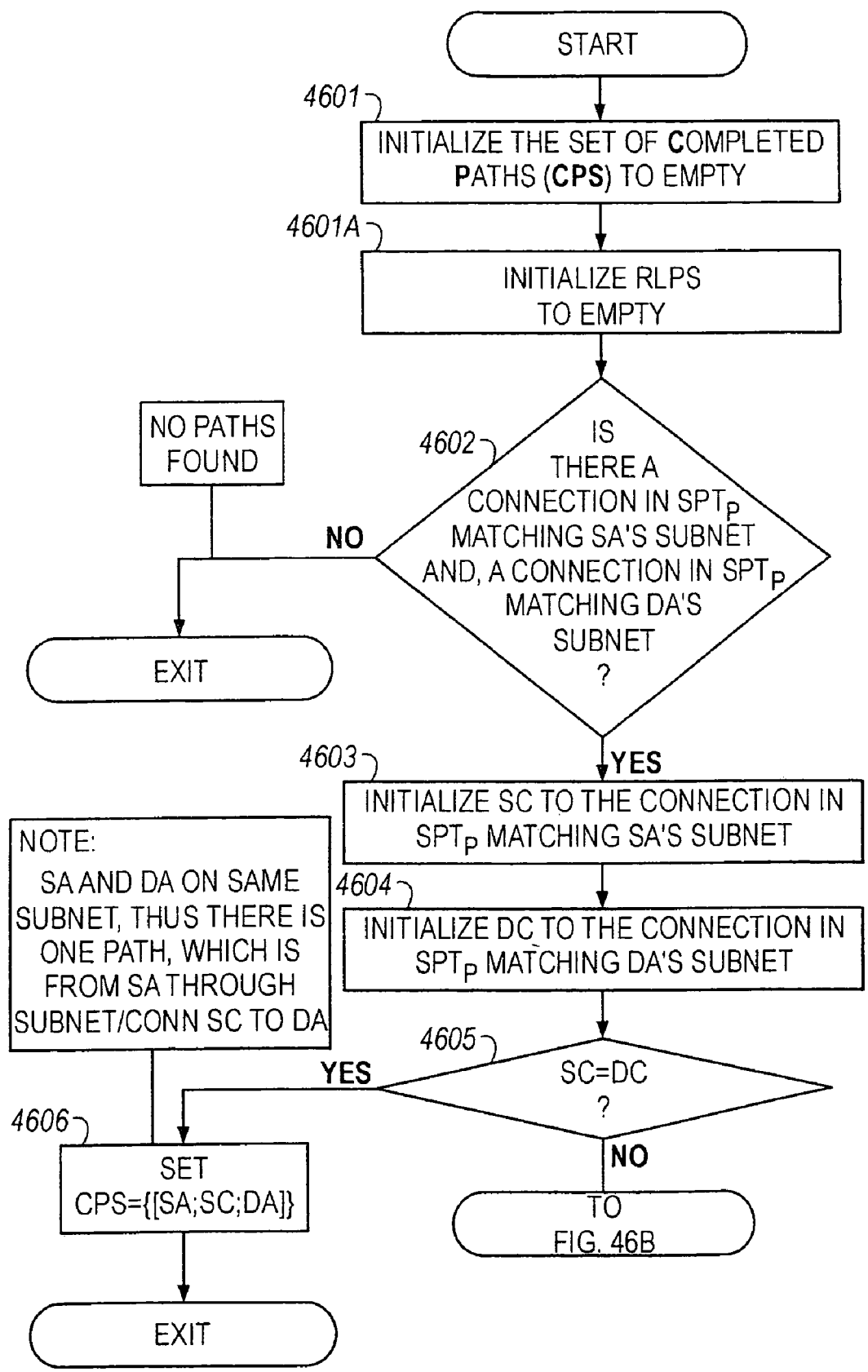
FIG. 46A-C comprise a flowchart that describes the process of finding paths from a Source Address to Destination Address, which is used as a subroutine as part of the phase shown as FIG. 1G.
Figure 46B:
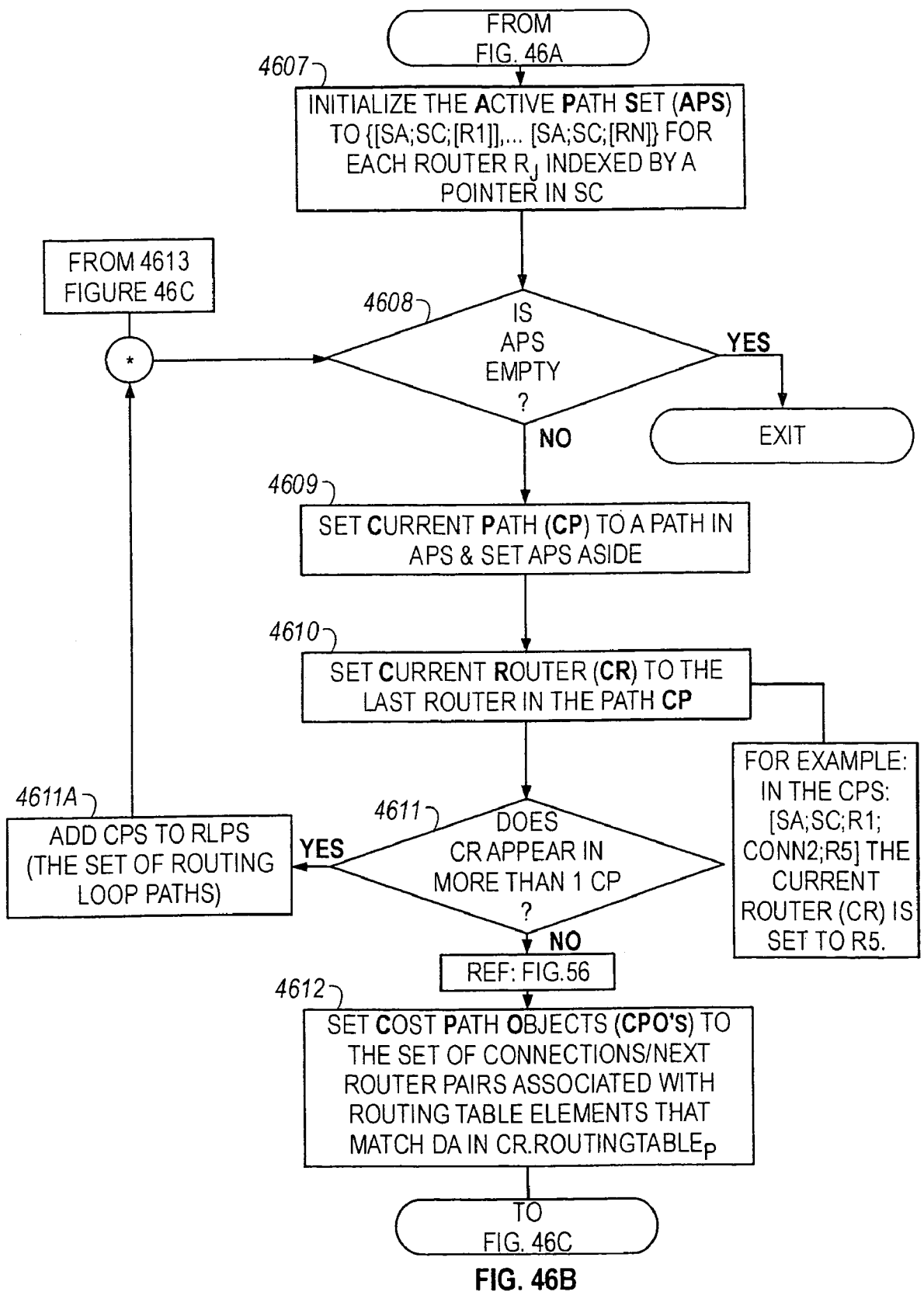
Figure 46C:
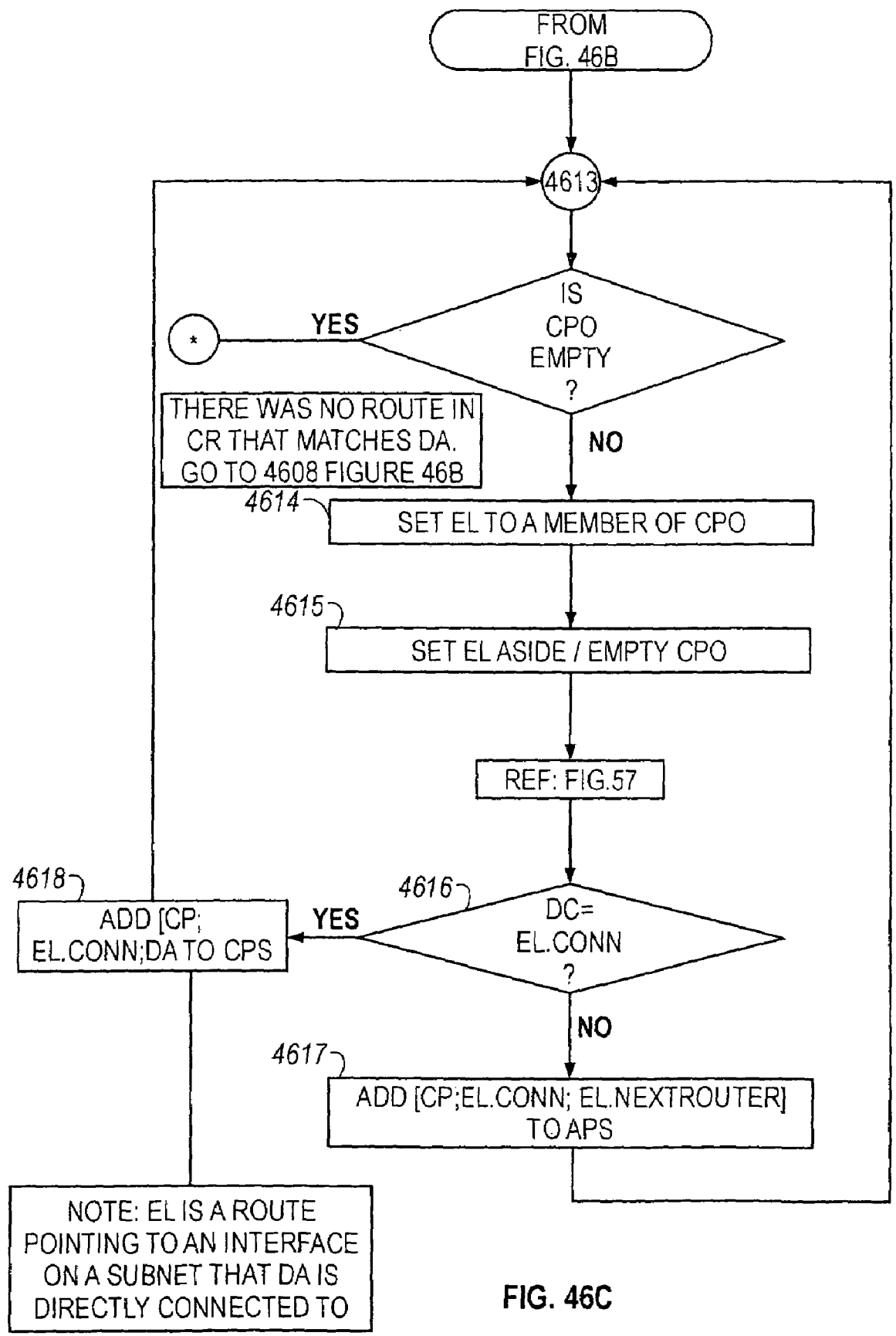
Figure 48:
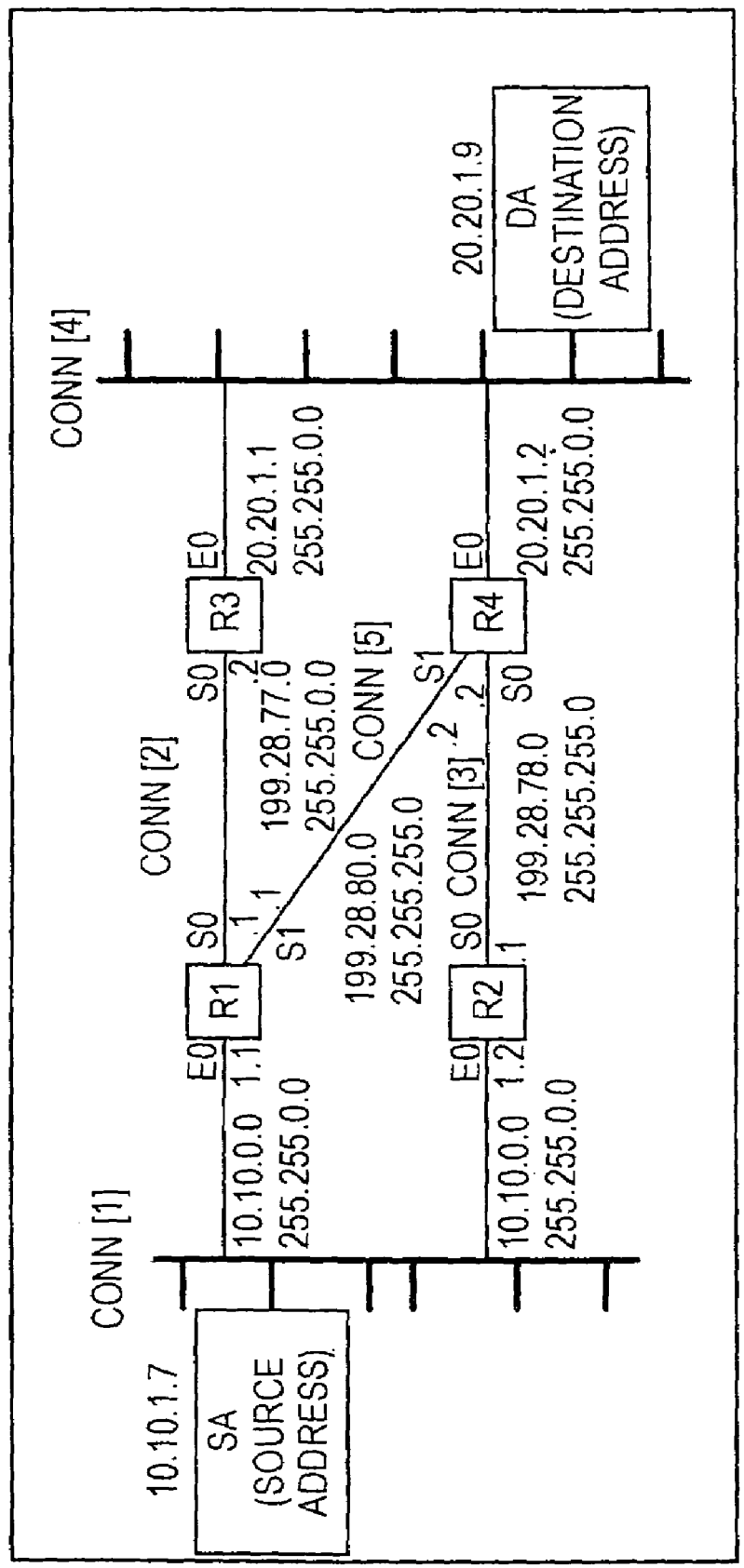
FIG. 48 is a hypothetical network topology map annotated with port designations and subnet addresses to be referenced in subsequent FIGS. 49 through 53A-G.
Figure 49:
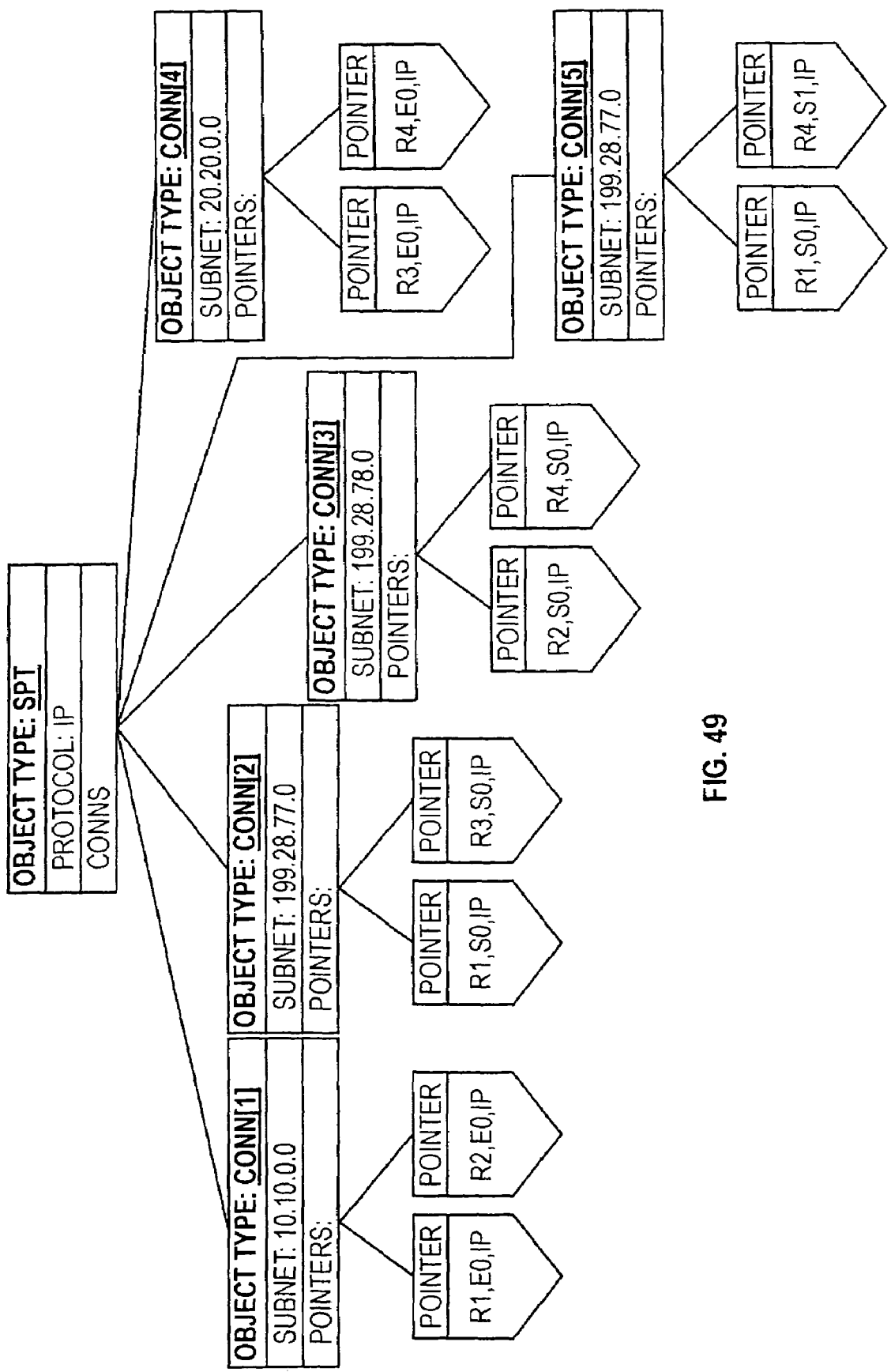
FIG. 49 shows a SPT object data structure corresponding to the topology shown in FIG. 48.

FIGS. 46A-46C depict a flow chart that the invention follows to produce a CPS, a completed path set, given a source address and a destination address. A novel aspect of this procedure is that it identifies multiple paths between source and destination and is performed off-line. This is in contrast, for example, with Cisco Systems Path Tool, which is an on-line tool that only identifies the current path, not all the possible ones. An advantage of knowing all the paths is that the current one might be working while another possible path, which can be chosen at a later time, might have problems. The best way to present this is a walkthrough of a particular example. Refer to FIG. 48, which is a generalized block diagram of a network very similar to the one in FIG. 45, but with an added link, the link labeled Conn[5] between R1 and R4. Also, the router R5 in FIG. 45 is omitted. The reason for including this link is to show what happens in the case of a routing table element with multiple paths. In this example, a CPS will be produced in which the source address is SA and the destination address is DA. The input to the process of FIGS. 46A-C is the SPT for the protocol under consideration. In this case, it is an $SPT_{IP}$. FIG. 49 shows the $SPT_{IP}$ that corresponds to FIG. 48.

Figure 50:
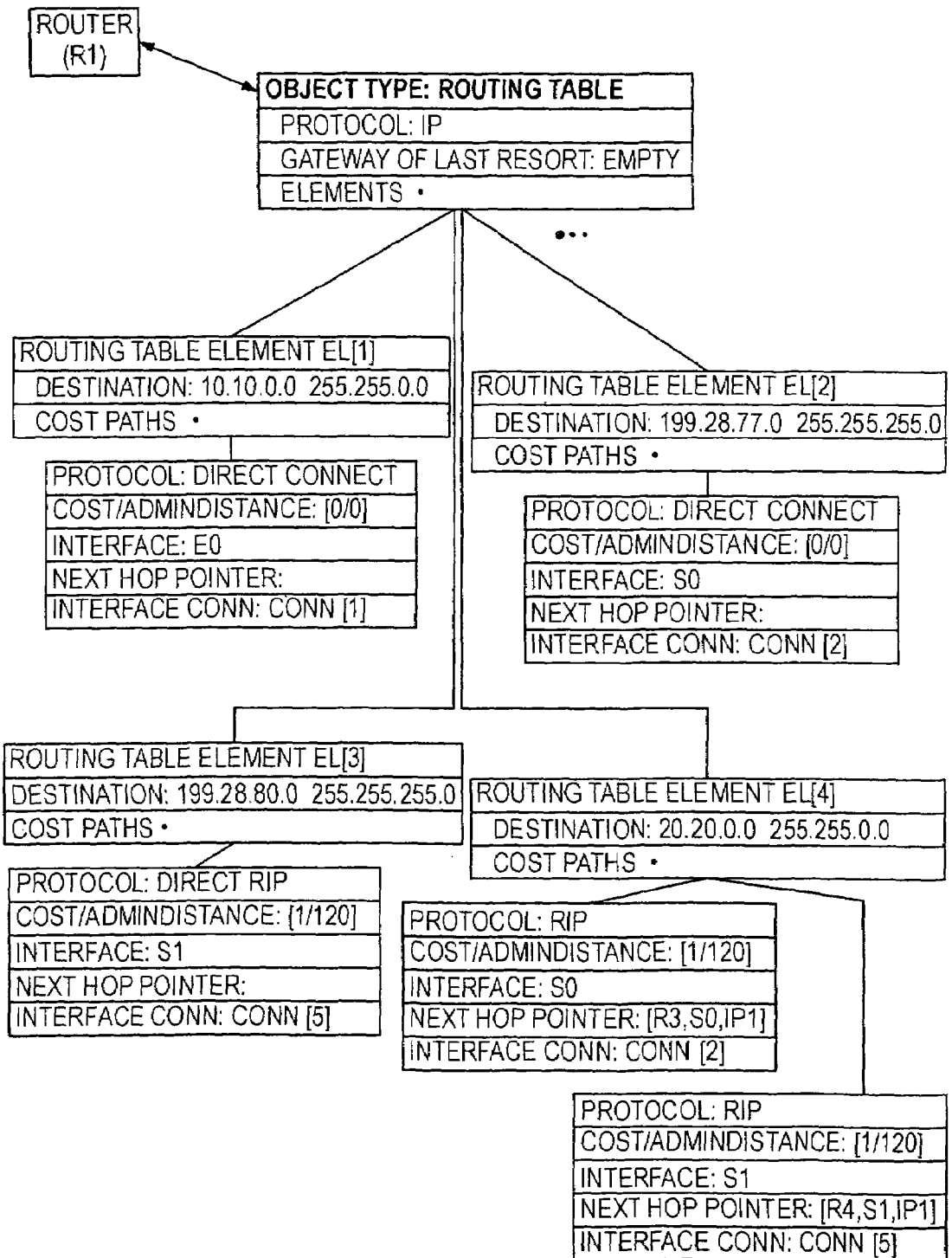
FIG. 50 shows part of a routing table object data structure for router R1 in FIG. 48.

FIG. 50 shows the IP routing table for router R1. The element labeled EL[1], has destination 10.0.0 255.255.0.0. It has one cost-path, which corresponds to the fact that it is directly connected. Routing table element EL[2] corresponds to destination 199.28.77.0 255.255.255.0 and is also directly connected and corresponds to interface S0. Element EL[3], like elements EL[2] and element EL[1], corresponds to a directly connected interface. Element EL[4] is the only element out of the four that corresponds to a route that was dynamically learned. This corresponds to destination 20.20.0.0 255.255.0.0. There are two cost-paths in the example, showing that there are two different ways to leave the router if a packet matches this element. The Cost Path element on the left indicates it was learned by RIP; it has a cost/administrative distance of $\frac{1}{120}$, and its interface is S0. The next hop pointer is to router R3, S0 and its interface connection is Conn[2]. The second cost-path object is also learned via RIP and has the same administrative distance as the first cost-path. This object specifies output interface S1, rather than S0. Its next hop pointer is R4,S1 and its interface connection is Conn[5].

Figure 51:
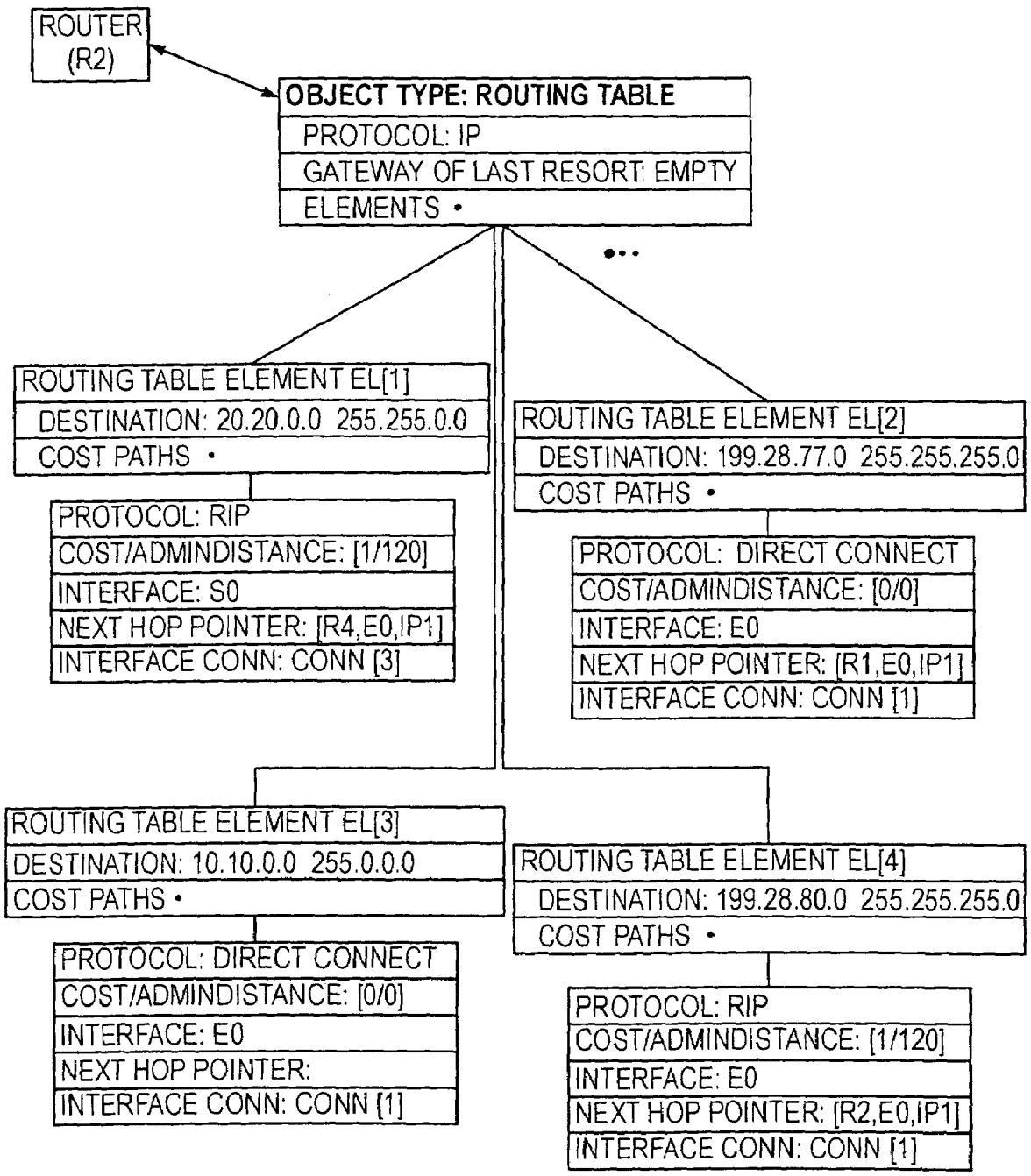
FIG. 51 shows part of a routing table object data structure for router R2 in FIG. 48.
Figure 52A:
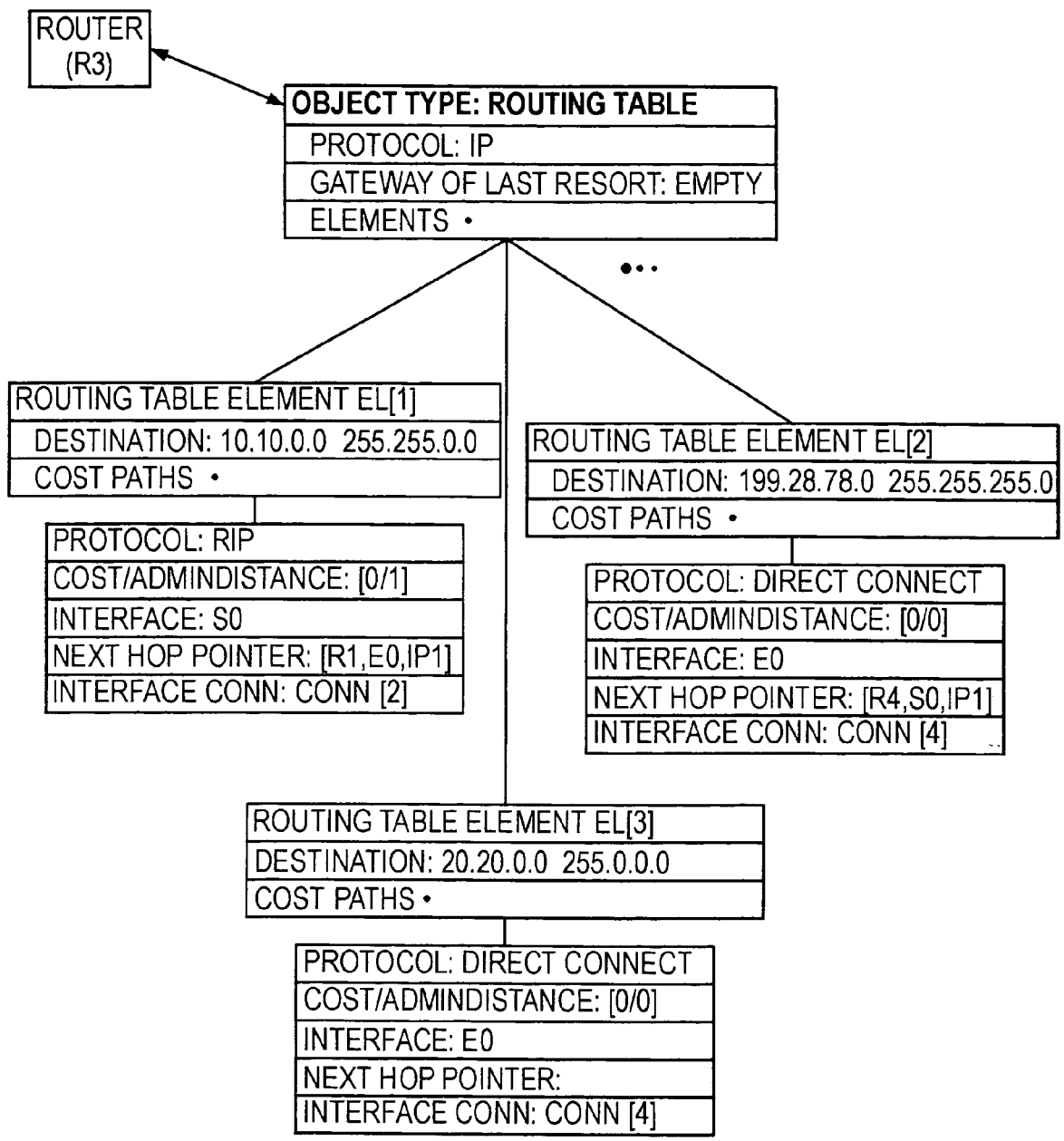
FIG. 52A shows part of a routing table object data structure for router R3 in FIG. 48.
Figure 52B:
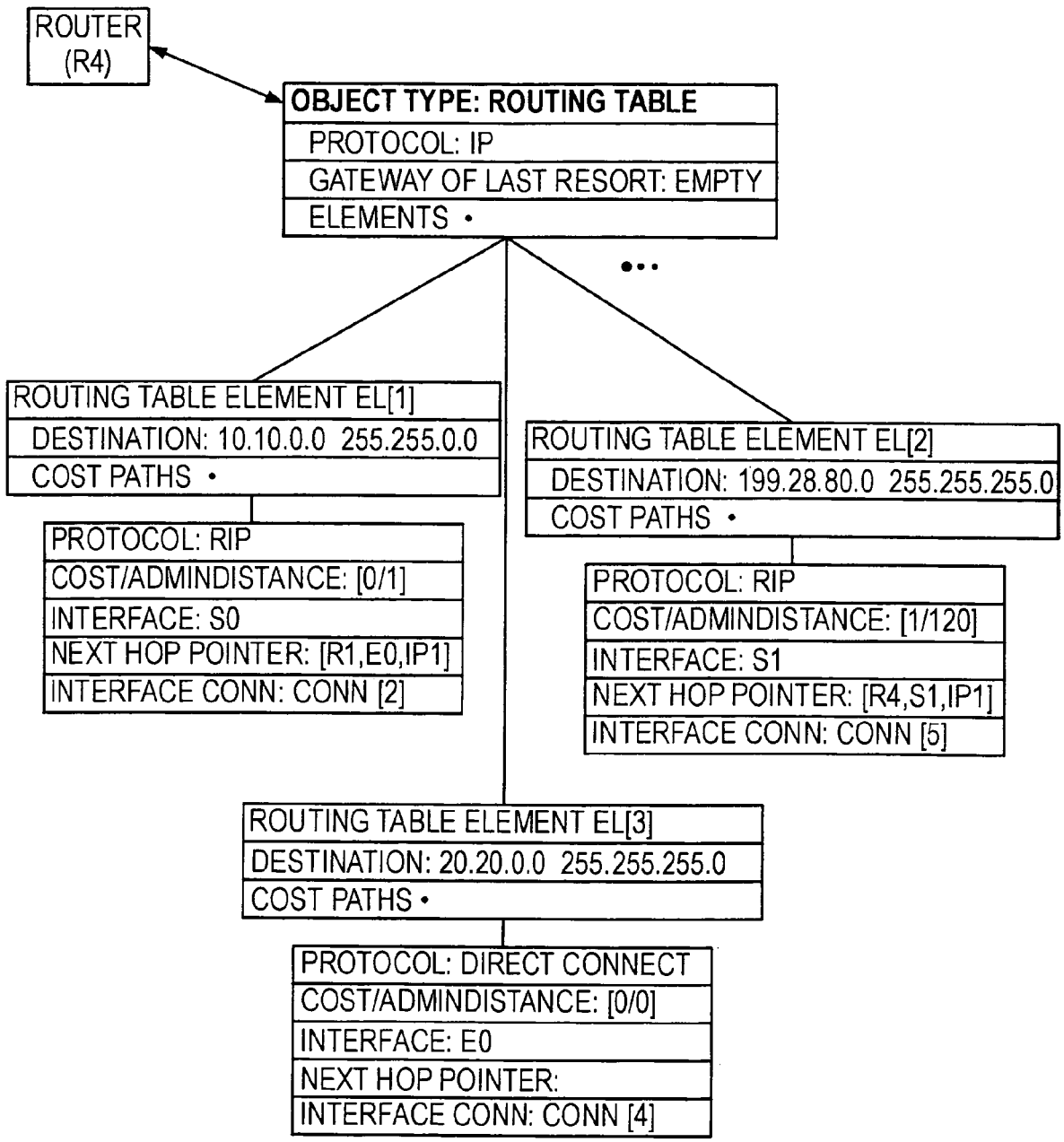
FIG. 52B shows part of a routing table object data structure for router R4 in FIG. 48.

FIG. 51 shows an IP routing table object for R2. FIG. 52A shows an IP routing table object for R3 and 52B shows an IP routing table for router R4.

Figure 53A:
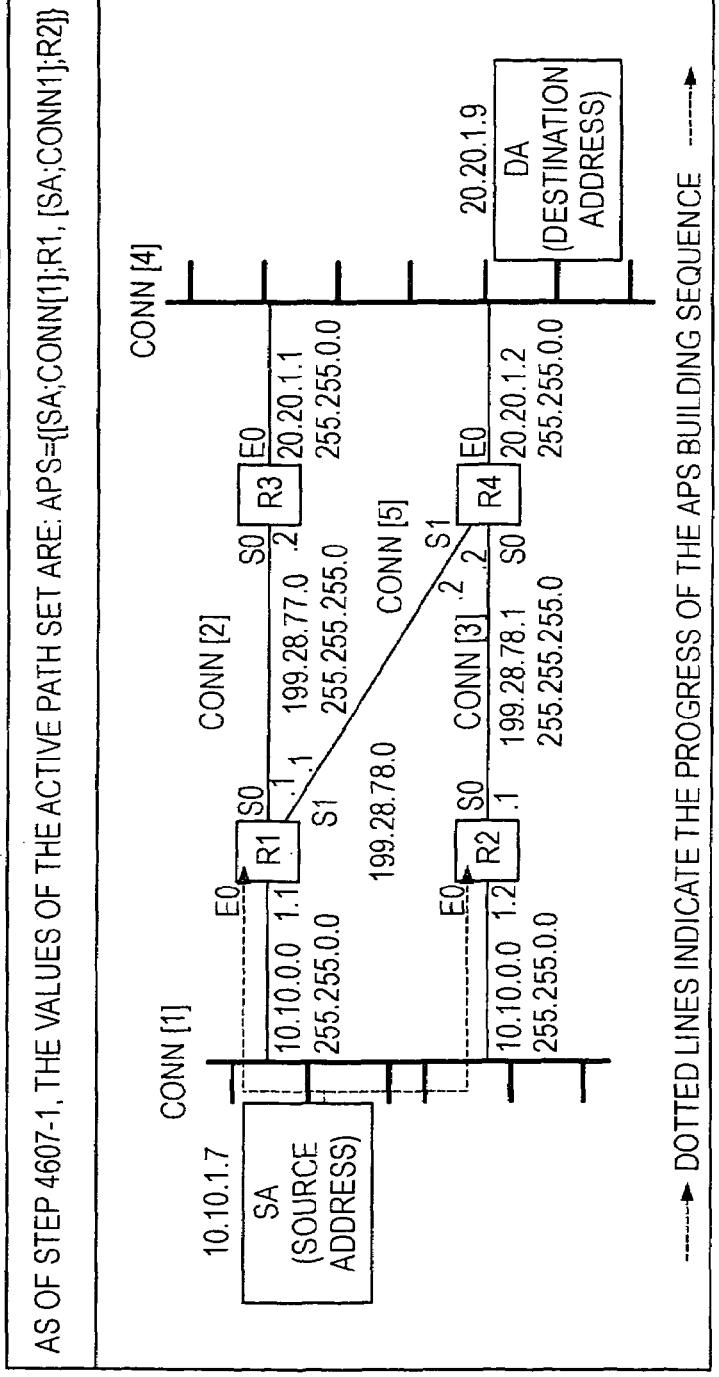
FIGS. 53A-G show a step-by-step walk-through of the flowchart in FIG. 46A-C (a flowchart for finding Paths between Source Address and Destination Address) using the topology illustrated in FIG. 48 as the example's input.

The flow chart in FIGS. 46A-46C shall be described in the context of the example by going through the walkthrough in conjunction with FIGS. 53A-53G. Reference numerals depicting the steps of FIGS. 46A-C for the walkthrough of FIGS. 53A-G are appended with dash numbers to distinguish iterations of steps. Starting in FIG. 53A refer to reference numeral 4601-1, which indicates that in Step 4601 of the flowchart in FIG. 46A the output produced is the CPS, is set to "empty". Step 4602 determines whether there is a connection in the $SPT_{IP}$ (Note: in this example, P is IP because the example looks at a destination address and source which are both IP). The answer in this case "yes", shown at 4602-1 (FIG. 53A). If this was not the case, which meant that the source and destination were on subnets that the object model did not have and consequently the analysis could not proceed. If the answer is "yes", for convenience, at Step 4603 the variable SC is set to the connection in the SPT, which matches SA's subnet. So for this example SC is set to Conn[1] because SA is directly connected to the Ethernet labeled Conn[1], shown at step 4603-1. Step 4604 sets DC (which is a variable referring to the destination's Conn) to the subnet matching DA; in this case it is Conn[4] because DA is directly connected to Conn[4], shown at 4604-1 (FIG. 53A). Step 4605 determines whether SC equals DC. In other words, are the source and destination on the same subnet? If that is the case, go to Step 4606 and return a CPS with one element where the path is from SA, to the shared connection, to DA, a very simple path. If the answer is "no", which is the case in this example, shown at 4605-1 of FIG. 53A, go to Step 4607 (FIG. 46B) and initialize a variable called APS (for "active path set") to the path that is being constructed. In this case, there are two paths in progress. The first one starts at SA, goes to Conn[1] and to router R1, and the second one goes from SA to Conn[1] to router R2, shown at 4607-1 of FIG. 53A. In general, at Step 4607, the procedure puts in as many elements as there are routers connected to the source's subnet.

In FIG. 53A, we show the progress of APS, which are paths that are incrementally building. So in this example, we can see that we have two paths shown by the dotted lines that both start at SA and one that ends at R1 and the other that ends at R2. As the process proceeds, it will be picking one of the elements in this set to extend by a hop and then puts it back in APS unless it gets to its destination the router that drops the packet or is involved in a routing loop.

Figure 53B:
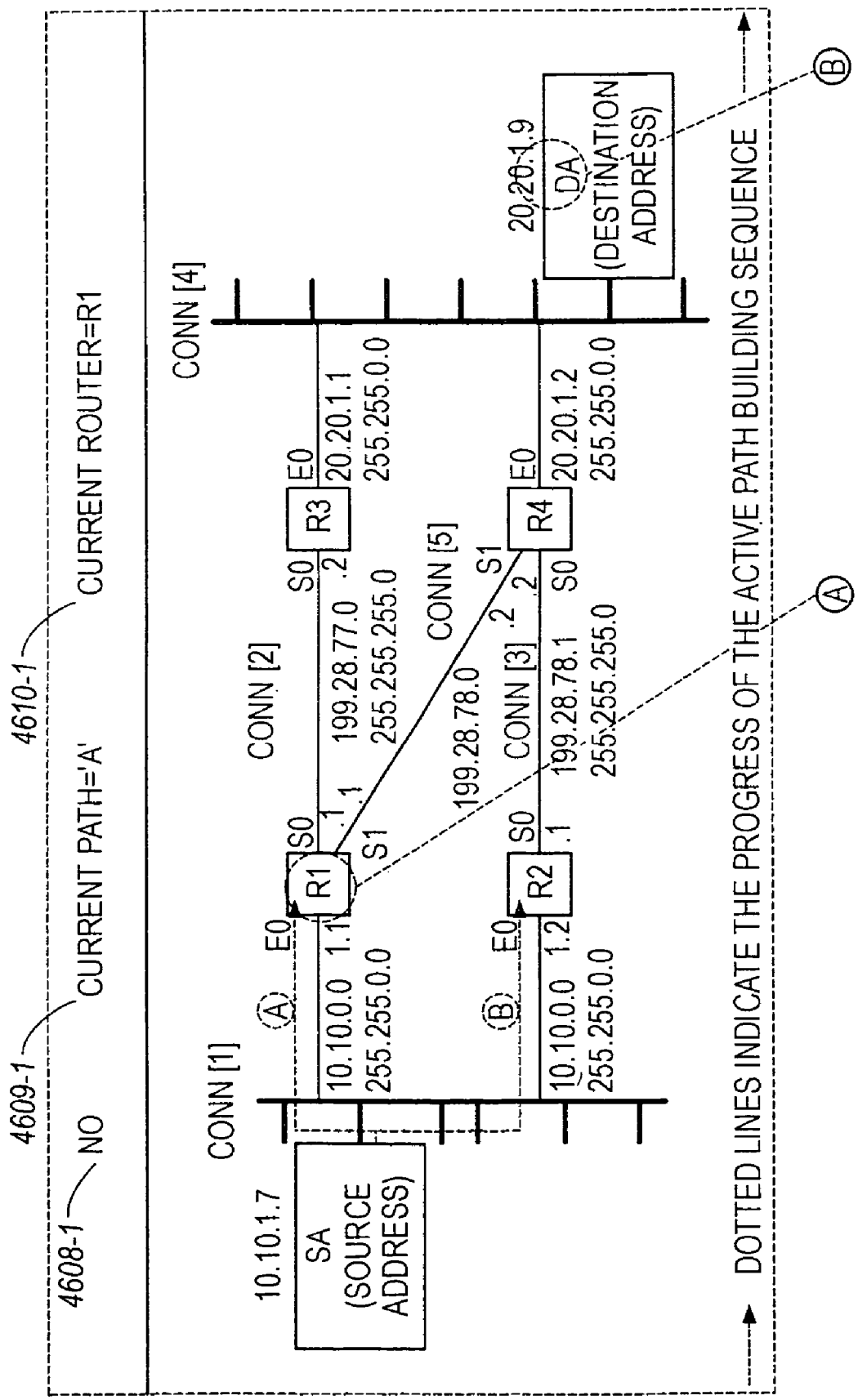
Figure 53C:
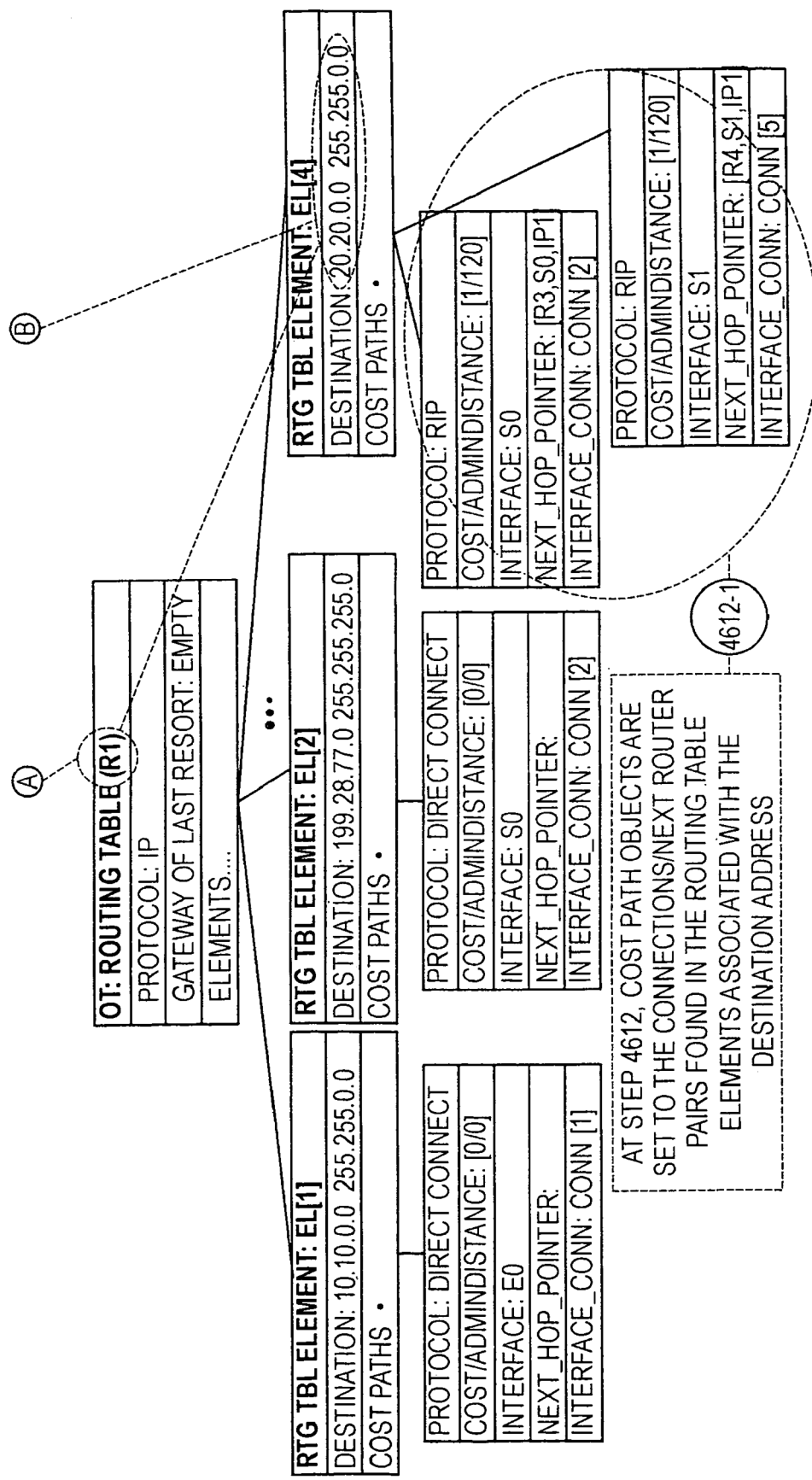

Now refer to FIGS. 53B-C, and more specifically to the reference therein to Step 4608-1 (from step 4608 of FIG. 46B), which determines whether there are any elements (active paths) in APS. If it is "empty", the process terminates. If it is not empty, as shown at 4608-1, then proceed to Step 4609. In this case, since the ADS has two elements, proceed to Step 4609. Step 4609 sets the variable CP (for "current path") to one of the elements in APS and removes this element from APS. In the example, CP is set to the first path, which goes from SA to Conn[1] to router R1, shown at 4609-1 of FIG. 53B. In Step 4610, for convenience we are letting the variable, CR (for "current router"), refer to the last router in the path CP. In this case, the current router is R1 since there is only one router in the path, shown at 4610-1. In Step 4611 we ask, "does CR appear in the path more than once?" This is a check to see if we are in a routing loop and to protect this procedure from being in an infinite loop. If CP refers to a loop, we add CP to the set of routing loop paths and proceed by going back to Step 4608 to see if there are any more paths to process in APS. If there is no loop, we go to Step 4612 where we set a variable called CPO, standing for the Cost Path Objects, to the set of Cost Path objects associated with a routing table element that matches the destination address in the current routers routing table for the applicable protocol; IP in this case. If there are no elements matching DA and no gateway of last resort, CPO is set to null.

Figure 47:
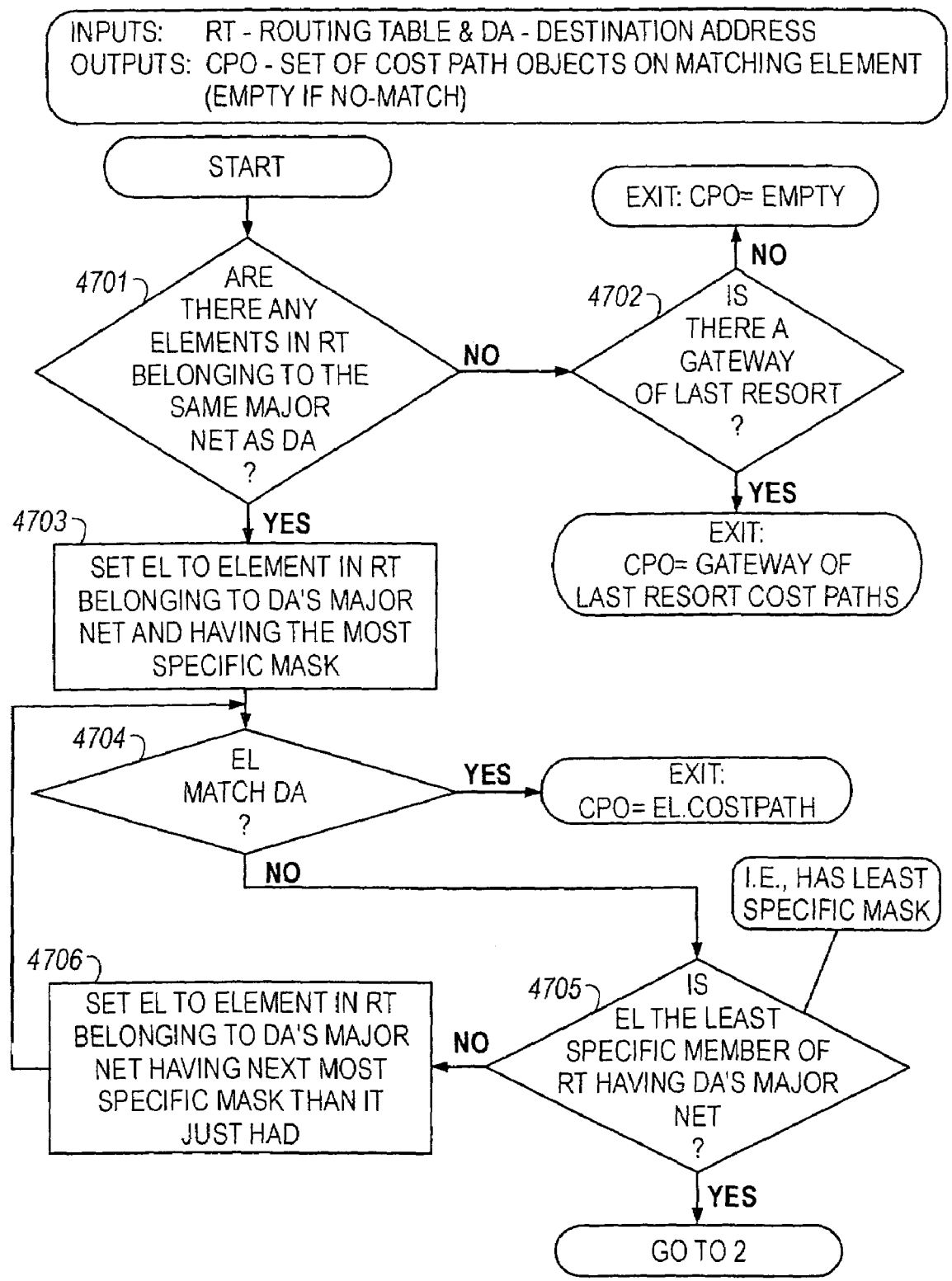
FIG. 47 is a flowchart of the subprocess of matching routing table elements per FIG. 46B Step 4612.

The bottom of FIG. 53C shows the cost paths that are set to CPO in Step 4612, shown at 4612-1. These are the two cost paths that are circled, the ones that are under element EL[4]. The details of how Step 4612 is executed are depicted in the flowchart in FIG. 47. In FIG. 47, the input is a routing table (the routing table for the router and protocol under consideration—Router R1 and protocol IP in this example) and DA, which refers to the destination address. In our example, the destination address is 20.20.1.9. The output is the CPO, in other words a set of cost path objects that match the element DA. If there is no match, CPO will be empty.

Referring to FIG. 47, Step 4701 determines whether there are any elements in the routing table that belong to the same major net as DA. For example, the major net that is associated with 20.20.0.0 is 200.0.0. (It is a Class A network address as opposed to being a Class B or Class C address). See, Martin, James, "Internet Address Formats", Local Area Networks Architectures and Implementations, pp. 439-440, PTR Prentice Hall, 1994. In Step 4703 of FIG. 47, EL is set to the element in the routing table belonging to the destination's major net having the most specific mask. The most specific mask is the one with the most 255s on the left. In this case, there is only one element in the routing table shown in FIG. 50, belonging to net 20.0.0.0 and that is element EL[4]. Proceeding to Step 4704, it is determined whether this element matches the destination address. We look at the destination in element EL[4] and we see the destination is 20.20.0.0 with mask 255.255.0.0. That means we are looking for any destination that starts with 20.20 and do not care about the last two octets. In our example, this matches. So the answer at Step 4704 is "yes" and the procedure exits, returning this element's cost path set, which are the two circled cost paths in FIGS. 53B-C, as output. If it does not match, the process goes to Step 4705 and determines whether there are any other elements belonging to DA's major network which have a more general mask. Then, go back to Step 4704 and try to apply the match. If the answer to Step 4705 is "no" then we go to Step 4702, which determines whether there is a gateway of last resort. If there is, we return the CPO associated with it; if not, we return saying the CPO is empty. Also, note that in Step 4701, if there are no matching elements in the routing table that belong to the same major net as DA, go to Step 4702 and look for a gateway of last resort and return the CPO associated with it, if it is found. Otherwise, an empty CPO is returned. In general, this procedure iterates, looking for the most specific match. If one is found, its CPO is returned. If no matches are found, then the gateway of last resort's CPO is returned, if it exists.

Figure 53D:
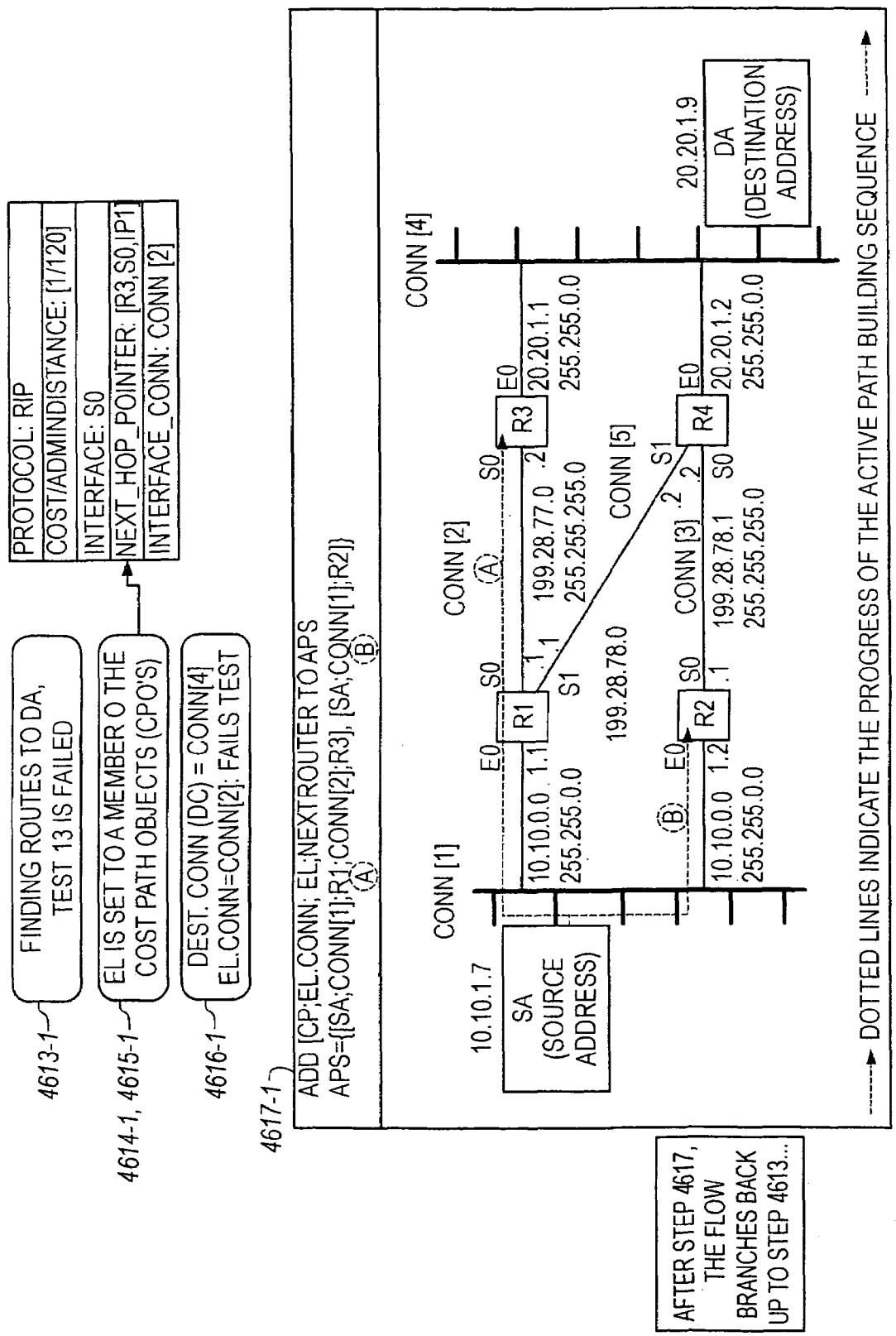

Let's continue the walkthrough at FIG. 53D. To set the context, we had reached Step 4612, as shown in FIG. 53C, which identified the CPO as being the circled items; in other words, the items under element EL[4] in FIG. 53C. In Step 4613, we ask the question, "is the CPO empty?" In this case, since there are two elements, the answer is "no", shown at 4613-1 and we go onto Step 4614. If it were the case that the CPO were "empty", meaning that there are no routes in the current router that match the destination address, then we are in a sense discarding this active path and going back to Step 4608 to see if there are any more active paths to process. In our case, as we said, there was a match, so we go on to Step 4614. In Steps 4614 and 4615, we take one of the elements of the CPO, remove it, and set EL to the CPO we're processing. In this case, L is set to the CPO as depicted as 4614-1 and 4615-1 in FIG. 53D, one CPO whose interface is set to S0. We next go to Step 4616, which asks, "does the destination connection (DC) match the EL's connection?" In other words, "are we pointed to the interface attached to the media on which the destination is connected?" In this case, the answer is "no", shown at 4616-1 because the destination connection is Conn [4], but the connection associated with EL is Conn[2]. So the answer at Step 4616 is "No" and we go onto Step 4617. In 4617, the current path is extended with the element's Conn[2] (EL's interface Conn) and the next hop router R3 and put back in the set of active paths APS. The diagram in FIG. 53A pictorially shows the paths being developed that currently are in APS.

Figure 53E:
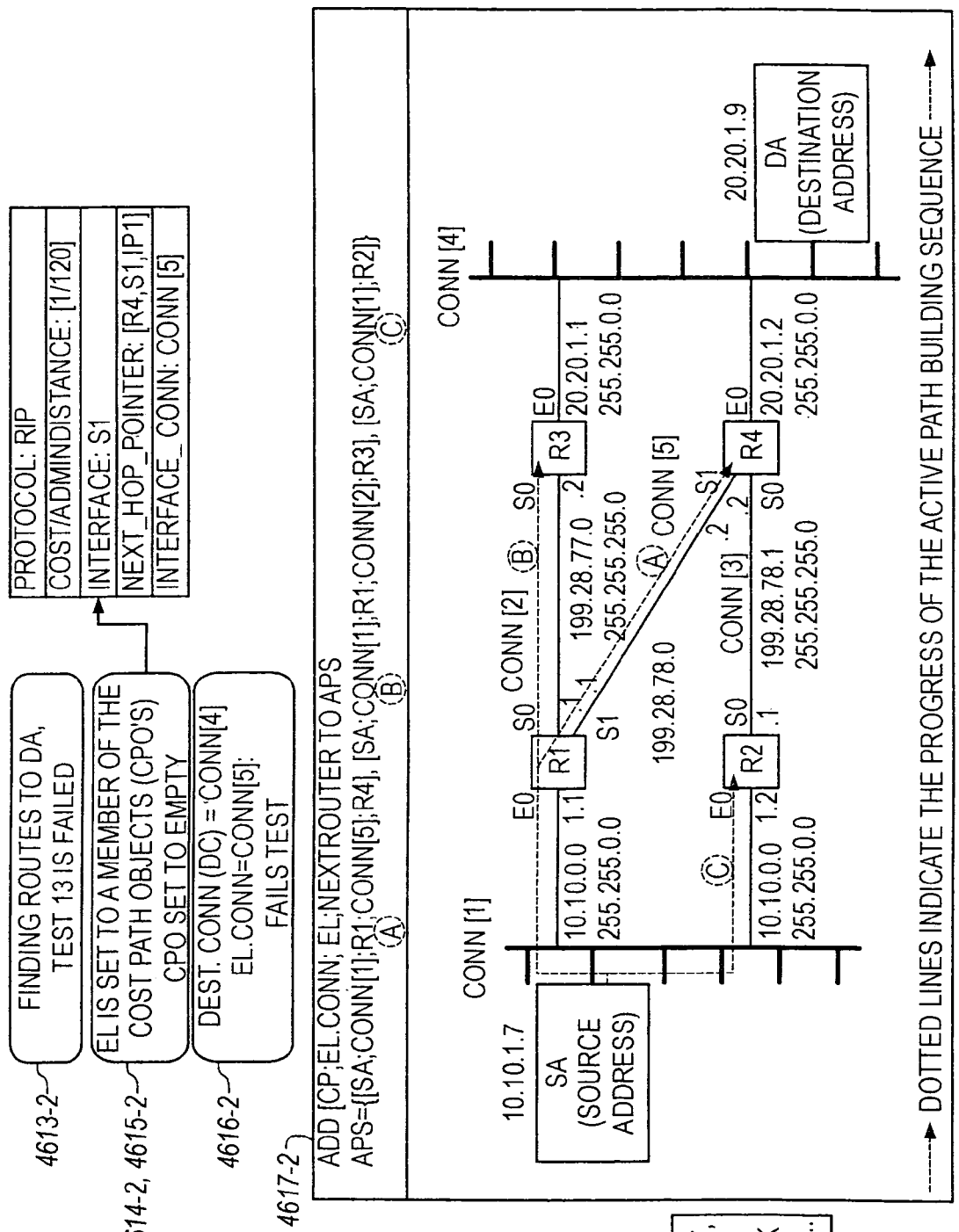

The walkthrough continues at FIG. 53E; after processing Step 4617, we go back to Step 4613 and see if there is another cost path object to process. In our example, since there were two paths out of the router associated with the matching routing table element, there is another cost path object to process, shown at 4613-2. In FIG. 53E, in the items marked 4614-2 and 4615-2, we see that CPO is set to the cost path to 4616 and ask the question, "does the connection associated with CPO, which in this case is Conn[5], match the destination connection Conn[4]. The answer is "No", shown at 4616-2; we haven't gotten to the destination connection. So we go back to Step 4617 and add a new path to the APS. In this case it is the path that starts from SA to Conn[1] to R1 and this time rather than going out S0, we go out S1 to Conn[5] to Router R4, shown at 4617-2. The diagram in 53E depicts the three paths under construction that are on the APS after we execute Step 4617.

Figure 53F:
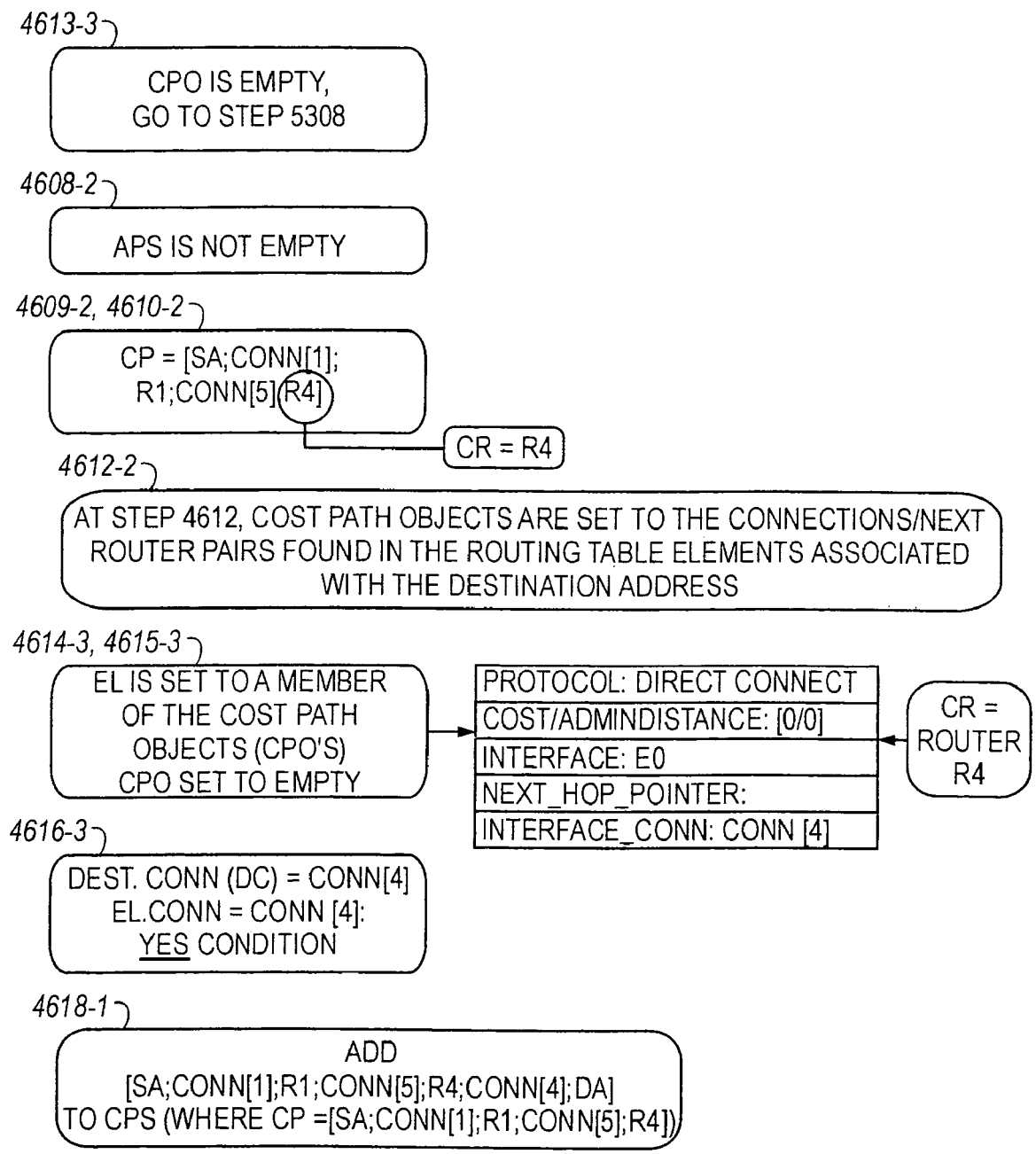
Figure 53G:
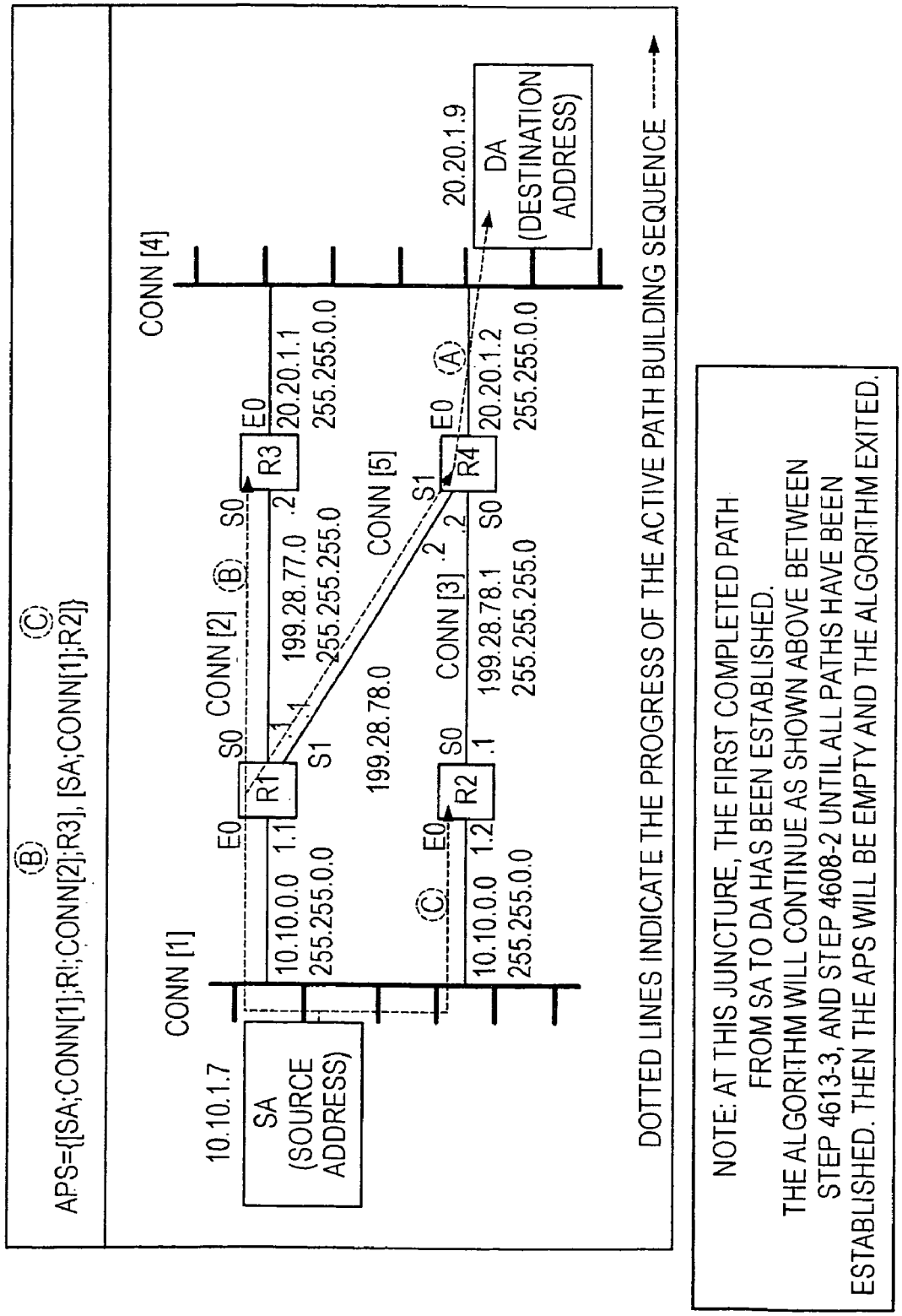

The walkthrough continues at FIG. 53F. After processing Step 4617 we go back to Step 4613 and ask "is the CPO empty?" This time the answer is "yes, it is empty", shown at 4613-3, so then we go to Steps 4608 and 4609, which refer to picking one element from the APS, if it is not empty, and seeing if we could add another hop to it in trying to reach the destination. So after going to Step 4608 and getting the answer that APS is not empty, shown at 4608-2, we go to Step 4609 where we set CP to one of the elements in the APS, shown at 4609-2. In this case we set it to the path labeled Path A in FIG. 53E. Step 4610-2 shown in FIG. 53F refers to setting CR to the last router in the current path, R4. We then go to Step 4612, which looks through R4s IP routing table for a match to destination address DA, shown at 4612-2. In this case, a matching element is found with a CPO that is depicted right after Steps 4614-3 and 4615-3 in FIG. 53F. This CPO is a directly connected CPO, which means that the matching destination, which is Subnet 20.20.0.0 is directly connected. CPO's interface is set to E0 (Ethernet 0) since it is directly connected it does not have a next-hop pointer and associated connections, Conn[4]. We then go to 4616, which asks the question, "does the destination's connection, which is Conn[4], match the one on the CPO that we are processing? The answer here is "yes", shown at 4616-3. So, after Step 4616, we go to Step 4618, which is the first time in this example we have added to the CPS; thus, we have reached the destination; the path that gets added to the CPS is one that goes from SA to Conn[1] to Router R1 to Conn[5] to Router R4, out Conn[4] to the destination address, shown at 4618-1.

After Step 4618, processing goes to Step 4613, which returns "yes" since there are no more cost path objects to process; consequently, the algorithm goes to Step 4608. At Step 4608, the APS has the two paths shown in FIG. 53G. This processing of elements in the APS repeats itself; the end result will be that the CPS has 3 elements which are shown in the computer form at the bottom of FIG. 53G and shown in the diagram in the middle of FIG. 53G, the paths are from SA to Conn[1] to R1 to Conn[2] to R3 to Conn[4] to DA; from SA to Conn[1] to R1 to Conn[5] to R4 to Conn[4] to DA, and from SA to Conn[1] to R2 to Conn[3] to R4 to Conn[4] to DA.

One of the complications that is taken into account in constructing the CPS is that the routers might have both input and output access lists. These, as we described before, are filters that can block traffic coming into the router (an input port filter) or going out of the router (an output port filter). If the procedure runs into an access list that blocks the path being constructed, then it will not put it into CPS.

Figure 54:
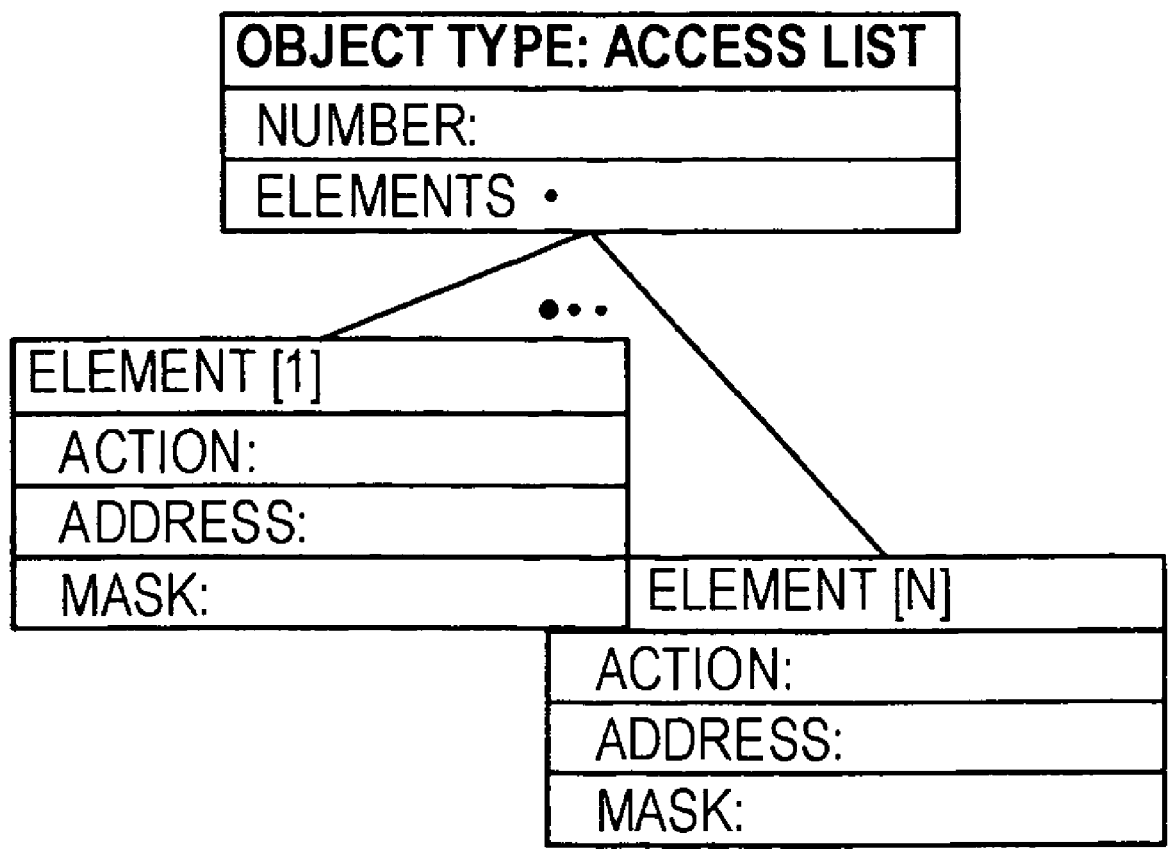
FIG. 54 shows the object data structure of the Access List object in attribute form.

FIG. 54 shows, in attribute form, an access list. An access list is indexed with a Number as an identifier. Access lists are maintained on the router and since the same access list may be used on a variety of ports, each port refers to its associated access list by the identifier (Number), rather than redundantly storing the whole access list. The main part of an access list is its element objects. Access lists are processed by going from the first element down to the next element looking for a match. If there is a match and the matching element has a permit action, the packet being matched gets through. If the matching element has a "deny" action, the matching packet does not get through. If all the elements in an access list are reached and no match is found, then the packet is blocked. What "matching" means depends on the protocol. For IP, the conditions for a match are as follows. For example, consider an element with the address set to 10.0.0.0 and the mask set to 0.255.255.255. For an access list element, 0 means consider the corresponding octet, while 255 means ignore it. Thus, the preceding pattern would match anything that starts with octet 10 and match it regardless the last three octets. Similarly, if the access list's address and mask were 10.20.0.0 and 0.0.255.255 respectively, this pattern would match anything that starts with a 10.20 regardless of the last two octets.

Figure 55:
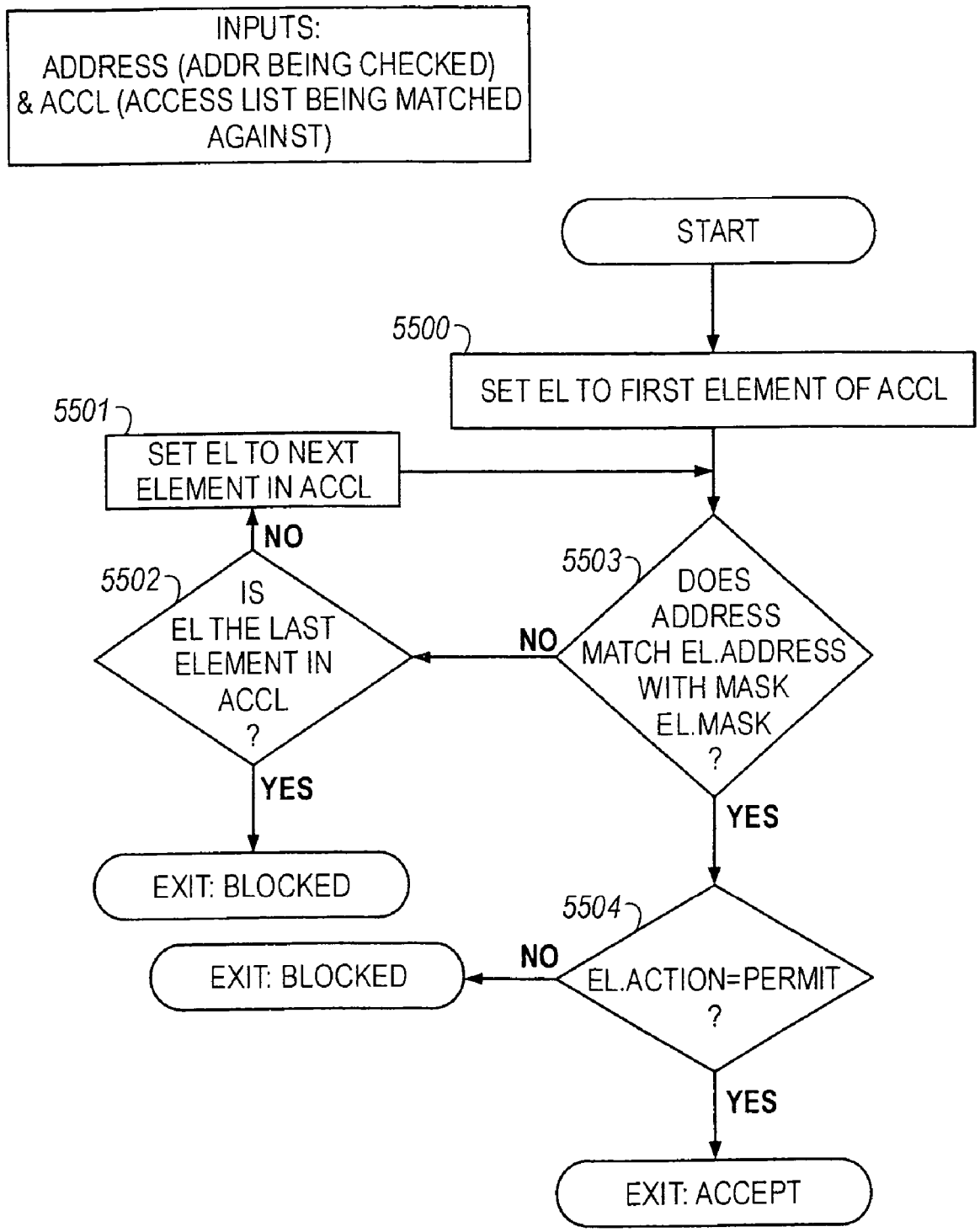
FIG. 55 is a flowchart showing the process of determining whether or not an element is blocked by an access list; logic which is invoked during the process shown as FIG. 1G.

FIG. 55 presents the flow chart that the invention follows to see if the addresses match an access list, Accl. In Step 5501, we set EL to the first element in the access list. In Step 5503 we ask, does the address (addr) match the EL's address, given the elements mask. If the answer is "no", proceed to Step 5502 where it is determined whether this is the last element. If this is the case, the process terminates, indicating that the status is "blocked". If the answer is "no", EL is set to the next element in the access list at Step 5501, and the process continues to Step 5503. If the answer to Step 5503 is "yes", then at Step 5504, it is determined whether the action associated with the matching element is a "permit". If the answer is "yes", then the process exits, indicating that the status is "accept." If the answer is "no", the process exits with status blocked.

Figure 56:
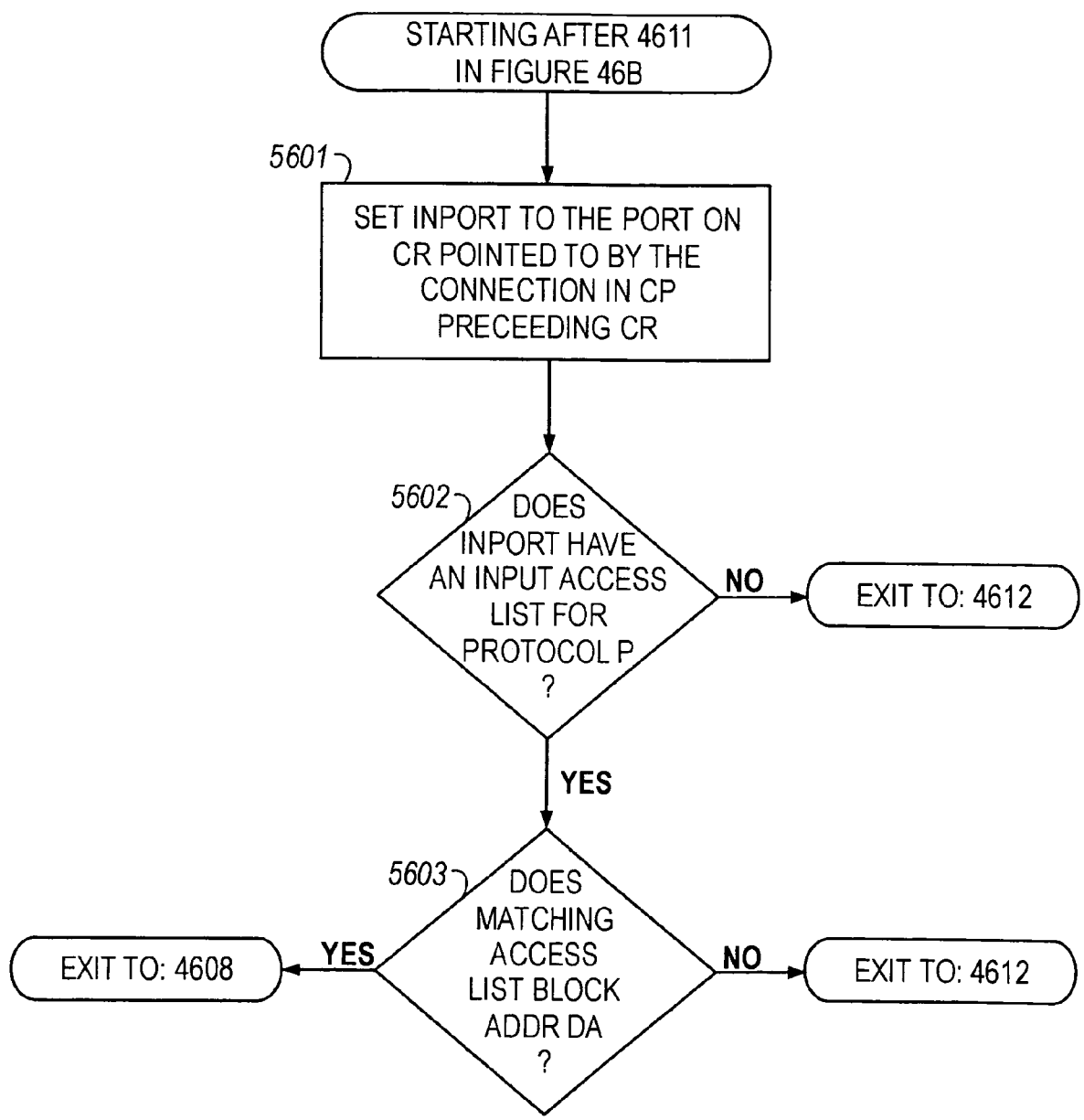
FIG. 56 is a flowchart that shows the modifications to the flowchart in FIG. 46B (which determines network connectivity) to take into account Input Access Lists.

As described, a complication exists in factoring into the flowchart in FIG. 46A-46C, the access lists on both input and output ports. In FIG. 56 we show how we patch into Flowchart on FIG. 46 the logic that is needed to process input access lists and in FIG. 57 we show how we further patch this flowchart to take into account output access lists.

The process shown in FIG. 56 is executed starting from Step 4611 in FIG. 46B. At Step 4607 in FIG. 46B, we are at the state where we take a path off the APS list and set CR to the current router, which is the router last in the path. After going to Step 4611, rather than going directly to Step 4612 we go to Step 5601 of FIG. 56, and we set input port to the port on the current router pointed to by the connection in the current path right proceeding CR. Thus, for the example shown in FIG. 46B, it would be the port that is connected to R5 that is pointed to by Conn[2]. Given this input port, it is determined whether this input port has an access list for the protocol under consideration. For our last example, the protocol is IP. If the answer is "no", we proceed as we did in the earlier example and go to Step 4612. If the answer is "yes", then it is determined at Step 5603 whether the matching access list blocks the destination address (DA). If the answer is "no" (it doesn't block it), the packet gets through and proceed as normal on to Step 4612. If it does block the packet, then at Step 4608 in 46B, effectively means ignore the path being processed because we took it out of the APS. That is, by just going right to Step 4608, we are dropping this path and going to the next one.

Figure 57:
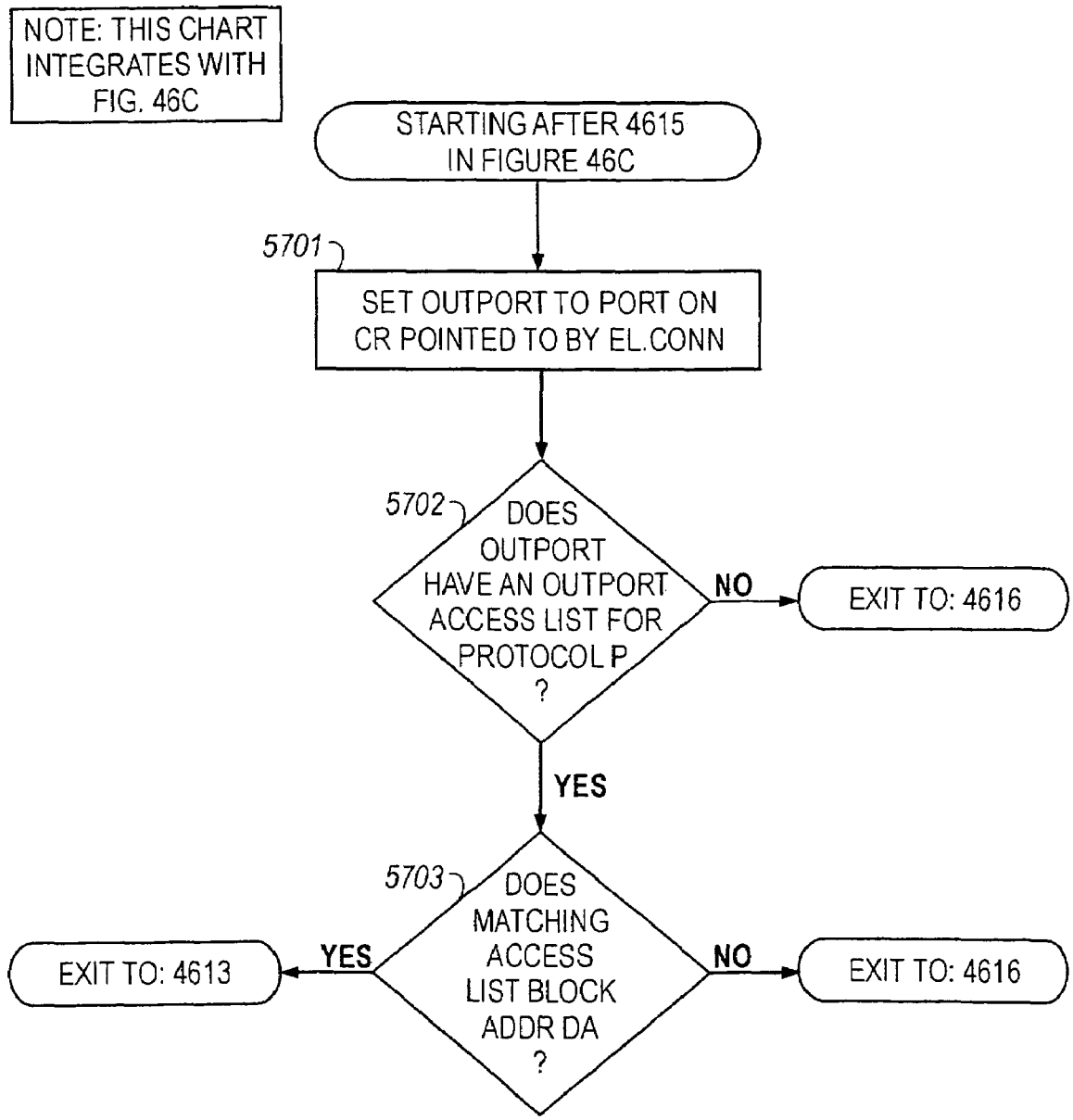
FIG. 57 is a flowchart that shows the modifications to the flowchart in FIG. 46C (which determines network connectivity) to take into account Output Access Lists.

FIG. 57 shows the modification we make to the flowchart in FIGS. 46A through 46C, to handle the complication of encountering output access lists. This process is integrated in at Step 4615 in FIG. 46C. Setting context, after the point that processing an active path, the current router is identified. Look to see if there is a matching element in its routing table that matches the destination address. If that is the case, then we set CPO to the set that shows how to get out of the router. Then we set EL to one of these elements. Step 4615 is at the state where we have a path (given by EL) out of the router. EL identifies a particular port, so in Step 5701 we set output to the port mentioned by EL. Then we ask the question in Step 5702, "does the output port have an access list for protocol P?" If the answer is "no", we proceed by doing nothing, and go to Step 4616. If the answer is "yes", we try to match the destination address against the access list, Step 5703. If the answer is that it doesn't block it, we proceed as normal and go to Step 4616. If the answer is "yes" it does block, then we go straight to Step 4613, which has the effect of rejecting the path out of the current router given by EL. For example, if you found a matching element with two ways out of the router, and both of them have access lists that block it, then all paths for the destination DA that go into the router will be dropped.

Note that although an example has been provided in which matching takes place on the destination address, matching can take place on other values as well. For example, as alternatives, matching can occur on the source address, the ports associated with a TCP packet, etc. There are many conditions that can be applied and tested during the filtering. For the sake of illustration only, matching on the destination address was discussed above.

Figure 58:
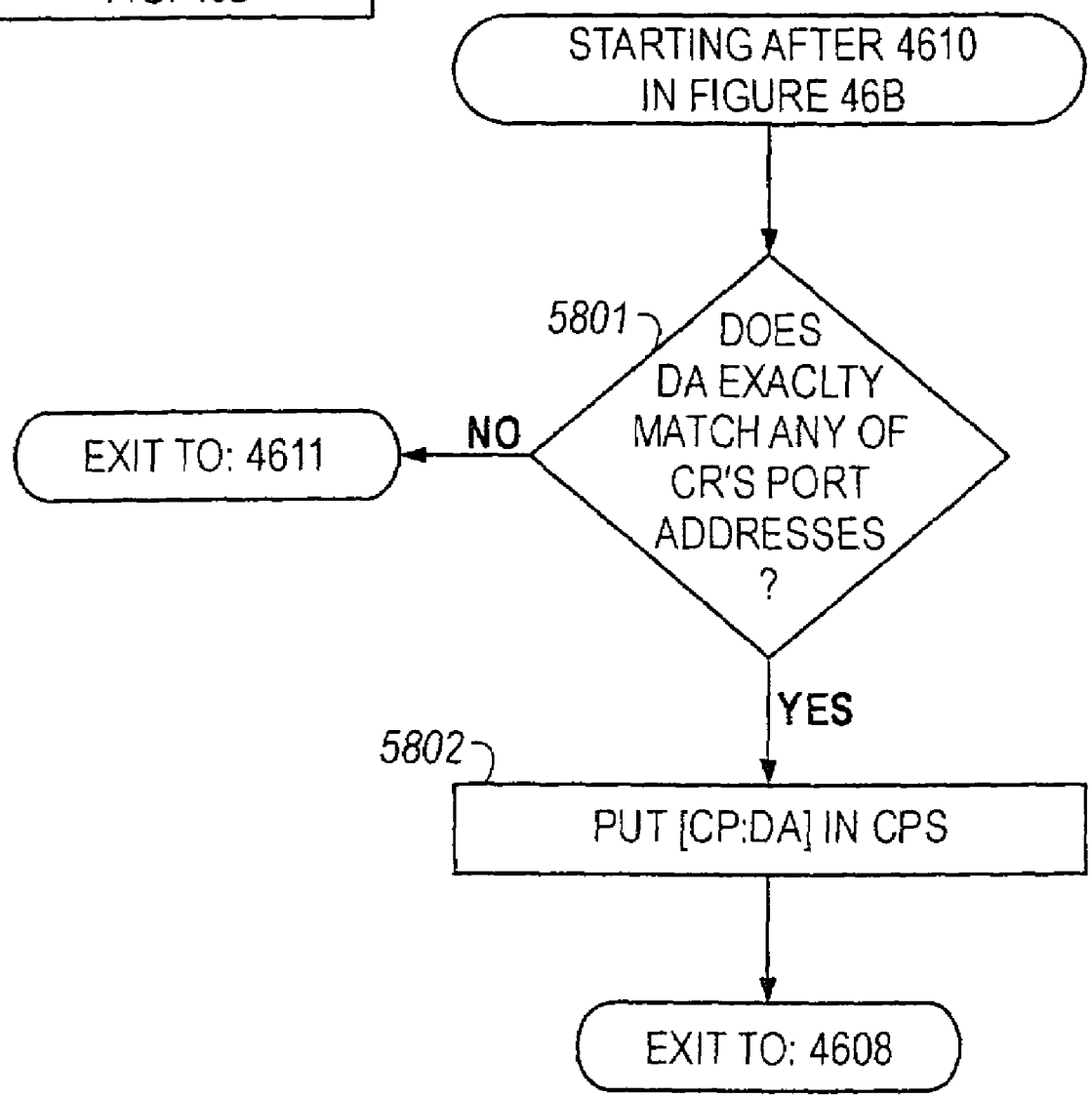
FIG. 58 is a flowchart of a modification the invention applied to the process shown in FIG. 46B to handle paths addressed to a router.

FIG. 58 depicts a graft to the flow chart for finding network paths (FIGS. 46A-C) to handle paths addressed to routers. To set context, at Step 4601 in FIG. 46A the procedure is at the stage where it is processing a path in the active path set (APS), referred to by CP, and has just assigned the variable CR to the last router in this path. In FIG. 58, processing (for the graft) goes from Step 4610 to Step 5801, which determines whether the destination address DA exactly matches any of CR's port addresses. If the answer is "yes", then the path being processed is one that is addressed to router CR. Consequently, processing moves to Step 5802, where the path [CP;DA] (i.e., the active path, which has reached router CR, annotated with the destination address DA) is put into CPS, the set of completed paths. Next, processing goes to Step 4608 shown in FIG. 46B, which checks if there is another active path to process. If at Step 5801, the algorithm determines that the path is not addressed to router CR, processing continues as it would have for the non-grafted algorithm; that is, processing moves to Step 4611, shown in FIG. 46B.

Figure 59:
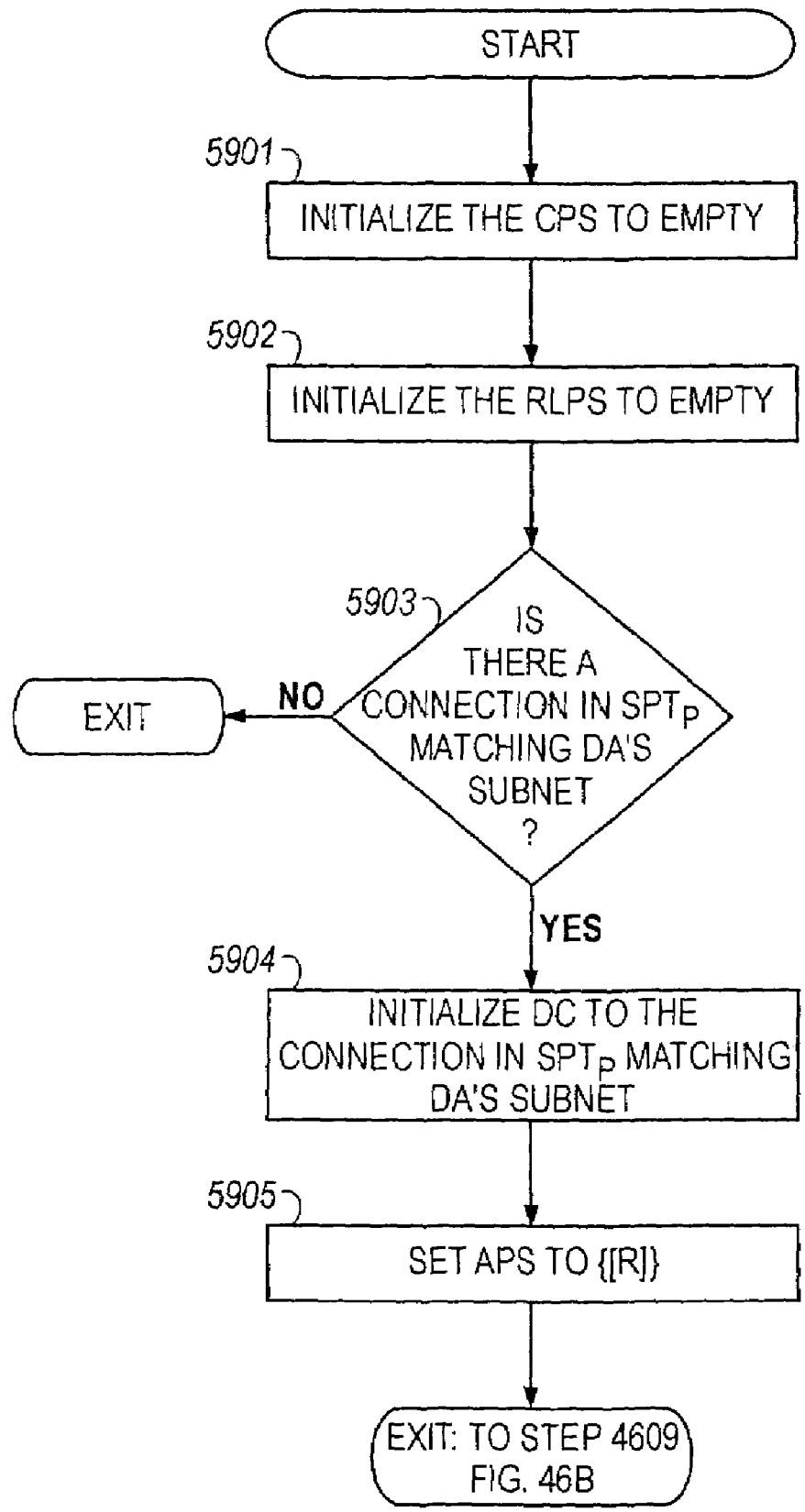
FIG. 59 is a flowchart of a process that is a variant to the process shown in FIG. 46A-C to handle a path starting from a router instead of a host address.

FIG. 59 depicts a variant of the flowchart for finding network paths (FIGS. 46A-C) to handle paths starting at a router. The input to this procedure is a reference to a router R, a destination address DA, the SPT for the protocol associated with DA, the set of SROs that the SPT points to, and the routing tables (for the associated protocol) for each of the routers. In Step 5901, the output set CPS, for Completed Path Set, is initialized to empty and at Step 5902, the output RLPS, for Routing Loop Path Set, is set to empty. Step 5903 checks whether the destination address has a connection in the SPT associated with it; if not, then processing terminates; otherwise Step 5904 is reached where DC is set to the connection in SPT that address DA is associated with. At Step 5905, the variable APS, for Active Path Set, is set to be a single element denoting a path starting at router R; processing then continues at Step 4609, shown in FIG. 46B, which is the step in the main algorithm, which chooses a member of APS to process (that is, to try to extend to the destination address). Because there is only one element in APS, in Step 4609, CP is set to that element (i.e., the path being "starting at R").

We have now described a process in which, given a SPT, the routing tables, a destination address, and a source address, whether there exists one or more paths through the network is determined. This is a basic function that is used in the following section, which describes the routing table integrity checks (FIG. 1G).

In the general case, whether two hosts should communicate is an organizational specific need. There is no general rule saying this host should talk to this host. So we are introducing here a new type of integrity check where the user supplies an input, namely, the set of source and destination address that should communicate and the set of ones that should not. Given this set of "connection requirements", the invention simply applies the CPS algorithm to find if the source-destination pairs that should communicate have a CPS with one or more elements and the pairs that should not communicate produce an empty CPS. If the invention is given the connectivity requirement, SA should talk to DA and CPS is computed to be empty, then that is an integrity violation to be presented to the user. Conversely, if there is a requirement that SA should not be able to reach DA, but we find that there is a path, then this violation is presented to the user.

Figure 65:
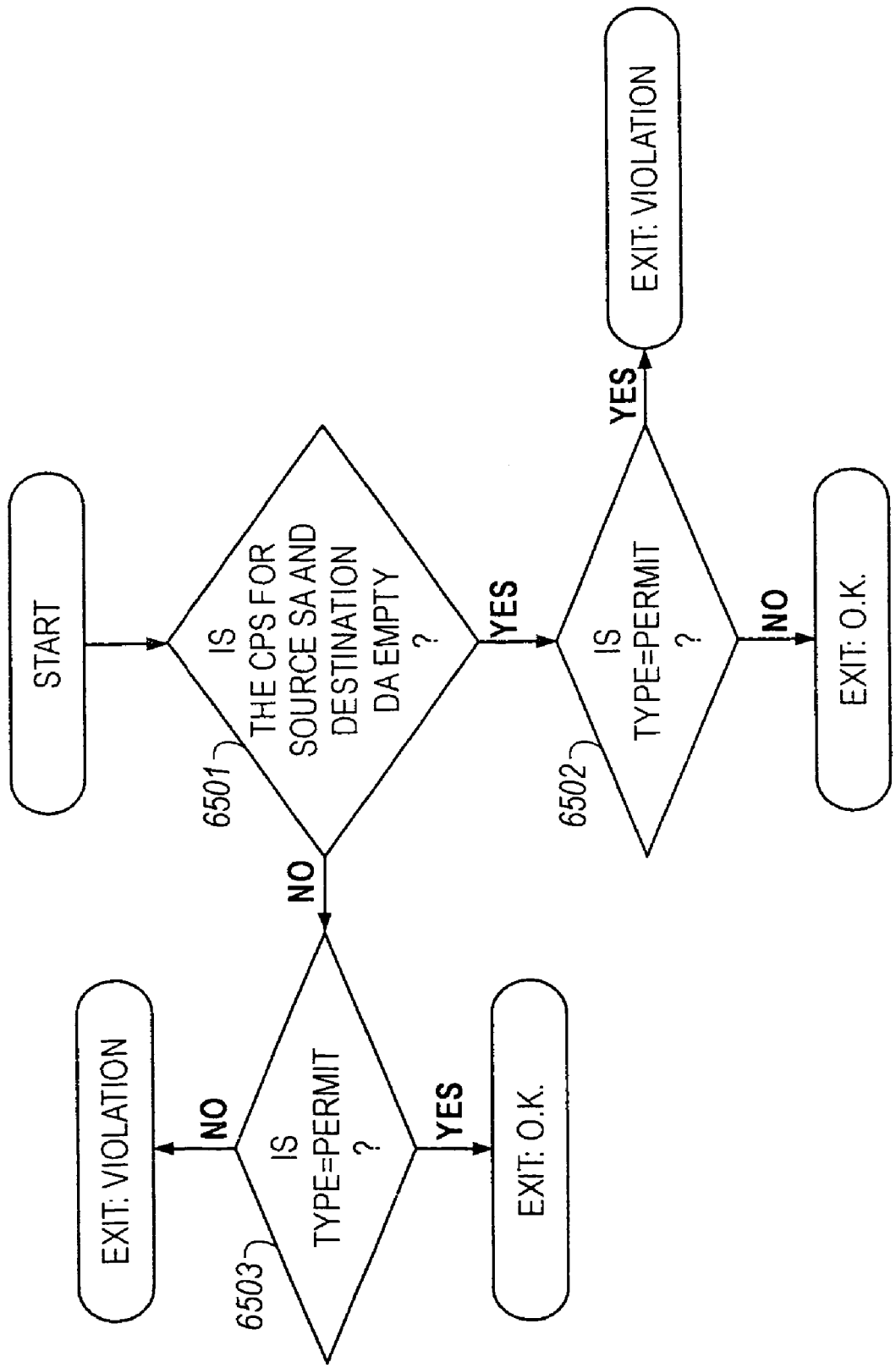
FIG. 65 shows a flowchart that computes the "User supplied connectivity requirements" integrity check. This is part of the phase shown as FIG. 1G.

FIG. 65 depicts the process for computing the "User Specified Requirements" integrity check. The input to this process is a source address SA, destination address DA, a TYPE variable which is set to "Permit" or "Block", and the routing table objects for each router in the list of SROs. The output is the state "OK" or "Violation". If TYPE is set to Permit, then the output will be acceptable if, and only if, one or more paths exist from the source SA to the destination DA. Conversely, if TYPE is set to Block, then the output will be acceptable if, and only if, no paths exist from the source SA to the destination DA.

In Step 6501 of the flowchart (FIG. 65), the procedure calls the subfunction described by the flowchart in FIGS. 46A-C, which determines whether there is a path from a source address to a destination address given as input. If there is a path, then the output CPS, which is a set, will be non-empty (and contain the path(s)). At Step 6501, the input to this procedure is SA as the source address and DA as the destination address. If the output (CPS) is empty, then there is no path and processing moves to Step 6502, which returns Violation if TYPE is Permit and OK otherwise (i.e., when TYPE is set to Block). If CPS in Step 6501 is not empty, then processing moves to Step 6503, which returns OK if TYPE is Permit and Violation otherwise.

Figures 60, 61A, 61B:
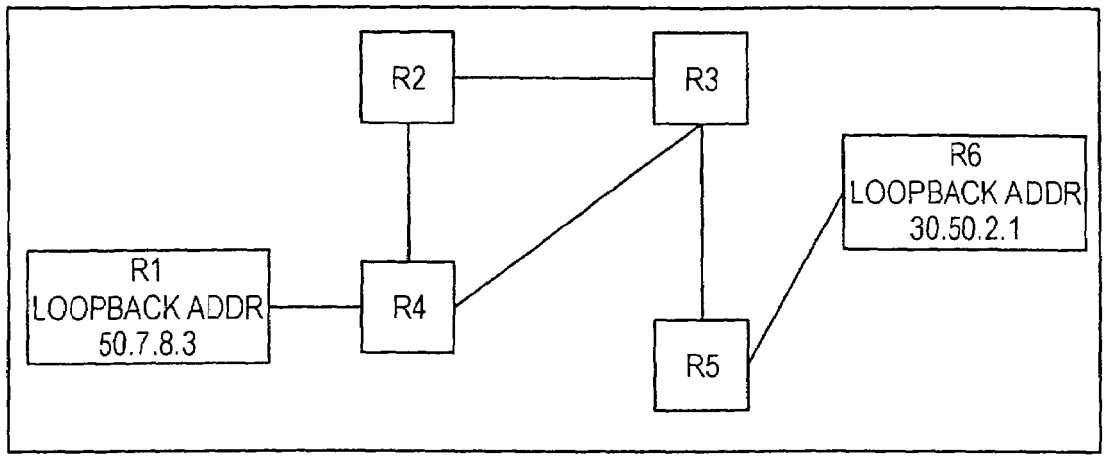
FIG. 60 is a topology rendering showing implicit RSRB connections that preface discussion and subsequent figures to show how the invention evaluates the quality of connectivity given instances of level 2 connectivity (i.e., bridging—or specifically Remote Source Route Bridging (RSRB)).
FIG. 61A is a sample router configuration file for Router R1 in FIG. 60.
FIG. 61B is a sample router configuration file for Router R6 in FIG. 60.

The integrity check just presented above required the user to give the pairs of source and destination addresses and specify whether or not they should communicate, since this is an organization specific requirement. The integrity checks prior to this were ones that were applicable regardless of the organization. For the case of paths, there are some examples (i.e., routing table integrity checks) where we have integrity checks that do not require asking the user to supply source and destination addresses. By virtue of some of the configurations of other options in the router, there are implicit requirements about routers that must communicate. One example relates to Remote Source Route Bridging (RSRB), when routers are configured to encapsulate source route bridge traffic (which is inherently OSI Model level 2) over an IP backbone. To do so, a set of routers is designated as SRB peers and within each of these routers' configuration there is a mention of peers with which it needs to communicate. By design, these routers need to talk to each other over, for example, a TCP connection. Note the example in FIGS. 60, 61A and 61B. This is an example of a network that has two routers, router R1 and R6, that are configured as source route bridge peers. Router R1 mentions the address of router R6 and conversely R6 mentions an address associated with R1 indicating that they are source route bridging peers and that they should talk using TCP.

Figure 62:
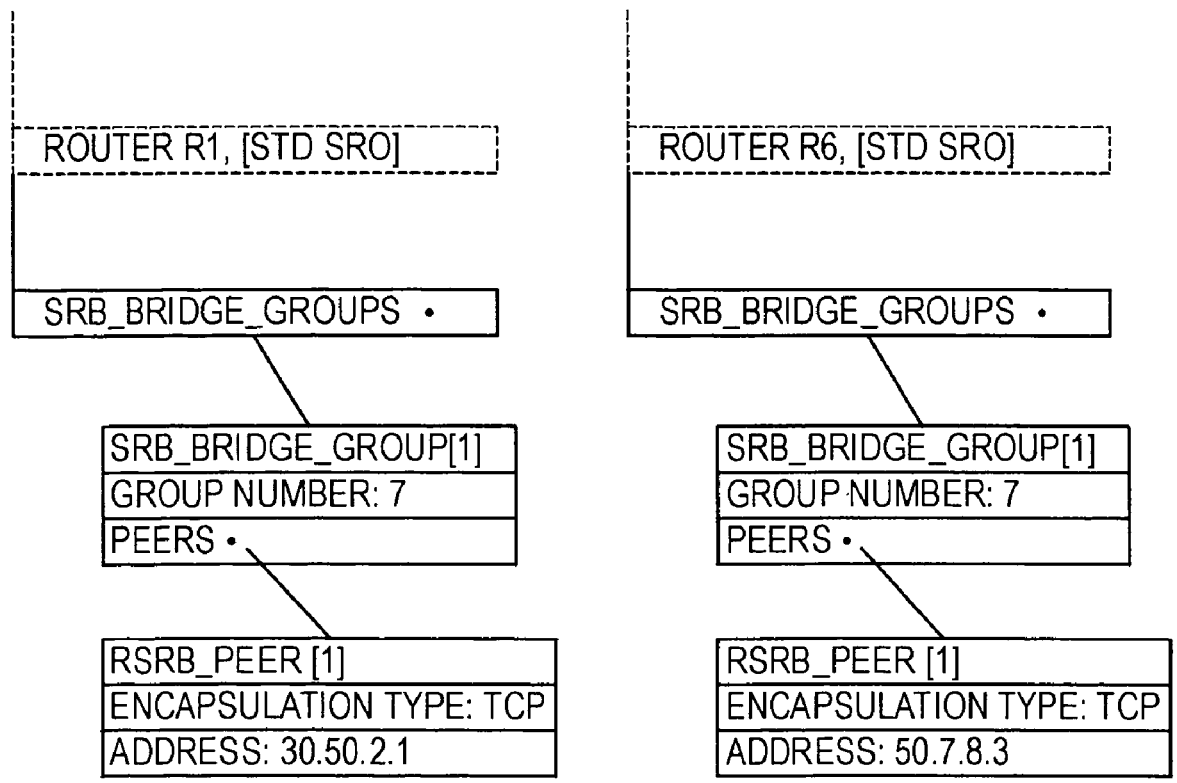
FIG. 62 shows the SRO excerpts focusing on the RSRB attributes for Routers R1 and R6 having configurations in FIGS. 61A and 61B, respectively.

Reiterating, the routers communicate with TCP. So by virtue of the configuration you see in FIGS. 61A and 61B (or looking in FIG. 62 where we show the RSRB fragments that are found on the SROs of R1 and R6, respectively), we know that these routers should be able to communicate. In other words, we know there should be a path from router R1 to router R6 and vice versa. So there should be a path from 30.50.2.1 to 50.7.8.3, a path from R1 to R6, in both directions. So without asking the user which hosts or which routers should communicate, we are able to automatically infer connectivity requirements. Thus, the integrity check associated with source route bridging simply looks at all the routers for RSRB peer statements and then applies the CPS algorithm for each of the routers that should peer together to find out if there is one or more path. If there is no path for a RSRB pair, then an integrity violation is given to the user showing, for example, that R1 and R6 cannot communicate although they are set up as RSRB peers.

There are a number of examples of these integrity checks that the invention includes. Another example stems from the use of the routing protocol BGP, which can mention a neighbor router that could be many hops away. In this case, by virtue of having the configuration mention a neighbor, we come up with a connectivity requirement saying that the router should be able to find a path to the neighbor. Another example is the use of static routes that mention an address that is not directly connected, and could be many hops away. In this situation we want to make sure that there is a one-way path from the router to the address that is mentioned. If there are any cases where we have a static route not having this property, a violation is flagged. In summary, by virtue of configuration, we are able to infer a number of connectivity requirements, and if these connectivity requirements are failed, the user is given a list of the violations.

Figure 63:
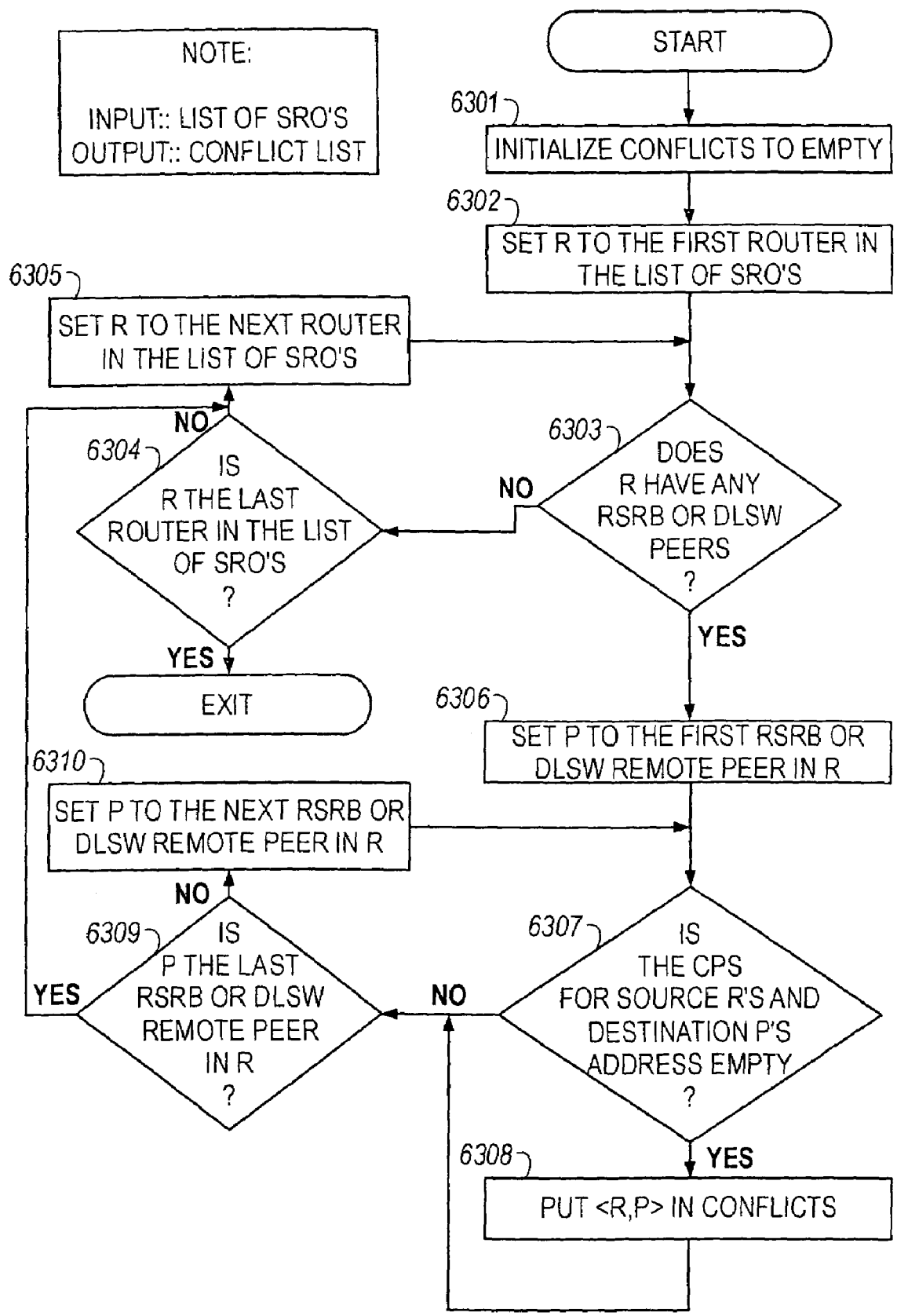
FIG. 63 shows a flowchart that computes the "RSRB/DLSw remote peers connectivity" integrity check, which is part of the phase shown as FIG. 1G.

FIG. 63 depicts the process for computing the "RSRB/DLSW Peer" integrity check. The input to this process is the SROs and routing tables objects for each router in the list of SROs. The output is the set Conflicts, which contains <Router, Remote Peer object>. If <R1,P1> is in Conflicts, this means that a connection cannot be established from router R1 to the address of the remote peer mentioned in P1.

In Step 6301 of the flowchart in FIG. 63, the output Conflicts is initialized as an empty set. At Step 6302, the variable R is set to the first router in the list of SROs and at Step 6303, the question is asked whether R has any remote DLSW or RSRB peers. If the answer is "no", then processing moves to Step 6304 to determine if there are any more routers that need processing. If there are more routers to process, then the algorithm goes to Step 6305, setting R to the next router, and then to Step 6303 to process this new router. If the answer to Step 6303 is "yes" (i.e., router R has DLSW and/or RSRB peers), then processing moves to Step 6306 where variable P is set to the first RSRB or DLSW remote peer object in R.

At Step 6307, the procedure calls the subfunction described by the flowchart in 59, which determines whether there is a path from a router given as input to a destination given as input. If there is a path, then the output set CPS will be non-empty (and contain the path(s)). At Step 6307, the input to this procedure is R as the input router and the address mentioned in P as the destination address. If the output (CPS) is empty, then there is no path and processing moves to Step 6308 where the pair consisting of R and P is put in the set Conflicts. Processing continues at Step 6309, which checks whether R has any more RSRB or DLSW peers needing processing. If there are more remote peers to process, then the algorithm sets P to the next remote peer (at Step 6310) and then moves to Step 6307 to process this new peer. Now, if at Step 6307 the result of computing CPS yields a non-empty set (i.e., there is a path from R to P's remote address), then processing goes straight to Step 6309.

Figure 64:
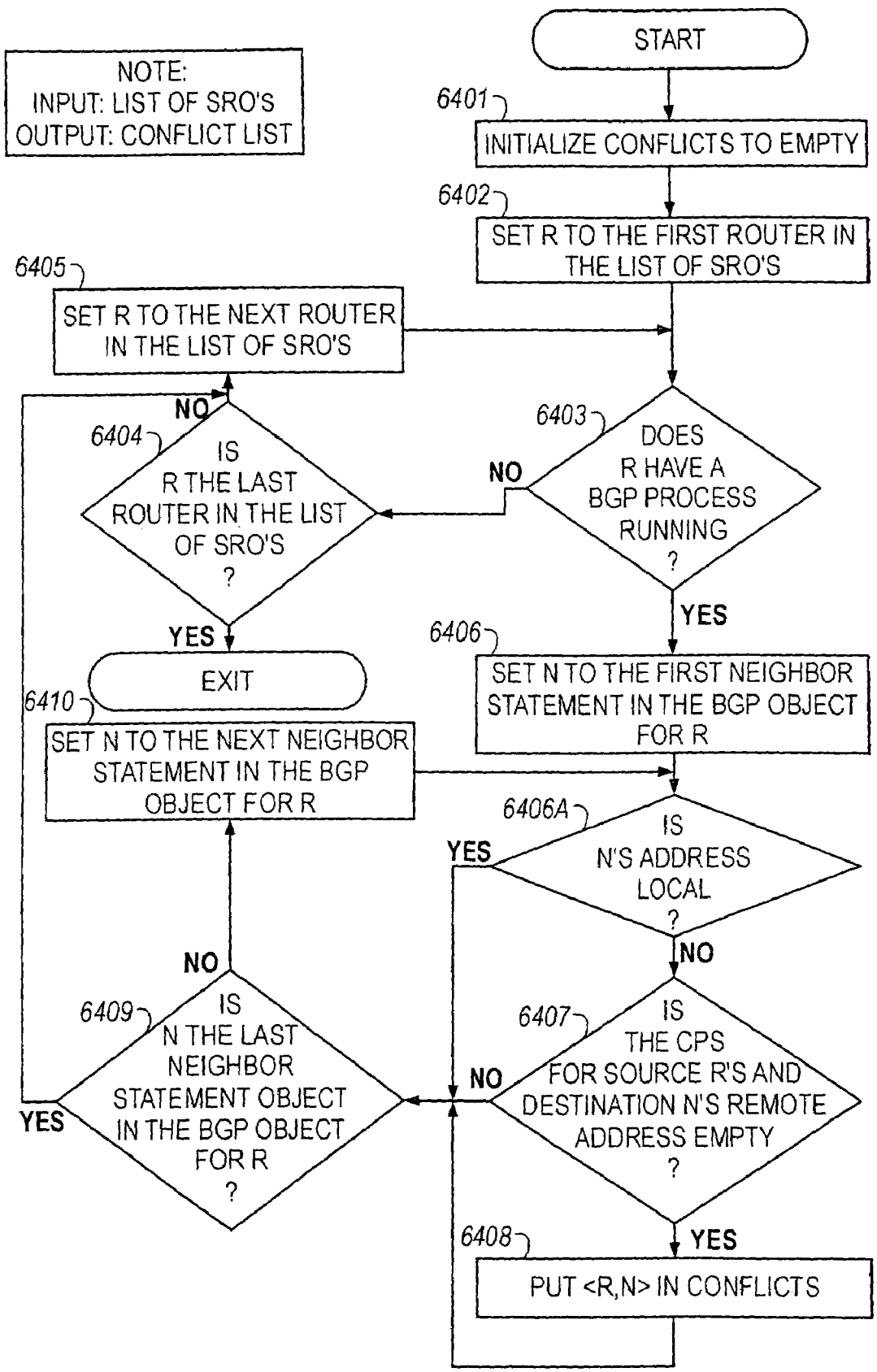
FIG. 64 shows a flowchart that computes the "BGP remote neighbors connectivity" integrity check. This is part of the phase shown as FIG. 1G.

FIG. 64 depicts the process for computing the "BGP Neighbor" integrity check. The input to this process is the SROs and routing tables objects for each router in the list of SROs. The output is the set Conflicts, which contains <Router, BGP Neighbor object>. If <R1,N1> is in Conflicts, this means that a connection cannot be established from router R1 to the address of the neighbor mentioned in N1.

In Step 6401 of the flowchart in FIG. 64, the output Conflicts is initialized as an empty set. At Step 6402, the variable R is set to the first router in the list of SROs and at Step 6403 it is determined whether R has a BGP process running. If the answer is "no", then processing moves to Step 6404 to determine if there are any more routers that need processing. If there are more routers to process, then the algorithm goes to Step 6405, setting R to the next router, and then to Step 6403 to process this new router. If the answer to Step 6403 is "yes" (i.e., router R has a BGP processing running), then processing moves to Step 6406 where variable N is set to the first BGP neighbor object in R's BGP object.

At Step 6406A, the invention checks whether N's address refers to a remote (i.e., more than 1 hop away router). If it does not, this neighbor does not need processing and the algorithm moves to Step 6409 to determine whether R has any more BGP Neighbor Objects to process. If there are more BGP objects to process, then the algorithm sets P to the next remote peer, at Step 6410, and then moves to Step 6407 to process this new peer. If at Step 6406 it is determined that N has a remote address, then processing goes to Step 6407.

At Step 6407, the procedure calls the subfunction described by the flowchart in 59, which determines whether there is a path from a router given as input to a destination given as input; At Step 6407, the input to this procedure is R as the input router and the address mentioned in N as the destination address. If the output (CPS) is empty, then there is no path and processing moves to Step 6408 where the pair consisting of R and N is put in the set Conflicts. Processing continues at Step 6409 to process the next BGP Neighbor object with a remote address (if one exists). If at Step 6407 the result of computing CPS yields a non-empty set (i.e., there is a path from R to P's remote address), then processing goes straight to Step 6409.

Figure 66:
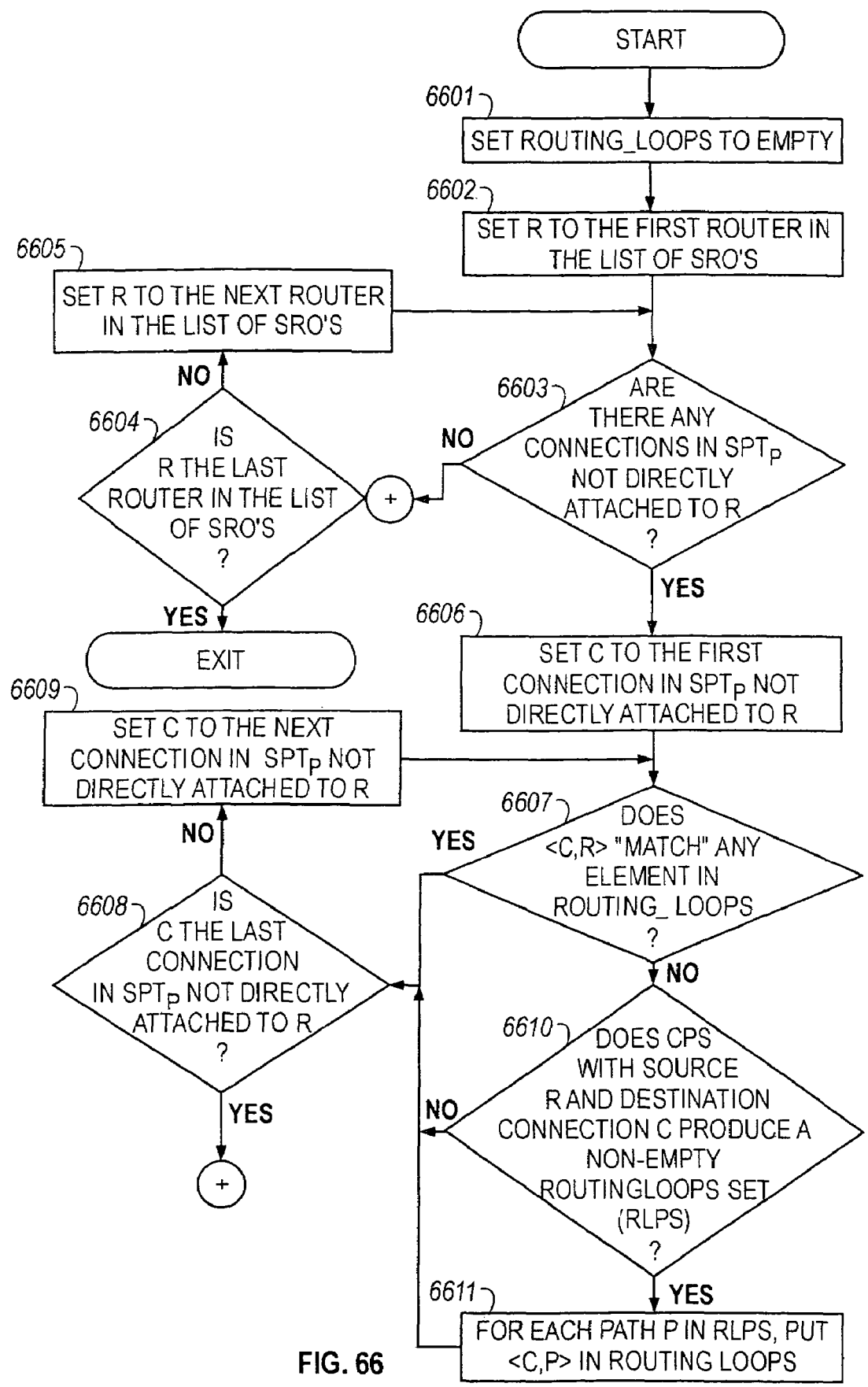
FIG. 66 shows a flowchart that computes the "Routing Loops" integrity check. This is apart of the phase shown in FIG. 1G.

FIG. 66 shows the invention's process for finding all routing loops for a protocol P. The input to this procedure is a SPT for protocol P, the list of SROs it points to, and the set of routing tables for protocol P for each router in the list of SROs. The output is the set Routing_Loops which contains elements of the form <Conn,Pth> where Conn is a connection in the SPT and Pth is a path through the network having a routing loop for hosts on connection Conn.

In Step 6601 of the flowchart in FIG. 66, the output Routing_loops is set to empty. At Step 6602, the variable R is set to the first router in the list of SROs given as input. Step 6603 checks whether there are any connections in the SPT for protocol P not directly attached to R. The reason for asking this question is because the algorithm will be trying to reach all connections from each router and there is no need to consider directly connected ones since they are trivially reachable. If the answer to Step 6603 is "no" (i.e., all connections in SPT are connected to R), the processing moves to Step 6604, which checks to see if the last router has been reached. If so, the process terminates. If not, processing moves to Step 6605 where R is set to the next router (in the list of SROs) and the process repeats itself for this new router.

If the answer to Step 6603 is "yes" then processing moves to Step 6606 where variable C is set to the first connection in SPT that is not directly attached to R. Next, at Step 6607, there is a check to see if a routing loop with connection C and Router R has already been found (which can happen, for example, if there was an earlier router processed which in going to C went through R and ended in a loop). If a loop has already been found, there is no need to process Connection C starting at router R and thus execution continues at Step 6608, which checks whether there are any more connections (not directly attached to R) left to process. If so, processing goes to Step 6609 where C is set to the next applicable connection and then processing continues for this new connection (still using router R as the starting point). On the other hand, if the answer to Step 6606 is "no" (i.e., there are no more connection to process), then the procedure goes to Step 6604 to see if there are any routers left to process.

Referring back to Step 6607, if the answer at this step is "no", meaning that a routing loop involving connection C and router R has not yet been found, then processing moves to Step 6610. At Step 6610, the procedure calls the subfunction described by the flowchart in 59, which determines whether there is a path from a router given as input to a destination address given as input and, if not, whether there is a routing loop. At Step 6607, the input to this procedure is R as the input router and C as the destination connection, which is given in place of a destination address. It is a trivial modification of FIG. 59 to use a destination connection rather than a destination address as input because essentially the only role of the destination address in the CPS procedure is as a handle at getting the destination connection (see Step 5904 in FIG. 59).

The result of the CPS computation at Step 6607 will be both the CPS output and the routing loop set (RLPS), which will be empty if no routing loops are found. If RLPS is empty, then no problem has been found and processing continues at Step 6608, which checks if there is another connection to process (starting at router R). If RLPS is not empty, then processing goes to Step 6611, where all the routing loop paths contained in RLPS are added to the output Routing Loops, each annotated with the destination connection that they are associated with (i.e., the connection C). Processing then continues at Step 6608.

While particular implementations of a presently preferred embodiment of the invention have been disclosed, described and illustrated in detail, it will be appreciated that various modifications to the preferred embodiment can be made without departing from the spirit and scope of the invention which is defined in the appended claims.

Implementation Mechanisms—Hardware Overview

Figure 67:
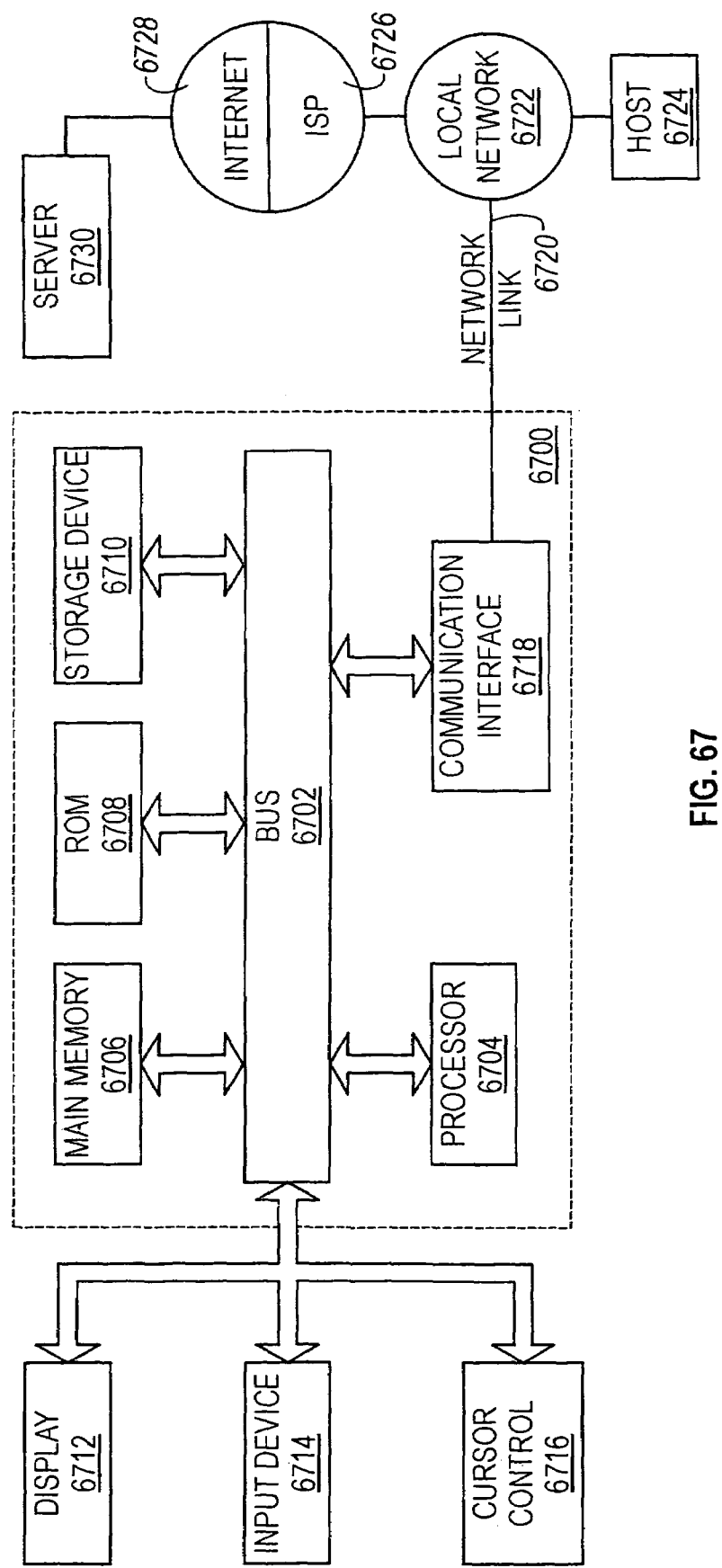
FIG. 67 is a block diagram illustrating a computer system upon which an embodiment of the invention may be implemented.

FIG. 67 is a block diagram that illustrates a computer system 6700 upon which an embodiment of the invention may be implemented. Computer system 6700 includes a bus 6702 or other communication mechanism for communicating information, and a processor 6704 coupled with bus 6702 for processing information. Computer system 6700 also includes a main memory 6706, such as a random access memory ("RAM") or other dynamic storage device, coupled to bus 6702 for storing information and instructions to be executed by processor 6704. Main memory 6706 also may be used for storing temporary variables or other intermediate information during execution of instructions to be executed by processor 6704. Computer system 6700 further includes a read only memory ("ROM") 6708 or other static storage device coupled to bus 6702 for storing static information and instructions for processor 6704. A storage device 6710, such as a magnetic disk or optical disk, is provided and coupled to bus 6702 for storing information and instructions.

Computer system 6700 may be coupled via bus 6702 to a display 6712, such as a cathode ray tube ("CRT"), for displaying information to a computer user. An input device 6714, including alphanumeric and other keys, is coupled to bus 6702 for communicating information and command selections to processor 6704. Another type of user input device is cursor control 6716, such as a mouse, trackball, stylus, or cursor direction keys for communicating direction information and command selections to processor 6704 and for controlling cursor movement on display 6712. This input device typically has two degrees of freedom in two axes, a first axis (e.g., x) and a second axis (e.g., y), that allows the device to specify positions in a plane.

The invention is related to the use of computer system 6700 for implementing the techniques described herein. According to one embodiment of the invention, a method for analysis of access list subsumption is provided by computer system 6700 in response to processor 6704 executing one or more sequences of one or more instructions contained in main memory 6706. Such instructions may be read into main memory 6706 from another computer-readable medium, such as storage device 6710. Execution of the sequences of instructions contained in main memory 6706 causes processor 6704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 6704 for execution. Such a medium may take many forms, including but not limited to, non-volatile media, volatile media, and transmission media. Non-volatile media includes, for example, optical or magnetic disks, such as storage device 6710. Volatile media includes dynamic memory, such as main memory 6706. Transmission media includes coaxial cables, copper wire and fiber optics, including the wires that comprise bus 6702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 6704 for execution. For example, the instructions may initially be carried on a magnetic disk of a remote computer. The remote computer can load the instructions into its dynamic memory and send the instructions over a telephone line using a modem. A modem local to computer system 6700 can receive the data on the telephone line and use an infra-red transmitter to convert the data to an infra-red signal. An infra-red detector can receive the data carried in the infra-red signal and appropriate circuitry can place the data on bus 6702. Bus 6702 carries the data to main memory 6706, from which processor 6704 retrieves and executes the instructions. The instructions received by main memory 6706 may optionally be stored on storage device 6710 either before or after execution by processor 6704.

Computer system 6700 also includes a communication interface 6718 coupled to bus 6702. Communication interface 6718 provides a two-way data communication coupling to a network link 6720 that is connected to a local network 6722. For example, communication interface 6718 may be an integrated services digital network ("ISDN") card or a modem to provide a data communication connection to a corresponding type of telephone line. As another example, communication interface 6718 may be a local area network ("LAN") card to provide a data communication connection to a compatible LAN. Wireless links may also be implemented. In any such implementation, communication interface 6718 sends and receives electrical, electromagnetic or optical signals that carry digital data streams representing various types of information.

Network link 6720 typically provides data communication through one or more networks to other data devices. For example, network link 6720 may provide a connection through local network 6722 to a host computer 6724 or to data equipment operated by an Internet Service Provider ("ISP") 6726. ISP 6726 in turn provides data communication services through the world wide packet data communication network now commonly referred to as the "Internet" 6728. Local network 6722 and Internet 6728 both use electrical, electromagnetic or optical signals that carry digital data streams. The signals through the various networks and the signals on network link 6720 and through communication interface 6718, which carry the digital data to and from computer system 6700, are exemplary forms of carrier waves transporting the information.

Computer system 6700 can send messages and receive data, including program code, through the network(s), network link 6720 and communication interface 6718. In the Internet example, a server 6730 might transmit a requested code for an application program through Internet 6728, ISP 6726, local network 6722 and communication interface 6718. In accordance with the invention, one such downloaded application provides for the techniques as described herein.

The received code may be executed by processor 6704 as it is received, and/or stored in storage device 6710, or other non-volatile storage for later execution. In this manner, computer system 6700 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of analyzing access list subsumption in a routing device of an actual or planned routed computer network, wherein each access list includes one or more elements, and wherein each element is associated with a respective address/mask pair, the method comprising:
    determining, from an access list stored in electronic memory, whether the access list includes two or more elements for which a first element in the access list has a more general or equal address/mask pair than a second element in the access list, wherein the access list is structured such that the first element is encountered prior to the second element during typical processing of the access list; and
    storing in electronic memory a list of element pairs in which a first element in the access list has a more general or equal address/mask pair than a second element in the access list.

2. The method of claim 1, wherein the step of determining includes determining from an access list that is related to input packets.

3. The method of claim 1, wherein the step of determining includes determining from an access list that is related to output packets.

4. The method of claim 1, wherein the step of determining includes determining from an access list that is related to a particular level three protocol.

5. The method of claim 4, wherein the respective level three protocol is one from a group consisting of IP, IPX, and AppleTalk.

6. A method of identifying network integrity violations in a computer network, the method comprising:
    determining, from an access list that is stored in electronic memory and that includes patterns used to filter data into and out of a routing device, whether the access list includes a subsumption relation in which a first pattern is more general than or equal to a second pattern, wherein the access list is structured such that the first pattern is encountered prior to the second pattern during typical processing of the access list; and
    storing in electronic memory a list of subsumption relations identifying pairs of first and second patterns.

7. The method of claim 6, wherein the step of determining includes determining from an access list that is related to input packets.

8. The method of claim 6, wherein the step of determining includes determining from an access list that is related to output packets.

9. The method of claim 6, wherein the step of determining includes determining from an access list that is related to a particular level three protocol.

10. The method of claim 9, wherein the respective level three protocol is one from a group consisting of IP, IPX, and AppleTalk.

11. A computer-readable volatile or non-volatile medium carrying one or more sequences of instructions for analyzing access list subsumption in a routing device of an actual or planned routed computer network, wherein each access list includes one or more elements, and wherein each element is associated with a respective address/mask pair, which instructions, when executed by one or more processors, cause the one or more processors to perform:
    determining, from an access list stored in electronic memory, whether the access list includes two or more elements for which a first element in the access list has a more general or equal address/mask pair than a second element in the access list, wherein the access list is structured such that the first element is encountered prior to the second element during typical processing of the access list; and
    storing in electronic memory a list of element pairs in which a first element in the access list has a more general or equal address/mask pair than a second element in the access list.

12. The computer-readable volatile or non-volatile medium of claim 11, wherein the instructions cause the one or more processors to perform determining by determining from an access list that is related to input packets.

13. The computer-readable volatile or non-volatile medium of claim 11, wherein the instructions cause the one or more processors to perform determining by determining from an access list that is related to output packets.

14. The computer-readable volatile or non-volatile medium of claim 11, wherein the instructions cause the one or more processors to perform determining by determining from an access list that is related to a particular level three protocol.

15. The computer-readable volatile or non-volatile medium of claim 14, wherein the respective level three protocol is one from a group consisting of IP, IPX, and AppleTalk.

16. A computer-readable volatile or non-volatile medium carrying one or more sequences of instructions for identifying network integrity violations in a computer network, which instructions, when executed by one or more processors, cause the one or more processors to perform:

determining, from an access list that is stored in electronic memory and that includes patterns used to filter data into and out of a routing device, whether the access list includes a subsumption relation in which a first pattern is more general than or equal to a second pattern, wherein the access list is structured such that the first pattern is encountered prior to the second pattern during typical processing of the access list; and storing in electronic memory a list of subsumption relations identifying pairs of first and second patterns.

17. The computer-readable volatile or non-volatile medium of claim 16, wherein the instructions cause the one or more processors to perform determining by determining from an access list that is related to input packets.

18. The computer-readable volatile or non-volatile medium of claim 16, wherein the instructions cause the one or more processors to perform determining by determining from an access list that is related to output packets.

19. The computer-readable volatile or non-volatile medium of claim 16, wherein the instructions cause the one or more processors to perform determining by determining from an access list that is related to a particular level three protocol.

20. The computer-readable volatile or non-volatile medium of claim 19 wherein the respective level three protocol is one from a group consisting of IP, IPX, and AppleTalk.

21. A system for analyzing access list subsumption in a routing device of an actual or planned routed computer network, wherein each access list includes one or more elements, and wherein each element is associated with a respective address/mask pair, the system comprising:

means for determining, from an access list stored in electronic memory, whether the access list includes two or more elements for which a first element in the access list has a more general or equal address/mask pair than a second element in the access list, wherein the access list is structured such that the first element is encountered prior to the second element during typical processing of the access list; and means for storing in electronic memory a list of element pairs in which a first element in the access list has a more general or equal address/mask pair than a second element in the access list.

22. The system of claim 21, wherein the means for determining includes means for determining from an access list that is related to input packets.

23. The system of claim 21, wherein the means for determining includes means for determining from an access list that is related to output packets.

24. The system of claim 21, wherein the means for determining includes means for determining from an access list that is related to a particular level three protocol.

25. A system for identifying network integrity violations in a computer network, the system comprising:

means for determining, from an access list that is stored in electronic memory and that includes patterns used to filter data into and out of a routing device, whether the access list includes a subsumption relation in which a first pattern is more general than or equal to a second pattern, wherein the access list is structured such that the first pattern is encountered prior to the second pattern during typical processing of the access list; and means for storing in electronic memory a list of subsumption relations identifying pairs of first and second patterns.

26. The system of claim 25, wherein the means for determining includes means for determining from an access list that is related to input packets.

27. The system of claim 25, wherein the means for determining includes means for determining from an access list that is related to output packets.

28. The system of claim 25, wherein the means for determining includes means for determining from an access list that is related to a particular level three protocol.

29. An apparatus for analyzing access list subsumption in a routing device of an actual or planned routed computer network, wherein each access list includes one or more elements, and wherein each element is associated with a respective address/mask pair, the apparatus comprising:

a network interface coupled to the routed computer network for receiving one or more packet flows therefrom;

a processor;

one or more stored sequences of instructions which, when executed by the processor, cause the processor to perform the steps of:

determining, from an access list stored in electronic memory, whether the access list includes two or more elements for which a first element in the access list has a more general or equal address/mask pair than a second element in the access list, wherein the access list is structured such that the first element is encountered prior to the second element during typical processing of the access list; and storing in electronic memory a list of element pairs in which a first element in the access list has a more general or equal address/mask pair than a second element in the access list.

30. The apparatus of claim 29, wherein the instructions that cause determining include instructions that cause determining from an access list that is related to input packets.

31. The apparatus of claim 29, wherein the instructions that cause determining include instructions that cause determining from an access list that is related to output packets.

32. The apparatus of claim 29, wherein the instructions that cause determining include instructions that cause determining from an access list that is related to a particular level three protocol.

33. An apparatus for identifying network integrity violations in a routed computer network, the apparatus comprising:

a network interface coupled to the routed computer network for receiving one or more packet flows therefrom;

a processor;

one or more stored sequences of instructions which, when executed by the processor, cause the processor to perform the steps of:

determining, from an access list that is stored in electronic memory and that includes patterns used to filter data into and out of a routing device, whether the access list includes a subsumption relation in which a first pattern is more general than or equal to a second pattern, wherein the access list is structured such that the first pattern is encountered prior to the second pattern during typical processing of the access list; and storing in electronic memory a list of subsumption relations identifying pairs of first and second patterns.

34. The apparatus of claim 33, wherein the instructions that cause determining include instructions that cause determining from an access list that is related to input packets.

35. The apparatus of claim 33, wherein the instructions that cause determining include instructions that cause determining from an access list that is related to output packets.

36. The apparatus of claim 33, wherein the instructions that cause determining include instructions that cause determining from an access list that is related to a particular level three protocol.

* * * * *